United States Patent
McNeff et al.

(10) Patent No.: US 9,388,345 B2
(45) Date of Patent: *Jul. 12, 2016

(54) HYDROCARBON SYNTHESIS METHODS, APPARATUS, AND SYSTEMS

(71) Applicant: SarTec Corporation, Anoka, MN (US)

(72) Inventors: Clayton V. McNeff, Andover, MN (US); Larry C. McNeff, Anoka, MN (US); Daniel Thomas Nowlan, Hugo, MN (US); Bingwen Yan, Shoreview, MN (US); Peter G. Greuel, Anoka, MN (US)

(73) Assignee: SarTec Corporation, Anoka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/934,713

(22) Filed: Jul. 3, 2013

(65) Prior Publication Data

US 2014/0046104 A1 Feb. 13, 2014

Related U.S. Application Data

(60) Provisional application No. 61/667,813, filed on Jul. 3, 2012, provisional application No. 61/680,360, filed on Aug. 7, 2012, provisional application No. 61/702,582, filed on Sep. 18, 2012.

(51) Int. Cl.
  *C10G 3/00* (2006.01)
  *C10L 1/04* (2006.01)
  (Continued)

(52) U.S. Cl.
  CPC ............... *C10G 3/44* (2013.01); *B01J 21/063* (2013.01); *B01J 21/066* (2013.01); *B01J 23/30* (2013.01);
  (Continued)

(58) Field of Classification Search
  USPC ............ 585/240; 44/306, 307, 308, 385, 605
  See application file for complete search history.

(56) References Cited

U.S. PATENT DOCUMENTS 2,154,835 A 4/1939 Eisenlohr
4,138,336 A 2/1979 Mendel et al.
(Continued)

FOREIGN PATENT DOCUMENTS

AU 2011200090 2/2011
BR 06001602 10/2007
(Continued)

OTHER PUBLICATIONS

Adebanjo, Adenike O. et al., "Production of Diesel-Like Fuel and Other Value-Added Chemicals from Pyrolysis of Animal Fat", Energy & Fuels, vol. 19, 2005, pp. 1735-1741.
(Continued)

*Primary Examiner* — In Suk Bullock
*Assistant Examiner* — Youngsul Jeong
(74) *Attorney, Agent, or Firm* — Pauly, Devries Smith & Deffner, L.L.C.

(57) ABSTRACT

Embodiments of the invention include apparatus and systems for hydrocarbon synthesis and methods regarding the same. In an embodiment, the invention includes a process for creating a hydrocarbon product stream comprising reacting a reaction mixture in the presence of a catalyst inside of a reaction vessel to form a product mixture, the reaction mixture comprising a carbon source and water. The temperature inside the reaction vessel can be between 450 degrees Celsius and 600 degrees Celsius and the pressure inside the reaction vessel can be above supercritical pressure for water. In an embodiment, the invention includes an extrusion reactor system for creating a hydrocarbon product stream. The temperature inside the extrusion reactor housing between 450 degrees Celsius and 600 degrees Celsius. Pressure inside the reaction vessel can be above supercritical pressure for water. Other embodiments are also included herein.

23 Claims, 63 Drawing Sheets

(51) Int. Cl.
*C10L 9/08* (2006.01)
*B01J 21/06* (2006.01)
*B01J 23/30* (2006.01)
*B01J 23/34* (2006.01)
*B01J 23/755* (2006.01)
*B01J 35/02* (2006.01)
*B01J 35/10* (2006.01)

(52) U.S. Cl.
CPC .............. *B01J 23/34* (2013.01); *B01J 23/755* (2013.01); *B01J 35/023* (2013.01); *B01J 35/1014* (2013.01); *B01J 35/1038* (2013.01); *B01J 35/1061* (2013.01); *C10L 1/04* (2013.01); *C10L 9/086* (2013.01); *Y02P 30/20* (2015.11)

(56) References Cited

U.S. PATENT DOCUMENTS

| | | | |
|---|---|---|---|
| 4,911,941 | A | 3/1990 | Katz et al. |
| 5,108,597 | A | 4/1992 | Funkenbusch et al. |
| 5,182,016 | A | 1/1993 | Funkenbusch et al. |
| 5,254,262 | A | 10/1993 | Funkenbusch et al. |
| 5,271,833 | A | 12/1993 | Funkenbusch et al. |
| 5,346,619 | A | 9/1994 | Funkenbusch et al. |
| 5,540,834 | A | 7/1996 | Carr et al. |
| 6,153,773 | A | 11/2000 | Kolstad et al. |
| 6,713,051 | B2 | 3/2004 | Mayes et al. |
| 7,179,379 | B2 | 2/2007 | Appel et al. |
| 7,288,685 | B2 | 10/2007 | Marker |
| 7,301,060 | B2 | 11/2007 | Appel et al. |
| 7,452,841 | B2 | 11/2008 | Ignatchenko et al. |
| 7,476,296 | B2 | 1/2009 | Appel et al. |
| 7,501,379 | B2 | 3/2009 | Ignatchenko et al. |
| 7,659,432 | B2 | 2/2010 | Ignatchenko et al. |
| 7,683,232 | B2 | 3/2010 | Schmidt et al. |
| 7,691,159 | B2 * | 4/2010 | Li .................................. 44/605 |
| 7,771,699 | B2 | 8/2010 | Adams et al. |
| 7,772,414 | B1 | 8/2010 | Hybertson et al. |
| 7,777,085 | B2 | 8/2010 | Berry et al. |
| 7,780,946 | B2 | 8/2010 | Wormsbecher |
| 7,850,841 | B2 | 12/2010 | Koivusalmi et al. |
| 7,883,882 | B2 | 2/2011 | Franklin et al. |
| 7,925,273 | B2 | 4/2011 | Fomukong et al. |
| 7,928,273 | B2 | 4/2011 | Bradin |
| 7,935,515 | B2 | 5/2011 | Franklin et al. |
| 7,967,973 | B2 | 6/2011 | Myllyoja et al. |
| 7,998,339 | B2 | 8/2011 | Myllyoja et al. |
| 8,003,833 | B2 | 8/2011 | Appel et al. |
| 8,076,498 | B2 | 12/2011 | Elst et al. |
| 2002/0173682 | A1 | 11/2002 | Tullio et al. |
| 2003/0143156 | A1 | 7/2003 | Wormsbecher |
| 2004/0188340 | A1 | 9/2004 | Appel et al. |
| 2004/0192980 | A1 | 9/2004 | Appel et al. |
| 2004/0192981 | A1 | 9/2004 | Appel et al. |
| 2006/0004237 | A1 | 1/2006 | Appel et al. |
| 2006/0246141 | A1 | 11/2006 | Liversidge et al. |
| 2007/0098625 | A1 | 5/2007 | Adams et al. |
| 2007/0137097 | A1 | 6/2007 | Ikura |
| 2008/0194811 | A1 | 8/2008 | McNeff |
| 2008/0275144 | A1 | 11/2008 | Van Hardeveld et al. |
| 2009/0014354 | A1 | 1/2009 | Knuuttila et al. |
| 2009/0069586 | A1 | 3/2009 | Oku et al. |
| 2009/0255171 | A1 | 10/2009 | Dumesic et al. |
| 2009/0297495 | A1 | 12/2009 | Kerovuo et al. |
| 2010/0010246 | A1 | 1/2010 | Yan et al. |
| 2010/0048930 | A1 | 2/2010 | Elst et al. |
| 2010/0050502 | A1 | 3/2010 | Wu et al. |
| 2010/0081181 | A1 | 4/2010 | Berry et al. |
| 2010/0081835 | A1 | 4/2010 | Wu et al. |
| 2010/0113849 | A1 * | 5/2010 | Bartek et al. .................. 585/240 |
| 2010/0151535 | A1 | 6/2010 | Franklin et al. |
| 2010/0151539 | A1 | 6/2010 | Franklin et al. |
| 2010/0170147 | A1 * | 7/2010 | McNeff et al. ................. 44/605 |
| 2010/0287823 | A1 | 11/2010 | Misra et al. |
| 2010/0305346 | A1 | 12/2010 | Hara et al. |
| 2010/0324310 | A1 | 12/2010 | Dumesic et al. |
| 2011/0009501 | A1 | 1/2011 | Ernst |
| 2011/0035993 | A1 | 2/2011 | Loescher |
| 2011/0105814 | A1 | 5/2011 | Koivusalmi et al. |
| 2011/0213040 | A1 | 9/2011 | Hassan et al. |
| 2011/0287991 | A1 | 11/2011 | Dubois |
| 2011/0306808 | A1 | 12/2011 | Appel et al. |
| 2011/0319849 | A1 | 12/2011 | Collias et al. |
| 2012/0055077 | A1 | 3/2012 | Savage et al. |
| 2014/0115955 | A1 | 5/2014 | McNeff et al. |

FOREIGN PATENT DOCUMENTS

| | | |
|---|---|---|
| CA | 2601472 | 9/2006 |
| CA | 2607931 | 11/2006 |
| CN | 101870989 | 10/2010 |
| DE | 19620378 | 2/1999 |
| EP | 1642560 | 4/2006 |
| EP | 1869173 | 12/2007 |
| EP | 2290035 | 3/2011 |
| EP | 2290045 | 3/2011 |
| FR | 2938536 | 5/2010 |
| FR | 2947564 | 1/2011 |
| JP | 02289692 | 11/1990 |
| WO | 9108677 | 6/1991 |
| WO | 9627632 | 9/1996 |
| WO | 9707187 | 2/1997 |
| WO | 02102337 | 12/2002 |
| WO | 2004108873 | 12/2004 |
| WO | 2006096834 | 9/2006 |
| WO | 2006121584 | 11/2006 |
| WO | 2007068097 | 6/2007 |
| WO | 2008152199 | 12/2008 |
| WO | 2009003039 | 12/2008 |
| WO | 2009115322 | 9/2009 |
| WO | 2009143159 | 11/2009 |
| WO | 2010005391 | 1/2010 |
| WO | 2010036333 | 4/2010 |
| WO | 2010132628 | 11/2010 |
| WO | 2010141794 | 12/2010 |
| WO | 2010147955 | 12/2010 |
| WO | 2010148057 | 12/2010 |
| WO | 2011004111 | 1/2011 |
| WO | 2011012438 | 2/2011 |
| WO | 2011012439 | 2/2011 |
| WO | 2011012440 | 2/2011 |
| WO | 2011130573 | 10/2011 |
| WO | 2011150410 | 12/2011 |
| WO | 2011150411 | 12/2011 |
| WO | 2014008355 | 1/2014 |

OTHER PUBLICATIONS

Albrecht, Ko et al., "A Brief Literature Overview of Various Routes to Biorenewable Fuels from Lipids for the National Alliance for Advanced Biofuels and Bio-products (NAABB) Consortium", U.S. Department of Energy, PNNL-20279, 2011, pp. 1-16.

Alonso, David M. et al., "Catalytic Conversion of Biomass to Biofuels", Green Chem., vol. 12, 2010, pp. 1493-1513.

Alonso, David M. et al., "Production of Liquid Hydrocarbon Transportation Fuels by Oligomerization of Biomass-Derived C9 Alkenes", Green Chem., vol. 12, 2010, pp. 992-999.

An, Lu et al., "The Influence of Ni Loading Coke Formation in Steam Reforming of Acetic Acid", Renewable Energy, vol. 36, 2011, pp. 930-935.

Barteau, Mark A., "Organic Reactions at Well-Defined Oxide Surfaces", Chem. Rev., vol. 96, 1996, pp. 1413-1430.

Billaud, F. et al., "Catalytic Cracking of Octanoic Acid", Journal of Analytical and Applied Pyrolysis, vol. 58-59, 2001, pp. 605-616.

Busca, Guido, "Bases and Basic Materials in Industrial and Environmental Chemistry: A Review of Commerical Processes", Ind. Eng. Chem. Res., vol. 48, 2009, pp. 6486-6511.

Catallo, W. J. et al., "Transformation of Glucose to Volatile and Semi-Volatile Products in Hydrothermal (HT) Systems", Biomass and Bioenergy, vol. 34, 2010, pp. 1-13.

Danuthai, Tanate et al., "Conversion of Methylesters to Hydrocarbons over an H-ZSM5 Zeolite Catalyst", Applied Catalyst A: General. vol. 361, 2009, pp. 99-105.

(56) References Cited

OTHER PUBLICATIONS

Deng, Li et al., "Upgraded Acidic Components of Bio-Oil through Catalytic Ketonic Condensation", Energy & Fuels, vol. 23, 2009, pp. 564-568.

Fu, Jie et al., "Catalytic Hydrothermal Deoxygenation of Palmitic Acid", Energy Environ. Sci., vol. 3, 2010, pp. 311-317.

Gaertner, C. A. et al., "Catalytic Coupling of Carboxylic Acids by Ketonization as a Processing Step in Biomass Conversion", Journal of Catalysis, vol. 266, 2009, pp. 71-78.

Gaertner, Christian A. et al., "Catalytic Upgrading of Bio-Oils by Ketonization", ChemSusChem, vol. 2, 2009, pp. 1121-1124.

Gaertner, Christian A. et al., "Ketonization Reactions of Carboxylic Acids and Esters over Ceria-Zirconia as Biomass-Upgrading Processes", Ind. Eng. Chem. Res, vol. 49, 2010, pp. 6027-6033.

Glinski, M. et al., "Catalytic Ketonization over Oxide Catalysts X. Transformations of Various Alkyl Heptanoates", Applied Catalysis A: General, vol. 281, 2005, pp. 107-113.

Glinski, M. et al., "Ketones from Monocarboxylic acids: Catalytic Ketonization over Oxide Systems", Applied Catalysis A: General, vol. 128, 1995, pp. 209-217.

Idem, Raphael O. et al., "Thermal Cracking of Canola Oil: Reaction Products in the Presence and Absence of Steam", Energy & Fuels . vol. 10, 1995, pp. 1150-11662.

Ignatchenko, Alexey et al., "Interaction of Water with Titania and Zirconia Surfaces", Journal of Molecular Catalysis A: Chemical, vol. 256, 2006, pp. 57-74.

Ignatchenko, Alexey V., "Density Functional Theory Study of Carboxylic Acids Adsorption and Enolization on Monoclinic Zirconia Surfaces", J. Phys. Chem. C., vol. 116, pp. 16012-16018.

Immer, Jeremy G. et al., "Catalytic Reaction Pathways in Liquid-Phase Deoxygenation of C18 Free Fatty Acids", Applied Catalysis A: General, vol. 375, 2010, pp. 134-139.

Kamimura, Yoichiro et al., "Synthesis of 3-Pentanone from 1-Propanol Over Ce02-Fe2O3 Catalysts", Applied catalysis A: General, vol. 252, (2003), pp. 399-410.

Kubicka, David et al., "Deactivation of HDS Catalysts in Deoxygenation of Vegetable Oils", Applied Catalysis A: General, vol. 394, 2011, pp. 9-17.

Kubicka, David et al., "Deoxygenation of Vegetable Oils over Sulfided Ni, Mo, and NiMo Catalysts", Applied Catalysis A: General, vol. 372, 2010, pp. 199-208.

Lusvardi, Victor S. et al., "The Effects of Bulk Titania Crystal Structure on the Adsorption and Reaction of Aliphatic Alcohols", Journal of Catalysis, vol. 153, 1995, pp. 41-53.

Madsen, Anders T. et al., "Step Changes and Deactivation Behavior in the Continuous Decarboxylation of Stearic Acid", Ind. Eng. Chem. Res., vol. 50, 2011, pp. 11049-11058.

Maher, Kelly D. et al., "Pyrolytic Decarboxylation and Cracking of Stearic Acid", Ind. Eng. Chem. Res., vol. 47, 2008, pp. 5328-5336.

Melero, Juan A. et al., "Production of Biofuels Via the Catalytic Cracking of Mixtures of Crude Vegetable Oils and Nonedible Animal Fats with Vacuum Gas Oil", Energy Fuels, vol. 24, 2010, pp. 707-717.

Murkute, Ambareesh D. et al., "Supported Mesoporous Solid Base Catalysts for Condensation of Carboxylic Acids", Journal of Catalysis, vol. 278, 2011, pp. 189-199.

Na, J. et al., "Hydrocarbon Production from Decarboxylation of Fatty Acid without Hydrogen", Catalysis Today, vol. 156, 2010, pp. 44-48.

Ooi, Yean Sang et al., "Catalytic Cracking of Used Palm Oil and Palm Oil Fatty Acids Mixture from the Production of Liquid Fuel: Kinetic Modeling", Energy & Fuels, vol. 18, 2004, pp. 1555-1561.

Palanisamy, Shanmugam et al., "Thermal Treatment of Rapeseed Oil", Bioenergy Technology, 2011, pp. 546-551.

Patel, Akshay D. et al., "Techno-Economic Analysis of 5-Nonanone Production from Levulinic Acid", Chemical Engineering Journal, vol. 1, 2010, pp. 311-321.

Pei, Z. F. et al., "On the Intermediates of the Acetic Acid Reactions on Oxides: An IR Study", Applied Surface Science, vol. 103, 1996, pp. 171-182.

Priecel, Peter et al., "The Role of Ni Species in the Deoxygenation of Rapeseed Oil Over NiMo-Alumina Catalysts", Applied Catalysis A: General, vol. 397, 2011, 127-137.

Quirino, Rafael L. et al., "Studying the Influence of Alumina Catalysts Doped with Tin and Zinc Oxides in the Soybean Oil Pyrolysis Reaction", J Am Oil Chem Soc, vol. 86, 2009, pp. 167-172.

Renz, Michael, "Ketonization of Carboxylic Acids by Decarboxylation: Mechanism and Scope", Eur. J. Org. Chem., 2005, pp. 979-988.

Serrano-Ruiz, Juan Carlos et al., "Catalytic Upgrading of Lactic Acid to Fuels and Chemicals by Dehydrations/Hydrogenation and C-C Coupling Reactions", Green Chem., vol. 11, 2009, pp. 1101-1104.

Serrano-Ruiz, Juan Carlos et al., "Catalytic Upgrading of Levulinic Acid to 5-Nonanone", Green Chem., vol. 12, 2010, pp. 574-577.

Serrano-Ruiz, Juan Carlos et al., "Transformation of Biomass-Derived Platform Molecules: From High Added-Value Chemicals to Fuels Via Aqueous-Phase Processing", Chemical Society Reviews, vol. 40, pp. 5266-5281.

Shanks, Brent H., "Conversion of Biorenewable Feedstocks: New Challenges in Heterogeneous Catalysis", Ind. Eng. Chem. Res., vol. 49, 2010, pp. 10212-10217.

Simonetti, Dante A. et al., "Catalytic Production of Liquid Fuels from Biomass-Derived Oxygenated Hydrocarbons: Catalytic Coupling at Multiple Length Scales", Catalysis Reviews, vol. 51, 2009, pp. 441-484.

Siswanto, Dessy Y. et al., "Gasoline Production from Palm Oil Via Catalytic Cracking Using MCM-41: Determination of Optimum Condition", Journal of Engineering and Applied Sciences, vol. 3, 2008, pp. 42-46.

Stefanidis, S.D. et al., "In-Situ Upgrading of Biomass Pyrolysis Vapors: Catalyst Screening on a Fixed Bed Reactor", Bioresource Technology, vol. 102, 2011, pp. 8261-8267.

Steinbusch, Kirsten J. et al., "Biological Formation of Caproate and Caprylate from Acetate: Fuel and Chemical Production from Low Grade Biomass", Energy Environ. Sci., vol. 4, 2011, p. 216.

Swaminathan, R. et al., "Studies on the Ketonization of Acetic Acid on Chromia: II. The Surface Reaction", Journal of Catalysis, vol. 16, 1970, pp. 357-362.

Tamunaidu, Pramila et al., "Catalytic Cracking of Palm Oil for the Production of Biofuels: Optimization Studies", Bioresource Technology, vol. 98, 2007, pp. 3593-3601.

Tanner, R.E. et al., "Structure and Chemical Reactivity of Adsorbed Carboxylic Acids on Anatase TiO2(001)", Surface Science, vol. 506, 2002, pp. 251-271.

Ten Dam, Jeroen et al., "Renewable Chemicals: Dehydroxylation of Glycerol and Polyols", ChemSusChem, vol. 4, 2011, pp. 1017-1034.

Twaiq, Farouq A. et al., "Liquid Hydrocarbon Fuels from Palm Oil by Catalytic Cracking Over Aluminosilicate Mesoporous Catalysts with Various Si/Al ratios", Microporous and Mesoporous Materials, vol. 64, 2003, pp. 95-107.

Vivier, Laurence et al., "Ceria-Based Solid Catalysts for Organic Chemistry", ChemSusChem, vol. 3, 2010, pp. 654-678.

Vonghia, Enrico et al., "Pathways for the Deoxygenation of Triglycerides to Aliphatic Hydrocarbons over Activated Alumina", Energy & Fuels, vol. 9, 1995, pp. 1090-1096.

Yared, Ivan et al., "Modeling of Liquid hydrocarbon Fuel Production from Palm Oil Via Catalytic Cracking Using MCM-41 as Catalyst", Journal of Engineering and Applied Sciences, vol. 3, 2008, pages.

Yean Sang, Ooi, "Biofuel Production from Catalytic Cracking of Palm Oil", Energy Sources, vol. 25, 2003, pp. 859-869.

Aimaretti, N. et al., "Batch Study of Glycerol Decomposition in One-Stage Supercritical Production of Biodiesel", Energy & Fuels 2009, vol. 23, pp. 1076-1080.

Akhtar, Javaid et al., "A Review on Process Conditions for Optimum Bio-Oil Yield in Hydrothermal Liquefaction of Biomass", Renewable and Sustainable energy Reviews 15 (2011), pp. 1615-1624.

Annen, M J. et al., "Development of Porous Zirconia spheres by Polymerization-Induced Colloid Aggregation—Effect of Polymerization Rate", Journal of Materials Science, vol. 29, 1994, pp. 6123-6130.

Billaud, Francis et al., "Pyrolysis of Secondary Raw Material from Used Frying Oils", Récents Progrès en Génie des Procédés, Numéro 94-2007 ISBN 2-910239-68-3, Ed. SFGP, Paris, France (8 pages).

(56) References Cited

OTHER PUBLICATIONS

Chen, Ching-Hung et al., "Biodiesel Production from Supercritial Carbon Dioxide Extracted Jatropha Oil Using Subcritical Hydrolysis and Supercritical Methylation", J. of Supercritical Fluids, vol. 52, 2010, pp. 228-234.
Chen, Ching-Hung et al., "Subcritical Hydrolysis and Supercritical Methylation of Supercritical Carbon Dioxide Extraction of Jatropha Oil", Separation and Purification Technology, vol. 74, 2010, pp. 7-13.
Choudhary, T. V. et al., "Renewable Fuels via Catalytic Hydrodeoxygenation", Applied Catalysis A: General, vol. 397, 2011 pp. 1-12.
Czernik, Stefan et al., "Hydrogen by Catalytic Steam Reforming of Liquid Byproducts from biomass Thermoconversion Processes", Ind. Eng. Chem. Res. vol. 41, 2002, pp. 4209-4215.
Dagle, Robert A. et al., "Methanol Steam Reforming for Hydrogen Production", Chem. Rev., vol. 107, 2007, pp. 3992-4021.
Dandik, Levent et al., "Catalytic Conversion of Used Oil to Hydrocarbon Fuels in a Fractionating Pyrolysis Reactor", Energy and Fuels, vol. 12, 1998, pp. 1148-1152.
De La Casa, R.M. et al., "Modification of the Activities of Two Different lipases from Candida Rugosa with Dextrans", Enzyme and Microbial Technology, vol. 30, 2002, pp. 30-40.
De Lasa, Hugo et al., "Catalytic Steam Gasificationof Biomass: Catalysts, Thermodynamics and Kinetics", Chemical Reviews, vol. 111, 2011, pp. 5404-5433.
De Paula, Ariela V. et al., "Screening of Food Grade Lipases to be Used in Esterification and Interesterification Reactions of Industrial Interest", Appl Biochem Biotechnol, vol. 160, pp. 1146-1156.
Dierker, Markus et al., "Surfactants from Oleic, Erucic, and Petroselinic Acid: Synthesis and Properties", Eur. J. Lipid Sci. Technol., vol. 112, 2010, pp. 122-136.
Dry, Mark E. et al., "High Quality Diesel via the Fischer-Tropsch Process—A Review", J. Chem Technol Biotechnol., vol. 77, 2001, pp. 43-50.
Dry, Mark E., "The Fischer-Tropsch process—Commercial Aspects", Catalysis today 6 (3), 1990, pp. 183-206.
Frykman, Hans B. et al., "Screening Catalytic Lipase Activities with an Analytical Supercritical Fluid Extractor", JAOCS, vol. 75, 1998, pp. 517-520.
Fu, Jie et al., "Activated Carbons for Hydrothermal Decarboxylation of Fatty Acids", ACS Catalysis, vol. 1, 2011, pp. 227-231.
Fujita, Kazunori et al., "Hydrolysis of Glycerol Trioleate and Extraction of Its Fatty acid Under Co2 Supercritical Conditions", The Chemical Society of Japan, vol. 1, 1995, pp. 79-82.
Fureby, Anna M. et al., "Preparation of Diglycerides by Lipase-Catalyzed Alcoholysis of Triglycerides", Enzyme and Microbial Technology, vol. 20, 1997, pp. 198-206.
Guerbuez, Elif I. et al., "Dual-Bed Catalyst System for C-C Coupling of Biomass-Derived Oxygenated Hydrocarbons to Fuel-Grade Compounds", Green Chemistry, vol. 12, 2010, pp. 223-227.
Guthalugu, Nagesha K. et al., "Optimization of Enzymatic Hydrolysis of Triglycerides in Soy Deodorized Distillate with Supercritical Carbon Dioxide", Biochemical Engineering Journal, vol. 29, 2006, pp. 220-226.
Hampson, J.W. et al., "Effect of Moisture Content on Immobilized Lipase-Catalyzed Tricyclglycerol Hydrolysis Under Supecritical Carbon Dioxide Flow in a Tubular Fixed-Bed Reactor", JAOCS, vol. 76, 1999, pp. 777-781.
Hampson, J.W. et al., "Separation of Tripalmitin from Its Hydrolysis Products by Simple Isocratic Reversed-Phase High-Performance Liquid Chromatography", JAOCS, vol. 75, 1998, pp. 539-540.
Hara, Michikazu, "Biomass conversion by a solid acid catalyst", Energy Environ. Sci., vol. 3, 2010, pp. 601-607.
Haryanto, Agus et al., "Current Status of Hydrogen Production Techniques by Steam Reforming of Ethanol: A Review", Energy and Fuels, vol. 19, 2005, pp. 2098-2106.
Hirata, Hirofumi et al., "Substrate-Solvent Dependence of Enantioselectivity in Porcine Pancreatic Lipase Catalyzed Transesterification Between Tributyrylglycerol and Secondary Alcohol in Organic Solvent", J. Oleo Sci., vol. 51, 2002, pp. 539-547.
Holliday, Russell L. et al., "Hydrolysis of Vegetable Oils in Sub- and Supercritical Water", Industrial and Engineering Chemistry Research, vol. 36, No. 3, 1997, pp. 932-935.
International Search Report and Written Opinion, for PCT/US2013/049250, mailed Nov. 1, 2013 (11 pages).
Irimescu, Roxana et al., "Comparison of Acyl Donors for Lipase-Catalyzed Production of 1,3-Dicapryloyl-2-eicosapentaenoylglycerol", JAOCS, vol. 78, 2001, pp. 65-70.
Isayama, Yohei et al., "Biodiesel production by supercritical process with crude bio-methanol prepared by wood gasification", Bioresource Technology, vol. 99, 2008, pp. 4775-4779.
Ishai, Paul B. et al., "Influence of Cyclosporine A on Molecular Interactions in Lyotropic Reverse Hexagonal Liquid Crystals", J. Phys. Chem. B, vol. 114, 2010, pp. 12785-12791.
Isono, Yasuyuki et al., "Interesterification of Triglyceride and Fatty Acid in a Mircoaqueous Reaction System Using Lipase-Surfactant Complex", Biosci. Biotech. Biochem., vol. 59 (9), 1995, 1632-1635.
Jiang, Xiaoxiang et al., "Upgrading Bio-Oil Through Emulsification with Biodiesel: Thermal Stability", Energy Fuels, vol. 24, 2010, pp. 2699-2706.
Jimenez-Morales, I. et al., "Calcined zirconium sulfate supported on MCM-41 silica as acid catalyst for ethanolysis of sunflower oil", Applied Catalysis B: Environmental, vol. 103, 2011, pp. 91-98.
Katsivela, E. et al., "Hydrolysis and Ester-Synthesis Activties of Crude Enzyme Preparation", Enzyme and Microbial technology, vol. 17, 1995, pp. 739-745.
King, Jerry W. et al., "Hydrolysis of soybean oil in a subcritical water flow reactor", Green Chemistry, vol. 1, 1999, pp. 261-264.
Koscsisova, Teodora et al., "Hydrolysis of fatty acid in esters in subcritical water", Eur. J. Lipid Sci. Technol., vol. 108, 2006, pp. 652-658.
Kubatova, Alena et al., "Triacylglyceride Thermal Cracking: Pathways to Cyclic Hydrocarbons", Energy & Fuels, 2011,14 pages.
Kusdiana, Dadan et al., "Effects of water on biodiesel fuel production by supercritical methanol treatment", Bioresource Technology, vol. 91, 2004, pp. 289-295.
Li, Lixiong et al., "Catalytic Hydrothermal Conversion of Triglycerides to Non-ester Biofuels", Energy Fuels, vol. 24, 2010, pp. 1305-1315.
Li, Wei et al., "Study on Acyl Migration Kinetics of Partial Glycerides: Dependence on Temperature and Water Activity", Journal of Molecular Catalysis B: Enzymatic, vol. 63, 2010, pp. 17-22.
Lopez, Dora E. et al., "Esterification and transesterification using modified-zirconia catalysts", Applied Catalysis A: General, vol. 339, 2008, pp. 76-83.
Lu, Jike et al., "Immobilized lipase Candida sp. 99-125 catalyzed methanolysis of glycerol trioleate: Solvent effect", Bioresource Technology, vol. 99, 2008, pp. 6070-6074.
Martinez, Jose L. et al., "Effect of Water on Canola oil Hydrolysis in an Online Extraction-Reaction System Using Supercritical Co2", Ind. Eng. Chem. Res., vol. 41, 2002, pp. 6475-6481.
Mazzieri, V.M. et al., "Non-Catalytic Biodiesel Process with Adsorption-Based Refining", Fuel, vol. 90, 2011, pp. 1186-1196.
McNeff, Clayton V. et al., "Continuous Production of 5-Hydroxymethylfurfural from Simple and Complex Carbohydrates", Applied Catalysis A: General, vol. 384, Issues 1-2, Aug. 2010, pp. 65-69.
Minami, Eiji et al., "Kinetics of hydrolysis and methyl esterification for biodiesel production in two-step supercritical methanol process", Fuel, vol. 85, 2006, pp. 2479-2483.
Mohan, Dinesh et al., "Pyrolysis of wood/Biomass for Bio-Oil: A Critical Review", Energy and Fuels, vol. 20, 2006, pp. 848-889.
Moquin, Paul H. et al., "Kinetic modeling of hydrolysis of canola oil in supercritical media", Journal of Supercritical Fluids, vol. 45, 2008, pp. 94-101.
Ngaosuwan, Kanokwan et al., "Effect of solvent on hydrolysis and transesterification reactions on tungstated zirconia", Applied Catalysis A: General, vol. 380, 2010, pp. 81-86.
Ngaosuwan, Kanokwan et al., "Hydrolysis of Triglycerides Using Solid Acid Catalysts", Ind. Eng. Chem. Res, vol. 48, 2009, 4757-4767.

(56) References Cited

OTHER PUBLICATIONS

Ngaosuwan, Kanokwan et al., "Reaction Kinetics and Mechanisms for Hydrolysis and Transesterification of Triglycerides on Tungstated Zirconia", Top Catal, vol. 53, 2010, pp. 783-794.
"Non-Final Office Action", for U.S. Appl. No. 14/146,601, mailed Feb. 14, 2014 (14 pages).
O'Connor, Charmian J. et al., "Determining the regio- and typo-selectivity of calf pregastric lipase", Journal of Molecular Catalysis B: Enzymatic, vol. 16, 2001, pp. 147-157.
Parve, Omar et al., "Lipase-Catalysed Enantioselective Hydrolysis: Interpretation of the Kinetic Results in Terms of Frontier Orbital Localisation", Tetrahedron, vol. 53, 1997, pp. 4889-4900.
Peterson, Andrew A. et al., "Thermochemical Biofuel Production in Hydrothermal Media: A Reivew of Sub- and Supercritical Water Technologies", Energy and Environmental Science, 2008, 1, pp. 32-65.
Piyatheerawong, Weera et al., "Enzymatic Preparation of Enantiomerically Pure sn-2, 3-Dicylglycerols: A Stereoselective Ethanolysis Approach", JAOCS, vol. 83, 2006, pp. 603-607.
Qi, Zhang et al., "Review of bioMass Pyrolysis Oil Properties and Upgrading Research", Energy Conversion and Management vol. 48, 2007, pp. 87-92.
Qualitative and Quantitative Analysis in GC and GCMS, Customer Support Centre, Shimadzu Asia Pacific Pte. Ltd., 2006, Singapore (32 pages).
Response to Non-Final Office Action, for U.S. Appl. No. 14/146,601, mailed Feb. 14, 2014 and filed with the USPTO May 14, 2014 (10 pages).
"Robichaud, Michael J. et al., An Improved Oil Emulsion Synthesis Method for Large, Porous Zirconia Particles for Packed- or Fluidized-Bed Protein Chromatography", Separation Science and Technology, vol. 32, 1997, pp. 2547-2559.
Saka, Shiro et al., "Useful Products from Lignocellulosics by Supercritical Water Technologies", The 2nd Joint International Conference on "Sustainable Energy and Environment (See 2006)", Nov. 2006, 5 pages.
Schmid U. et al., "Highly Selective Synthesis of 1,3-Oleoyl-2-Palmitoylglycerol by Lipase Catalysis", Biotechnology and Bioengineering, vol. 64, 1999, pp. 678-684.
Shieh, Chwen-Jen et al., "Optimized Enzymatic Synthesis of Geranyl Butyrate with Lipase AY from Candida Rugosa", Biotechnology and Bioengineering, vol. 51, 1996, pp. 371-374.
Takahashi, Yoshinori et al., "Characteristics of Lipase Modified with Water-soluble Acylating Reagents and Its Esterification Ability", Biosci. Biotech. Biochem., vol. 59, 1995, pp. 809-812.
Tanksale, Akshat et al., "A Review of catalytic Hydrogen production Processes from Biomass", Renewable and Sustainable Energy Reviews, vol. 14, 2010, pp. 166-182.
Tavakoli, Omid et al., "Squid Oil and Fat Production from Squid Wastes Using Subcritical Water Hydrolysis: Free Fatty Acids and Transesterification", Ind. Eng. Chem. Res., vol. 45, 2006, pp. 5675-5680.
Toor, Saqib S. et al., "Hydrothermal Liquefaction of Biomass: A Review of Subcritical Water Technologies", Energy 36 (2011), pp. 2328-2342.
Ulgen, Arda et al., "Conversion of Glycerol to Acrolein in the Presence of WO3/TiO2 Catalysts", Applied Catalysis A; General 400 (2011) pp. 34-38.
Van Tot, J. B. et al., "Do Organic Solvents Affect the Catalytic Properties of Lipase? Intrinsic Kinetic Parameters of Lipases in Ester Hydrolysis and Formation in Various Organic Solvents", Biotechnology and Bioengineering, vol. 47, 1995, pp. 71-81.
Varma, Mahesh N. et al., "Effect of Chain Length on Enzymatic Hydrolysis of p-Nitrophenyl Esters in Supercritical Carbon Dioxide", Appl Biochem Biotehnol, vol. 144, 2008, pp. 213-223.
Vieitez, Ignacio et al., "Continuous catalyst-free methanolysis and ethanolysis of soybean oil under supercritical alcohol/water mixtures", Renewable Energy, vol. 35., 2010, pp. 1976-1981.
White, D. H. et al., "Development of an Extruder-Feeder Biomass Direct Liquefactoin Process", Final Report, vol. 1, Oct. 1991, Parts 1-3, 294 pages.
White, Don H. et al., "Biomass Liquefaction Utilizing Extruder-Feeder Reactor System", Department of Chemical Engineering, University of Arizona, date unknown, pp. 106-116.
Yamakawa-Kobayashi, Kimiko et al., "Relation of the -514C/T Polymorphism in the Hepatic Lipase Gene to Serum HDL and LDL Cholesterol Levels in Postmenopausal Women Under Hormone Replacement Therapy", Atherosclerosis, vol. 162, 2002, pp. 17-21.
Yu, Yang et al., "Enzymatic Synthesis of Feruloyated Lipids: Comparison of the Efficiency of Vinyl Ferulate and Ethyl Ferulate as Substrates", J Am Oil Chem Soc, vol. 87, 2010, pp. 1443-1449.
Zheng, Yang et al., "Dual Response Surface-Optimized Process for Feruloylated Diacylglycerols by Selective Lipase-Catalyzed Transesterification in Solvent Free System", Bioresource Technology, vol. 100, 2009, pp. 2896-2901.
Cheng, F W., "China Produces Fuels from Vegetable Oils", Chem. Metall. Eng. Jan. 1945, 99.
Final Office Action, for U.S. Appl. No. 14/146,601, mailed Jun. 26, 2014 (32 pages).
Hirata, Hirofumi et al., "Enzyme Reaction in Organic Solvent. III. Effect of Water Content and Inhibition of Alcohol for the Catalyzed Transesterification in Tributyrin 1-Octanol", Natl. Chem. Lab. Ind., vol. 38, 1989, pp. 48-52.
"Lewkowitsch, J., The Meaning of the Acetyl Value in fat Analysis", Chem. Zentr., vol. 1, 1899, pp. 375-376.
"Non-Final Office Action", for US Appl. No. 14/146,601, mailed Nov. 6, 2014 (17 pages).
"Response to Final Office Action", for U.S. Appl. No. 14/146,601, mailed Jun. 26, 2014 and filed with the USPTO Sep. 26, 2014 (8 pages).
"International Preliminary Report on Patentability," for PCT Application No. PCT/US2013/049250, mailed on Jan. 15, 2015 (8 pages).
"Response to Non-Final Office Action," for U.S. Appl. No. 14/146,601, mailed Nov. 6, 2014 and filed with the USPTO Apr. 6, 2015 (9 pages).
"Final Office Action," for U.S. Appl. No. 14/146,601 mailed Jul. 31, 2015 (23 pages).
Wiggers, et al., "Biofuels from continuous fast pyrolysis of soybean oil: A pilot plant study," Bioresource Technology, vol. 100, (2009) pp. 6570-6577.

\* cited by examiner

HYDROCARBON SYNTHESIS METHODS, APPARATUS, AND SYSTEMS

This application claims the benefit of U.S. Provisional Application No. 61/667,813, filed Jul. 3, 2012, U.S. Provisional Application No. 61/680,360, filed Aug. 7, 2012 and U.S. Provisional Application No. 61/702,582, filed Sep. 18, 2012 the contents of which are herein incorporated by reference.

FIELD OF THE INVENTION

The present invention relates to apparatus and systems for hydrocarbon synthesis and methods regarding the same.

BACKGROUND OF THE INVENTION

Many chemical building blocks and energy sources are derived from fossil carbon deposits that are extracted from the earth's crust in the form of crude petroleum, coal, or natural gas. These fossil carbon deposits range from materials with low carbon to hydrogen ratios such as methane to those that are nearly pure carbon, such as certain types of coal. Fossil carbon sources are viewed as being non-renewable because it is estimated that such deposits take millions of year to form through slow anaerobic decomposition of buried organic matter in combination with exposure to heat and pressure.

World energy consumption is expanding at a rate of over 2% per year. In addition, the demand for products that are made from materials (including many types of polymers) derived from fossil carbon sources continues to increase at an accelerating pace. As such, while the total amount of fossil carbon deposits continues to change as new deposits are discovered, the amount remaining for further exploitation (whether currently known or unknown) necessarily decreases at an accelerating pace.

In addition, most uses of fossil carbon sources lead to a net increase in the amount of carbon in the atmosphere (usually in the form of carbon dioxide) because the cycle starts with carbon that is safely sequestered in the earth's crust and ends with carbon in the atmosphere. This is significant because carbon dioxide has been identified as a key contributor to global warming.

In addition, fossil carbon sources are not evenly distributed within the earth's crust. Some geographic areas are relatively rich in fossil carbon sources while others are relatively poor in fossil carbon sources. In some cases, certain areas may have a substantial amount of one form of fossil carbon but be substantially deficient in other forms. This uneven distribution results in substantial geopolitical stress as countries that are deficient in such essential resources sometimes find that they are at the economic mercy of countries that are rich in such resources.

Utilizing carbon from renewable sources such as organic matter can reduce carbon emissions substantially on a net lifecycle basis because the carbon in emissions from the combustion of renewable carbon sources is from carbon that was previously already in the atmosphere and incorporated into organic materials, rather than being permanently sequestered in the earth's crust.

However, carbon from renewable sources generally does not exist in the same forms as fossil carbon sources and this creates issues. For example, the energy and chemical production infrastructure of most nations has been built up to use fossil carbon sources and cannot be easily changed over to rely on renewable sources. In addition, the same range of compounds found in fossil carbon sources is generally not observed in most renewable carbon sources.

SUMMARY OF THE INVENTION

Embodiments of the invention include apparatus and systems for hydrocarbon synthesis and methods regarding the same. In an embodiment, the invention includes a process for creating a hydrocarbon product stream comprising reacting a reaction mixture in the presence of a catalyst inside of a reaction vessel to form a product mixture, the reaction mixture comprising a carbon source and water. The temperature inside the reaction vessel can be between 450 degrees Celsius and 600 degrees Celsius and the pressure inside the reaction vessel can be above supercritical pressure for water.

In an embodiment, the invention includes an extrusion reactor system for creating a hydrocarbon product stream. The extrusion reactor system can include an extrusion reactor housing comprising an input port and an output port; an extrusion screw disposed within the extrusion reactor housing; a temperature control system configured to maintain the temperature inside the extrusion reactor housing between 450 degrees Celsius and 600 degrees Celsius; and a catalyst disposed within the extrusion reactor housing. Pressure inside the extrusion reactor system can be above supercritical pressure for water.

In an embodiment, the invention includes a reactor system for creating a hydrocarbon product stream. The reactor system can include a reactor housing comprising an input port and an output port; a temperature control system configured to maintain the temperature inside the extrusion reactor housing between 450 degrees Celsius and 600 degrees Celsius; and a catalyst disposed within the reactor housing. The pressure inside the reaction vessel can be above supercritical pressure for water.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which.

Figure 1:
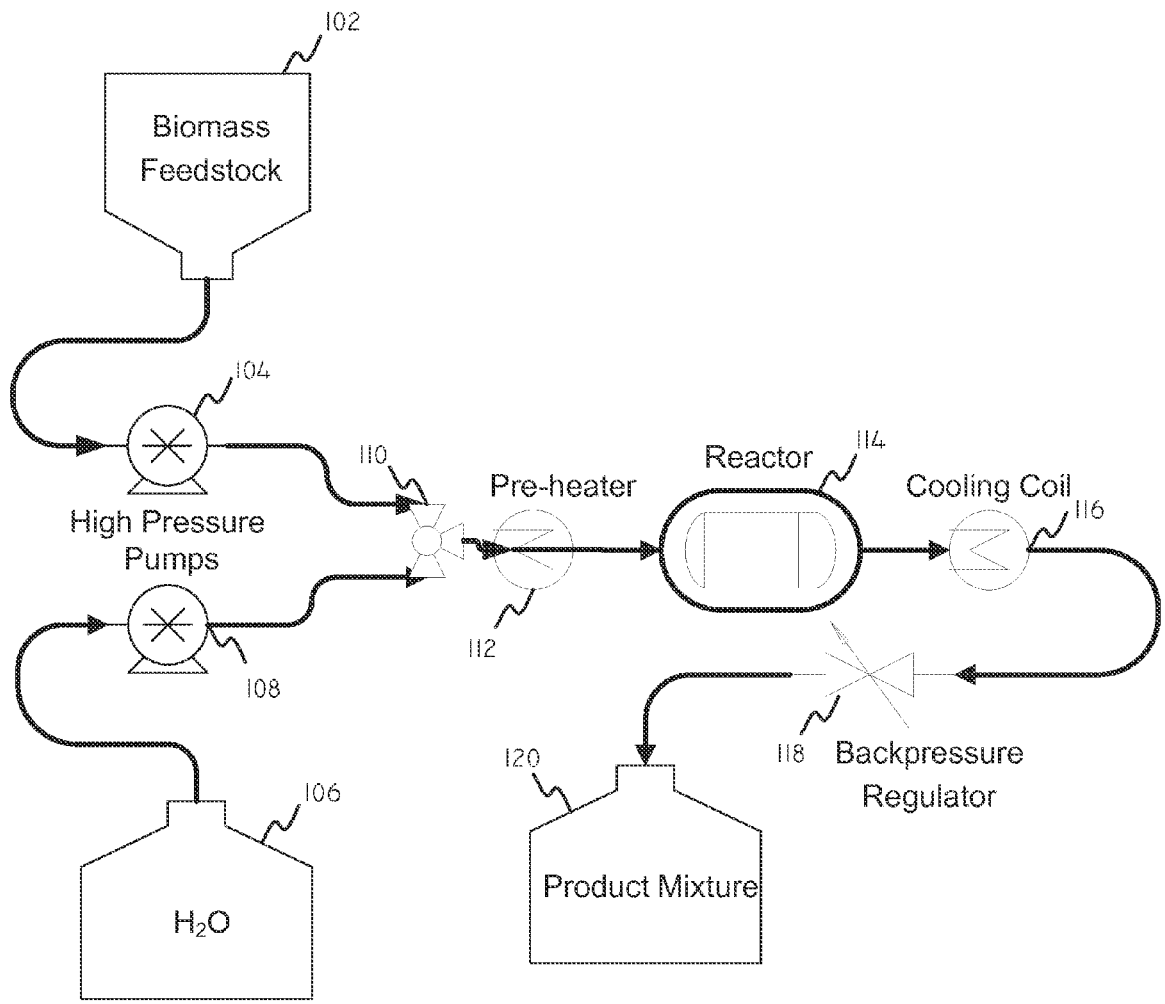
FIG. 1 is a schematic diagram of a reactor system in accordance with various embodiments herein.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Embodiments herein can be used to convert renewable carbon sources into forms similar to non-renewable carbon sources. By way of example, embodiments herein can be used to convert renewable carbon sources into fossil fuel equivalents for engines, including external combustion engines and internal combustion engines (including both intermittent and continuous combustion engines). As a specific example, embodiments herein can be used to produce fuel for two-stroke engines, four-stroke engines, compression-ignition engines, gas turbine engines, and jet engines.

In addition, embodiments herein can be used to convert renewable carbon sources into hydrocarbon compounds useful as chemical building blocks. By way of example, embodiments herein can be used to convert renewable carbon sources into bio-petroleum compounds such as alkanes, alkenes, olefins, aromatics and combinations of these.

In addition, embodiments herein can be used to convert a one form of a non-renewable carbon material into a different form of non-renewable carbon material. By way of example, embodiments herein can be used to convert various types of coal into other forms of hydrocarbon such as products that are equivalent to petroleum, the various materials that can be derived there from, and/or fractions of petroleum.

Embodiments herein can be used to perform various reactions. Reaction can include, but are not limited to, those illustrated in reaction diagrams (I), (II), and (III) below (wherein (I) illustrates the reaction of a triglyceride, (II) illustrates the reaction of a carboxylic acid, and (III) illustrates the reaction of cellulose):

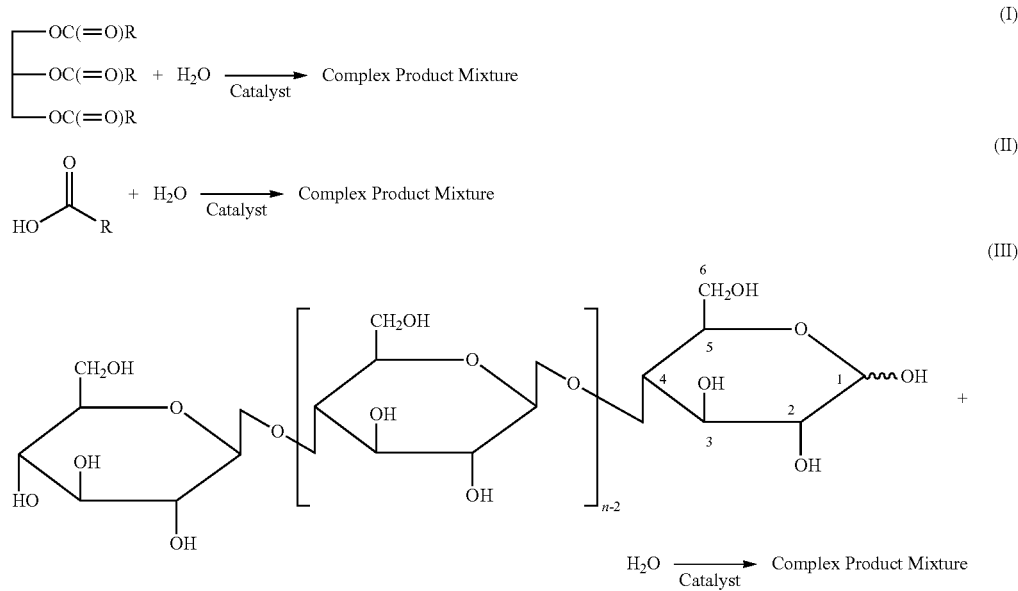

It will be appreciated, however, that reactions here are not limited to these starting materials (provided by way of example) and can include a wide variety of feedstock materials. Other specific bioorganic starting materials can include, but are not limited to, proteins, amino acids, alcohols, nucleic acids, phospholipids, other lipids, saccharides, disaccharides, polysaccharides, lignin, chitin, and the like.

The products of reactions herein can include alkanes, alkenes, ketones, aromatics, polyaromatics, and various gases. Alkanes formed in various embodiments herein can include, but are not limited to, methane, ethane, propane, butane, pentane, heptane, octane, nonane, decane, dodecane, and tridecane. Alkenes formed in various embodiments herein can include, but are not limited to, 1-butene, 1-pentene, 1-heptene, 2-octene, 1-nonene, 4-decene, 5-undecene, 1-hexadecene. Ketones formed in various embodiments herein can include, but are not limited to, 3-octanone, 3-nonanone, 2-decanone, 2-heptadecanone, 2-heptadecanone, 3-octadecanone, 2-nonadecanone, 5-tridecanone, and 6-undecanone. Aromatics formed in various embodiments herein can include, but are not limited to, benzene, toluene, and xylene. Gases formed in various embodiments herein can include, but are not limited to, $H_2$, CO, and $CO_2$.

In some embodiments, the product mixture of reactions herein includes at least about 0-40% ketones. In some embodiments, the product mixture includes at least about 1-40% ketones. In some embodiments, the product mixture includes greater than 0%, 1%, 2%, 3%, 4%, 5%, 10%, 15%, 20%, 25%, 30%, 35%, or 40% ketones. In some embodiments, the product mixture includes at least about 20% aromatics (by chromatographic peak normalization method). In some embodiments, the product mixture includes at least about 30% aromatics. In some embodiments, the product mixture includes greater than 0%, 1%, 2%, 3%, 4%, 5%, 10%, 15%, 20%, 25%, 30%, 35%, or 40% aromatics.

The embodiments herein are quite distinct from other chemical processes. By way of example, pyrolysis is a process of converting organic materials into other forms. The key feature of pyrolysis is the removal of oxygen from the system to circumvent combustion. As such, normal pyrolysis is usually performed in a nitrogen atmosphere under very high temperatures. Vacuum pyrolysis is performed in a similar manner to normal pyrolysis, except the inert atmospheres is achieved by removal of pressure from the system. Typically, pyrolysis product streams are characterized by an aqueous phase, a bio-oil phase and a gaseous stream (often referred to as non-condensables). The bio-oil liquid phase is typically composed of acidic compounds, oxygenates, and phenols. Most bio-oils require a second processing step to make them useful as fuels because of their inherent instability. Hydrogenation (often called hydrodeoxygenation) is usually the preferred method of upgrading. The other methods commonly used are gasification of the bio-oil through cracking or steam reforming and emulsification with a petroleum fuel.

Pyrolysis is often performed to effect the total gasification of a substrate. That gas stream is then separated into hydrocarbon components and syn-gas components. The syn-gas stream can then be processed by methods such as Fischer-Tropsch chemistry to yield hydrocarbons.

In general, water is viewed as problematic to pyrolysis. It increases the amount of energy required to heat the feedstock to the appropriate temperatures. As such, most biomass inputs are subjected to drying before entering a pyrolysis reactor.

Embodiments herein differ substantially from pyrolysis in many regards. Embodiments herein can use water as both a solvent and reactant. Further, the pressures of many embodiments herein are much higher and the temperatures are generally low for pyrolytic techniques. In addition, the product stream obtained herein when using triglyceride based oils is deoxygenating, which is not consistent with a pyrolysis process. For these and other reasons, embodiments herein are substantially different than pyrolysis.

Another process referred to as steam reforming is characterized by total gasification of biomass in the presence of superheated water (700-1000 degrees Celsius), but under normal pressures (3-25 bar). Steam reforming is typically used to produce hydrogen gas from methane. With the proper temperatures and catalyst, methane is converted to carbon monoxide and hydrogen gas in the presence of water. Furthermore, the carbon monoxide equivalent produced undergoes a water-gas shift to produce a third equivalent of hydrogen. The vast majority of hydrogen gas in the US is produced by reforming of methane.

Embodiments herein differ substantially from steam reforming techniques in terms of temperatures, pressure, residence times, and product mixtures obtained.

Hydrothermal cracking is another process for the treatment of oil, biomass and crude petroleum mixtures. It is characterized by a reaction of the incoming feedstock stream with hydrogen gas. Reactions are conducted under moderate to high pressure (14-4000 psi) and at a range of temperatures (100-500 degrees Celsius). There are a variety of catalysts that effect this transformation. In general this results in the reduction of most functional groups in the mixtures and results in the production of mostly saturated hydrocarbon constituents. In terms of biomass related materials this process may also be called hydrodeoxygenation. This process is responsible for the removal of sulfur and nitrogen as well in the form of $H_2S$ and ammonia, respectively. Partial cracking versus total cracking can be identified by cracking pressure. The higher the pressure the more aggressive the reduction is, i.e. reducing aromatics to cycloalkanes.

However, embodiments herein differ substantially from hydrothermal cracking at least in the lack of hydrogen as a co-reactant and the addition of water.

Catalytic cracking processes include fluid catalytic cracking (FCC) or thermal cracking. Typically, feedstock streams are petroleum based long chain hydrocarbons. The FCC system passes a hot mixture over a much hotter bed of catalyst (700-1000 degrees Celsius) resulting it fragmentation of the larger molecules to give an array of lighter compounds—gasolines, naphthas, olefins. This is performed at or very near atmospheric pressures.

Embodiments herein differ substantially from catalytic cracking in the use of higher pressures, lower temperatures, and the use of water as a co-reactant.

The properties of water change greatly with temperature and pressure. At sub-critical temperatures the Kw of water continues to increase making water a more aggressive amphoteric solvent. While the dielectric constant is decreasing as temps are increased, the solvating power of water at sub-critical temps is increased for polar molecules like celluloses. The increased Kw also allows water to act in acid/base capacities more aggressively. That is, hydrolytic rates increase greatly, as well as elimination reactions, condensations and other general acid/base catalyzed reactions. Supercritical water displays very different properties. As water nears its supercritical temperature the dielectric constant continues to decrease and Kw sees a very rapid drop as well. Above supercritical temperatures water behaves like a non-polar solvent. It becomes miscible with oils and hydrocarbons and many salts become completely insoluble.

The process of embodiments herein is unique in many ways including that it utilizes a very active catalyst that is capable of performing multiple reactions. Specifically, triglycerides are hydrolyzed, ketonized, and fragmented to hydrocarbons. Other processes do not directly hydrolyze triglycerides under supercritical water conditions and then simultaneously convert the hydrolyzed free fatty acids to petroleum stream products. Depending on the feedstock and its olefinic content, large amounts of aromatics can be formed by processes herein. In some embodiments, product steams can include at least about 10 aromatics.

Embodiments herein can achieve both sub-critical hydrolysis and reaction of the resulting fatty acids with a specific decarboxylation or ketonization catalyst in a single step with a regenerable catalyst. Significantly, for the subsequent chemistries taking place beyond hydrolysis the removal of water is unnecessary. While not intending to be bound by theory, in some embodiments water can be pivotal for some of the chemistries occurring beyond hydrolysis.

Embodiments herein can include specific and selective chemical transformations (hydrolysis to FFAs, FFAs to ketones). As such, this stands in contrast to random bond breakage due to thermal autodecomposition (cracking).

Methods and Reaction Conditions

Applicants have discovered that the reaction can fail to result in some desirable products if the temperature is not sufficiently high. In some embodiments, the temperature is greater than the critical temperature for water. In some embodiments, the reaction is carried out at about 374° Celsius or hotter. In some embodiments, the reaction is carried out at about 400° Celsius or hotter. In some embodiments, the reaction is carried out at about 450° Celsius or higher. In some embodiments, the reaction is carried out at about 500° Celsius or higher. In some embodiments, the reaction is carried out at about 515° Celsius or higher. In some embodiments, the reaction is carried out at about 530° Celsius or higher. In some embodiments, the reaction is carried out at about 540° Celsius or higher.

If the temperature is too high, the reaction products will simply decompose with random bond breaking as a result of thermal decomposition. In some embodiments, if the temperature is too high the mix of product might shift to a less desirable mixture. In some embodiments, the reaction is carried out at a temperature of less than about 650° Celsius. In some embodiments, the reaction is carried out at a temperature of less than about 600° Celsius. In some embodiments, the reaction is carried out at a temperature of less than about 580° Celsius. In some embodiments, the reaction is carried out at a temperature of less than about 560° Celsius.

In some embodiments, the reaction is carried out between about 400° Celsius and about 650° Celsius. In some embodiments, the reaction is carried out between about 450° Celsius and about 600° Celsius. In some embodiments, the reaction is carried out between about 500° Celsius and about 600° Celsius. In some embodiments, the reaction is carried out between about 500° Celsius and about 550° Celsius. In some embodiments, the reaction is carried out between about 510° Celsius and about 540° Celsius.

In an embodiment, the pressure is greater than about 500 psi. In an embodiment, the pressure is greater than about 800 psi. In an embodiment, the pressure is greater than about 1000 psi. In an embodiment, the pressure is greater than about 1500 psi. In an embodiment, the pressure is greater than about 2000 psi. In an embodiment, the pressure is greater than about 3000 psi. In an embodiment, the pressure is greater than about 3000 psi. In an embodiment, the pressure is greater than about 4000 psi. In some embodiments, the pressure is between about 1500 psi and about 5000 psi. In some embodiments, the pressure during the reaction is greater than the critical pressure of water (221.2 bar or 3205 psi).

In an embodiment, the contact time is between about 0.1 seconds and 2 hours. In an embodiment, the contact time is between about 1 second and 20 minutes. In an embodiment, the contact time is between about 2 seconds and 1 minute.

Reactor Systems

Referring now to FIG. 1, a schematic view of a basic reactor is presented in accordance with an embodiment of the invention. In this embodiment, a feedstock, such as a biomass feedstock is held in a first feedstock tank 102 or bin. Various examples of biomass feedstocks are described in greater detail below. However, it will be appreciated that the scope of biomass feedstocks contemplated for use herein is quite broad and therefore the listing is being provided only by way of non-limiting example. A co-reactant, such as water, is held in a second feedstock tank 106. One or both of the feedstock tanks can be continuously sparged with an inert gas such as nitrogen to remove dissolved oxygen from the respective feedstock. While this embodiment of a reactor setup includes two separate feedstock tanks, it will be appreciated that in some embodiments only a single feedstock tank can be used and the reactants can be combined together within the single feedstock tank.

The feedstocks then pass from the first feedstock tank 102 and second feedstock tank 106 through pumps 104 and 108, respectively, before being combined and passing through a heat exchanger (not shown) where the feedstocks absorb heat from downstream products. The mixture then passes through a shutoff valve 110 and, optionally, a filter (not shown). The feedstock mixture then passes through a preheater 112 and through a reactor 114 where the feedstock mixture is converted into a product mixture. The reactor can include a catalyst, such as in the various forms described herein. In some embodiments, the catalyst is in the form of a particulate and it is packed within the reactor. In some embodiments, however, the catalyst can be mixed in with the feedstock and then passed into a reaction chamber that does not include a packed catalyst.

The reaction product mixture can pass through the heat exchanger (not shown) in order to transfer heat from the effluent reaction product stream to the feedstock streams. In some embodiments, the reaction product mixture can pass through a cooling coil 116. The liquid reaction product mixture can also pass through a backpressure regulator 118 before passing on to a liquid reaction product storage tank 120.

It will be appreciated that various other processes can be performed on the product mixture. By way of example, a lipid phase can be separated from a phase that includes a product mixture. In some embodiments, various products can be separated from one another using distillation techniques. In some embodiments, the reaction products can be isolated from one another and then subjected to further reaction steps.

Figure 2:
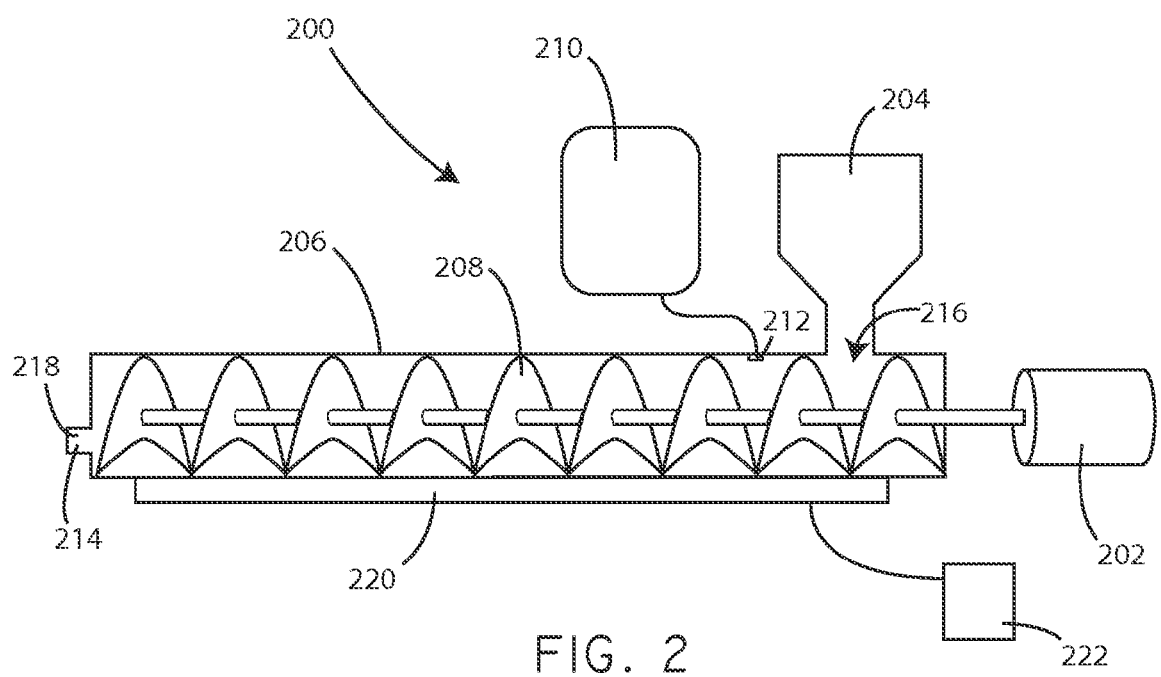
FIG. 2 is a schematic diagram of an extrusion system in accordance with various embodiments herein.

In some embodiments, the carbon feedstock can be subjected to an extrusion process. Referring now to FIG. 2, a schematic diagram is shown of an extrusion reactor 200 in accordance with an embodiment of the invention. The reactor 200 includes an extrusion reactor housing 206 defining an input port 216 and an output port 218. A hopper 204 is configured to hold a feedstock and deliver it into the reactor housing 206 through the input port 216. The feedstock is conveyed and mixed by an extrusion screw 208. The extrusion screw 208 or auger is rotated by a motor 202.

Various additives can be inserted into the reactor housing 206. For example, additives can be stored in an additive tank 210 and then injected into the reactor housing 206 through an additive injection port 212. Additives can include catalysts, water, surfactants, acids or bases, carrier compounds, or the like. In some embodiments, the additives can simply be mixed with the feedstock before entering the input port 216 such as when in the hopper 204 or prior to entering the hopper 204.

In some embodiments, a temperature control system (including, for example, heating element 220 and controller 222) can be disposed along the reactor housing 206 in order to maintain the interior of the reactor housing at a given temperature. In some embodiments, a preheater (not shown) can be disposed along the hopper 204 in order to heat the feedstock to a desired temperature before it enters the reactor housing 206.

The reactor 200 is configured to allow the feedstock stream to interact with a catalyst. In some embodiments, a catalyst can be embedded in the walls of the reactor housing 206. In some embodiments, a catalyst can be embedded on the surfaces of the extrusion screw 208. In some embodiments, a particulate catalyst is added to the feedstock before entering the reactor housing 206 and, optionally, later recovered after passing through the reactor housing 206.

The extrusion screw 208 rotates and moves the feedstock through the reactor housing 206 toward the output port 218. Pressure and, as a result, temperature are increased as the feedstock is pushed on by the extrusion screw 208. The reaction product stream passes out of the reactor housing 206 and then through an extrusion die 214.

Though not shown in FIGS. 1-2, in some embodiments, feedstocks can be subjected to one or more preprocessing steps before being processed in a reactor. For example, a feedstock can be subject to mechanical processing in order to render the matter therein more suitable for reaction. In some embodiments, the feedstock may be mechanically processed to yield a relatively fine particulate feedstock. By way of example, mechanical processing can include operations of cutting, chopping, crushing, grinding, or the like. In some embodiments, other types of processing procedures can be performed such as the addition of water, or other additives, to the feedstock.

Figure 3:
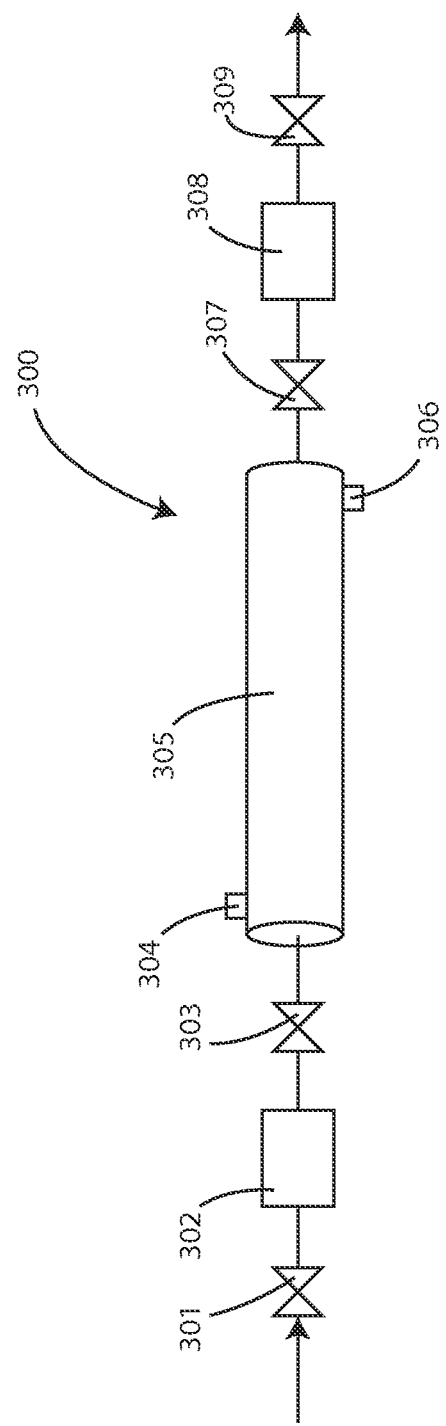
FIG. 3 is a schematic diagram of an extraction system in accordance with various embodiments herein.

In some embodiments, a feedstock may be subjected to an extraction operation before contacting a catalyst. For example, a feedstock can be subjected to a supercritical fluid extraction operation. One example of a supercritical fluid extraction apparatus is described in U.S. Pat. No. 4,911,941, the content of which is herein incorporated by reference. Referring now to FIG. 3, an extraction system 300 is shown in accordance with an embodiment of the invention. At steady state conditions, the extraction vessel 305 is filled with a raw feedstock material that contains carbon source material. A supercritical fluid is fed to the first end 304 of the extraction vessel 305 and feedstock-containing supercritical fluid is withdrawn from the second end 306 of the extraction vessel 305. In an embodiment, the supercritical fluid is supercritical water. In an embodiment, the supercritical fluid is carbon dioxide. Raw feedstock material is periodically admitted through valve 301 into blow case 302. Valves 303 and 307 are simultaneously opened intermittently so as to charge the raw feedstock from blow case 302 to the second end of the extraction vessel 306 and discharge a portion of processed feedstock waste from the first end 304 of the extraction vessel 305 to blow case 308. Valves 303 and 307 are then closed. Valve 309 is then opened to discharge the processed feedstock waste from blow case 308. Additional raw feedstock is admitted through valve 301 into blow case 302 and the procedure is repeated. The extraction system 300 can be connected in series with a reactor. For example, the extraction system 300 can be connected in series with the reactor shown in FIG. 1 or FIG. 2.

In some embodiments, a reactor including staged temperatures can be utilized. For example, reactants can first be exposed to a particular temperature level for a period of time in the presence of a first catalyst, then can pass onto further reaction stages at a different temperature in the present of the same or a different catalyst. For example, the reactor can include one or more lower temperature reaction stages followed by a last reaction stage at between 500 degrees Celsius and 550 degrees Celsius. The lower temperature preliminary reaction stages can be at either supercritical or subcritical temperatures for water.

Figure 4:
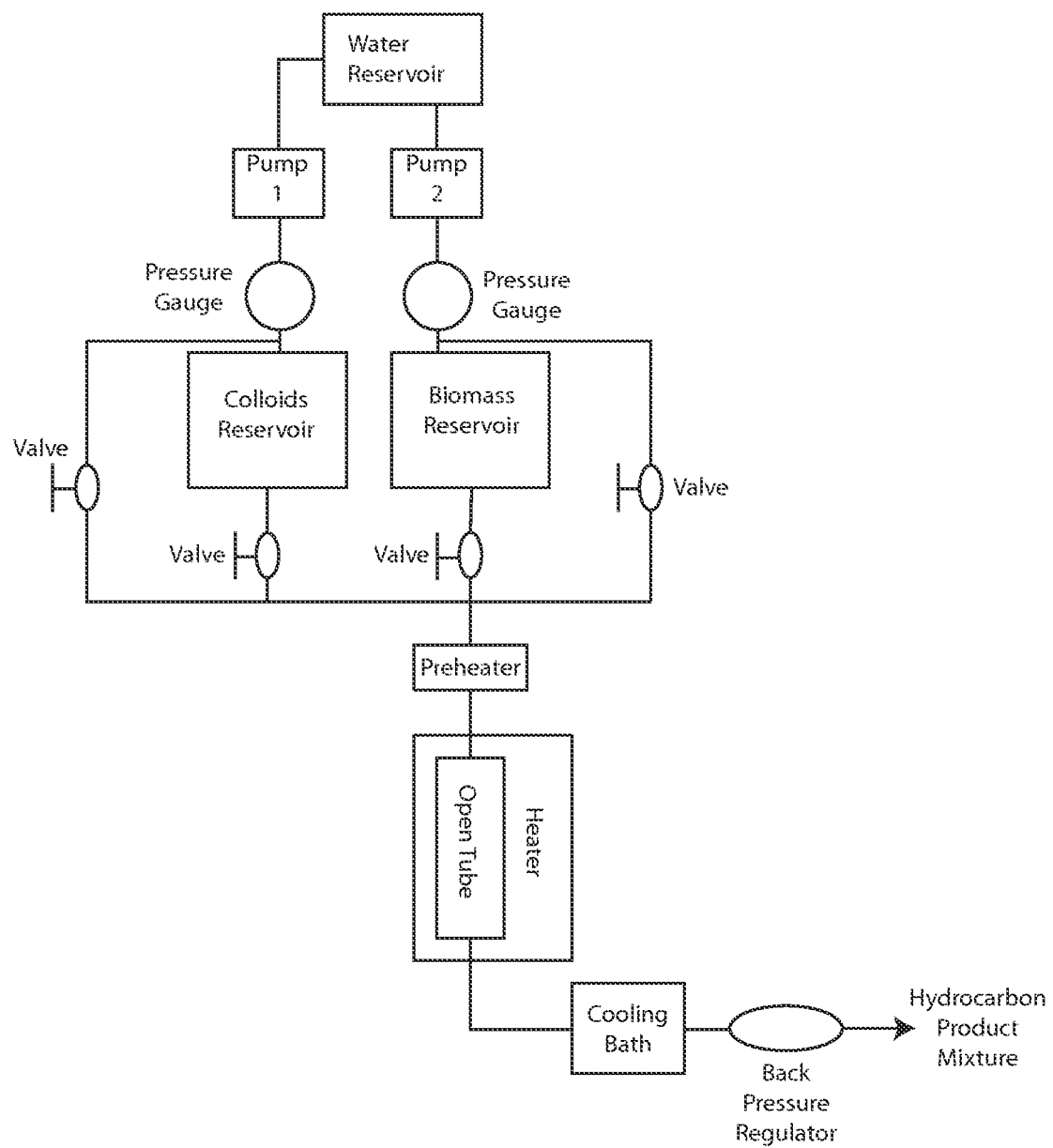
FIG. 4 is a block diagram of an open tube hydrocarbon production system.
Figure 44:
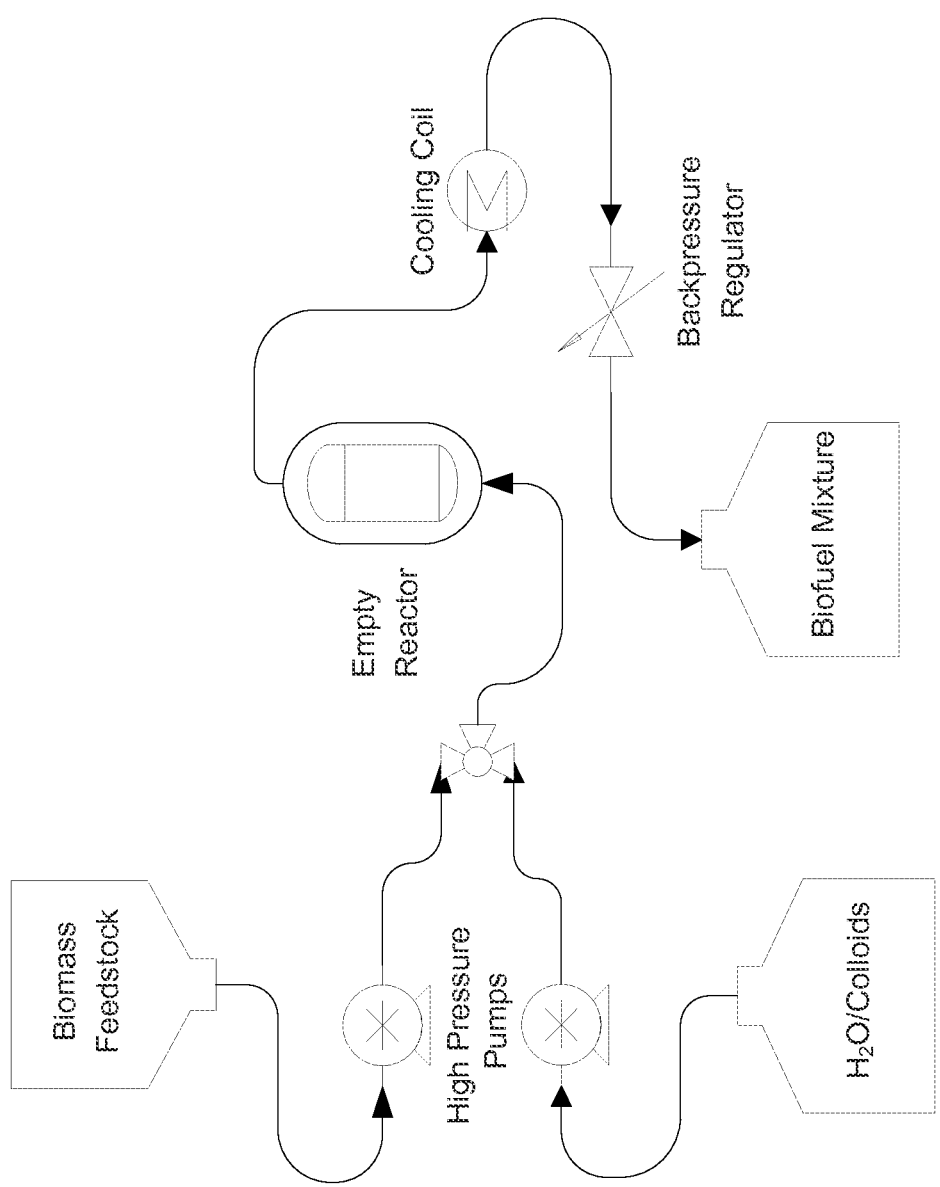
FIG. 44 is a schematic view of a reactor system in accordance with various embodiments herein.

It will be appreciated that many other specific reactor configurations are within the scope described herein. By way of example, additional reactor configurations are shown in FIG. 44 and FIG. 4. FIG. 4 is one example of a reactor system that can be used in conjunction with embodiments herein. The reactor system can include a water reservoir in communication with one or more pumps. In some embodiments, a pressure gauge or sensor can be included in order to monitor pressure within the system. In some embodiments, the reactor system can include a reservoir for storing quantities of catalyst, such as a colloid reservoir. In various embodiments, the reactor system can also include a biomass reservoir. The catalyst and the biomass can be carried to a reaction chamber, such as an open tube reactor. In some embodiments, the materials can pass through a preheater before reaching the reaction chamber. The reaction chamber can include a heater in order to maintain the temperature therein at a desired temperature. After passing through the reaction chamber, reaction products can pass through a cooling bath and a back pressure regulator. It will be appreciated that the reactor system in FIG. 4 is provided by way of example only and in accordance with various embodiments herein reactor systems may not include all of the components described with respect to FIG. 4. In addition, in some embodiments, reactors systems can include additional components beyond what is described with respect to FIG. 4.

Catalysts

Catalysts herein can include those exhibiting sufficient stability in the presence of supercritical water. Catalysts herein can include metals, metal oxides, ceramics, and the like. Catalysts used with embodiments of the invention can include metal oxides with surfaces including Lewis acid sites, Bronsted base sites, and Bronsted acid sites. By definition, a Lewis acid is an electron pair acceptor. A Bronsted base is a proton acceptor and a Bronsted acid is a proton donor.

Catalysts of embodiments herein can specifically include zirconia, titania, hafnia, yttria, tungsten (VI) oxide, manganese oxide, nickel oxide, nickel, copper oxide, niobium oxide, cobalt oxide, carbon, carbon/nickel, carbon/platinum. In some embodiments catalysts can include alumina, iron oxide, metal salts, insoluble metal salts, metal oxides, metal hydroxides, metal alloys, metal complexes, and metal ion complexes. Metals of these can include alkali metals, alkaline earth metals, transition metals and poor metals. In some embodiments, the metal can include one or more of group IA, IIA, IIB, IVB, VB, VIIB, VIIB, VIIIB, IB, IIB, IIIA, IVA metals. In some embodiments, the catalyst can include one or more of CuO, $KH_2PO_4$, $Nb_2O_5$, $Y_2O_3$, ZnO, $MgCO_3$, $K_2CO_3$, $Fe_2O_3$, $CoO_2$. In some embodiments, the catalyst can consist essentially of one or more of any of the materials described herein.

Catalysts of embodiments herein can also include silica clad with any of the foregoing catalyst materials, such as a metal oxide selected from the group consisting of zirconia, titania, hafnia, yttria, tungsten (VI) oxide, manganese oxide, nickel oxide, nickel, copper oxide, niobium oxide, cobalt oxide, carbon carbon/nickel, carbon/platinum.

In some embodiments, the catalyst can be of a single metal oxide type. By way of example, in some embodiments, the catalyst is substantially pure zirconia. By way of example, in some embodiments, the catalyst is substantially pure titania. By way of example, in some embodiments, the catalyst is substantially pure hafnia. By way of example, in some embodiments, the catalyst is substantially pure yttria. By way of example, in some embodiments, the catalyst is substantially pure tungsten (VI) oxide. By way of example, in some embodiments, the catalyst is substantially pure manganese oxide. By way of example, in some embodiments, the catalyst is substantially pure nickel oxide.

Catalysts of embodiments herein can also include mixtures of materials, such as mixtures of materials including zirconia, titania, hafnia, yttria, tungsten (VI) oxide, manganese oxide, nickel oxide, nickel, carbon, carbon/nickel, and carbon/platinum.

Catalysts of embodiments herein can include metal oxide particles clad with carbon. Carbon clad metal oxide particles can be made using various techniques such as the procedures described in U.S. Pat. Nos. 5,108,597; 5,254,262; 5,346,619; 5,271,833; and 5,182,016, the contents of which are herein incorporated by reference. Carbon cladding on metal oxide particles can render the surface of the particles more hydrophobic.

Catalysts of embodiments herein can be made in various ways. As one example, a colloidal dispersion of zirconium dioxide can be spray dried to produce aggregated zirconium dioxide particles. Colloidal dispersions of zirconium dioxide are commercially available from Nyacol Nano Technologies, Inc., Ashland, Mass. The average diameter of particles produced using a spray drying technique can be varied by changing the spray drying conditions. Examples of spray drying techniques are described in U.S. Pat. No. 4,138,336 and U.S. Pat. No. 5,108,597, the contents of both of which are herein incorporated by reference. It will be appreciated that other methods can also be used to create metal oxide particles. One example is an oil emulsion technique as described in Robichaud et al., Technical Note, "An Improved Oil Emulsion Synthesis Method for Large, Porous Zirconia Particles for Packed- or Fluidized-Bed Protein Chromatography," Sep. Sci. Technol. 32, 2547-59 (1997). A second example is the formation of metal oxide particles by polymer induced colloidal aggregation as described in M. J. Annen, R. Kizhappali, P. W. Carr, and A. McCormick, "Development of Porous Zirconia Spheres by Polymerization-Induced Colloid Aggregation-Effect of Polymerization Rate," J. Mater. Sci. 29, 6123-30 (1994). A polymer induced colloidal aggregation technique is also described in U.S. Pat. No. 5,540,834, the contents of which are herein incorporated by reference.

Metal oxide catalysts used in embodiments of the invention can be sintered by heating them in a furnace or other heating device at a relatively high temperature. In some embodiments, the metal oxide is sintered at a temperature of about 160° C. or greater. In some embodiments, the metal oxide is sintered at a temperature of about 400° C. or greater. In some embodiments, the metal oxide is sintered at a temperature of about 600° C. or greater. Sintering can be done for various amounts of time depending on the desired effect. Sintering can make metal oxide catalysts more durable. In some embodiments, the metal oxide is sintered for more than about 30 minutes. In some embodiments, the metal oxide is sintered for more than about 3 hours. However, sintering also reduces the surface area. In some embodiments, the metal oxide is sintered for less than about 1 week.

In some embodiments, the catalyst is in the form of particles. Particles within a desired size range can be specifically selected for use as a catalyst. For example, particles can be sorted by size using techniques such as air classification, elutriation, settling fractionation, or mechanical screening. In some embodiments, the size of the particles is greater than about 0.2 µm. In some embodiments, the size range selected is from about 0.2 µm to about 10 mm. In some embodiments, the size range selected is from about 0.2 µm to about 5 mm. In some embodiments, the size range selected is from about 0.2 µm to about 1 mm. In some embodiments, the size range selected is from about 1 µm to about 100 µm. In some embodiments, the size range selected is from about 5 µm to about 15 µm. In some embodiments, the average size selected is about 10 µm. In some embodiments, the average size selected is about 5 µm.

In some embodiments, the catalyst can be a particulate in the nanometer size range. In some embodiments, the catalyst can be from about 0.1 nm to about 500 nm. In some embodiments, the catalyst can be from about 1.0 nm to about 300 nm. In some embodiments, the catalyst can be from about 5.0 nm to about 200 nm. In some embodiments, the catalyst can be used in the form of a colloid.

In some embodiments, catalyst particles used with embodiments of the invention are porous. By way of example, in some embodiments the particles can have an average pore size of about 30 angstroms to about 2000 angstroms. However, in other embodiments, catalyst particles used are non-porous.

The physical properties of a porous catalyst can be quantitatively described in various ways such as by surface area, pore volume, porosity, and pore diameter. In some embodiments, catalysts of embodiments herein can have a surface area of between about 1 and about 400 $m^2$/gram. In some embodiments, the catalyst of embodiments herein can have a surface area much higher than 400 $m^2$/gram.

In some embodiments, catalysts of embodiments herein can have a surface area of between about 1 and about 200 $m^2$/gram. Pore volume refers to the proportion of the total volume taken up by pores in a material per weight amount of the material. In some embodiments, catalysts of embodiments herein can have a pore volume of between about 0.01 mL/g and about 2 mL/g. Porosity refers to the proportion within a total volume that is taken up by pores. As such, if the total volume of a particle is 1 $cm^3$ and it has a porosity of 0.5, then the volume taken up by pores within the total volume is 0.5 $cm^3$. In some embodiments, catalysts of embodiments herein can have a porosity of between about 0 and about 0.8. In some embodiments, catalysts of embodiments herein can have a porosity of between about 0.3 and 0.6.

Catalyst particles used with embodiments of the invention can have various shapes. By way of example, in some embodiments the particle can be in the form of spherules. In other embodiments, the particle can be a monolith. In some embodiments, the particle can have an irregular shape.

The Lewis acid sites on catalysts of embodiments herein can interact with Lewis basic compounds. Thus, in some embodiments, Lewis basic compounds can be bonded to the surface of catalysts. However, in other embodiments, the catalysts used with embodiments herein are unmodified and have no Lewis basic compounds bonded thereto. A Lewis base is an electron pair donor. Lewis basic compounds of embodiments herein can include anions formed from the dissociation of acids such as hydrobromic acid, hydrochloric acid, hydroiodic acid, nitric acid, sulfuric acid, perchloric acid, boric acid, chloric acid, phosphoric acid, pyrophosphoric acid, chromic acid, permanganic acid, phytic acid and ethylenediamine tetramethyl phosphonic acid (EDTPA), and the like. Lewis basic compounds of embodiments herein can also include hydroxide ion as formed from the dissociation of bases such as sodium hydroxide, potassium hydroxide, lithium hydroxide and the like.

The anion of an acid can be bonded to a metal oxide of embodiments herein by refluxing the metal oxide in an acid solution. By way of example, metal oxide particles can be refluxed in a solution of sulfuric acid. Alternatively, the anion formed from dissociation of a base, such as the hydroxide ion formed from dissociation of sodium hydroxide, can be bonded to a metal oxide by refluxing in a base solution. By way of example, metal oxide particles can be refluxed in a solution of sodium hydroxide. The base or acid modification can be achieved under exposure to the acid or base in either batch or continuous flow conditions when disposed in a reactor housing at elevated temperature and pressure to speed up the adsorption/modification process. In some embodiments, fluoride ion, such as formed by the dissociation of sodium fluoride, can be bonded to the particles.

In some embodiments, catalyst particles can be packed into a housing, such as a column. Disposing catalyst particles in a housing is one approach to facilitating continuous flow processes. Many different techniques may be used for packing the catalyst particles into a housing. The specific technique used may depend on factors such as the average particle size, the type of housing used, etc. Generally speaking, particles with an average size of about 1-20 microns can be packed under pressure and particles with an average size larger than 20 microns can be packed by dry-packing/tapping methods or by low pressure slurry packing. In some embodiments, the catalyst particles of embodiments herein can be impregnated into a membrane, such as a PTFE membrane.

However, in some embodiments, catalysts used with embodiments of the invention are not in particulate form. For example, a layer of a metal oxide can be disposed on a substrate in order to form a catalyst used with embodiments of the invention. The substrate can be a surface that is configured to contact the feedstocks during processing. In one approach, a catalyst can be disposed as a layer over a surface of a reactor that contacts the feedstocks. Alternatively, the catalyst can be embedded as a particulate in the surface of an element that is configured to contact the feedstocks during processing.

Feedstocks

Feedstocks for embodiments herein can include carbon sources including both renewable carbon sources and non-renewable carbon sources. By way of example, renewable carbon sources can include, but are not limited to, plant-based, microorganism based, and/or animal based biomass. Renewable carbon sources can specifically include carboxylic acids, fatty acids, triglycerides, carbohydrates, biopolymers, and the like.

Renewable carbon sources can specifically include lipid feed stocks that can be derived from many different sources. In some embodiments, lipid feed stocks used in embodiments of the invention can include biological lipid feed stocks. Biological lipid feed stocks can include lipids (fats or oils) produced by any type of microorganism, fungus, plant or animal. In an embodiment, the biological lipid feed stocks used include triglycerides. Many different biological lipid feed stocks derived from plants can be used.

Plant-based feed stocks can include rapeseed oil, soybean oil (including degummed soybean oil), canola oil, cottonseed oil, grape seed oil, mustard seed oil, corn oil, linseed oil, safflower oil, sunflower oil, poppy-seed oil, pecan oil, walnut oil, oat oil, peanut oil, rice bran oil, camellia oil, castor oil, and olive oil, palm oil, coconut oil, rice oil, algae oil, seaweed oil, Chinese Tallow tree oil. Other plant-based biological lipid feed stocks can be obtained from argan, avocado, babassu palm, balanites, borneo tallow nut, brazil nut, calendula, camelina, caryocar, cashew nut, chinese vegetable tallow, cocoa, coffee, cohune palm, coriander, cucurbitaceae, euphorbia, hemp, illipe, jatropha, jojoba, kenaf, kusum, macadamia nuts, mango seed, noog abyssinia, nutmeg, opium poppy, perilla, pili nut, pumpkin seed, rice bran, sacha inche, seje, sesame, shea nut, teased, allanblackia, almond, chaulmoogra, cuphea, jatropa curgas, karanja seed, neem, papaya, tonka bean, tung, and ucuuba, cajuput, clausena anisata, davana, galbanum natural oleoresin, german chamomile, hexastylis, high-geraniol monarda, juniapa-hinojo sabalero, lupine, melissa officinalis, milfoil, ninde, patchouli, tarragon, and wormwood.

Many different feed stocks derived from animals can also be used. By way of example, animal-based biological lipid feed stocks can include choice white grease, lard (pork fat), tallow (beef fat), fish oil, and poultry fat.

Many different feed stocks derived from microorganisms (Eukaryotes, Eubacteria and Archaea) can also be used. By way of example, microbe-based lipid feed stocks can include the L-glycerol lipids of Archaea and algae and diatom oils. Many different lipid feed stocks derived from fungus (e.g. Yeasts) can also be used.

In some embodiments, feed stocks derived from both plant and animal sources can be used such as yellow grease, white grease, and brown grease. By way of example, yellow, white or brown grease can include frying oils from deep fryers and can thus include fats of both plant and animal origin. Lipid feed stocks can specifically include used cooking oil. Brown grease (also known as trap grease) can include fats extracted from waste water treatment and sewage systems and can thus include fats of both plant and animal origin. In some embodiments, lipid feed stocks used in embodiments of the invention can include non-biological lipid feed stocks. Lipid feed stocks of embodiments herein can include black oil.

In some embodiments, feed stocks can be derived from microorganisms such as bacteria, protozoa, algae (such as algae oil, whole algae biomass, algae paste, algae powder), and fungi. Lipid feed stocks of embodiments herein can also include soap stock and acidulated soap stock.

Lipid feed stocks used with embodiments of embodiments herein can specifically include low value feed stocks. Low value feed stocks, such as various types of animals fats and waste oils, generally have a relatively high concentration of free fatty acids. One method of assessing the concentration of free fatty acids is to determine the acid number (or acid value) of the feed stock. The acid number is the mass of potassium hydroxide (KOH) in milligrams that is required to neutralize one gram of the chemical substance being assessed. The precise acid number as measured can vary because of the heterogeneity of the lipid feed stock. However, as an example, a high value feed stock such as virgin soybean oil can have an acid number of about 0.35 whereas a lower value feed stock such as swine tallow can have an acid number of about 5. Yellow grease, a low value feed stock, can have an acid number of about 15 while acidulated soap stock, also a low value feed stock, can have an acid number of about 88.

In some embodiments, the feed stock used has an acid number of about 3 (mg KOH/g oil) or greater. In some embodiments, the feed stock used has an acid number of about 5 (mg KOH/g oil) or greater. In some embodiments, the feed stock used has an acid number of about 10 (mg KOH/g oil) or greater. In some embodiments, the feed stock used has an acid number of about 50 (mg KOH/g oil) or greater.

Carbohydrates used with embodiments herein can include, but are not limited to, monosaccharides, disaccharides, polysaccharides, and the like. Carbohydrates used with embodiments herein can specifically include cellulose and hemicellulose.

Other materials useful as feedstocks can include lignin, pectin, and the like.

Non-renewable carbon sources can include, but are not limited to, coal, carbonaceous gases, and petroleum, or fractions thereof.

The present invention may be better understood with reference to the following examples. These examples are intended to be representative of specific embodiments of the invention, and are not intended as limiting the scope of the invention.

EXAMPLES

Example 1

Formation of Zirconia Particles

A colloidal dispersion of zirconium oxide (NYACOL™ ZR 100/20) (Nyacol Nano Technologies, Inc., Ashland, Mass.), containing 20 wt. % $ZrO_2$ primarily as about 100 nm particles was spray dried. As the dispersion dried, the particles interacted strongly with one another to provide aggregated $ZrO_2$ particles. The dried aggregated particles that were obtained were examined under an optical microscope and observed to consist mostly of spherules from about 0.5 μm to about 15 μm in diameter.

The dried spherules were then sintered by heating them in a furnace at a temperature of 750° C. for 6 hours. The spherules were air classified, and the fraction having a size of approximately 10 μm was subsequently isolated. The particles were all washed in sodium hydroxide (1.0 Molar), followed by water, nitric acid (1.0 Molar), water and then dried under vacuum at 110° C. BET nitrogen porosimetry was performed in order to further characterize the sintered spherules. The physical characteristics of the spherules were as listed in Table A1.

Example 2

Formation of a Packed Reactor 20 g of zirconia catalyst as formed in Example 1 were dry packed into a 15 cm×10.0 mm i.d. stainless steel tube. 80 μm diameter (60 Angstrom average pore diameter) bare titania particles were obtained (ZirChrom Separations, Inc., Anoka, Minn.) and were dry packed into two 1.0 cm i.d.×15 cm stainless steel reactor tubes. Each tube contained 14 g of titania.

Example 3

Product Production from Biomass Feedstock

A reactor was set up similar to that shown in FIG. 1. The reactor included two high pressure pumps (Waters 590 HPLC pumps, Waters Corporation, Milford, Mass.) drawing from water and heated (using a hot plate) lipid reservoirs. Both reservoirs were continuously sparged with nitrogen to minimize the effect of dissolved oxygen on the reaction.

The lipid (soybean oil) feedstock was first filtered by passing the liquid under high pressure through a blank stainless steel 10 mm (i.d.)×150 mm length reactor fitted with two 10 micron stainless steel frits. The feedstock then entered a heat exchanger, preheater and subsequently went into the reactor. Both the water and lipid feedstock streams were pumped into a custom designed heat exchanger. This design consisted of ⅛th inch (o.d.) stainless steel tubes (Alltech Associates, Deerfield, Ill.) welded together with silver solder. By this design, direct contact and counter flow was achieved such that the heat from the hot reactor effluent could be transferred to the two incoming reactant streams (methanol and lipid).

After the heat exchanger, the two reactant streams were combined using a "T" fitting and the mixture was passed through an electrically driven preheater that was capable of bringing the mixture to the desired set point temperature before entering the independently thermostated fixed bed catalytic reactor. Temperature control was achieved using EZ-Zone PM Watlow (St. Louis, Mo.) temperature controllers. The custom preheater was used to bring the temperature of the feedstock stream up to the desired temperature before it entered the reactor. The preheater consisted of stainless steel HPLC tubing wound around a grooved aluminum cylindrical block with an 800 watt Watlow heater positioned in the center of the cylinder. The backpressure of the system was maintained through the use of a backpressure regulator obtained from Tescom (Elk River, Minn.), after which the cooled effluent was collected. The recovered effluent spontaneously separated into two distinct phases with the top phase being primarily reaction products while the bottom layer was predominantly water.

Figure 5:
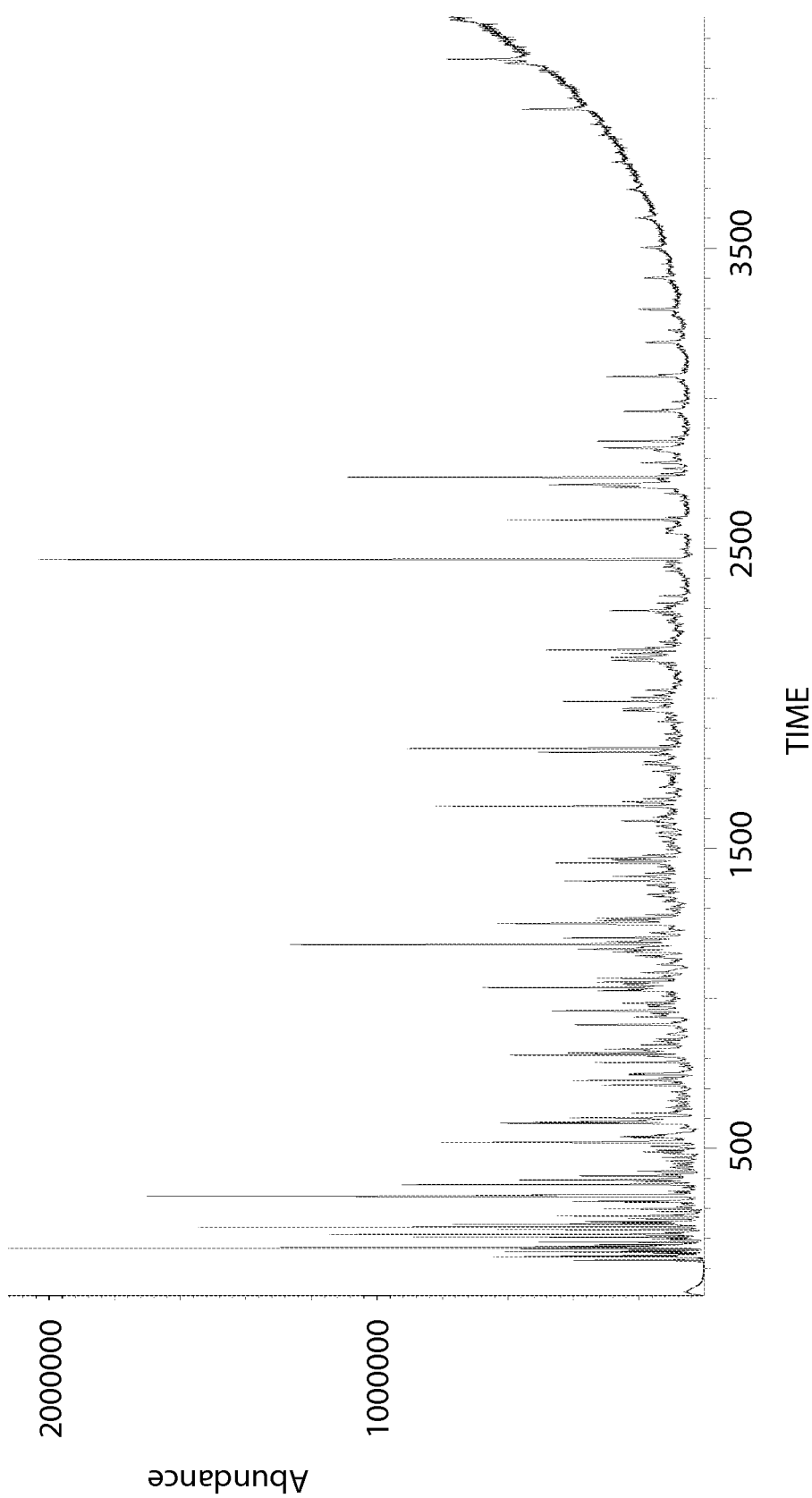
FIG. 5 is an image of a GC-MS spectrum of products from the reaction of soybean oil over a titania catalyst at 530 degrees Celsius (Exp. No. 11).
Figure 6:
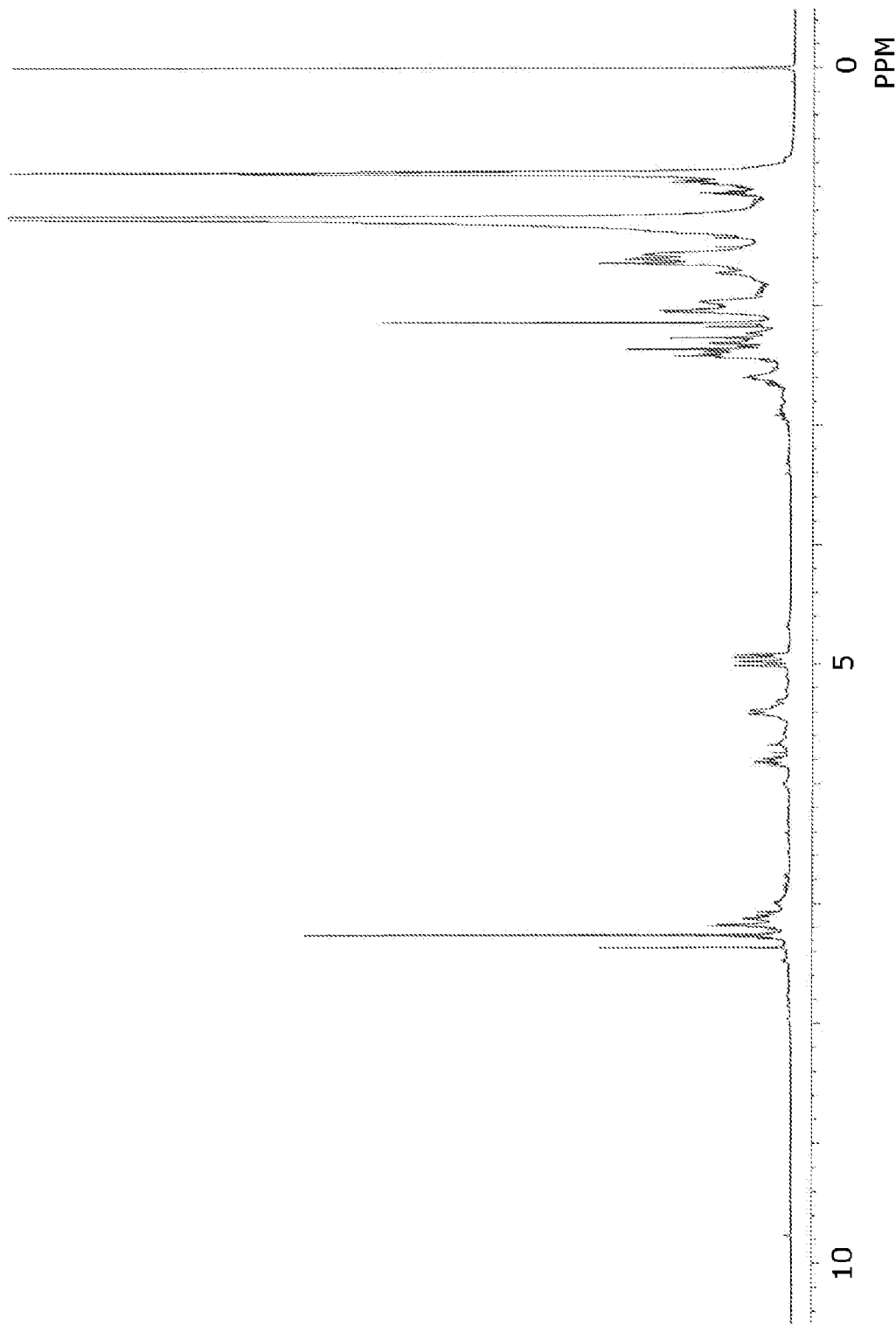
FIG. 6 is an image of a $^1$H-NMR spectrum of products from the reaction of soybean oil over a titania catalyst at 530 degrees Celsius (Exp. No. 11).
Figure 7:
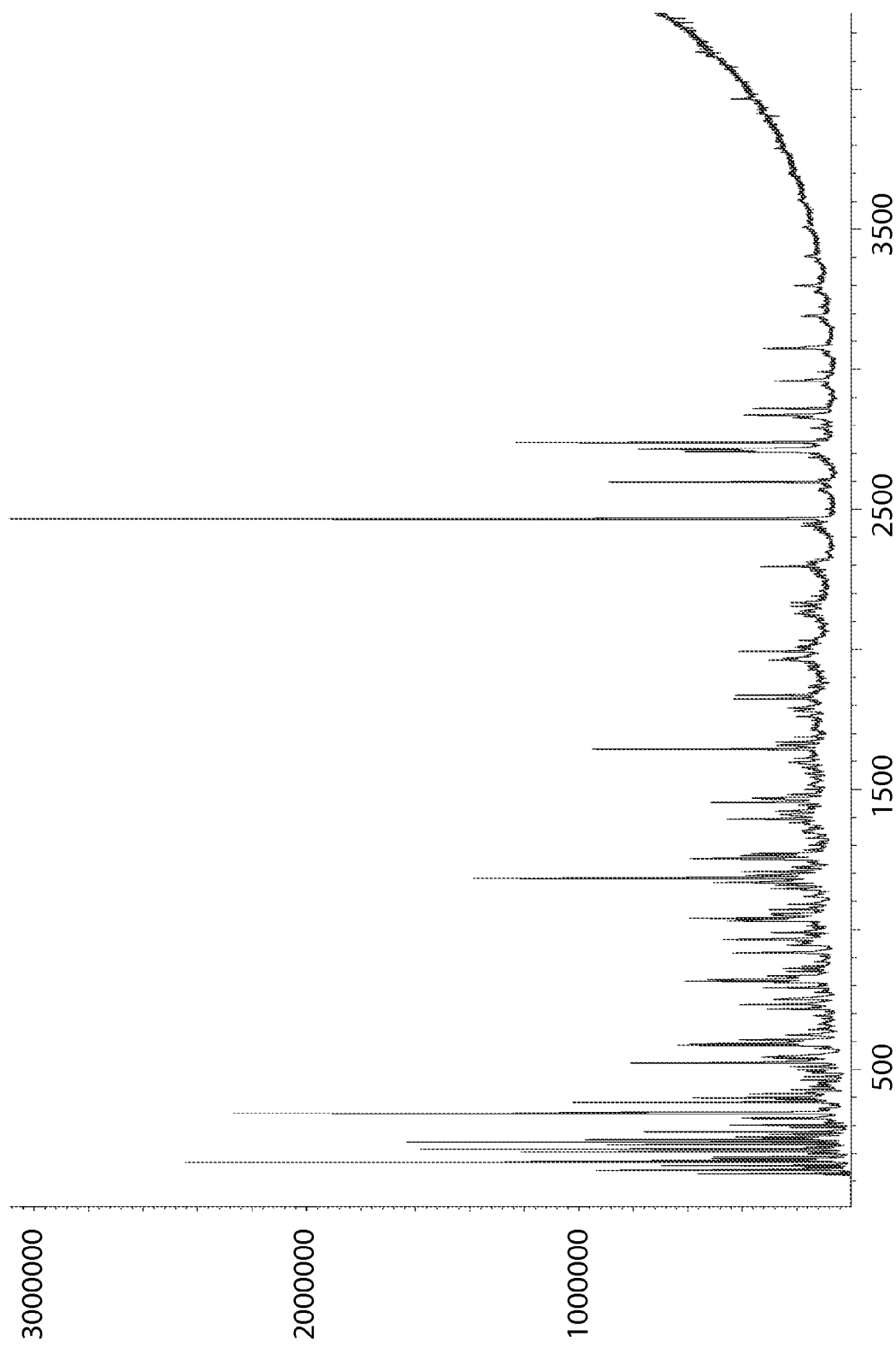
FIG. 7 is an image of a GC-MS spectrum of products from the reaction of soybean oil over a zirconia catalyst at 525 degrees Celsius (Exp. No. 78).
Figure 8:
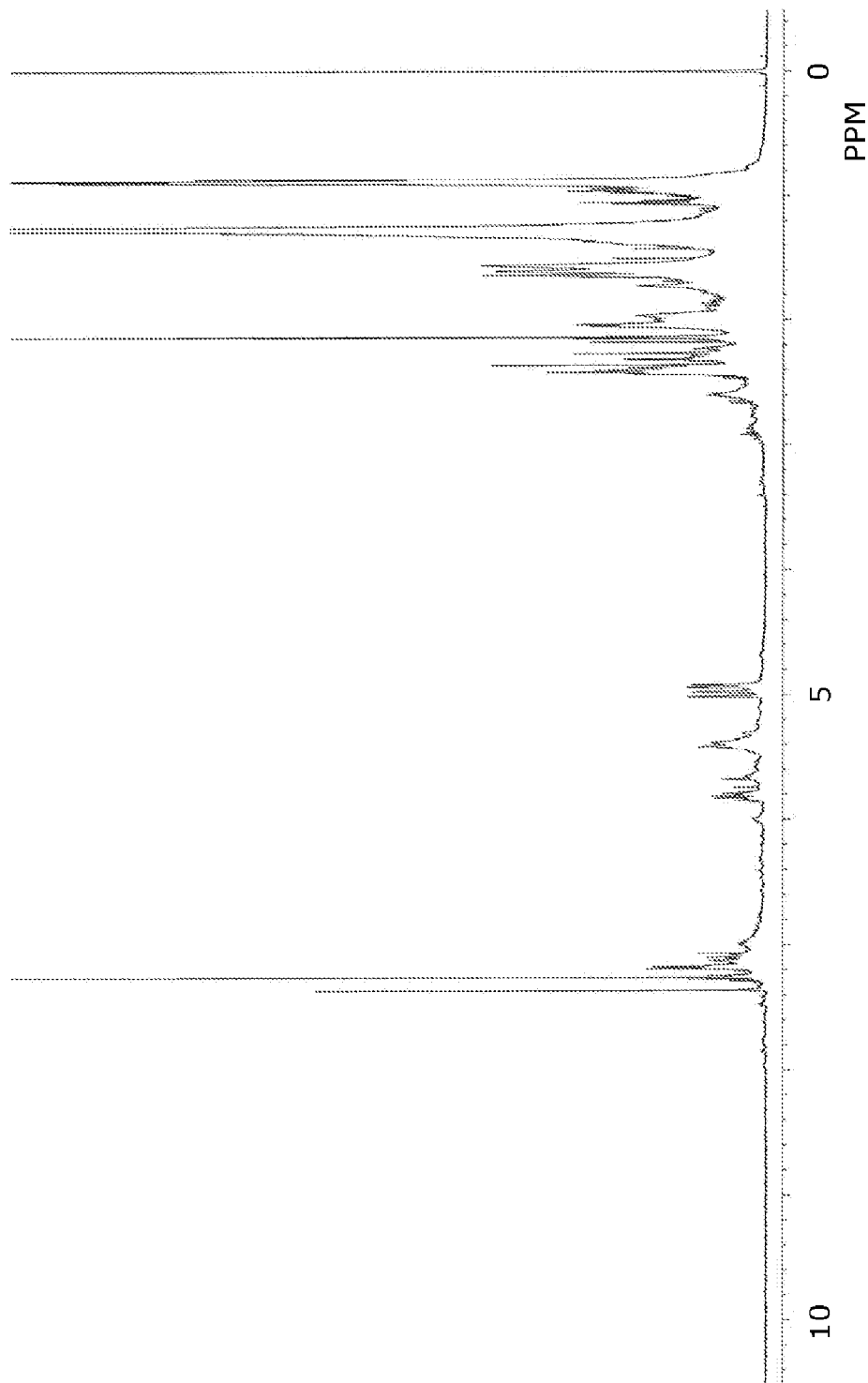
FIG. 8 is an image of a $^1$H-NMR spectrum of products from the reaction of soybean oil over a zirconia catalyst at 525 degrees Celsius (Exp. No. 78).

Samples of the feedstocks were processed through the reaction apparatus under varying conditions. The products were collected hourly based on production rate. The specific reaction conditions are described in Table A2. Samples from experiments 11, 29, and 78 were analyzed by $^1$H-NMR and GC-MS (See Table A4 (GC-MS Data for Sample 11), FIG. 5 (GC-MS Spectrum for Sample 11), FIG. 6 ($^1$H-NMR Spectrum for Sample 11), Table A6 (GC-MS Data for Sample 78), FIG. 7 (GC-MS Spectrum for Sample 78), FIG. 8 ($^1$H-NMR Spectrum for Sample 78)). Samples 11 and 29 were both performed at 530° C. using titania as the catalyst. The pressure was varied in these two experiments. Sample 11 was performed at 2250 psi (gaseous water phase) and sample 29 was performed at 3450 psi (supercritical water phase). Sample 78 utilized zirconia as the catalyst and supercritical water conditions (525° C., 3500 psi). Each of these samples was found to have a very low acid number of the product biofuel (<30) as shown in Table A3.

Example 4

Hydrocarbon Production from Soybean Oil

A reactor was set-up as described in Example 3 using a zirconia catalyst. The specific reaction conditions are described in Table A7. Further aspects of the experiments and acid numbers for the products are shown in Table A8.

For blank runs 131 and 144, 1 and 2 minute residence times respectively, the GC-MS spectra could not be acquired directly due to their high acid numbers. The samples were subjected to an esterification/transesterification reaction conducted on a small scale (microesterification). That procedure was as follows:

Microesterification

A biofuel sample was obtained by placing a pipette in the liquid sample and allowing a small amount to enter the pipette by capillary action; this typically draws 4 to 8 milligrams of liquid. The sample was then added to a small Teflon capped vial and 0.2 mL methanol were added. The transferring pipette was rinsed to ensure most of the sample was transferred to the vial. Then 0.8 mL of 5% acetyl chloride in methanol was added to the vial. The vial was tightly capped and heated in a sand bath to 50° C. for 14 hours.

After cooling, the contents of the vial were transferred to a test tube containing 1 mL saturated $NaHCO_3$ and 2 mL pentane. Once gas evolution ceased the pentane solution was removed by pipette and transferred to another test tube. The pentane solution was dried over sodium sulfate. The pentane solution was transferred to a GC vial and analyzed.

GC-MS Method for Esterified Samples

Figure 9:
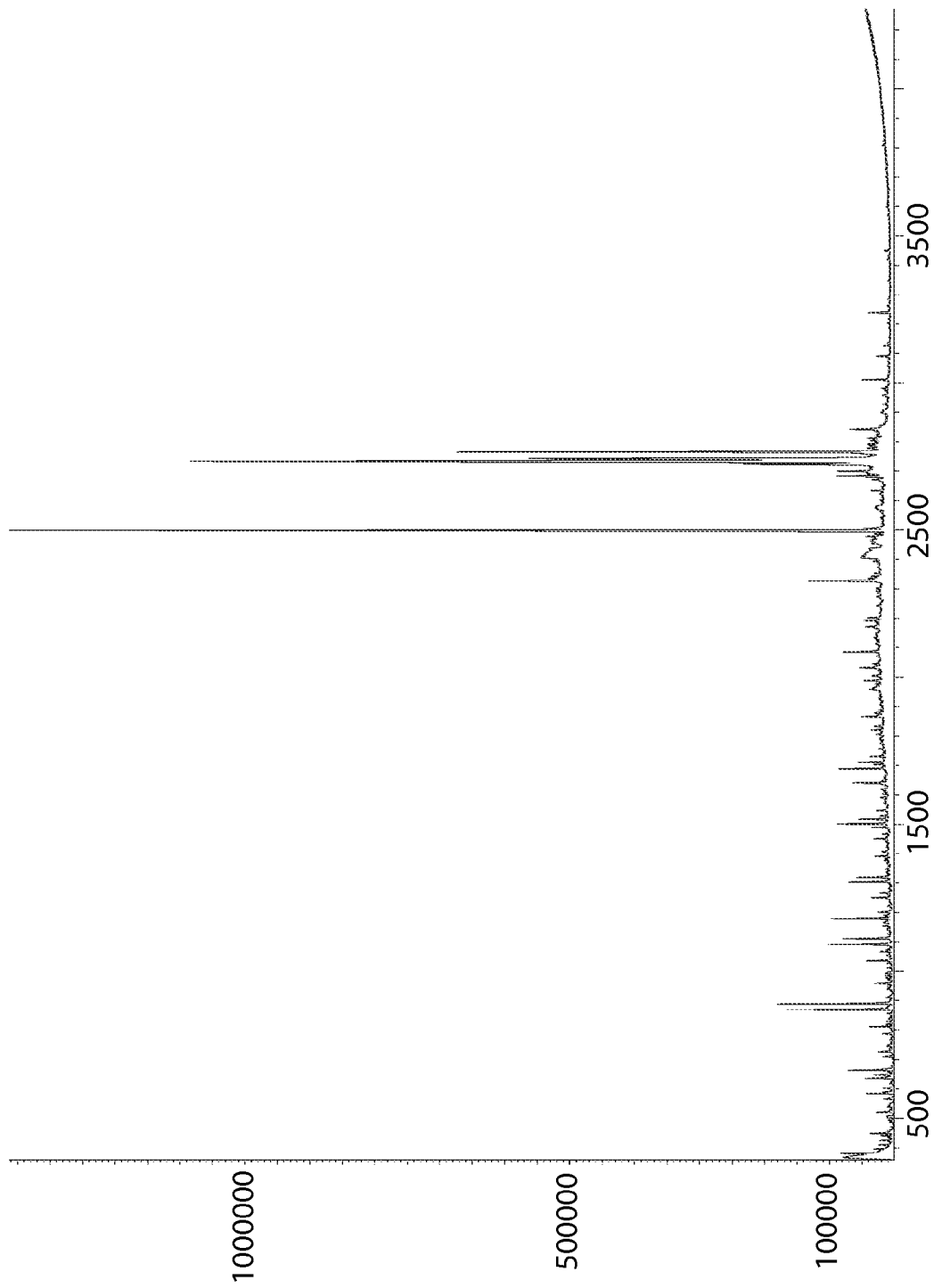
FIG. 9 is an image of a GC-MS spectrum of products from the reaction of soybean oil with no catalyst at 515 degrees Celsius (Exp. No. 131).
Figure 10:
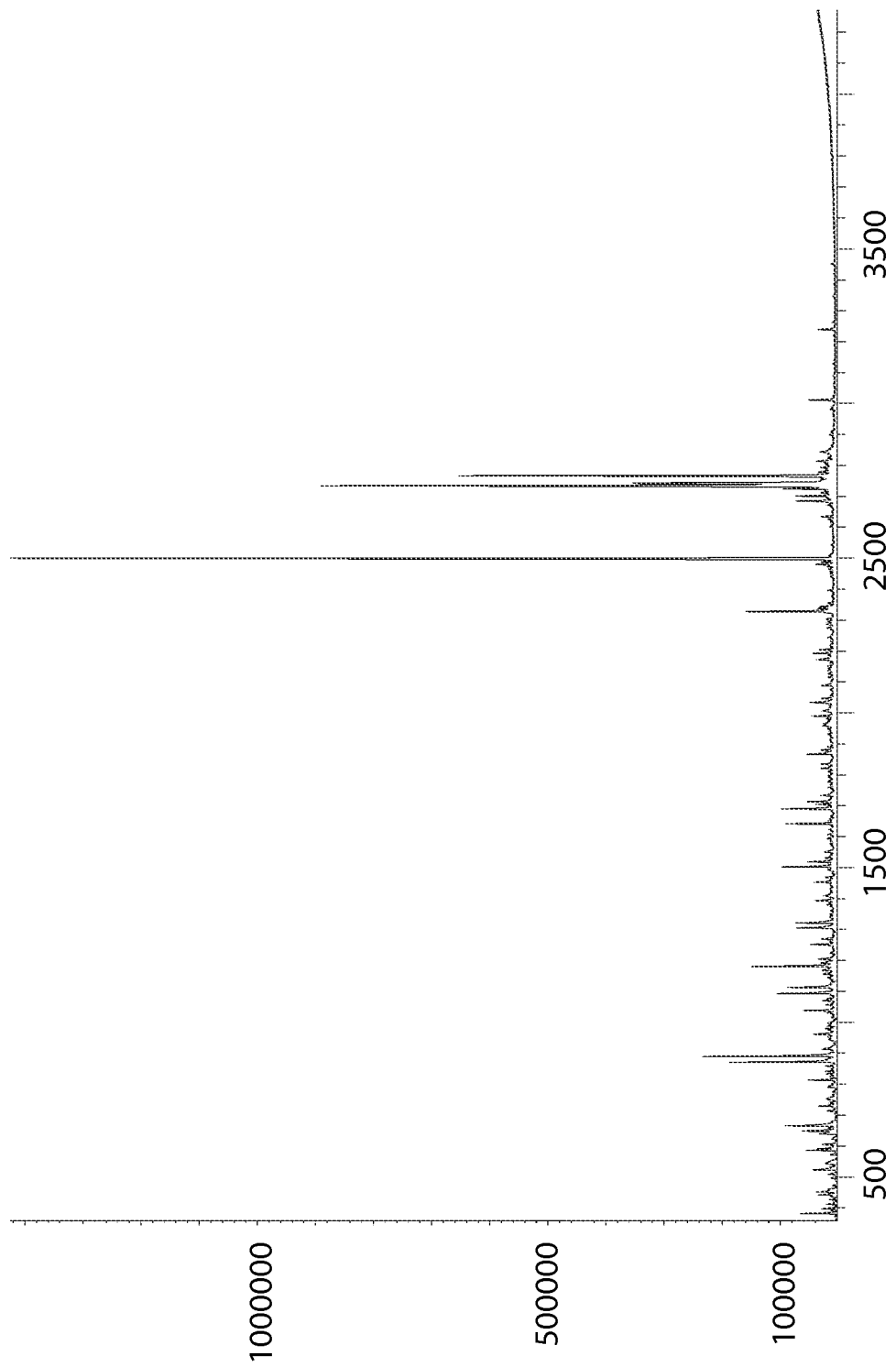
FIG. 10 is an image of a GC-MS spectrum of products from the reaction of soybean oil with no catalyst at 515 degrees Celsius (Exp. No. 144).

The GC-MS data was collected using a HP6890 equipped with a HP5-MS capillary column. The samples were injected directly with no dilution. The GC-MS conditions were: 1 μL injection volume; splitless injection; 1 mL/min flow rate; Initial temp 40° C., hold for 2 min, ramp 7° C./min to 325° C.; MS detection with a 3.5 min solvent delay. FIG. 9 shows the GC-MS spectrum for Exp. No. 131. FIG. 10 shows the GC-MS spectrum for Exp. No. 144.

Example 5

Analysis of Hydrocarbon Products in Diesel Fuel and Jet A Fuel

Figure 11:
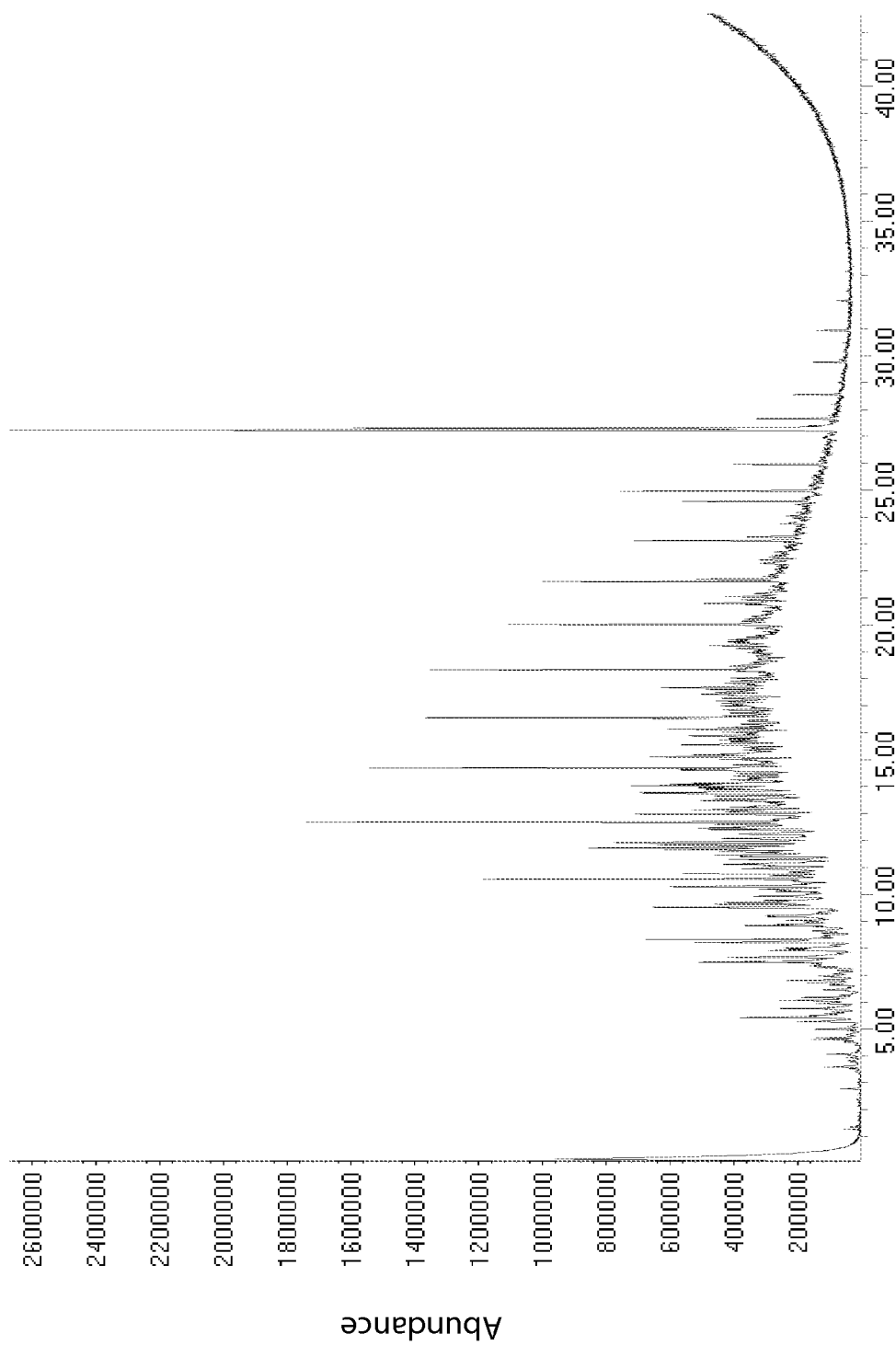
FIG. 11 is an image of a GC-MS spectrum for diesel fuel.
Figure 12:
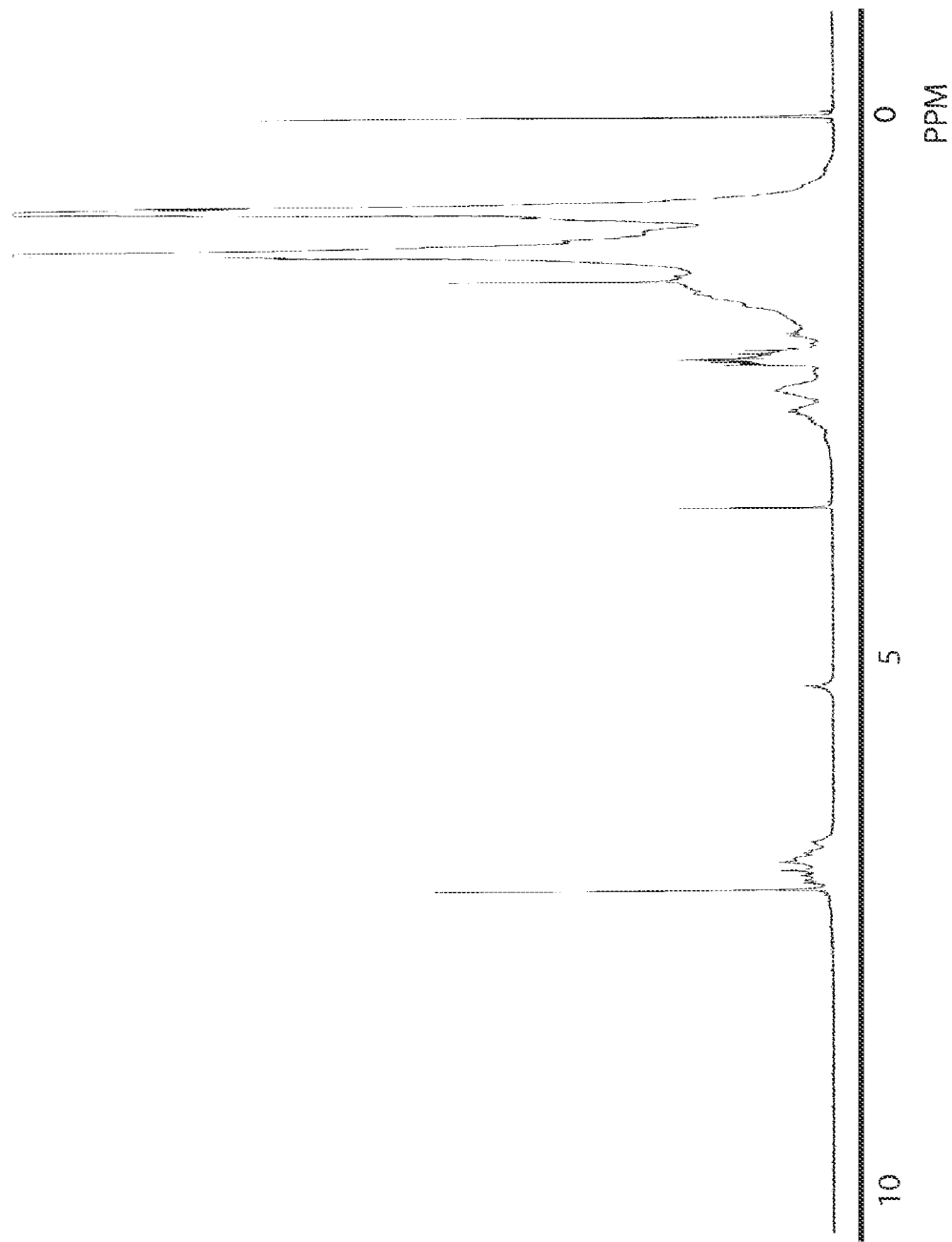
FIG. 12 is an image of a $^1$H-NMR spectrum for diesel fuel.

By way of comparative example, GC-MS and $^1$H-NMR analysis was performed on commercially available diesel fuel and Jet A fuel. They were found to have similar spectrums to those for various embodiments herein. FIG. 11 shows the GC-MS spectrum for diesel fuel. FIG. 12 shows the $^1$H-NMR spectrum for the diesel fuel.

Example 6

Hydrocarbon Production from Soybean Oil

A reactor was set-up as described in Example 3 using a zirconia catalyst. The specific reaction conditions are described in Table A13. Further aspects of the experiments and acid numbers for the products are shown in Table A14.

Various feedstocks were used including soybean oil, glycerol, biodiesel, a soy-based high free fatty acid distillate ("Cargill FS201201092100"), oleic acid, and hexadecane. Soybean oil was obtained from Costco, Seattle, Wash. 98124. Glycerol was obtained from Sigma-Aldrich, Milwaukee, Wis. Biodiesel was obtained from Ever Cat Fuels, Isanti, Minn. The high fatty acid mixture was obtained from Cargill. Oleic acid was obtained from Sigma-Aldrich, Milwaukee, Wis. Hexadecane was obtained from Sigma-Alrdich, Milwaukee, Wis.

GC-MS and $^1$H-NMR data were recorded for selected conditions. $^1$H-NMR spectra were recorded on a Varian-Inova 500 MHz $^1$H-NMR. $^1$H-NMR samples were prepared by dissolving ~5 mg of sample in 700 μL of CDCl$_3$ (0.03% TMS). The GC-MS data was collected using a HP6890 equipped with a HP5-MS capillary column (HP-5MS, 300 m×0.25 mm×250 um). The samples were injected neat. The GC-MS conditions were: 0.1 μL injection volume; split ratio 200:1; 1 mL/min flow rate; Initial temp 40° C., hold for 2 min, ramp 7° C./min to 325° C. and hold for 10 min; MS detection limits 35-600 amu.

Glycerol

Figure 13:
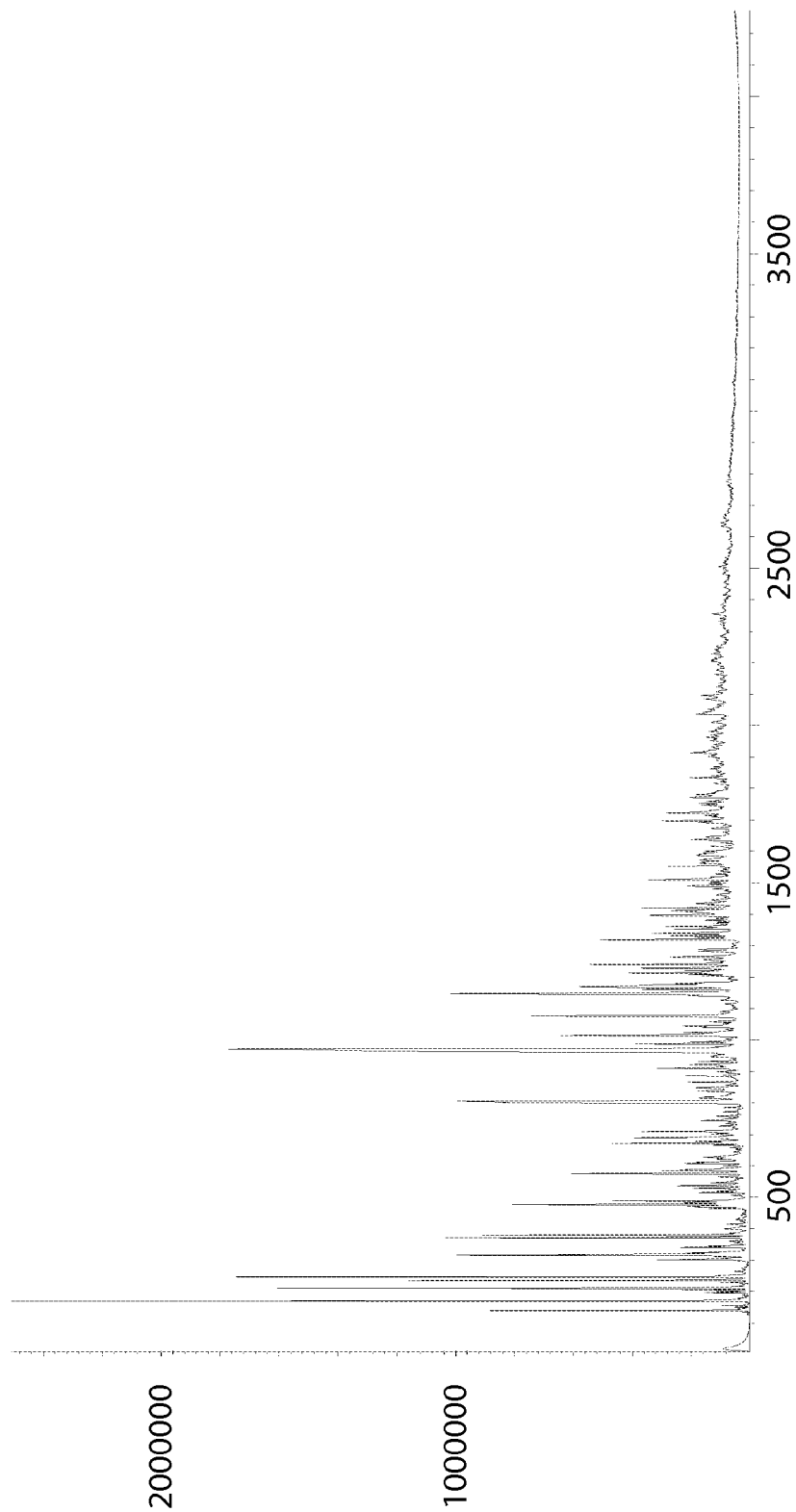
FIG. 13 is an image of a GC-MS spectrum of products from the reaction of glycerol over a zirconium catalyst at 500 degrees Celsius.
Figure 14:
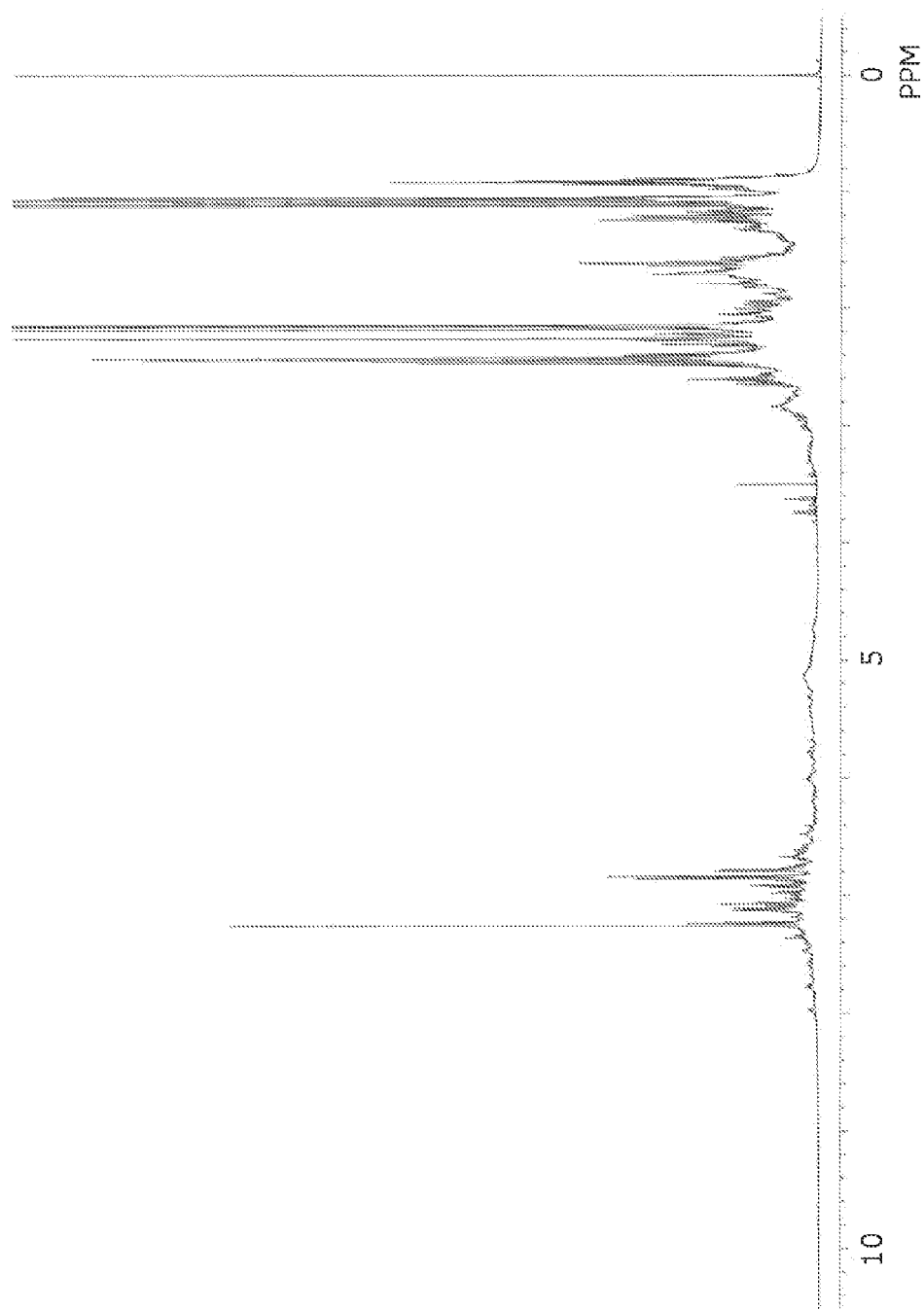
FIG. 14 is an image of a $^1$H-NMR spectrum of products for the reaction of glycerol over a zirconium catalyst at 500 degrees Celsius.

The reaction of glycerol in supercritical water over zirconium dioxide was studied at 400, 450 and 500° C. The reaction conditions are described in experiment numbers 239 through 244 and 249 through 254 contained in Table A13. The production rate of water insoluble biofuel for glycerol is very different from oil based feedstocks as evidenced by data contained in Table A14. Only a small amount of water-insoluble organic material was produced with the majority of the reaction proceeding to form water soluble components and gaseous products The GC-MS data for the organic phase contains mostly phenolic compounds as the products. The GC-MS data for sample 241 is included in Table A15 and the GC-MS chromatogram is shown in FIG. 13. The $^1$H-NMR data presents signals that are consistent with the GC-MS data in terms of functionality present in the mixture and is shown in FIG. 14

Figure 15:
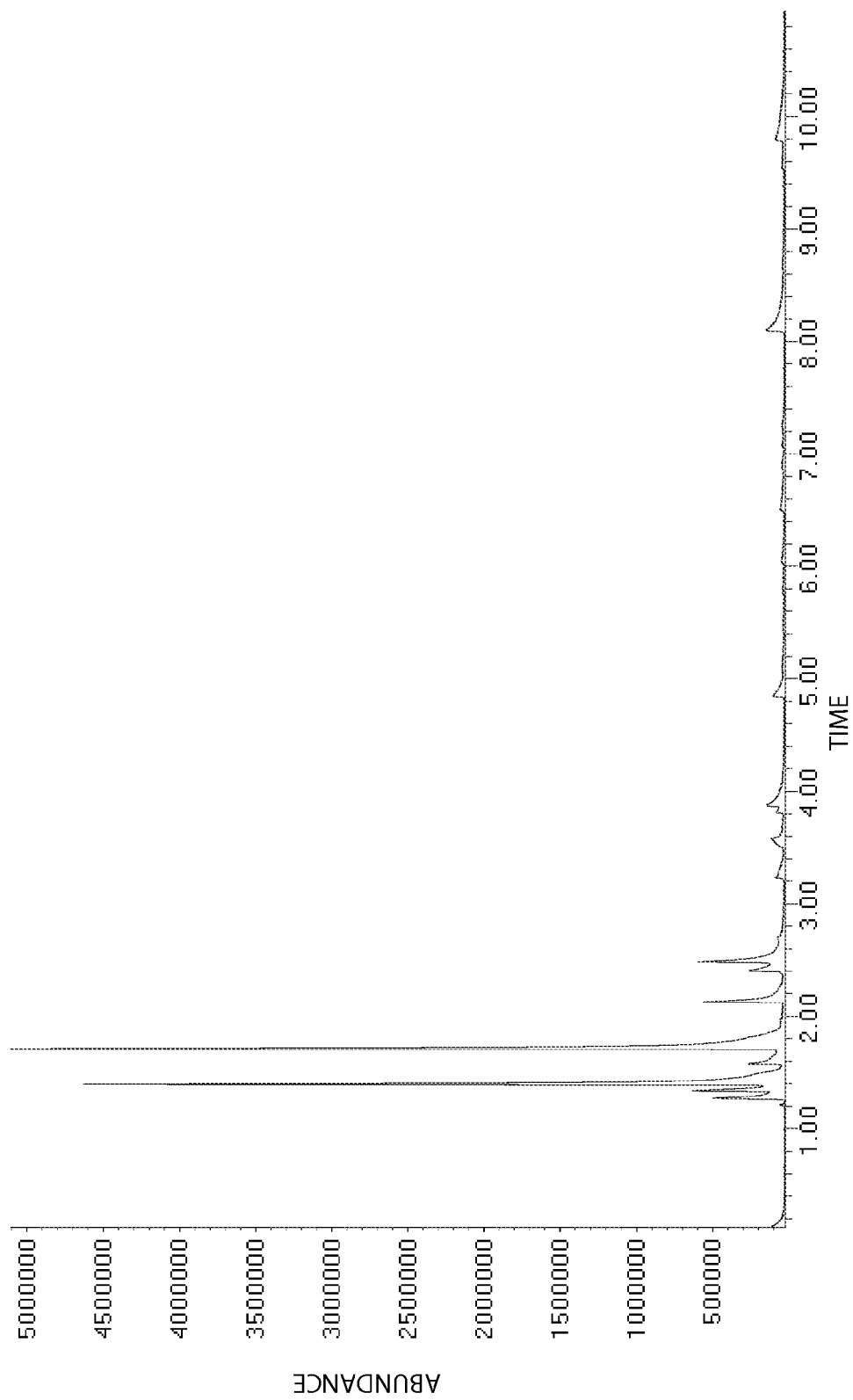
FIG. 15 is an image of a GC-MS spectrum for aqueous phase products for the reaction of glycerol over a zirconium catalyst at 500 degrees Celsius.
Figure 16:
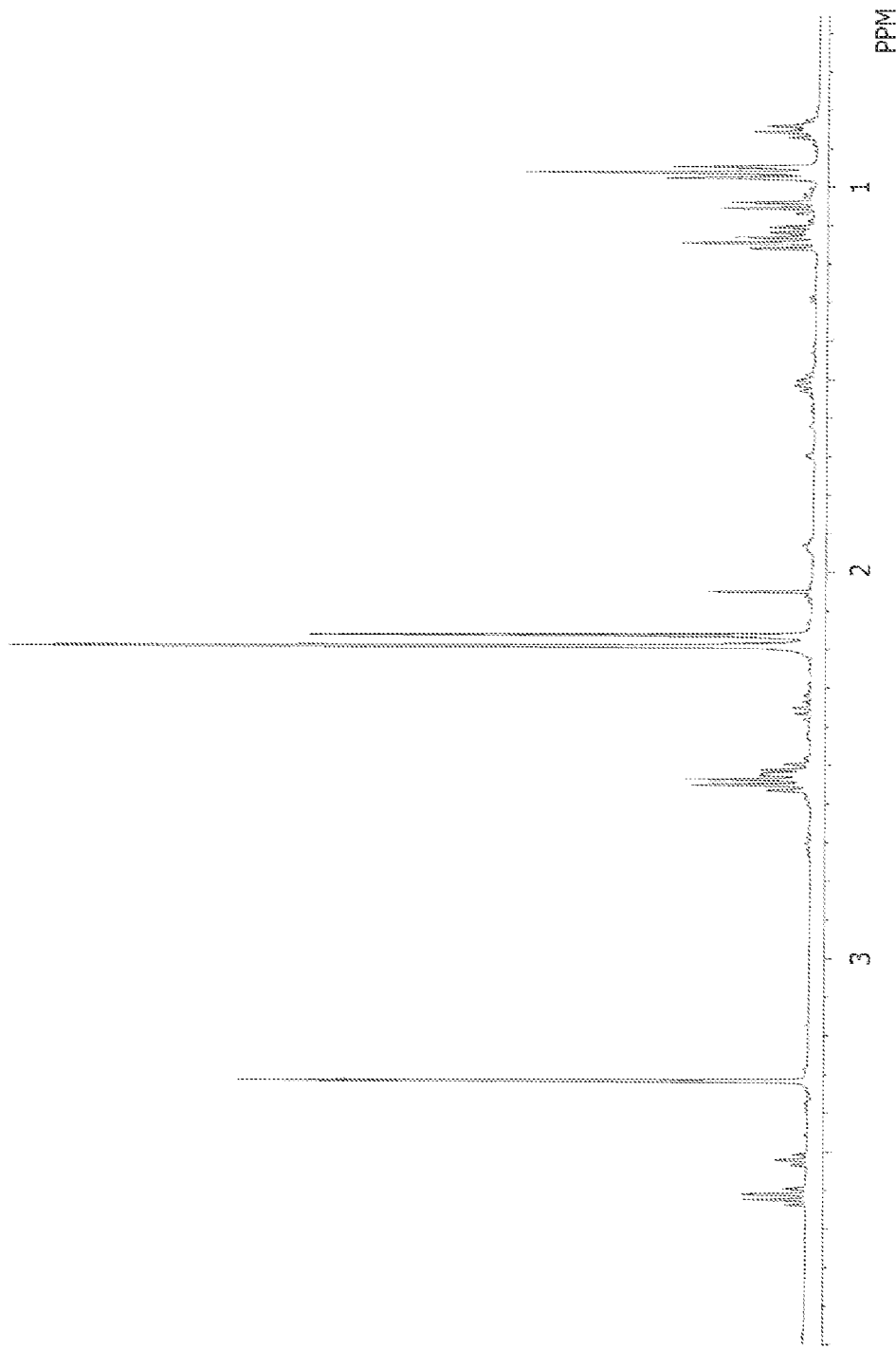
FIG. 16 is an image of a $^1$H-NMR spectrum for aqueous phase products for the reaction of glycerol over a zirconium catalyst at 500 degrees Celsius.

The aqueous phase was also investigated by GC-MS. A chromatogram is shown in FIG. 15 for sample 242. The notable feature of the aqueous GC-MS data is the presence of only a few compounds being present in the product mixture. The $^1$H-NMR spectrum, shown in FIG. 16, supports this observation of a few compounds being produced compared to the very complex product profile the water insoluble product.

Biodiesel

The decomposition reaction of biodiesel in supercritical water over zirconium dioxide was investigated at 500 and 550° C. The reaction conditions are listed in Table A13 and described in experiments 245 through 248 and 255 through 262. The product array is similar to the products obtained for soybean oil.

High Fatty Acid Mixture

Figure 17:
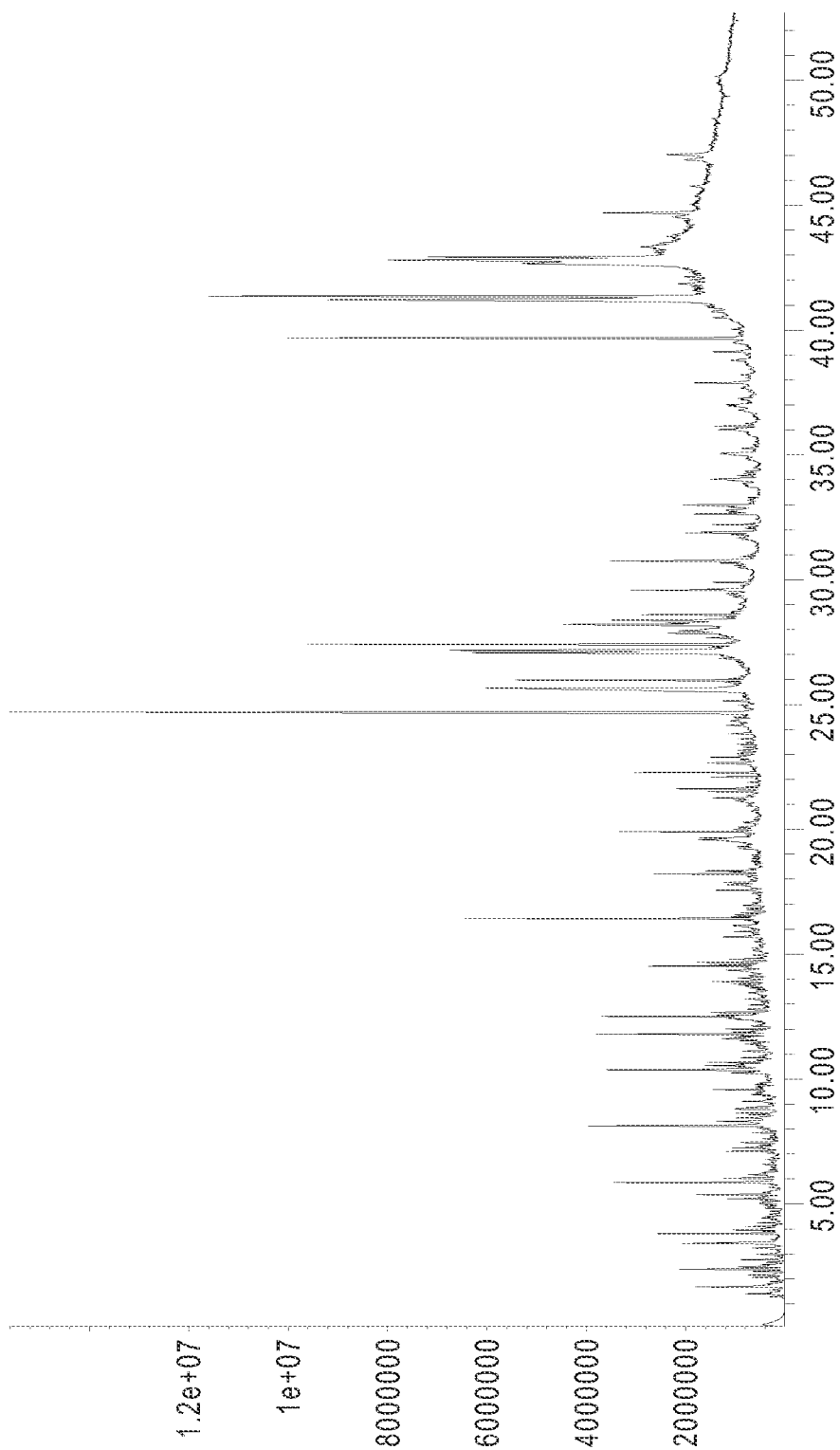
FIG. 17 is an image of a GC-MS spectrum of products for the reaction of a high free fatty acid mixture over a zirconium catalyst at 500 degrees Celsius.
Figure 18:
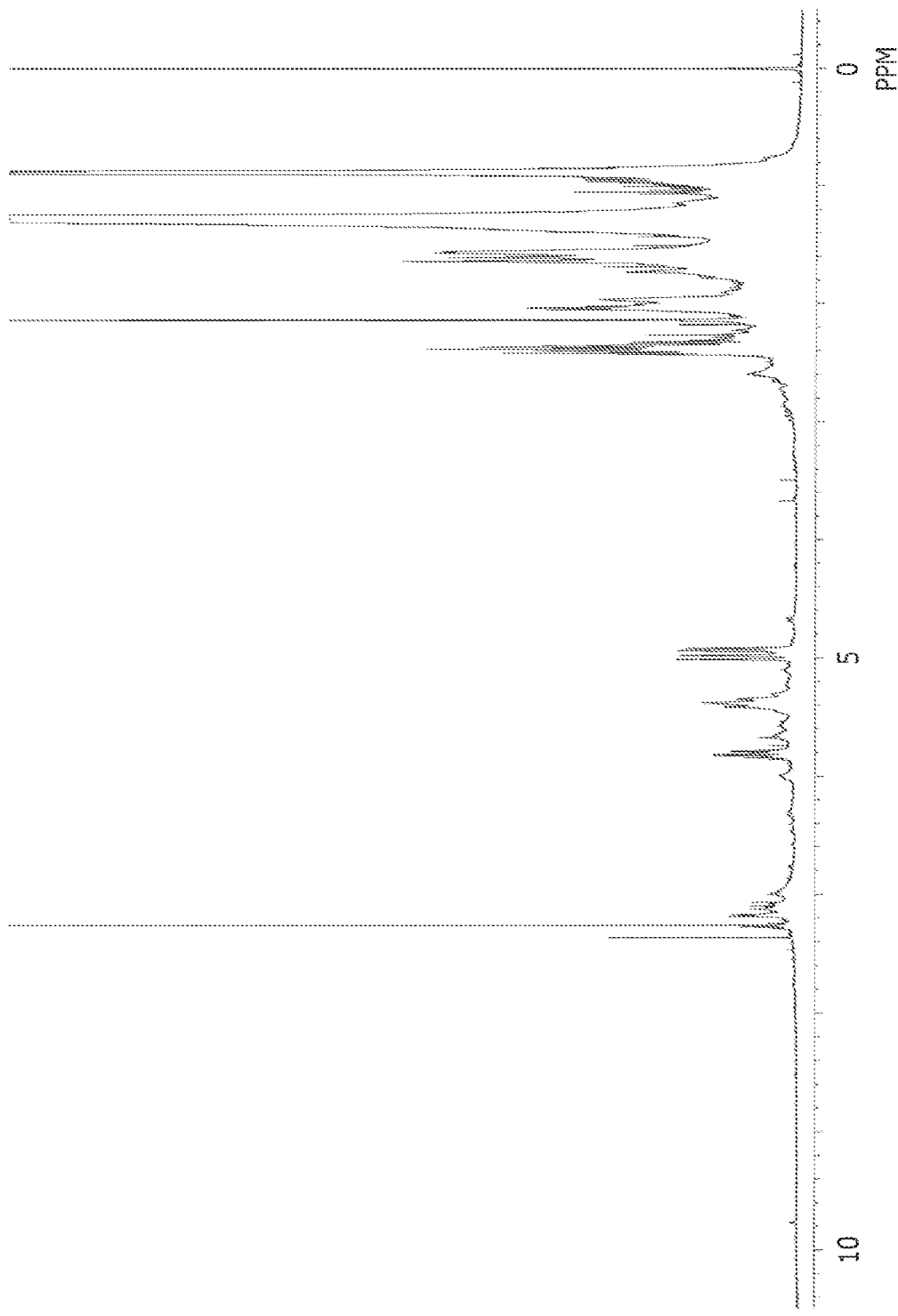
FIG. 18 is an image of $^1$H-NMR spectrum of products for the reaction of a high free fatty acid mixture over a zirconium catalyst at 500 degrees Celsius.

The decomposition of a mixture of soy-based free fatty acid distillate ("Cargill FS201201092100") in supercritical water over zirconium dioxide was investigated at 500 and 550 degrees Celsius. Cargill FS201201092100 is a high free fatty acid mixture (acid number=120). The mixture is primarily composed of FFAs and triglycerides. The conditions are listed in Table A13 in experiments 266 through 269 and 276 through 277. The product array is similar to the products obtained for soybean oil. The GC-MS chromatogram is shown in FIG. 17. The $^1$H-NMR spectrum is contained in FIG. 18.

Oleic Acid

Figure 19:
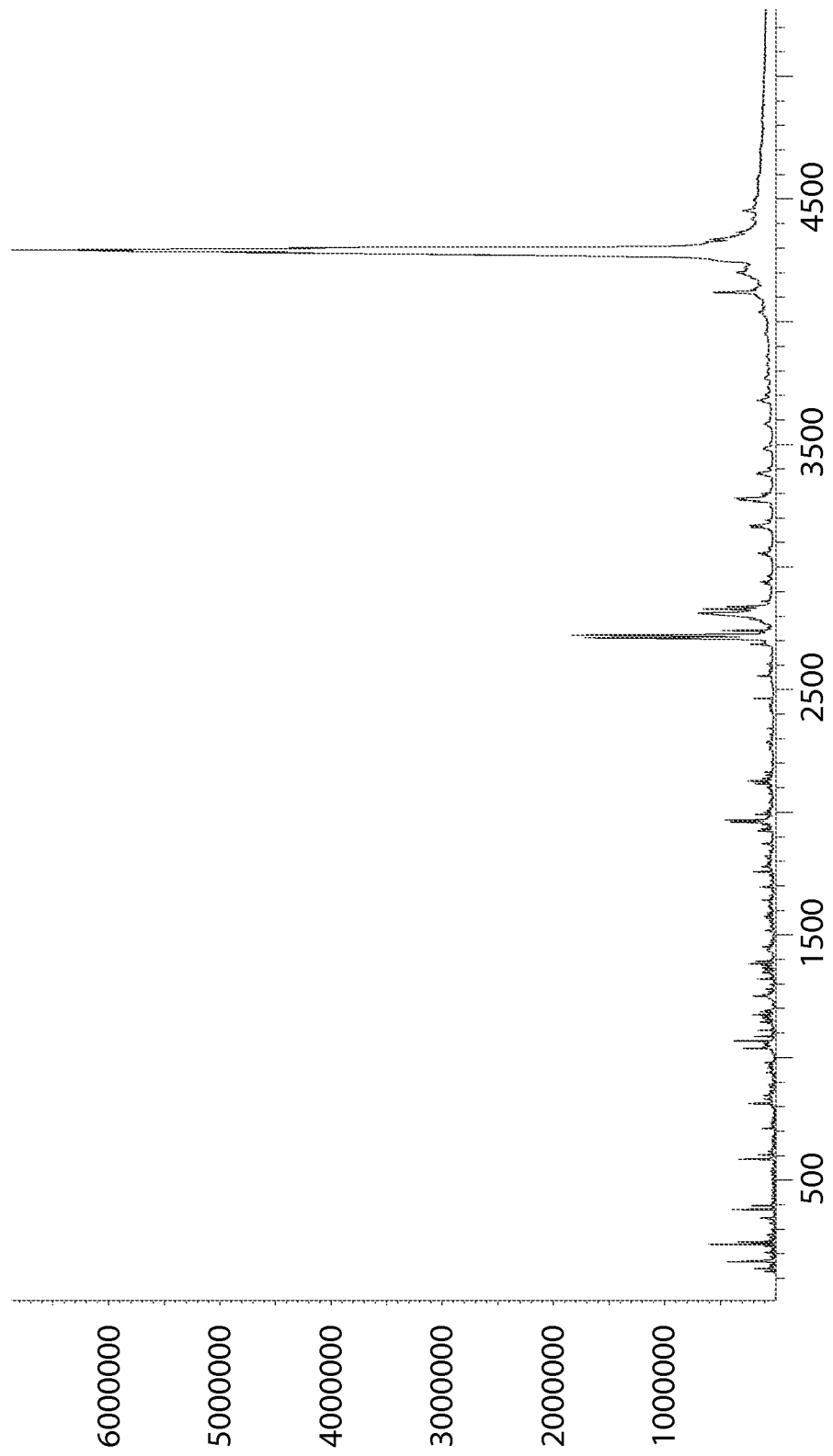
FIG. 19 is an image of a GC-MS spectrum of products for the reaction of oleic acid over a zirconium catalyst at 500 degrees Celsius.
Figure 20:
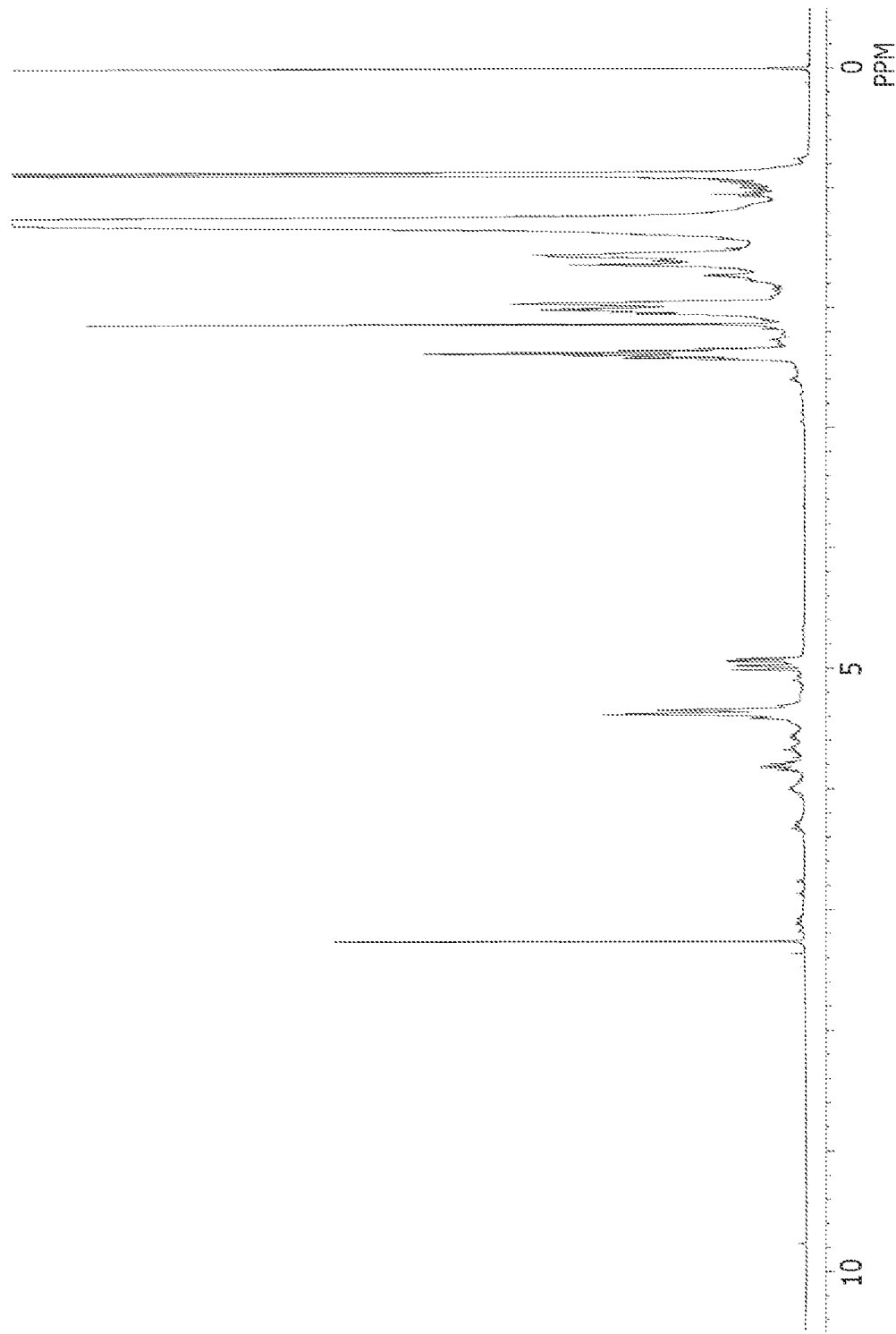
FIG. 20 is an image of a $^1$H-NMR spectrum of products for the reaction of oleic acid over a zirconium catalyst at 500 degrees Celsius.

The decomposition of oleic acid in supercritical water over zirconium dioxide was investigated at 500 degrees Celsius. The experimental data is listed in Table A13 and described in experiments 278 through 283 and 290 through 295. The product array is comprised of similar compounds to those obtained for soybean oil with the noticeable difference that the major product formed is the ketonization coupling of oleic acid. The GC-MS data for sample 280 is presented in Table A19 and the GC-MS chromatogram is shown in FIG. 19. The $^1$H-NMR spectrum is contained in FIG. 20.

Hexadecane

Figure 21:
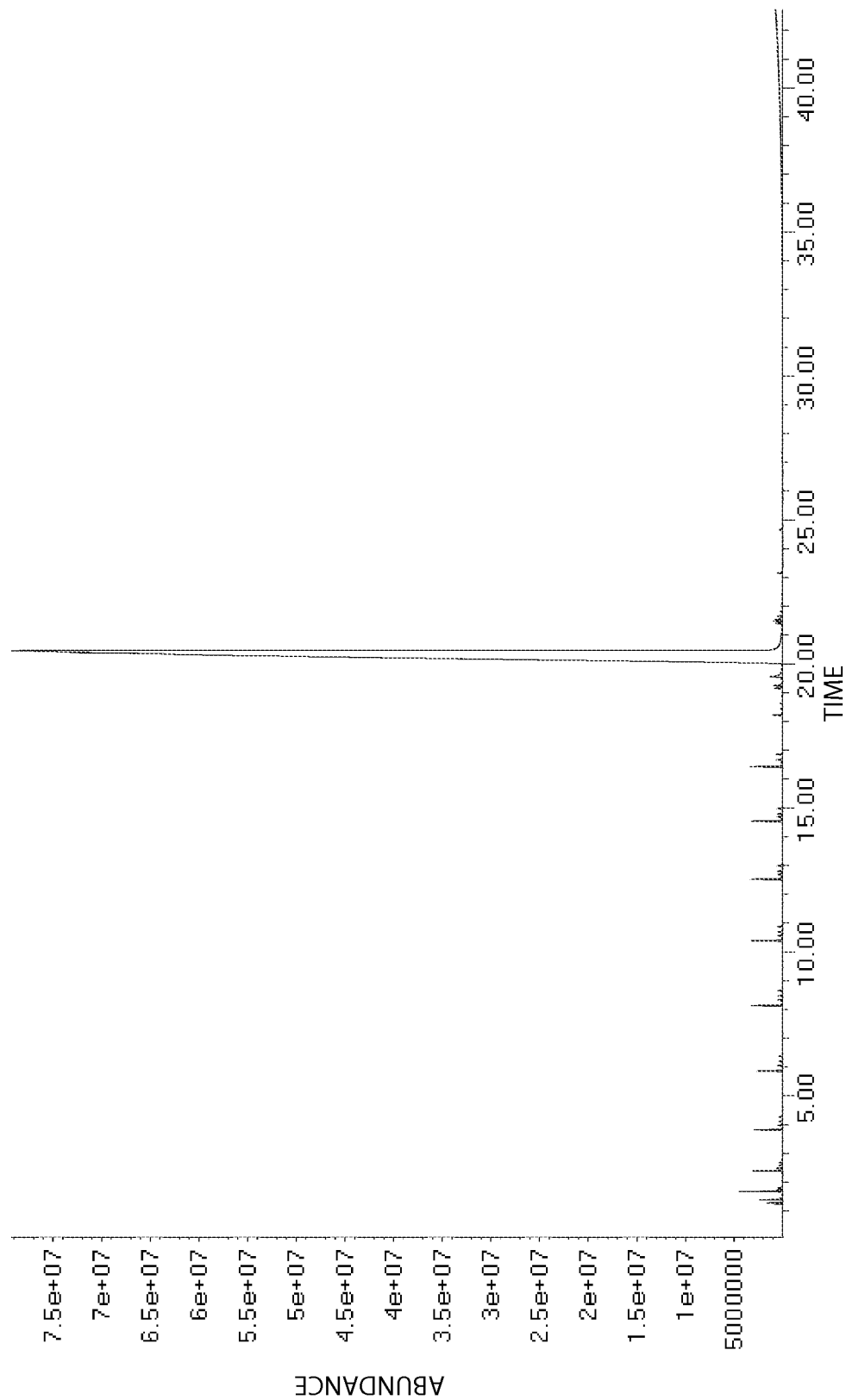
FIG. 21 is an image of a GC-MS spectrum of products for the reaction of hexadecane over a zirconium catalyst at 500 degrees Celsius.
Figure 22:
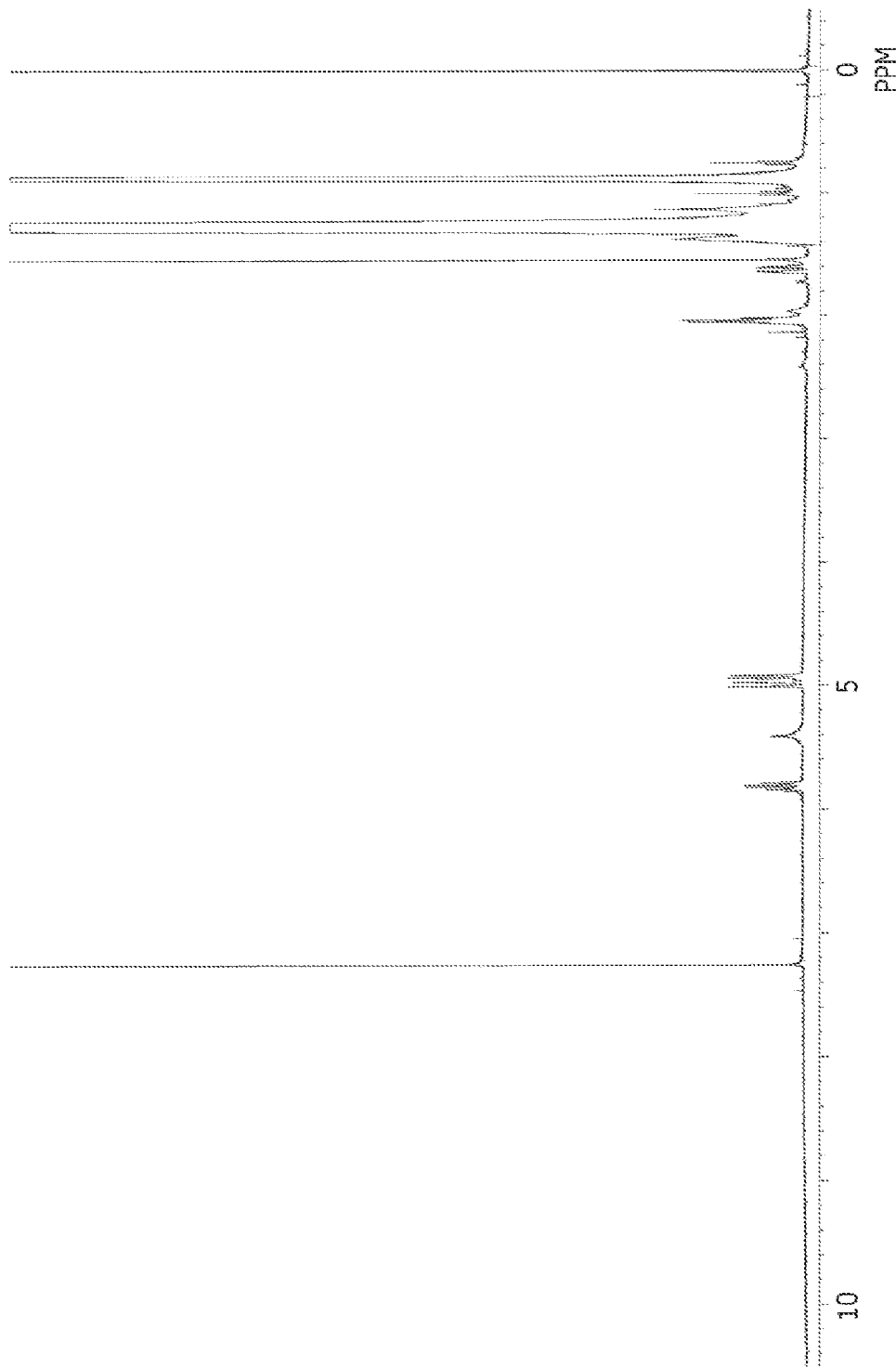
FIG. 22 is an image of a $^1$H-NMR spectrum of products for the reaction of hexadecane over a zirconium catalyst at 500 degrees Celsius.

The decomposition of hexadecane in supercritical water over zirconium dioxide was investigated at 500 and 550 degrees Celsius. The experimental data is listed in Table A13 and described in experiments 284 through 289 and 296 through 300. The product array is comprised of cracked aliphatic and olefinic compounds. The conversion efficiency of hexadecane to these smaller chain compounds approximately 8% at 500 degrees Celsius. The GC-MS chromatogram for sample 288 is shown in FIG. 21. The $^1$H-NMR spectrum is contained in FIG. 22.

Example 7

Hydrocarbon Production from Multiple Feedstocks

A reactor was set-up as described in Example 3 using a zirconia catalyst. The specific reaction conditions are described in Table A21. Further aspects of the experiments and acid numbers for the products are shown in Table A22.

Various feedstocks were used including lecithin, corn oil, glucose, oleic acid, a soy-based high fatty acid distillate ("UCO-FS2012020"), soybean oil, bio-oil, octanoic acid, stearic acid, acetone, 1-octanol, ethanol, acetic acid, camelina oil, and jatropha oil.

Lecithin was obtained from Nowfoods, Bloomingdale, Ill. Corn oil was obtained from Ever Cat Fuels, Isanti, Minn. Glucose was obtained from Sigma-Aldrich, Milwaukee, Wis.

Oleic acid was obtained from Sigma-Aldrich, Milwaukee, Wis. The high fatty acid distillate ("UCO-FS2012020") was obtained from Cargill. Soybean oil was obtained from Costco, Seattle, Wash. 98124. Octanoic acid was obtained from Sigma-Aldrich, Milwaukee, Wis. Stearic acid was obtained from Sigma-Aldrich, Milwaukee, Wis. Acetone was obtained from AAPER Alcohols, Ky. 1-octanol was obtained from Sigma-Aldrich, Milwaukee, Wis. Ethanol was obtained from Sigma-Aldrich, Milwaukee, Wis. Acetic acid was obtained from Sigma-Aldrich, Milwaukee, Wis. Camelina oil was obtained from Central Lakes College. Jatropha oil was obtained from Haiti.

Further data are shown in Tables A23-A25, A32-A37 and in FIGS. 23-27, 28-32.

Figure 23:
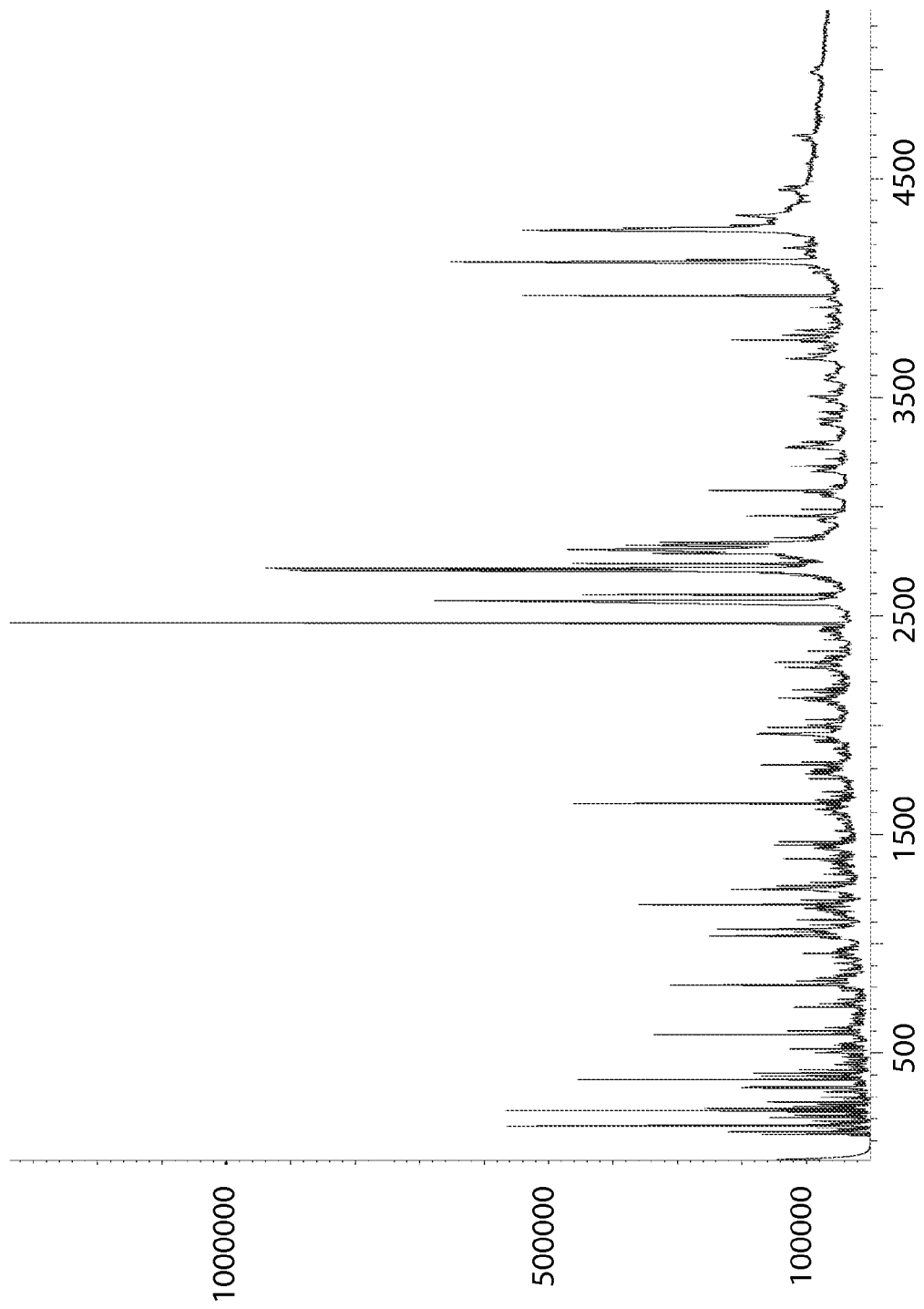
FIG. 23 is an image of a GC-MS spectrum of products for the reaction of corn oil over a zirconium catalyst at 500 degrees Celsius.
Figure 24:
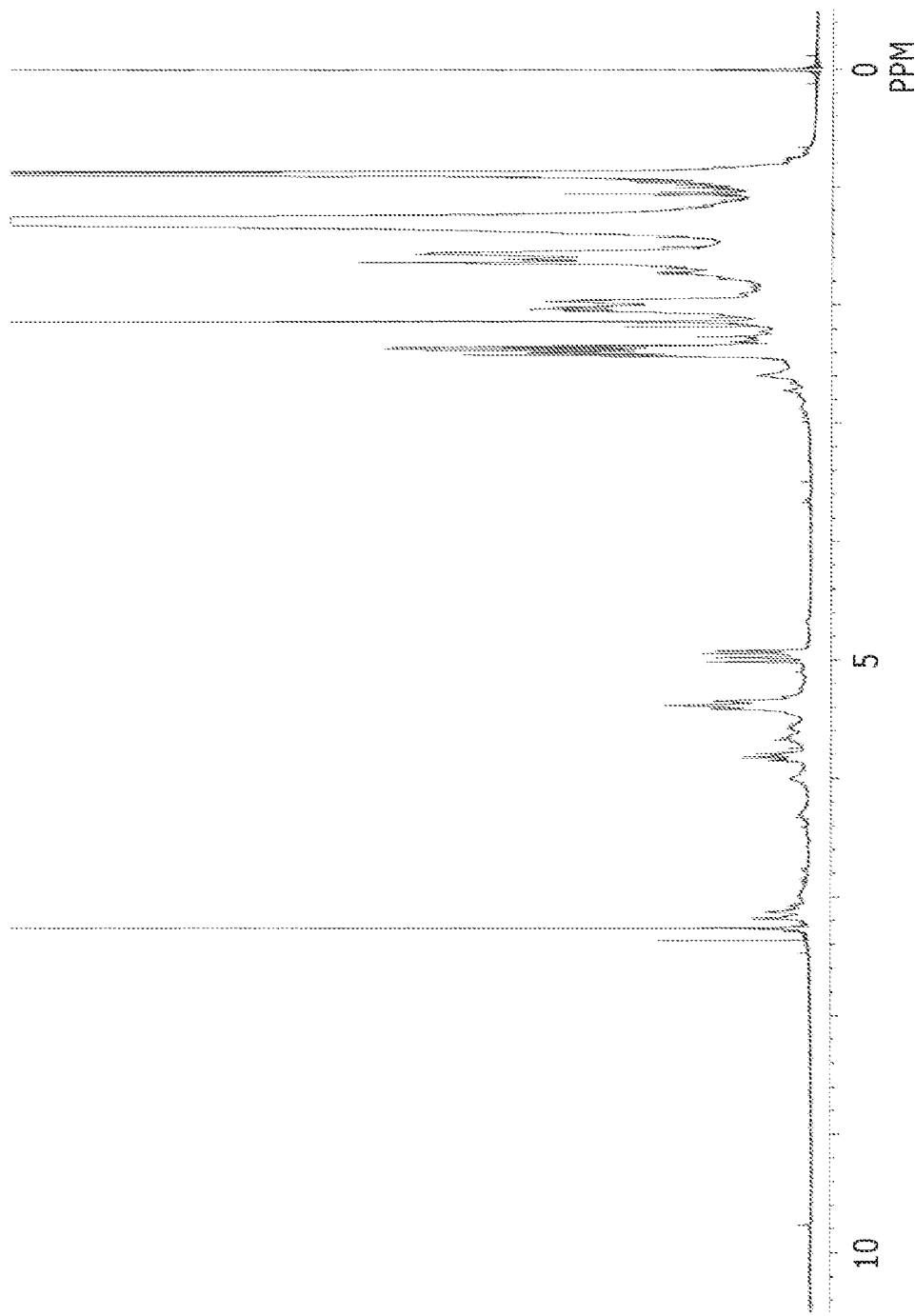
FIG. 24 is an image of a $^1$H-NMR spectrum of products for the reaction of corn oil over a zirconium catalyst at 500 degrees Celsius.

Table A23 is GC-MS data of products for the reaction of corn oil over a zirconium catalyst at 500 degrees Celsius. FIG. 23 is an image of a GC-MS spectrum of products for the reaction of corn oil over a zirconium catalyst at 500 degrees Celsius. FIG. 24 is an image of a $^1$H-NMR spectrum of products for the reaction of corn oil over a zirconium catalyst at 500 degrees Celsius.

Figure 25:
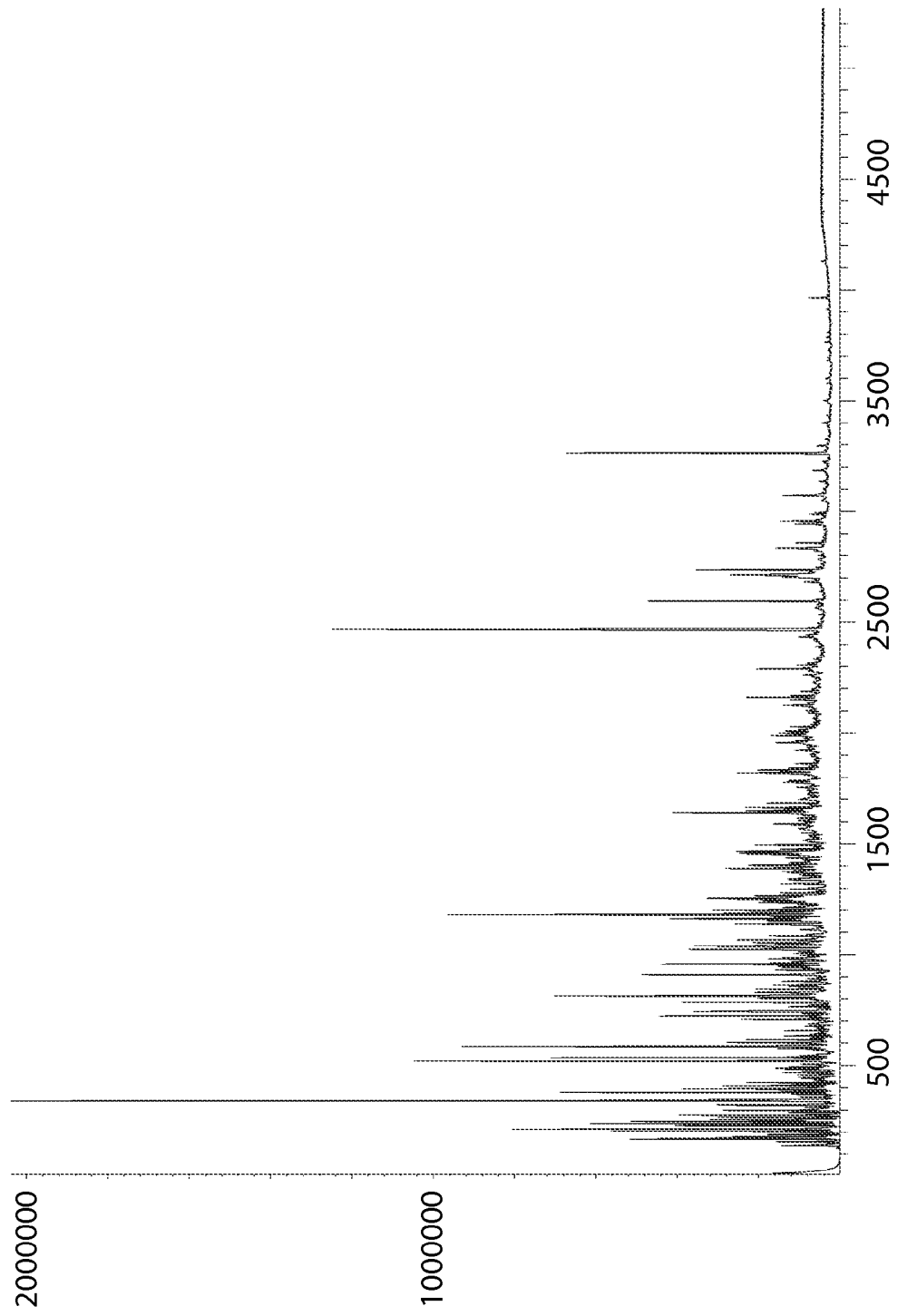
FIG. 25 is an image of a GC-MS spectrum of products for the reaction of corn oil over a zirconium catalyst at 550 degrees Celsius.
Figure 26:
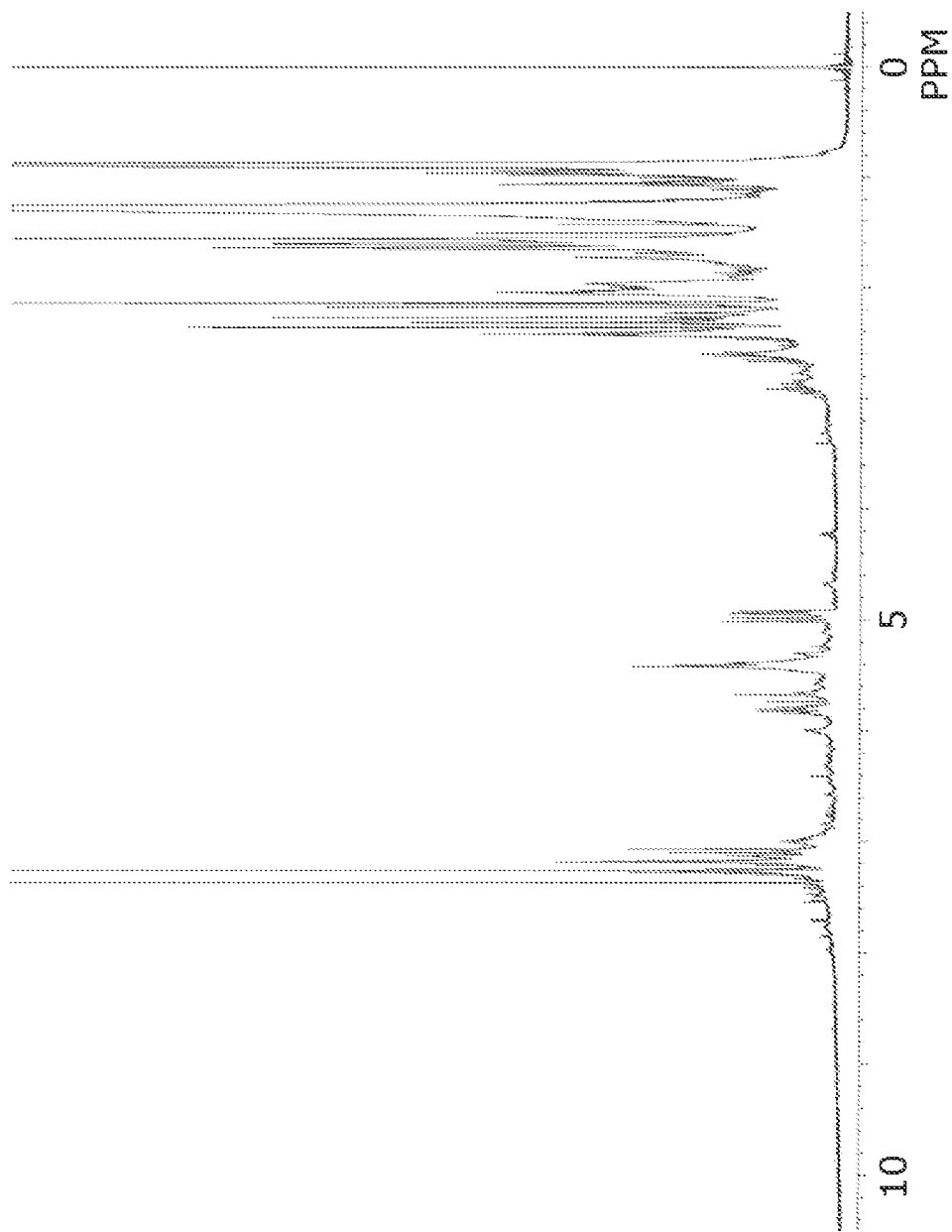
FIG. 26 is an image of a $^1$H-NMR spectrum of products for the reaction of corn oil over a zirconium catalyst at 550 degrees Celsius.

Table A24 is GC-MS data of products for the reaction of corn oil over a zirconium catalyst at 550 degrees Celsius. FIG. 25 is an image of a GC-MS spectrum of products for the reaction of corn oil over a zirconium catalyst at 550 degrees Celsius. FIG. 26 is an image of a $^1$H-NMR spectrum of products for the reaction of corn oil over a zirconium catalyst at 550 degrees Celsius.

Figure 27:
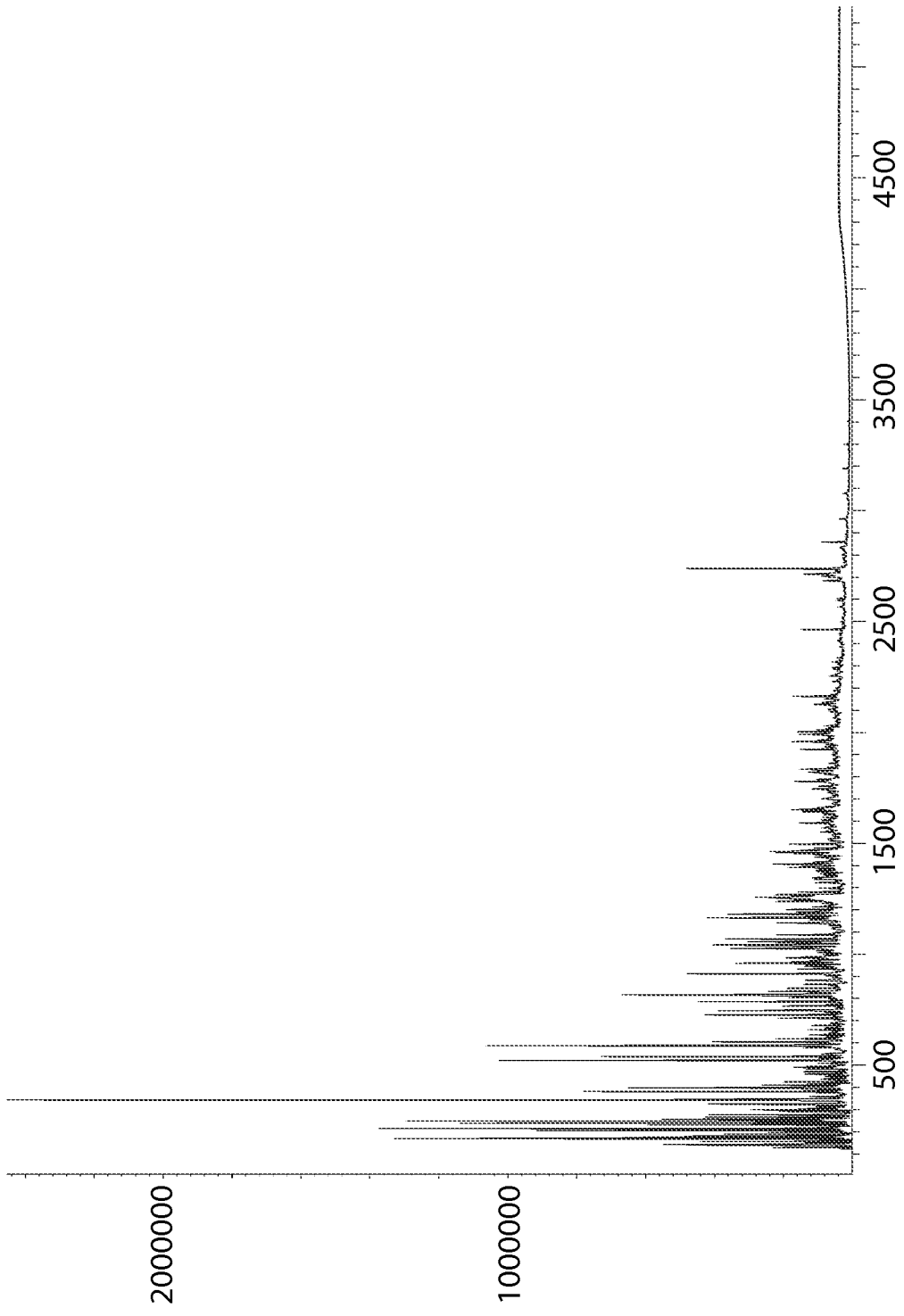
FIG. 27 is an image of a GC-MS spectrum of products for the reaction of oleic acid over a zirconium catalyst at 550 degrees Celsius.

Table A25 is GC-MS data of products for the reaction of oleic acid over a zirconium catalyst at 550 degrees Celsius. FIG. 27 is an image of a GC-MS spectrum of products for the reaction of oleic acid over a zirconium catalyst at 550 degrees Celsius.

GC-MS was also performed for the reaction of used cooking oil over a zirconium catalyst at 500 degrees Celsius and for the reaction of used cooking oil over a zirconium catalyst at 550 degrees Celsius.

A sample of bio-oil produced by pyrolysis was obtained. The top layer was separated from the water. This layer contained bio-oil and tar. The top bio-oil/tar layer was mixed with soybean oil in a 1.6:1 (m/m) ratio of soybean oil to bio-oil. The mixture was heated to 70° C. for 30 min. The mixture was then centrifuged and decanted. The bio-oil/soybean oil fraction was passed through a 5um nylon vacuum filter before use. The bio-oil/soybean oil fraction was reacted with water over zirconium dioxide at 515° C. The results are detailed in experiments 442-445.

Figure 28:
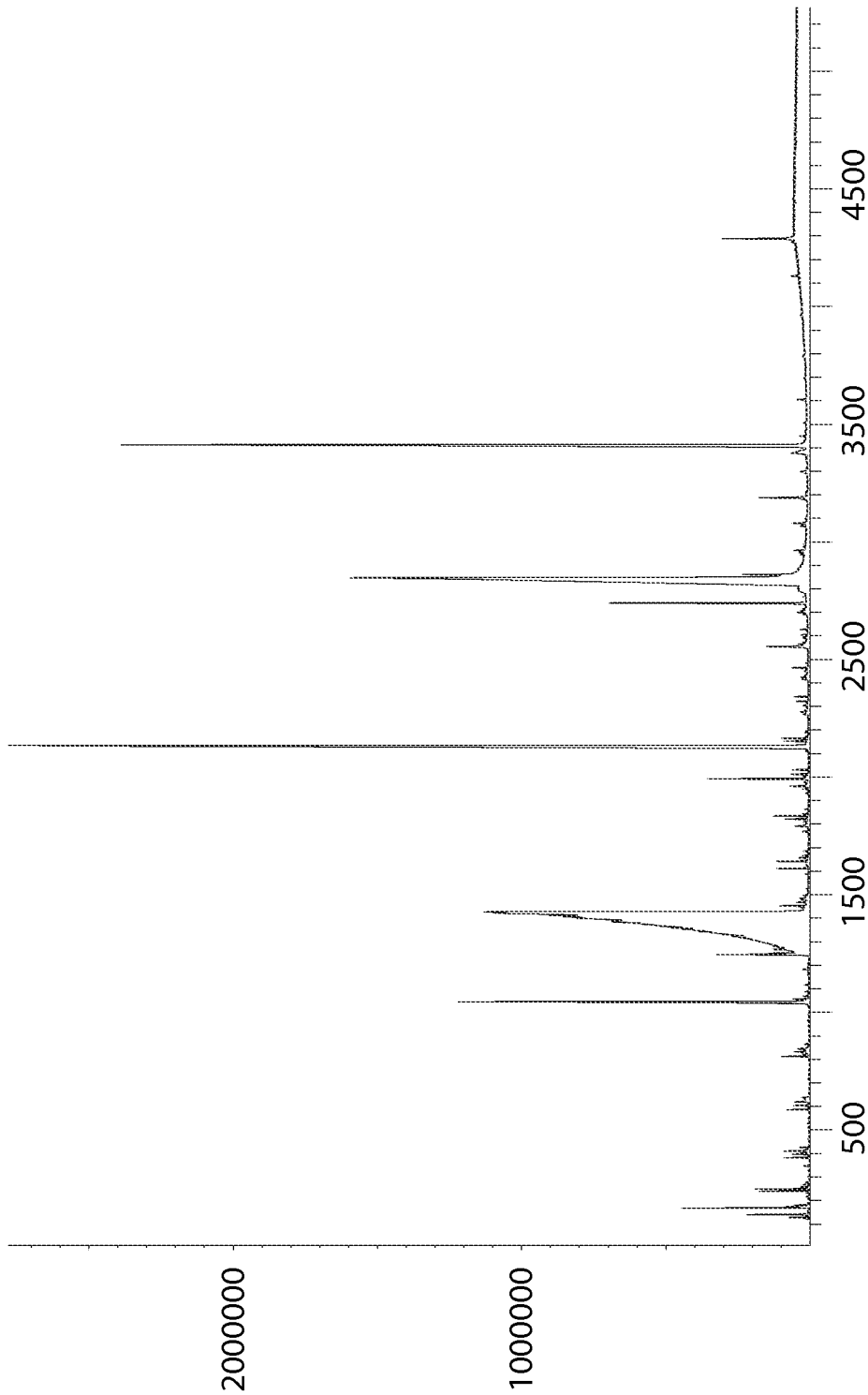
FIG. 28 is an image of a GC-MS spectrum of products for the reaction of octanoic/stearic acid over a zirconium catalyst at 500 degrees Celsius.
Figure 29:
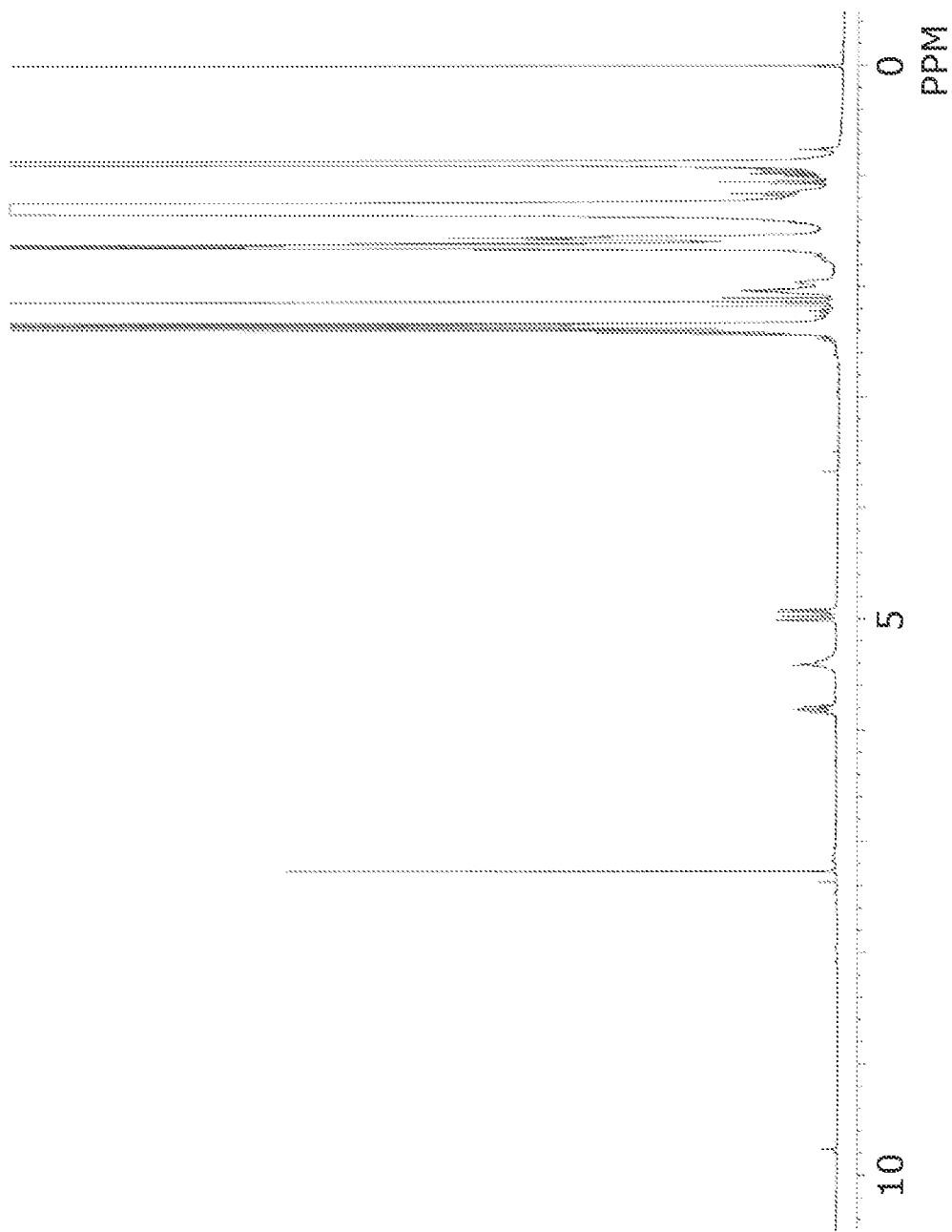
FIG. 29 is an image of a $^1$H-NMR spectrum of products for the reaction of octanoic/stearic acid over a zirconium catalyst at 500 degrees Celsius.

Table A29 is GC-MS data of products for the reaction of octanoic/stearic acid over a zirconium catalyst at 500 degrees Celsius. FIG. 28 is an image of a GC-MS spectrum of products for the reaction of octanoic/stearic acid over a zirconium catalyst at 500 degrees Celsius. FIG. 29 is an image of a $^1$H-NMR spectrum of products for the reaction of octanoic/stearic acid over a zirconium catalyst at 500 degrees Celsius.

Figure 30:
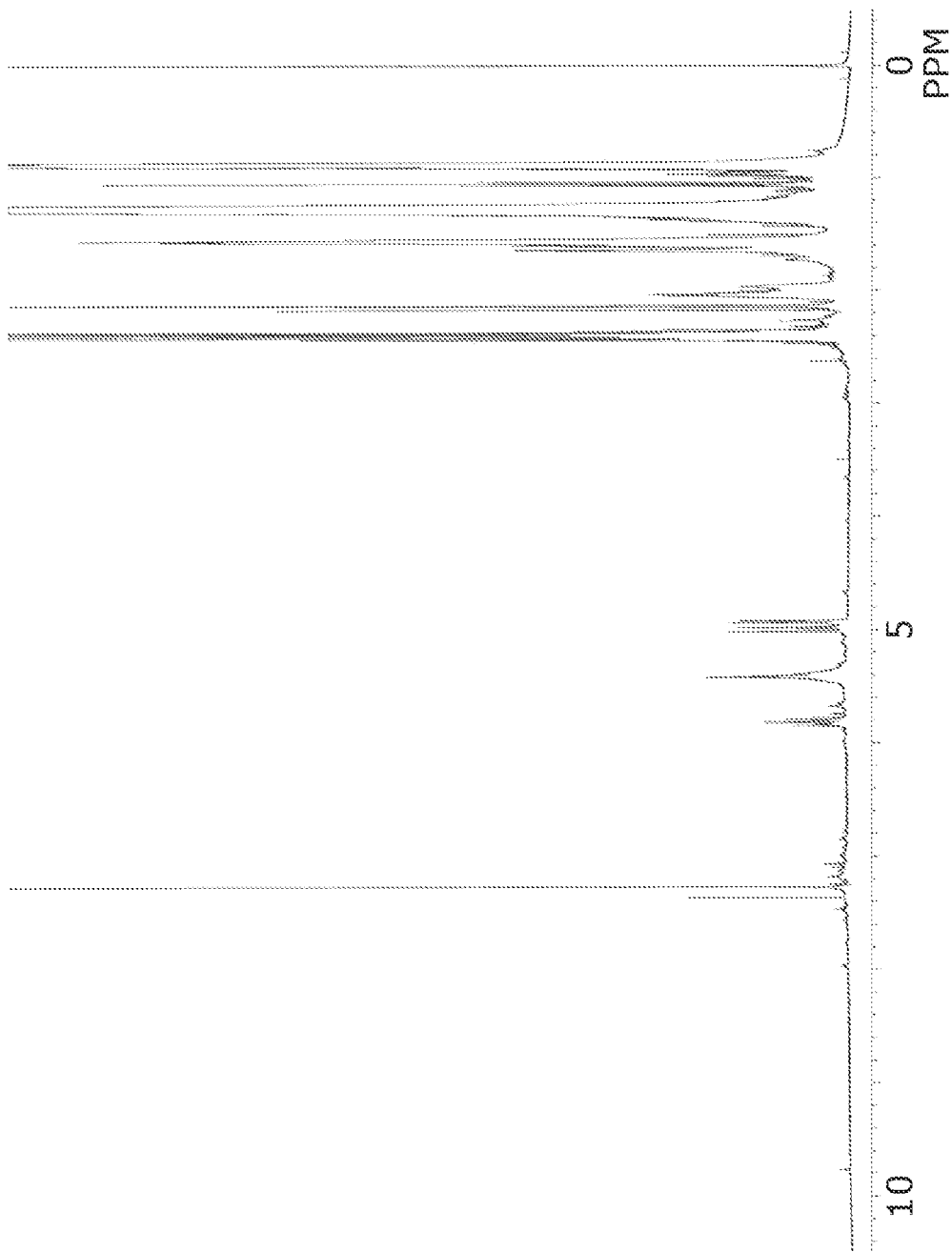
FIG. 30 is an image of a $^1$H-NMR spectrum of products for the reaction of octanoic/stearic acid over a zirconium catalyst at 550 degrees Celsius.

Table A30 is GC-MS data of products for the reaction of octanoic/stearic acid over a zirconium catalyst at 550 degrees Celsius. FIG. 30 is an image of a $^1$H-NMR spectrum of products for the reaction of octanoic/stearic acid over a zirconium catalyst at 550 degrees Celsius.

Figure 31:
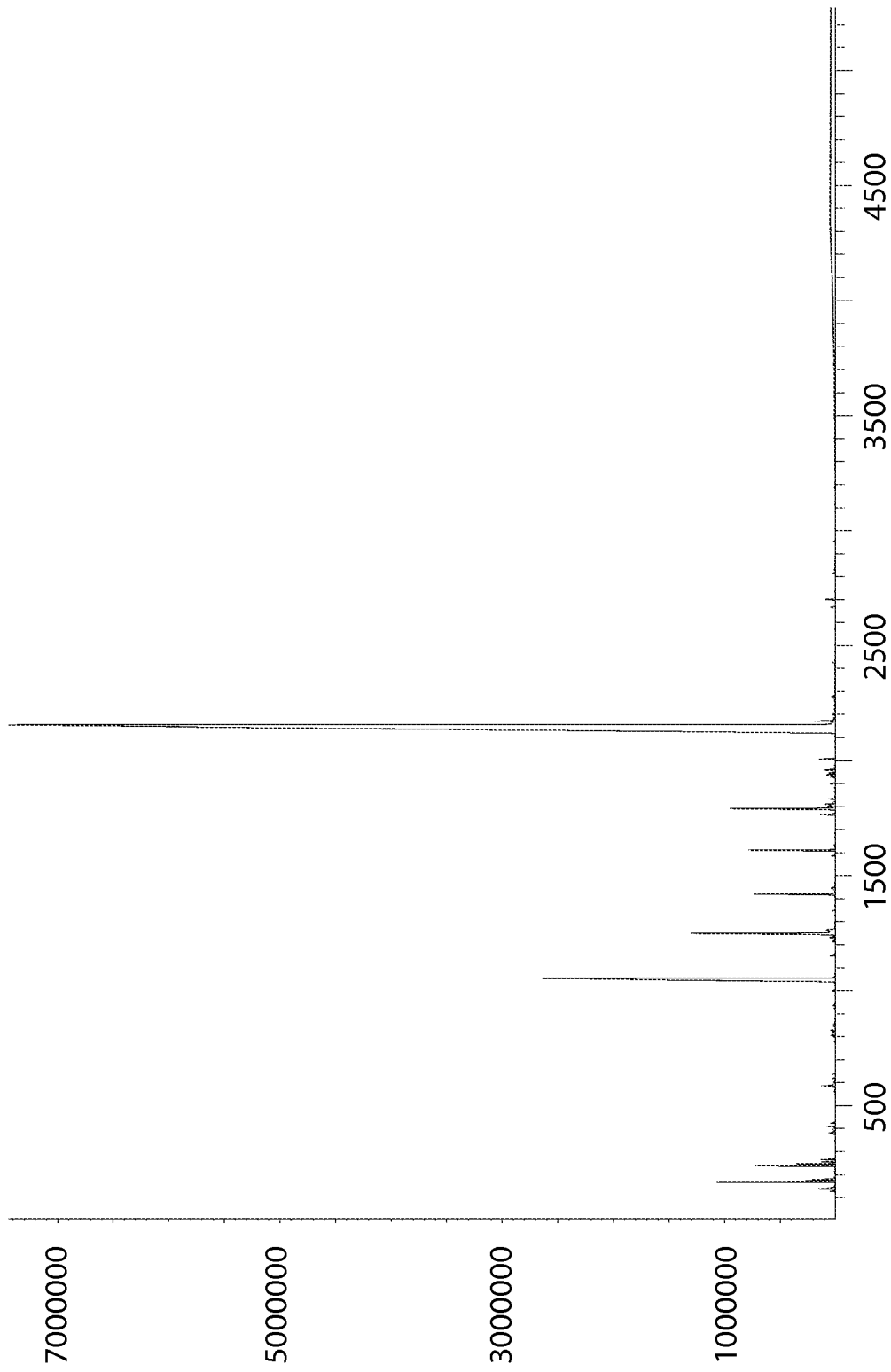
FIG. 31 is an image of a GC-MS spectrum of products for the reaction of octanoic acid over a zirconium catalyst at 550 degrees Celsius.
Figure 32:
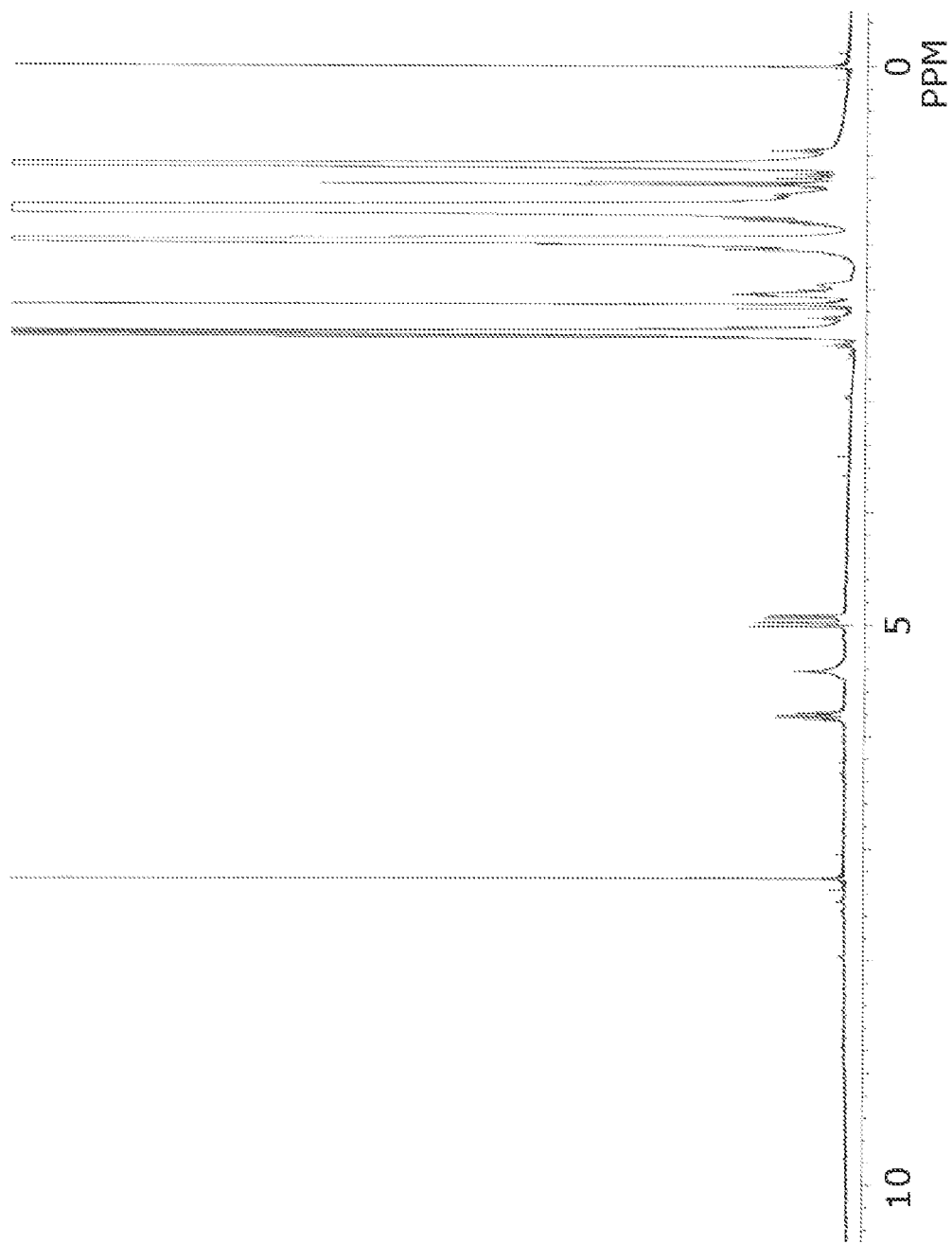
FIG. 32 is an image of a $^1$H-NMR spectrum of products for the reaction of octanoic acid over a zirconium catalyst at 550 degrees Celsius.

Table A31 is GC-MS data of products for the reaction of octanoic acid over a zirconium catalyst at 550 degrees Celsius. FIG. 31 is an image of a GC-MS spectrum of products for the reaction of octanoic acid over a zirconium catalyst at 550 degrees Celsius. FIG. 32 is an image of a $^1$H-NMR spectrum of products for the reaction of octanoic acid over a zirconium catalyst at 550 degrees Celsius.

GC-MS analysis was also performed for the reaction of acetone over a zirconium catalyst at 500 degrees Celsius, the reaction of 1-octanol over a zirconium catalyst at 500 degrees Celsius, the reaction of 1-octanol over a zirconium catalyst at 550 degrees Celsius, the reaction of camelina oil over a zirconium catalyst at 500 degrees Celsius, the reaction of camelina oil over a zirconium catalyst at 540 degrees Celsius, and the reaction of jatropha oil over a zirconium catalyst at 550 degrees Celsius.

Example 8

Distillation and Testing of Hydrocarbon Products

Crude biofuel was produced by reaction of soybean oil with water at 515° C. The biofuel was distilled through a simple distillation setup. A light distillate fraction was collected with vapor temperatures up to 95° C. The light distillate had a measured acid number of 14. The acids were removed from the distillate by washing with 1M NaOH, and then centrifuging to remove residual water. Various embodiments herein include a refining step that can include reducing the acid number and/or removing residual water. In some embodiments, a refining step can include removing residual catalyst. The treated distillate was sent to Southwest Institute for ASTM testing based on gasoline ASTM D4814. The results are shown in Table A38.

Example 9

Hydrocarbon Products from Soybean Oil

A reactor was set-up as described in Example 3. In addition to a column using a zirconia catalyst, a column was set up using a tungsten (VI) oxide catalyst, a manganese oxide catalyst, and a nickel oxide catalyst. The tungsten (VI) oxide catalyst material was obtained from Sigma-Aldrich, Milwaukee, Wis. The manganese oxide catalyst material was obtained from Sigma-Aldrich, Milwaukee, Wis. The nickel oxide catalyst was obtained from Sigma-Aldrich, Milwaukee, Wis. The specific reaction conditions are described in Table A39. Further aspects of the experiments and acid numbers for the products are shown in Table A40.

Various feedstocks were used including soybean oil and cuphea oil. Soybean oil was obtained from Costco Co., Seattle, Wash. 98124.

Further data are shown in Tables A41-A43 and in FIGS. 33-36.

Figure 33:
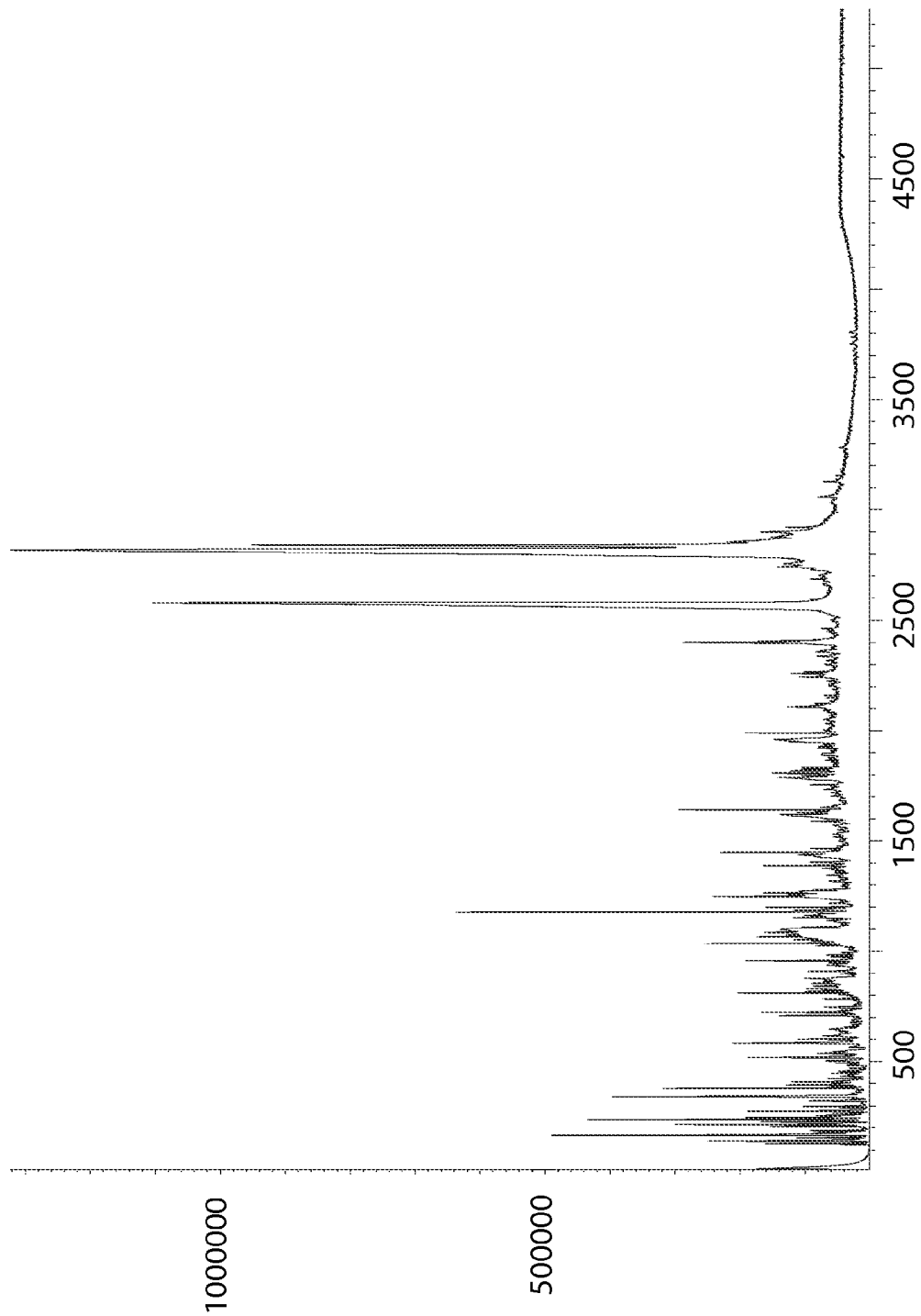
FIG. 33 is an image of a GC-MS spectrum of products for the reaction of soybean oil and water at 515 degrees Celsius over a tungsten (VI) oxide catalyst.
Figure 34:
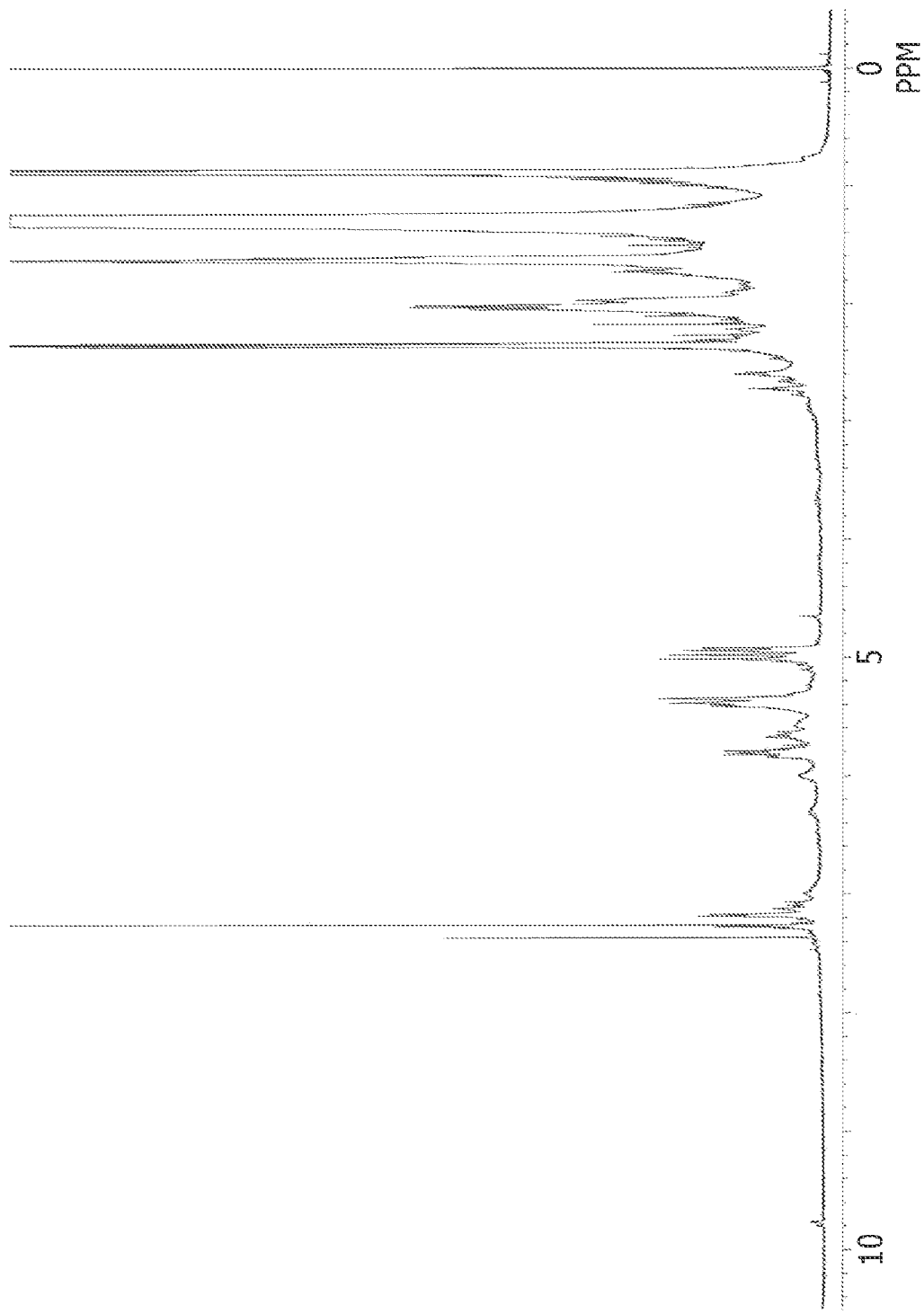
FIG. 34 is an image of an $^1$H-NMR spectrum of products for the reaction of soybean oil and water at 515 degrees Celsius over a tungsten (VI) oxide catalyst.

Table A41 is GC-MS data of products (Exp. No. 605-606) for the reaction of soybean oil and water at 515 degrees Celsius over a tungsten (VI) oxide catalyst. FIG. 33 is an image of a GC-MS spectrum of products for the reaction of soybean oil and water at 515 degrees Celsius over a tungsten (VI) oxide catalyst. FIG. 34 is an image of an $^1$H-NMR spectrum of products for the reaction of soybean oil and water at 515 degrees Celsius over a tungsten (VI) oxide catalyst.

Figure 35:
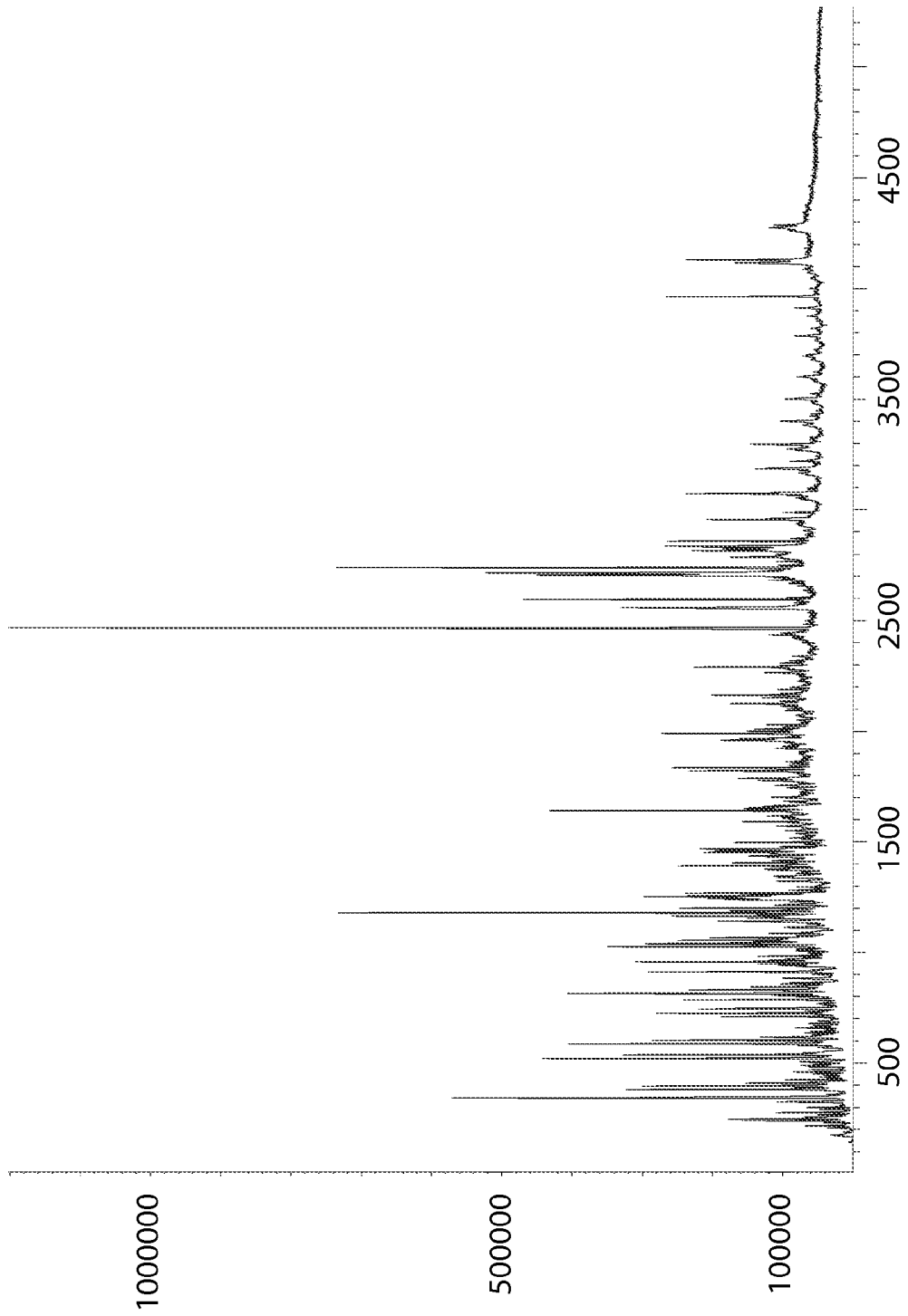
FIG. 35 is an image of a GC-MS spectrum of products for the reaction of soybean oil and water at 550 degrees Celsius over a tungsten (VI) oxide catalyst.
Figure 36:
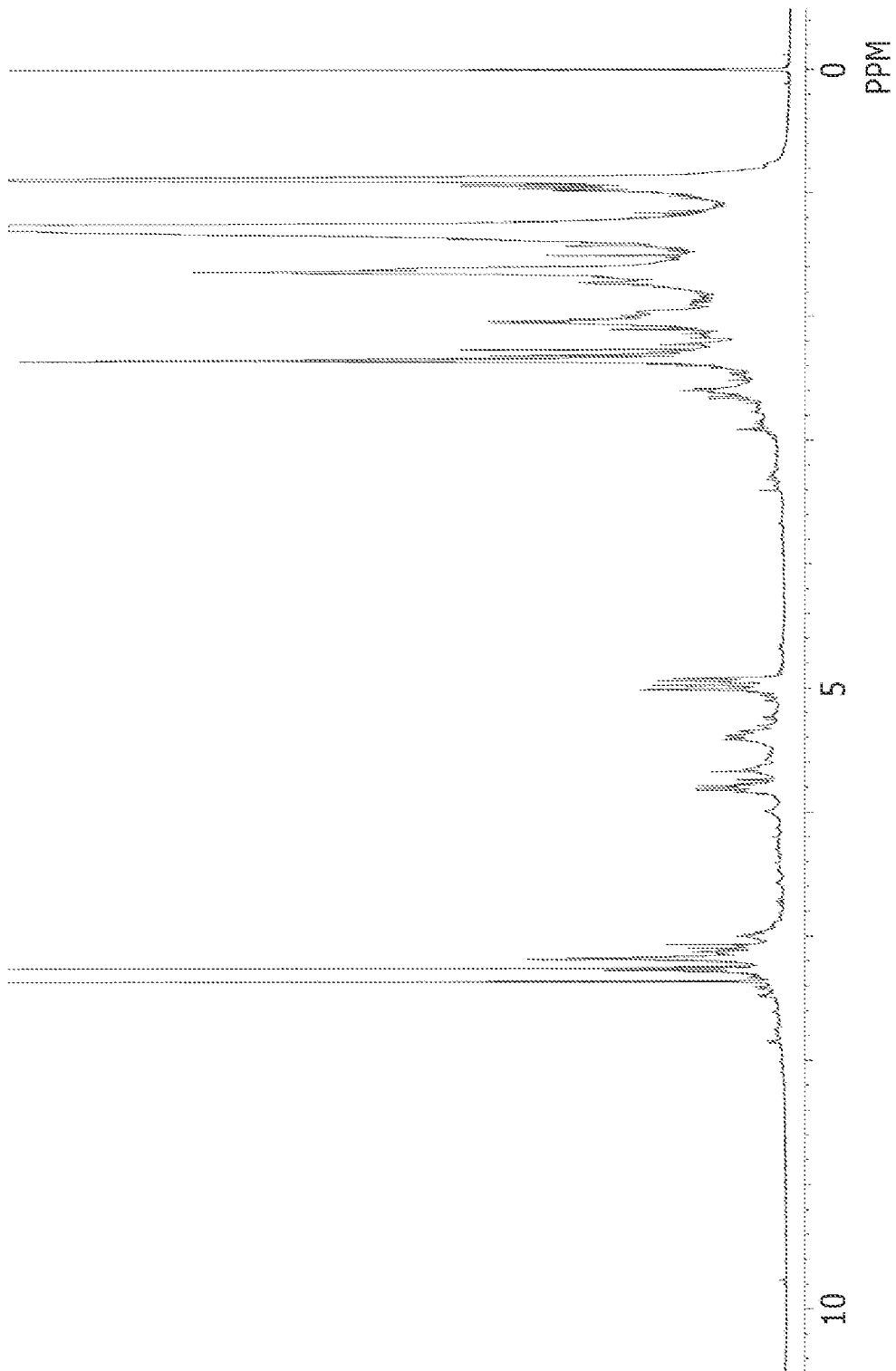
FIG. 36 is an image of a $^1$H-NMR spectrum of products for the reaction of soybean oil and water at 550 degrees Celsius over a tungsten (VI) oxide catalyst.

Table A42 is GC-MS data of products (Exp. No. 602-604) for the reaction of soybean oil and water at 550 degrees Celsius over a tungsten (VI) oxide catalyst. FIG. 35 is an image of a GC-MS spectrum of products for the reaction of soybean oil and water at 550 degrees Celsius over a tungsten (VI) oxide catalyst. FIG. 36 is an image of a $^1$H-NMR spectrum of products for the reaction of soybean oil and water at 550 degrees Celsius over a tungsten (VI) oxide catalyst.

GC-MS was also performed on the products of the reaction of cuphea oil and water at 550 degrees Celsius over a zirconium catalyst

Example 10

Hydrocarbon Products from Algae Oil

A reactor was set-up as described in Example 3 using a zirconia catalyst. The specific reaction conditions are described in Table A44. Further aspects of the experiments and acid numbers for the products are shown in Table A45. Algae oil (derived from salt water kelp) was used as the carbon feedstock. Algae oil was obtained from China. GC-MS analysis was performed on the products. It was found that algae oil serves as an excellent feedstock in conjunction with embodiments herein.

Example 11

Hydrocarbon Products from Glucose, Sucrose, Starch

Figure 37:
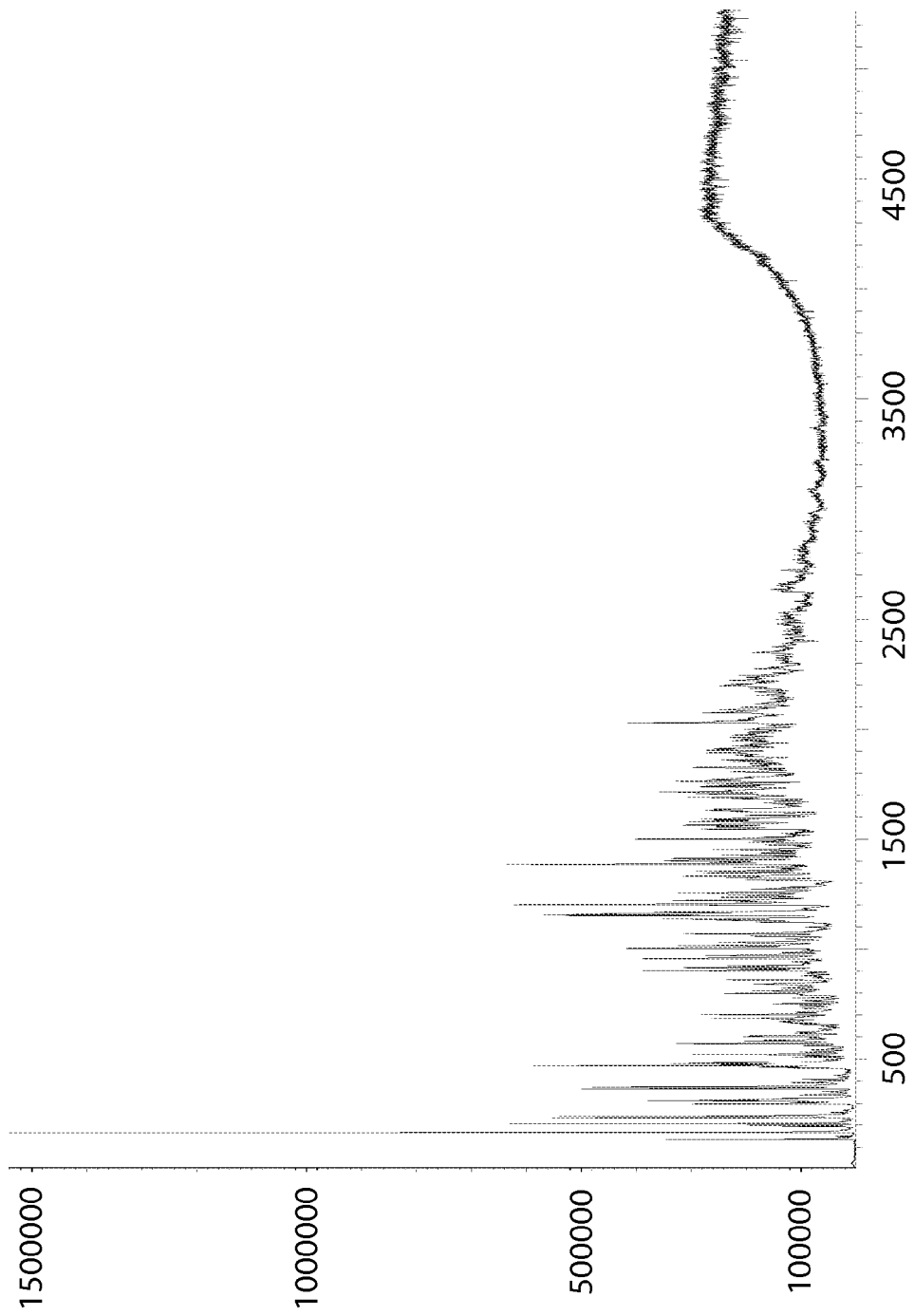
FIG. 37 is an image of a GC-MS spectrum of a sample created from 10% glucose in water at 500° C. over zirconium dioxide.
Figure 38:
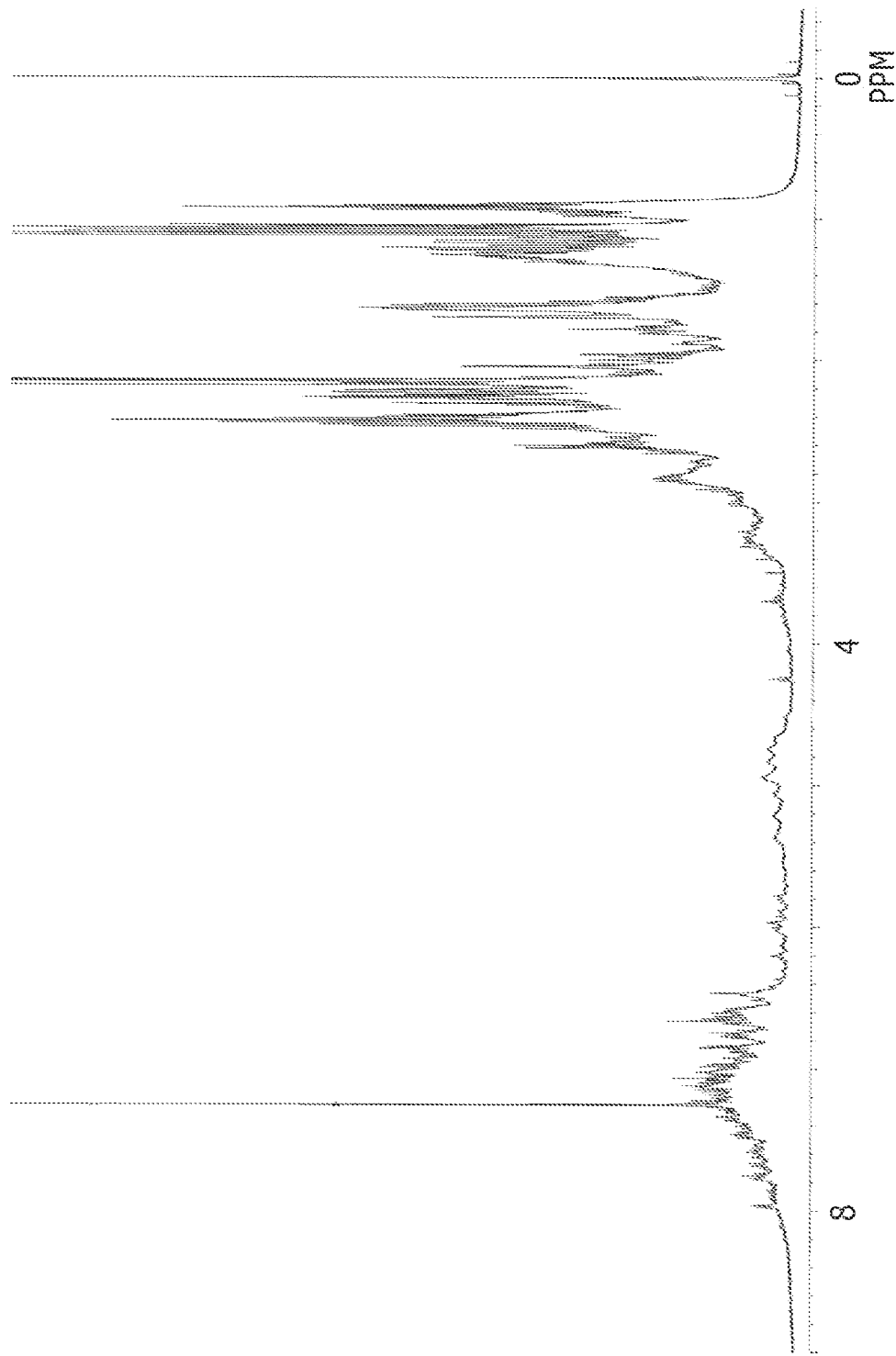
FIG. 38 is an image of a $^1$H-NMR spectrum (CDCl$_3$) of sample created from 10% glucose in water at 500° C. over zirconium dioxide.

The reaction of glucose in supercritical water over zirconium dioxide was studied at 500° C. The reaction conditions are contained in Table A48. The production rate for glucose is different from oil based feed stocks as evidenced by data contained in Tables A49-A50. Only a small amocellobioseunt of organic material was produced with the majority of the reaction proceeding to form water soluble components and gaseous products. The GC-MS data for the organic phase contains mostly phenolic compounds as the products. The GC-MS data for sample 705 is included in Table A51 and the GC-MS chromatogram is shown in FIG. 37. The $^1$H-NMR data presents signals that are consistent with the GC-MS data in terms of functionality present in the mixture and is shown in FIG. 38. The aqueous phase was also investigated by $^1$H-NMR. The aqueous phase contains a small number of compounds. Some of the compounds have been tentatively identified. Those compounds are methanol, ethanol, 2-butanone, acetone, and acetic acid. The aqueous phase derived from glucose was utilized as a basis of comparison for the polysaccharide substrates.

The reaction of sucrose in supercritical water over zirconium dioxide was studied at 500° C. The reaction conditions are described in Table A48. Only a small amount of organic material was produced with the majority of the reaction proceeding to form water soluble components and gaseous products. The $^1$H-NMR data from experiment 716 presents signals that are indistinguishable from the organic product obtained using glucose.

The reaction of water soluble starch in supercritical water over zirconium dioxide was studied at 500° C. The reaction conditions are described in Table A48. Only a minute amount of organic material was produced with the majority of the reaction proceeding to form water soluble components and gaseous products. The $^1$H-NMR data from experiment 724 presents signals that are indistinguishable from the organic product obtained using glucose. $^1$H-NMR spectra were recorded for the aqueous phase and compared to glucose. Starch is a polymer of glucose composed of alpha-1,4 linkages, therefore the successful hydrolysis and decomposition of starch can be gauged by a lack of anomeric hydrogen signals and the presence of the same group of compounds observed with glucose. There is no evidence of glucose (chemical shift region not shown) and the same chemical components are seen as in the 10% glucose assays.

The reaction of cellobiose in supercritical water over zirconium dioxide was studied at 500° C. The reaction conditions are described in experiment number 727 contained in Table A48. Only a small amount of organic material was produced with the majority of the reaction proceeding to form water soluble components and gaseous products. A $^1$H-NMR spectrum was recorded for the aqueous phase and compared to glucose. Cellobiose is a disaccharide of glucose composed of a beta-1,4 linkage, therefore the successful hydrolysis and decomposition of cellobiose can be gauged by a lack of anomeric hydrogen signals and the presence of the same group of compounds observed with glucose. The $^1$H-NMR spectrum showed no evidence of cellobiose and the same chemical components are seen as in the 10% glucose assays.

Example 12

Hydrocarbon Products from Cellulose

Figure 39:
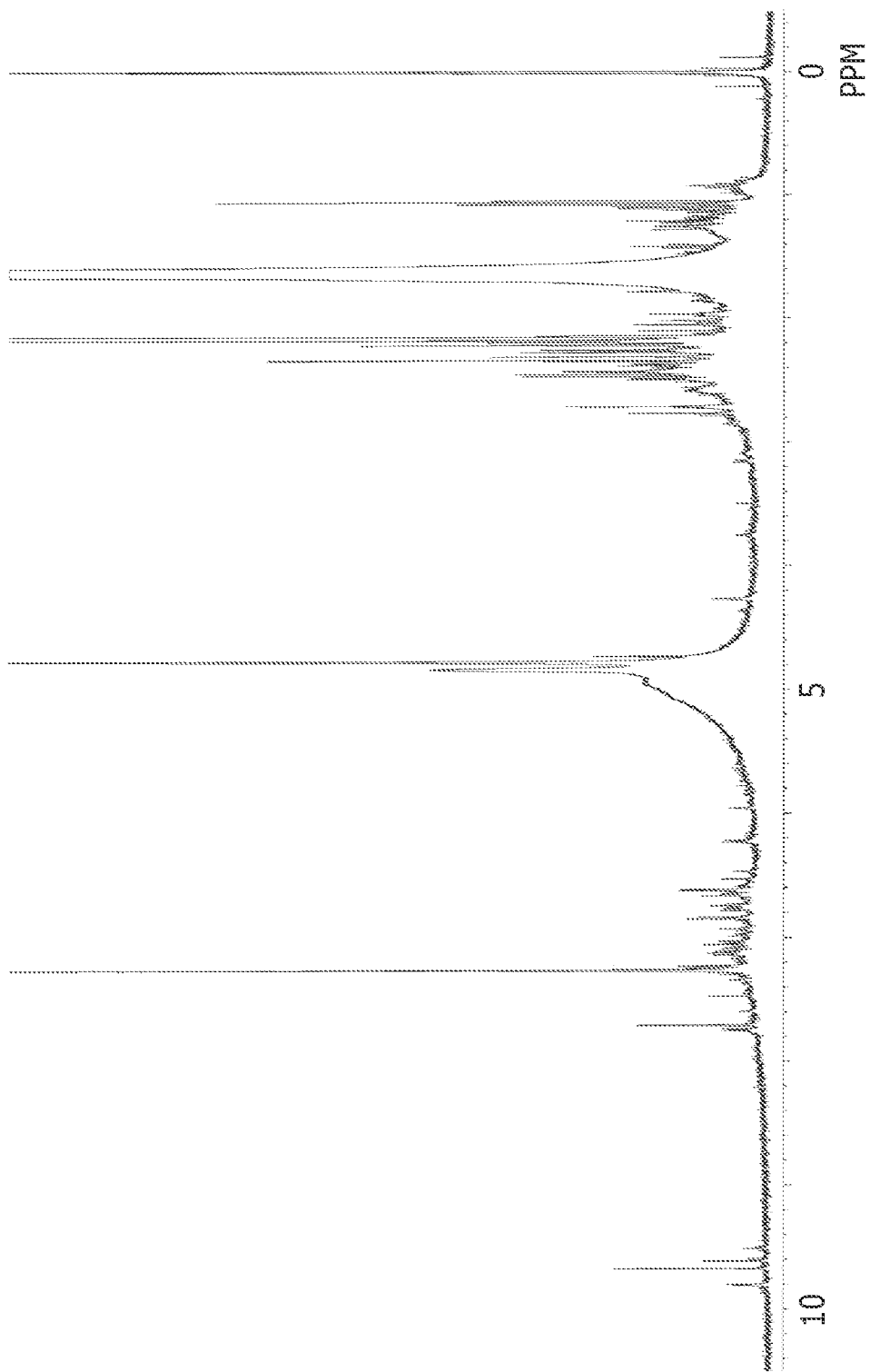
FIG. 39 is an image of $^1$H-NMR spectrum (CDCl$_3$) of sample created from cellulose and supercritical water at 450° C. over zirconium dioxide.

The reaction of cellulose with supercritical water over zirconium dioxide was studied at 450° C. The reaction condition is described in Table A52. A previously employed setup utilizing a chamber packed with microcrystalline cellulose was used (Clayton V. McNeff, Daniel T. Nowlan, Larry C. McNeff, Bingwen Yan, Ronald L. Fedie Continuous production of 5-hydroxymethylfurfural from simple and complex carbohydrates Applied Catalysis A: General, Volume 384, Issues 1-2, 20 Aug. 2010, Pages 65-69). The system was heated as rapidly as possible to supercritical conditions. Only a minute amount of organic material was produced with the majority of the reaction proceeding to form water soluble components. The organic $^1$H-NMR shown in FIG. 39 (cellulose and supercritical water at 450° C. over zirconium dioxide) was obtained by extracting a 5 g aqueous phase sample with 1.5 g CDCl$_3$ and separating the layers. The spectrum presents signals consistent with small alkyl organics, phenols, aromatics and aldehydes. The composition appears to be similar to that observed for glucose, but with less decomposition due to the lower temperature. Aqueous phase NMR showed no traces of glucose present and a similar organic profile to that of glucose and starch.

Example 13

Hydrocarbon Product Production Using Catalyst Colloids

Colloid Preparation:

Add 6×45 mL of 20% zirconia colloids (120 nm, Naycol Products, Inc, Ashland, Mass.) into 6 50 mL centrifuge tubes. Centrifuge colloids at 10,000 rpm for 5 minutes. Decant the supernatant into a beaker. The colloids were centrifuged down to the bottom of each tube. Add 10 mL of water into each tube and suspend the colloids by shaking Centrifuge the colloids again at 10,000 rpm for 5 minutes. Decant the supernatant into a beaker. The colloids were collected by adding 10 mL of water into each tube and suspended them by shaking. The suspension was then transferred to a 500 mL container. Two batches of colloids were prepared though this method. The concentration of each batch was 8.4%, and 10.5% (w/w) zirconia colloids in water as measured by moisture analysis.

Process Setup

A schematic of a continuous process reactor system employing colloidal solutions is shown in FIG. 44. There are two main differences from the system described earlier. The preheater coil has been removed and the empty column is filled from bottom to top. The diagram shows the use of two high pressure pumps (Waters 590 HPLC pumps, Waters Corporation, Milford, Mass.) that draw from water and heated (using a hot plate) lipid reservoirs. Both reservoirs were continuously sparged with nitrogen to minimize the effect of dissolved oxygen on the reaction. Both zirconia colloids suspension and soybean were pumped and combined using a "T" fitting and enter into an independently thermostated 150 mm×10 mm blank reactor. Temperature control was achieved using EZ-Zone PM Watlow (St. Louis, Mo.) temperature controllers. The hot product stream was cooled through a heat exchanger. The backpressure of the system was maintained through the use of a backpressure regulator obtained from Tescom (Elk River, Minn.), after which the cooled effluent was collected. The recovered effluent spontaneously separated into two distinct phases with the top phase being primarily biofuel while the bottom layer was water with colloids.

Hydrocarbon Production

Figure 40:
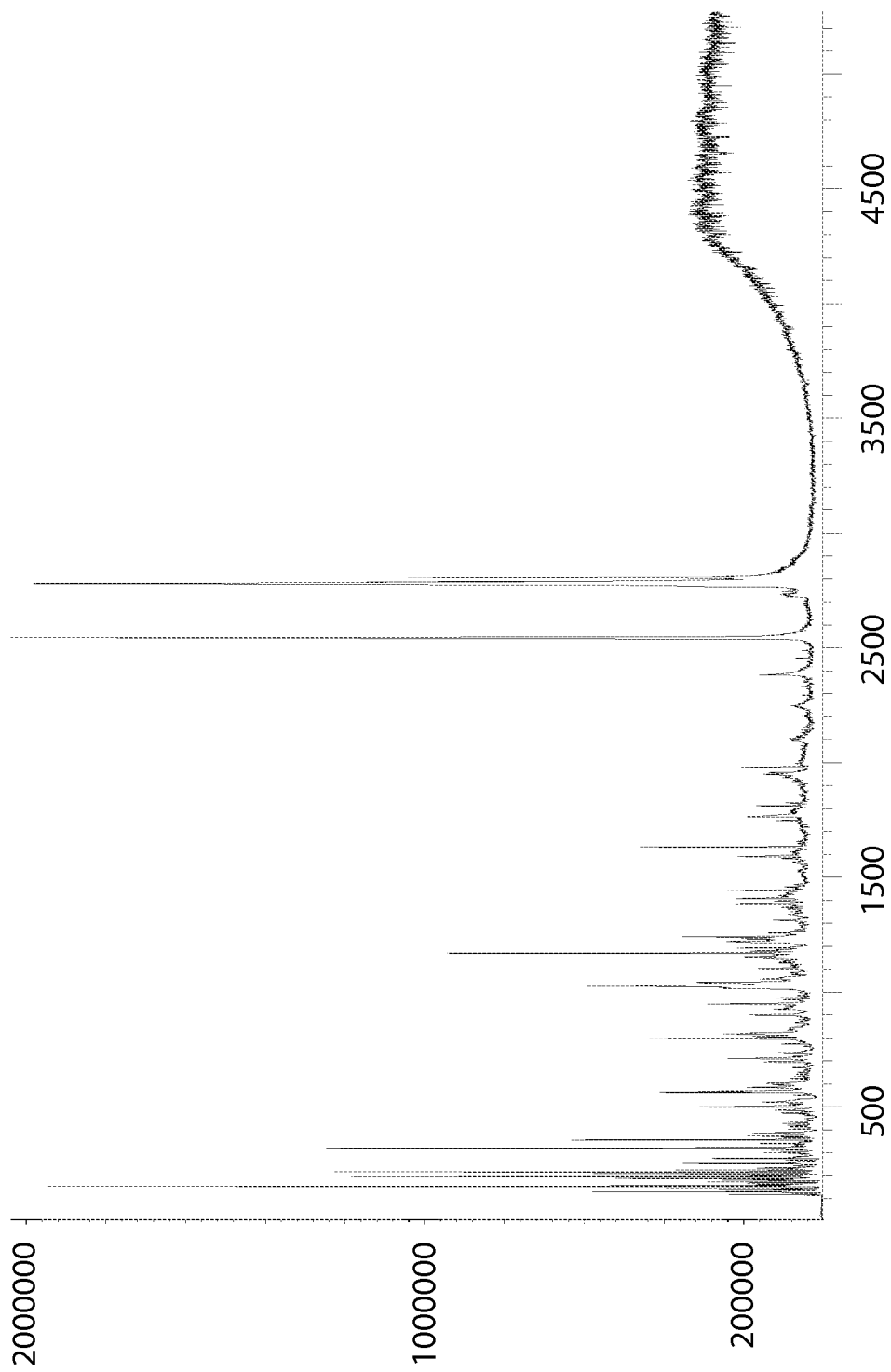
FIG. 40 is an image of GC-MS spectrum of sample created from supercritical water and soybean oil and with no catalyst at 500° C.
Figure 41:
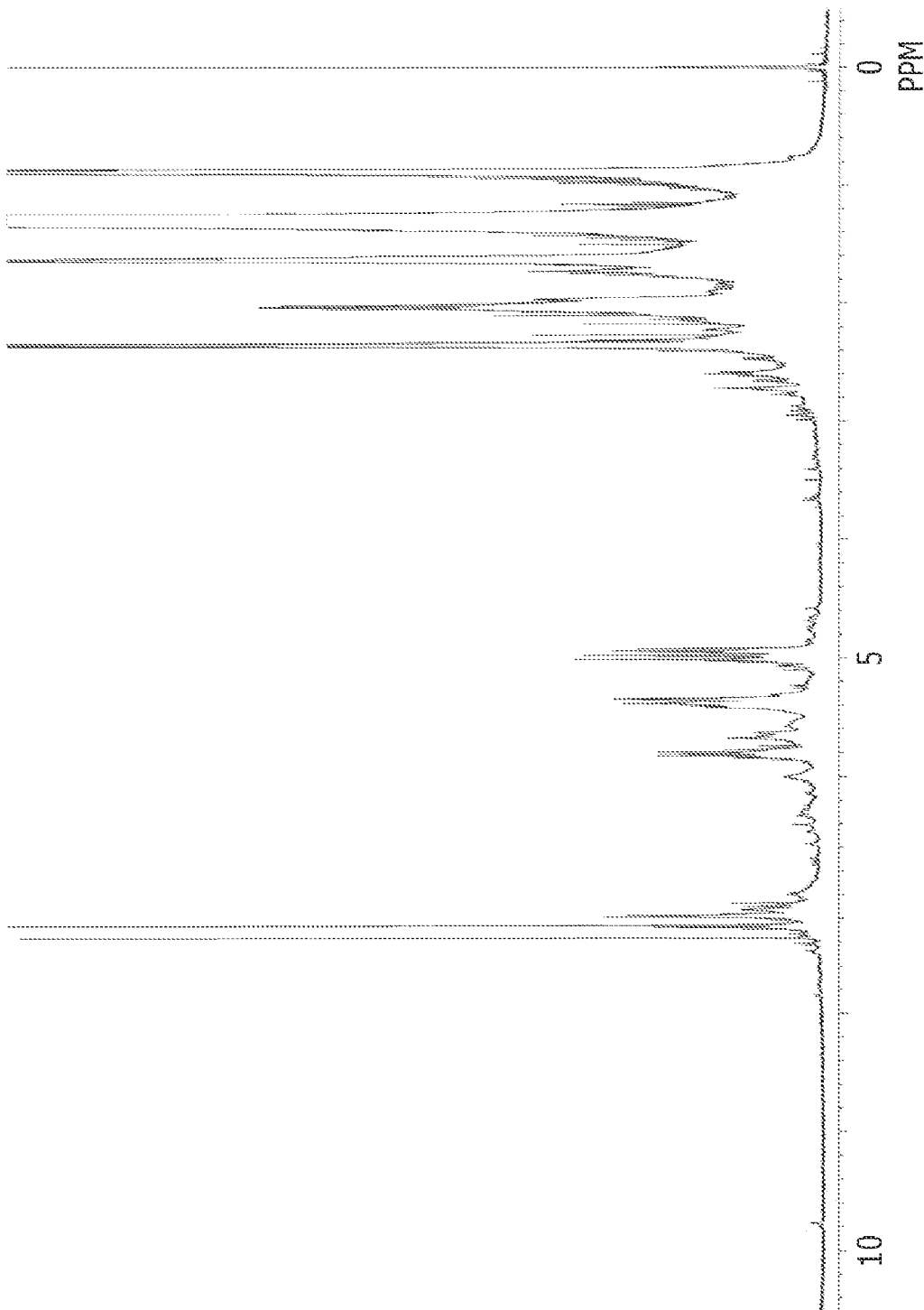
FIG. 41 is an image of $^1$H-NMR spectrum sample created from supercritical water and soybean oil at 500° C.

The conversion of soybean oil to a suitable biofuel mixture was demonstrated using a continuous flow setup with an open tubular reactor and the catalyst mixed with the water layer. This setup demonstrates the ability of the catalyst to perform in systems other than fixed bed and greatly expands the substrate possibilities by employing design modifications to the system, i.e. the use of an extruder to react solid materials in a continuous process. The reaction conditions are shown in Table A53. Table A54 shows the data collected for the sample conditions of Table A53. The catalyst was introduced by using a colloidal suspension in water. Because the average particle size in the colloid is <100 nm the solution can be pumped through a high pressure HPLC pump without clogging of the pump heads. Table A55 contains the GC-MS data collected for the blank experiment using only soybean oil and supercritical water. The results show a range of organic molecules formed, but that majority of the product is free fatty acids resulting from the hydrolysis of the oil. This observation is supported by the high acid number of the fraction as well. The GC-MS spectrum of the sample created from supercritical water and soybean oil and with no catalyst at 500° C. is contained in FIG. 40. In FIG. 41, the $^1$H-NMR spectrum of the resulting mixture is presented.

Figure 42:
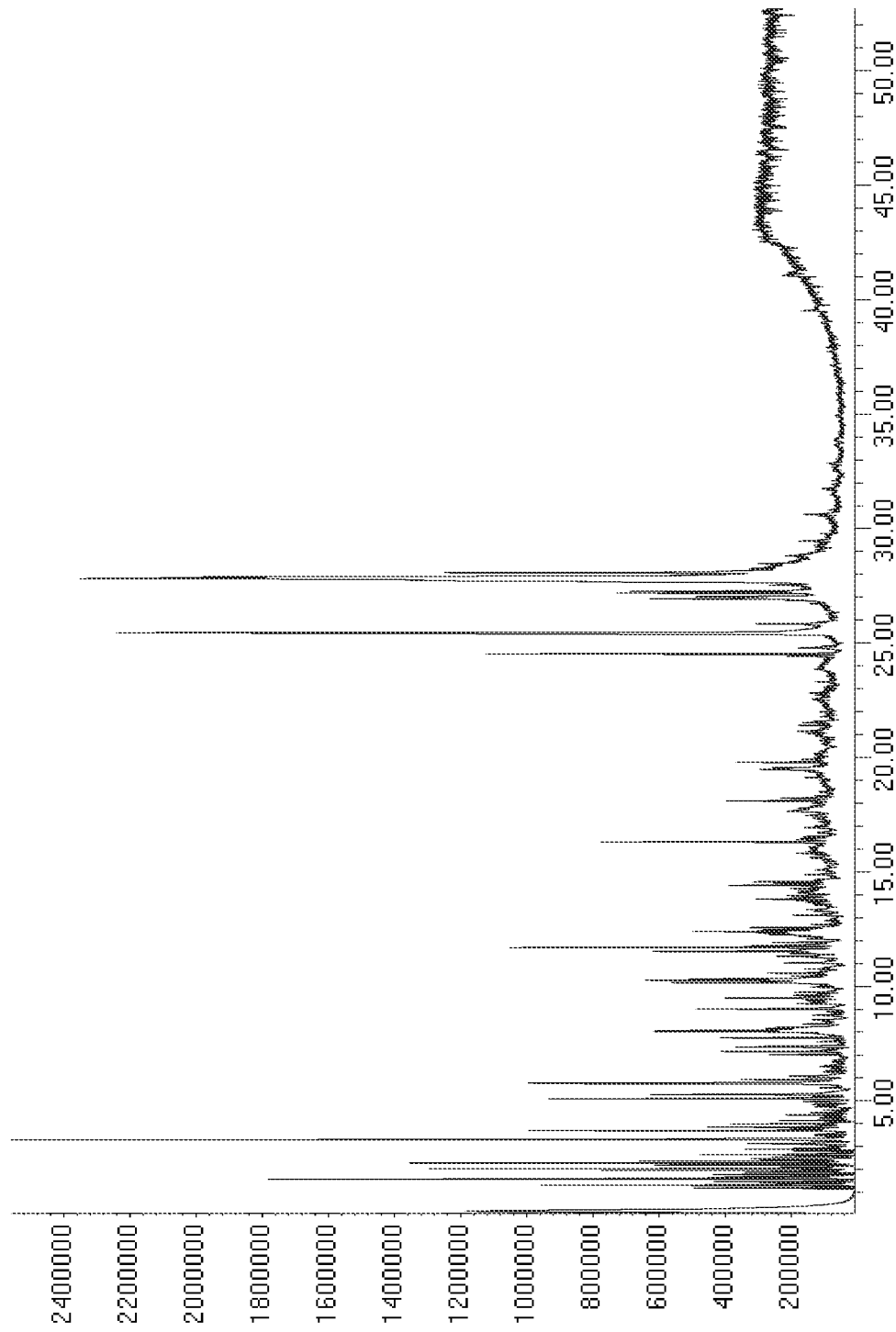
FIG. 42 is an image of a GC-MS spectrum of a sample created from 8.4% colloidal zirconia in water and soybean oil at 500° C.
Figure 43:
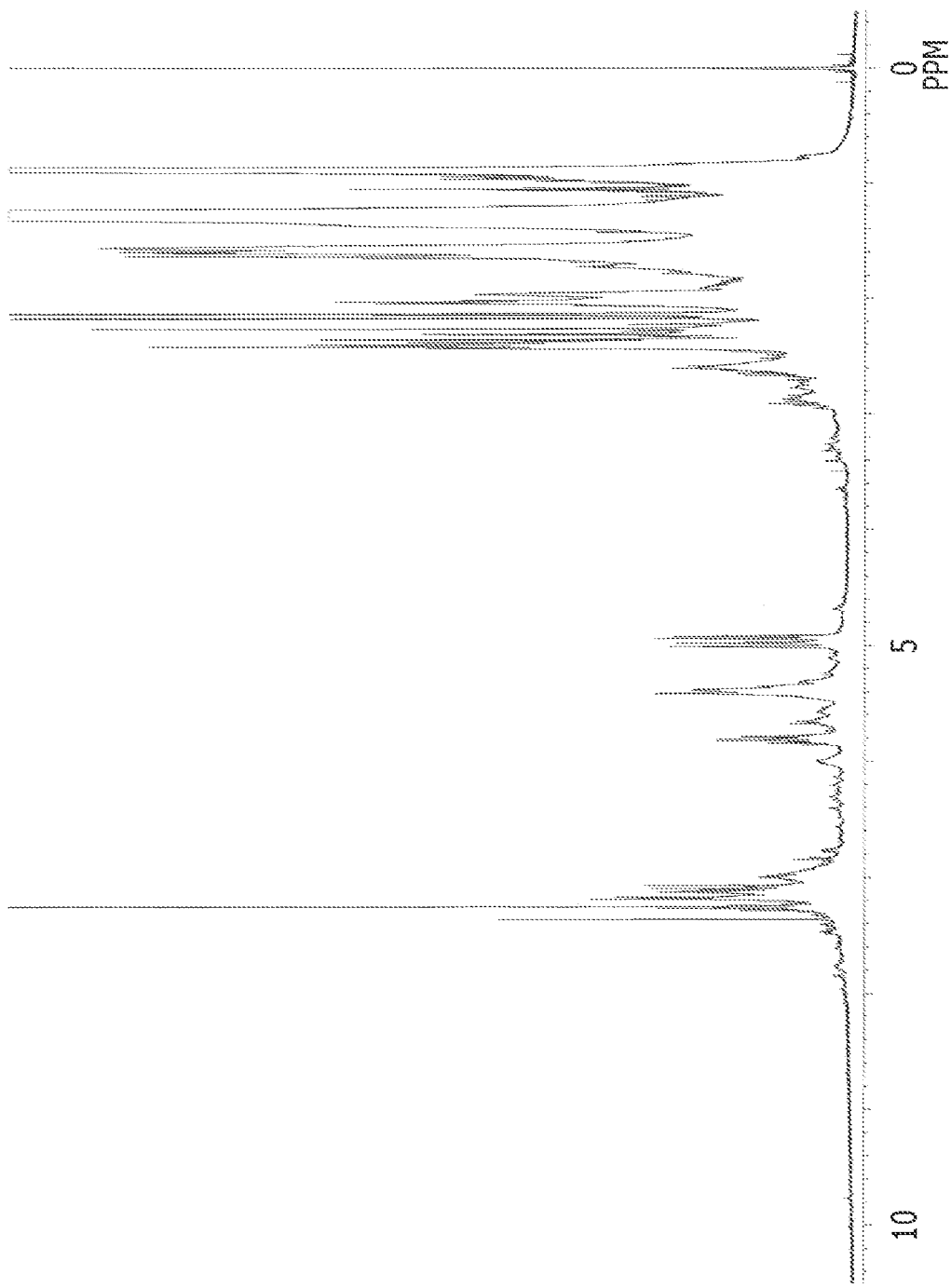
FIG. 43 is an image of a $^1$H-NMR spectrum of a sample created from 8.4% colloidal zirconia in water and soybean oil at 500° C.

After the blank experiment was complete the pump was switched to the colloid suspension of zirconia (8.4%). The system was stabilized and fractions were collected. The GC-MS data collected for the reaction of colloidal zirconia with soybean oil shows that the number of compounds greatly increases with introduction of colloids. The most notable change is the presence of long chain ketones and their fragmentation products. Also, there is a significant decrease in the acid number as compared to the blank indicating the further reaction of the free fatty acids. FIG. 42 shows the GC-MS spectrum of the product organic layer created from 8.4% colloidal zirconia in water and soybean oil at 500° C. FIG. 43 shows the $^1$H-NMR spectrum of the resultant product created from 8.4% colloidal zirconia in water and soybean oil at 500° C.

Example 14

Hydrocarbon Production from Open Tubular Reactor

An open tube reactor for continuous production of hydrocarbon products was setup as shown in FIG. 4. The reactor included two high pressure Waters 590 HPLC pumps obtained from Waters Corporation (Milford, Mass.) that draw from a water reservoir that is continuously sparged with nitrogen to minimize the effect of dissolved oxygen on the system. The water was then pumped into two custom designed tubes with a volume of 700 ml. One tube contains feedstocks (e.g. soybean oil, algae oil, 5% algae, and 5% cellulose) in a water solution/suspension and one tube contained 9.7% zirconia colloids. The colloids and feedstock were then pumped, combined and passed through an electrically driven preheater that is capable of bringing the reactants to the desired set point temperature before they entered the independently thermostated reactor. The temperature control was maintained using EZ-Zone PM Watlow (St. Louis, Mo.) temperature controllers. The custom preheater was used to bring the temperature of the flowing fluid up to the desired point before it entered the empty 150 mm×10 mm tube reactor. The preheater consisted of wound stainless steel HPLC tubing in a grooved aluminum cylindrical block with an 800 watt Watlow heater located in the center of the cylinder. The backpressure of the system was maintained through the use of a backpressure regulator obtained from Tescom (Elk River, Minn.). Upon exiting the reactor, the reaction products were cooled through a heat exchanger.

Tables A57 and A58 show experimental conditions for experiments that were conducted with this reactor system (experiments 755-760). The reaction products were then analyzed using $^1$H-NMR and GC-MS techniques. The results from experiments 755-760 are summarized in the following paragraphs.

Figure 45:
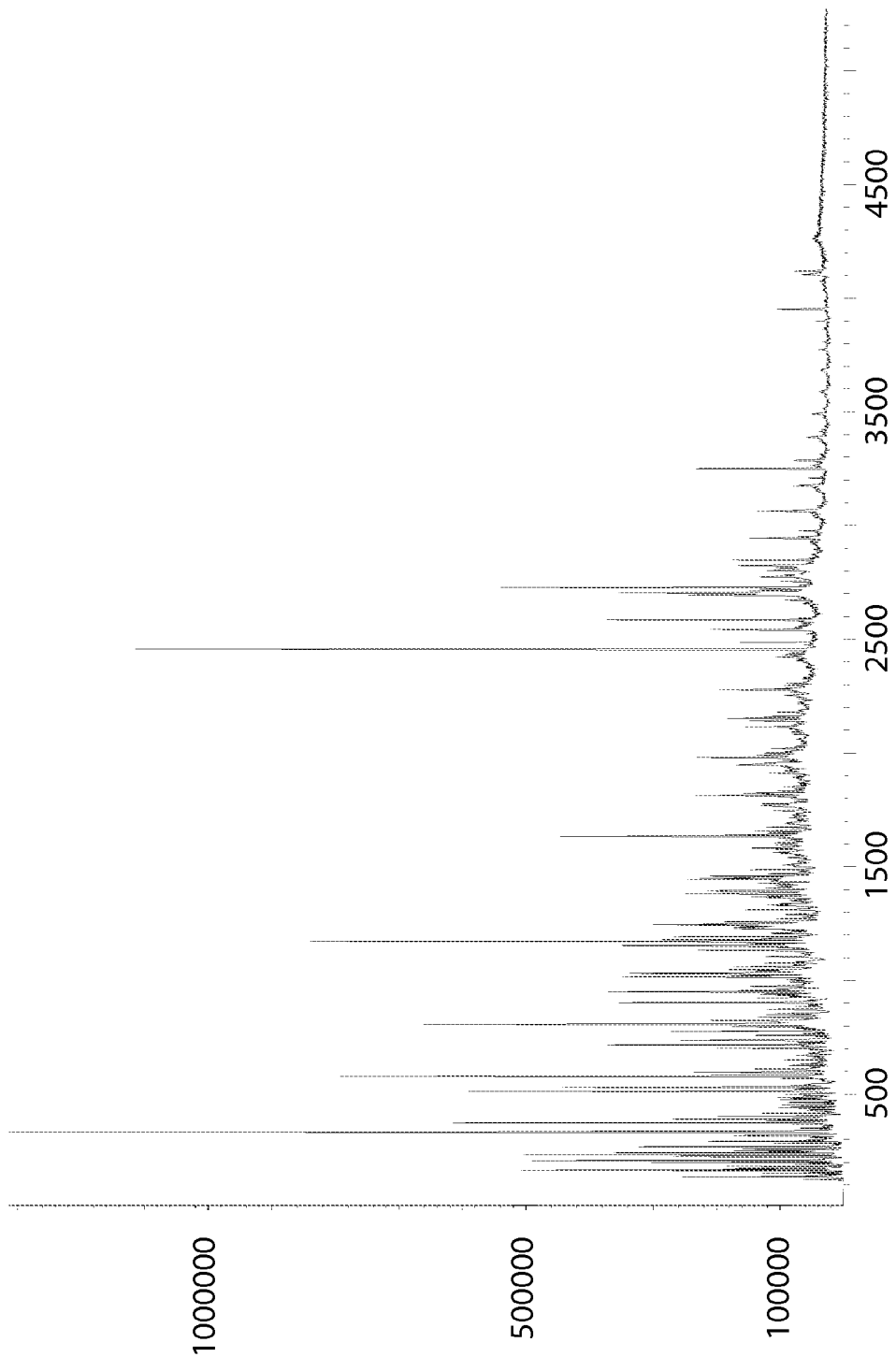
FIG. 45 is an image of a GC-MS spectrum of a sample of products created from 9.7% colloidal zirconia in water and soybean oil at 515° C.
Figure 46:
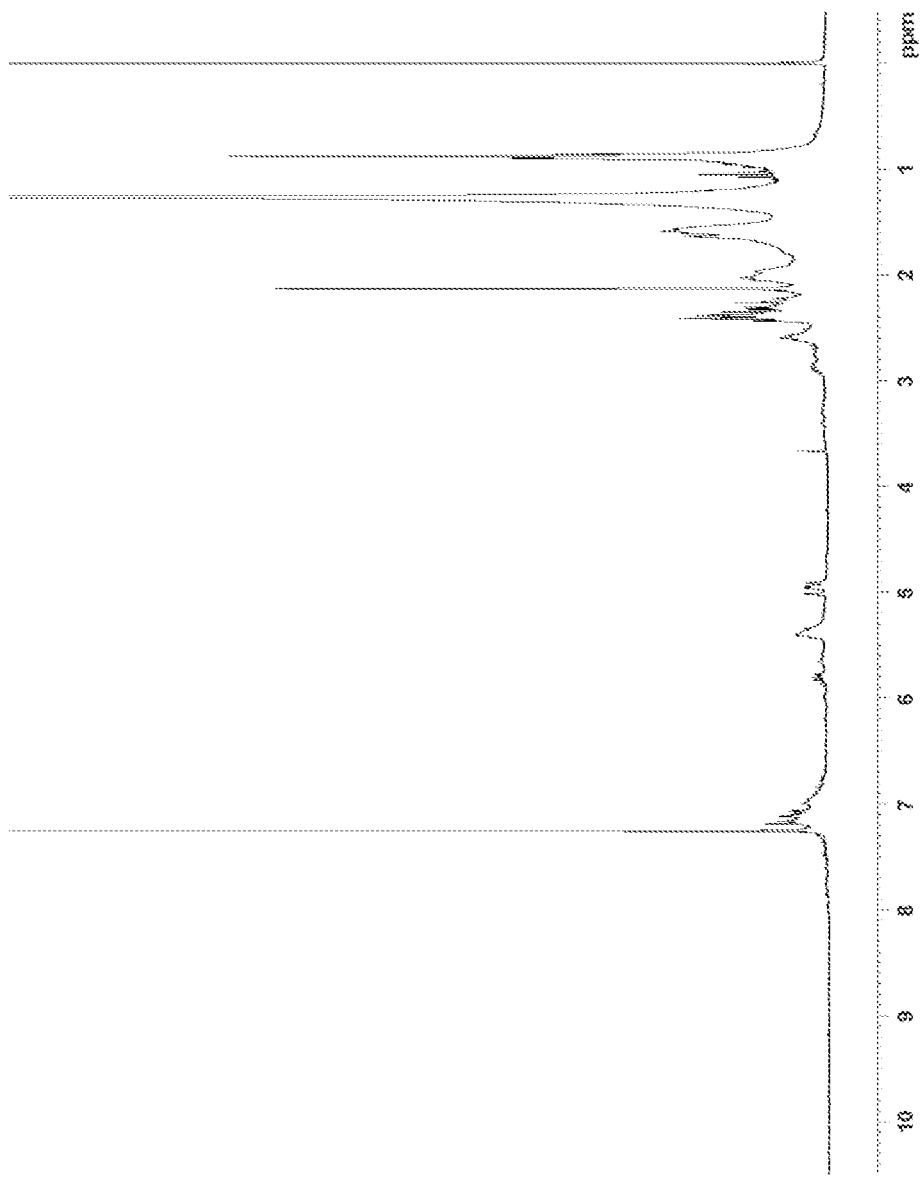
FIG. 46 is an image of a $^1$H-NMR spectrum (CDCl$_3$) of a sample of products created from 9.7% colloidal zirconia in water and soybean oil at 515° C.

Experiment 755—The reaction of soybean oil with a 9.7% suspension of zirconia (colloidal) in water at 515° C. and under supercritical conditions yields a product mixture that is very similar to the mixture observed when using a fixed bed catalytic reactor under similar conditions. FIG. 45 shows GC-MS spectrum of the products obtained from experiment #755. FIG. 46 shows $^1$H-NMR spectrum (CDCl$_3$) of the products obtained from experiment #755.

Figure 47:
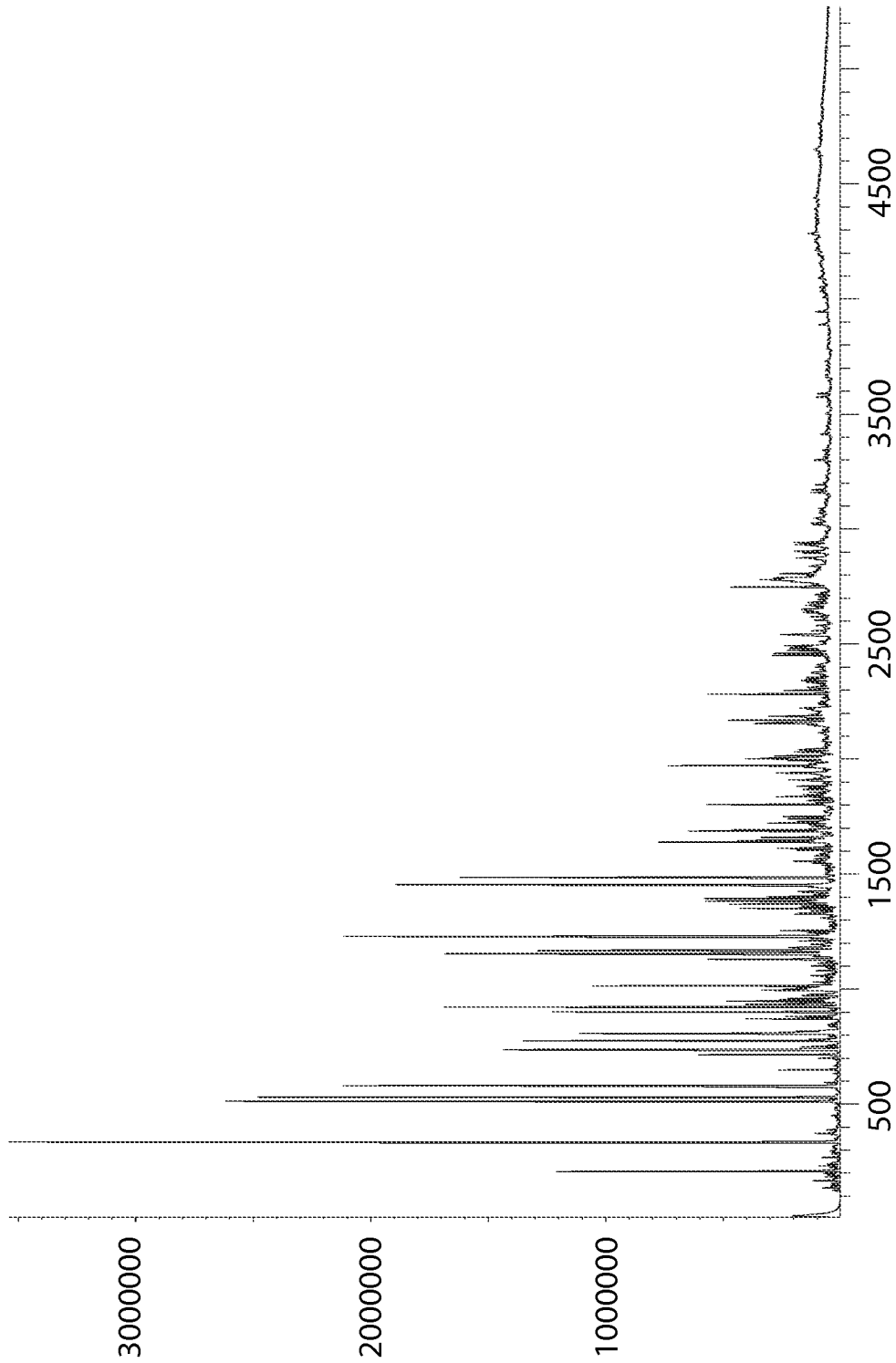
FIG. 47 is an image of a GC-MS spectrum of a sample of products created from 9.7% colloidal zirconia in water and soybean oil at 550° C.
Figure 48:
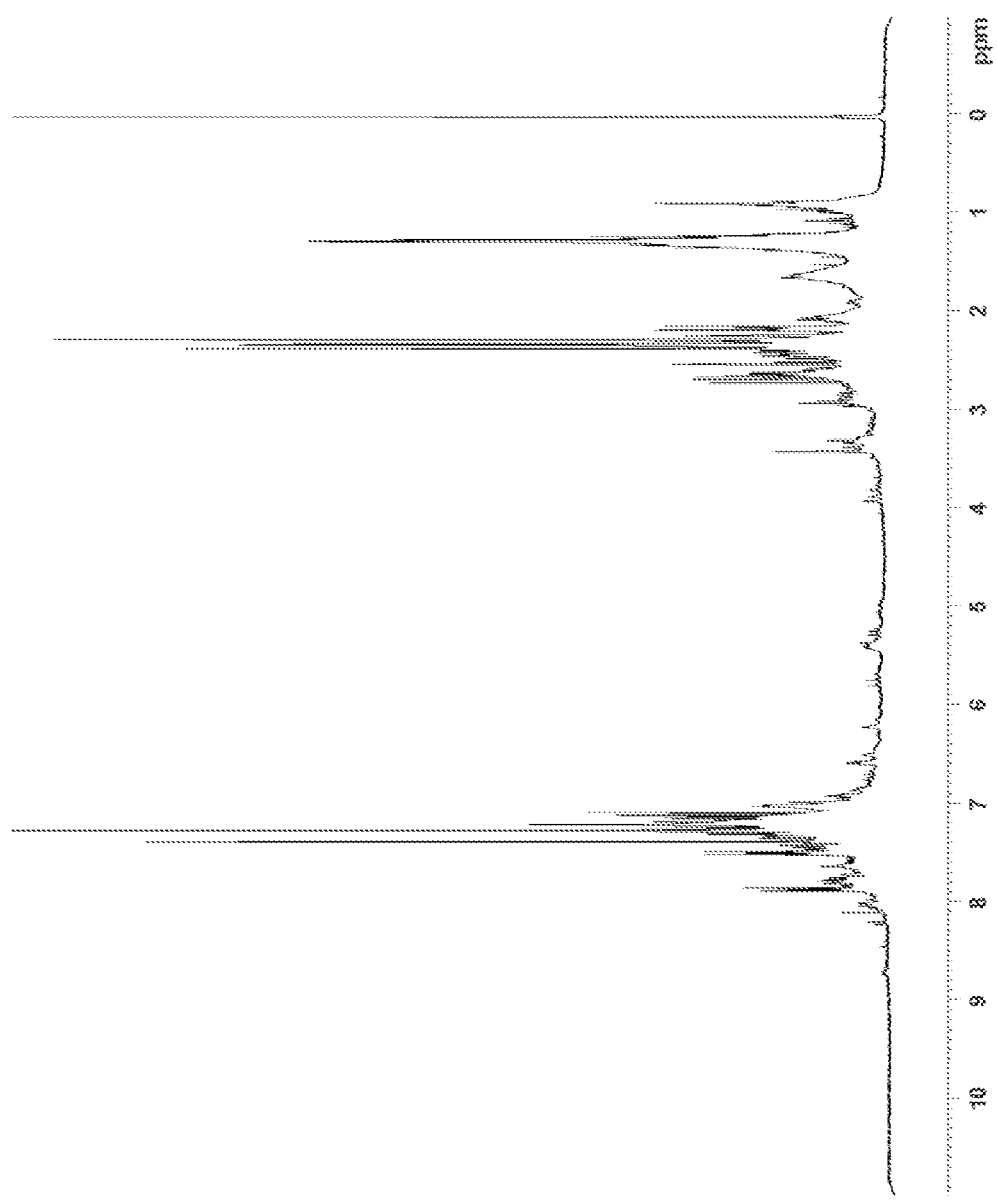
FIG. 48 is an image of a $^1$H-NMR spectrum (CDCl$_3$) of a sample of products created from 9.7% colloidal zirconia in water and soybean oil at 550° C.

Experiment 756—The reaction of soybean oil with a 9.7% colloidal suspension of zirconia in water at 550° C. and under supercritical conditions yields a product mixture that is comprised almost exclusively of aromatic compounds. There are some remaining olefins and aliphatics, but the amount of ketones has greatly decreased (when compared to the results of experiment #755), especially the long chain components. Conversely, the number of aromatic compounds has increased significantly. FIG. 47 shows GC-MS spectrum of the products obtained from experiment #756. FIG. 48 shows $^1$H-NMR spectrum (CDCl$_3$) of the products obtained from experiment #756.

Figure 49:
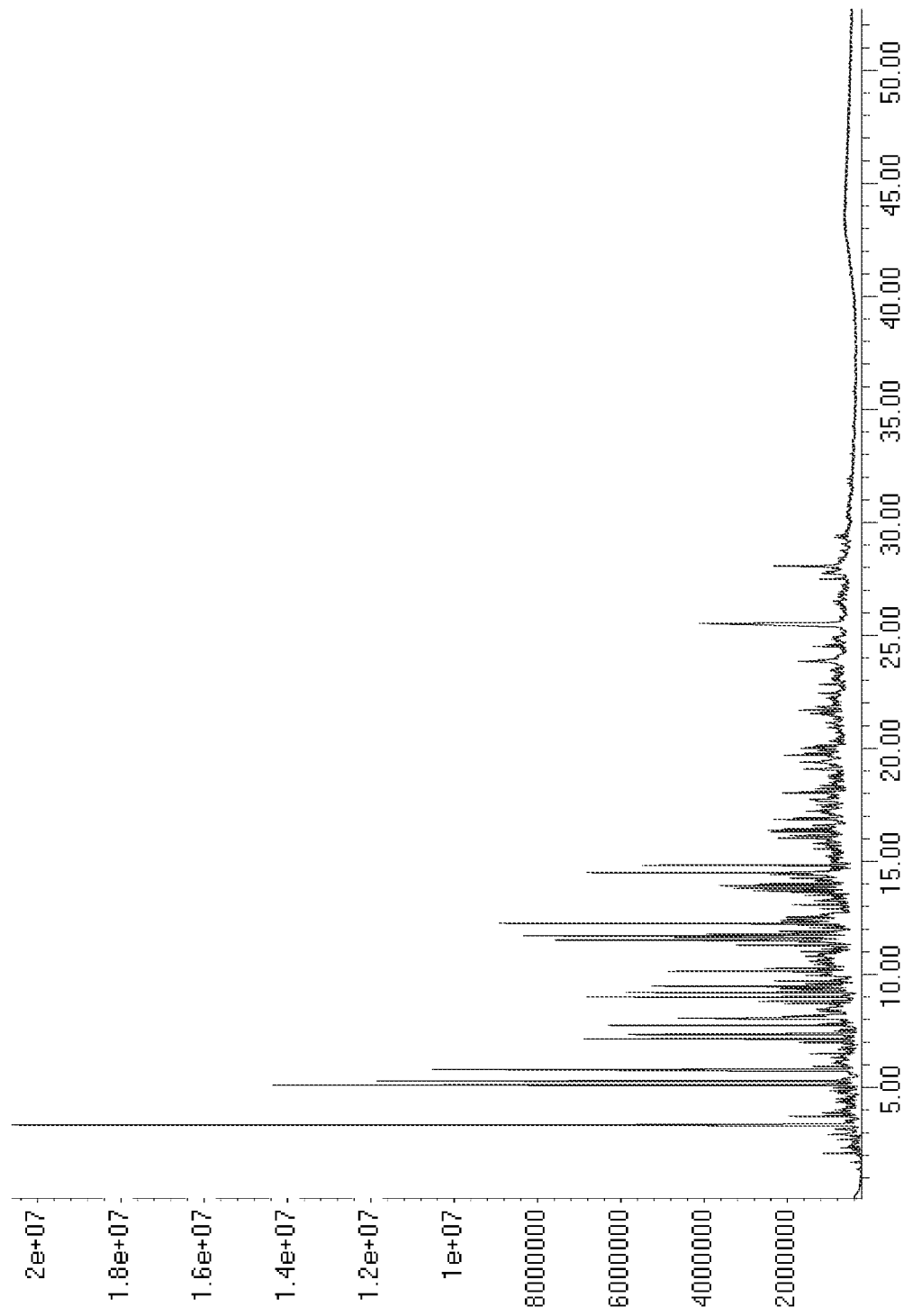
FIG. 49 is an image of a GC-MS spectrum of a sample of products created from water and soybean oil with no catalyst at 550° C.
Figure 50:
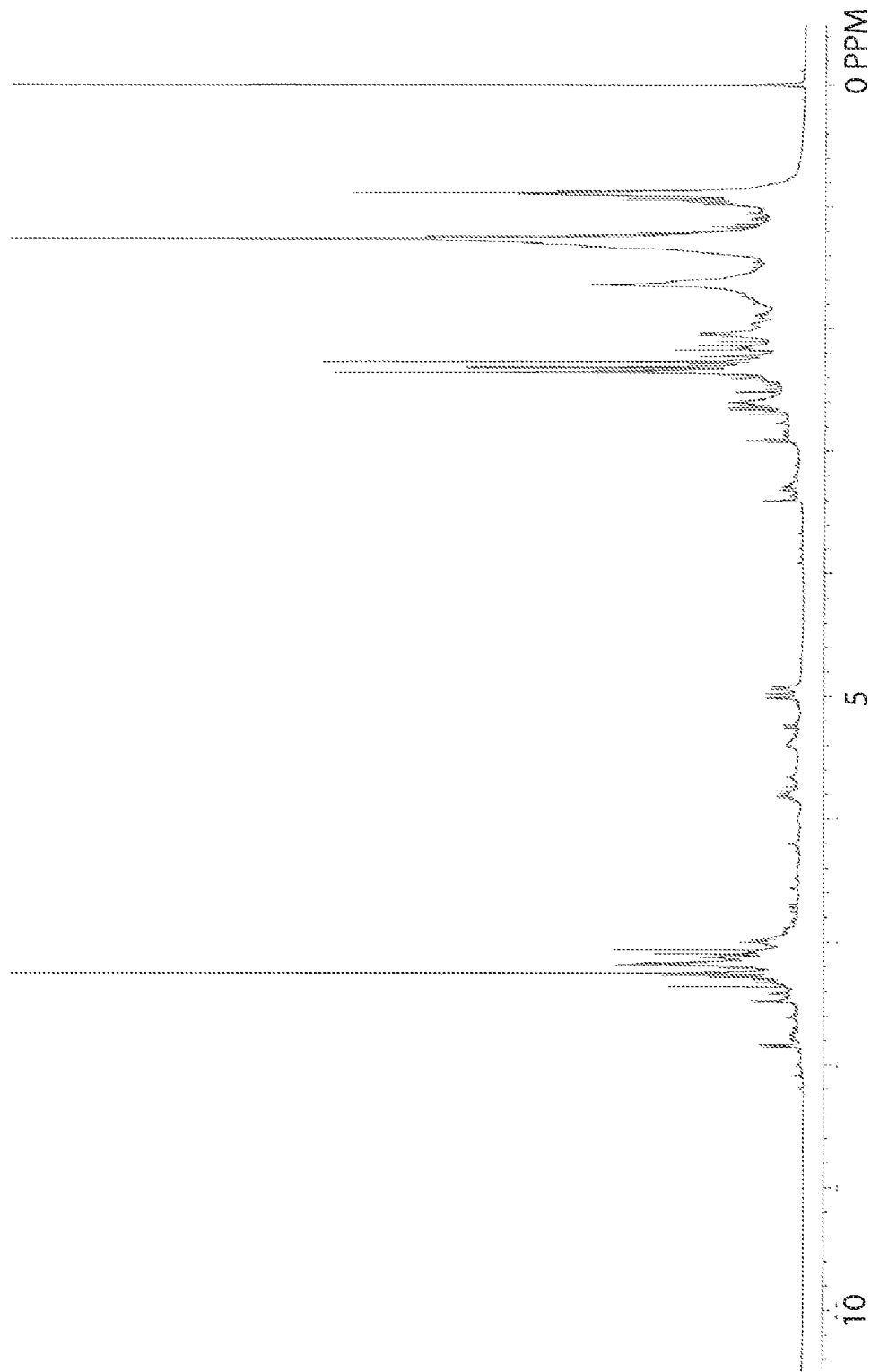
FIG. 50 is an image of a $^1$H-NMR spectrum (CDCl$_3$) of a sample of products created from water and soybean oil with no catalyst at 550° C.

Experiment 757—The blank reaction of soybean oil with water at 550° C. and under supercritical conditions yields a product mixture that is comprised almost exclusively of aromatic compounds. There are some remaining olefins, aliphatics, and long chain acids. There are no ketones observed and the array of aromatics shows many differences from the reaction with colloidial zirconia, particularly in the identity of some components and the relative abundance of others. FIG. 49 shows GC-MS spectrum of the products obtained from experiment #757. FIG. 50 shows $^1$H-NMR spectrum (CDCl$_3$) of the products obtained from experiment #757.

Figure 51:
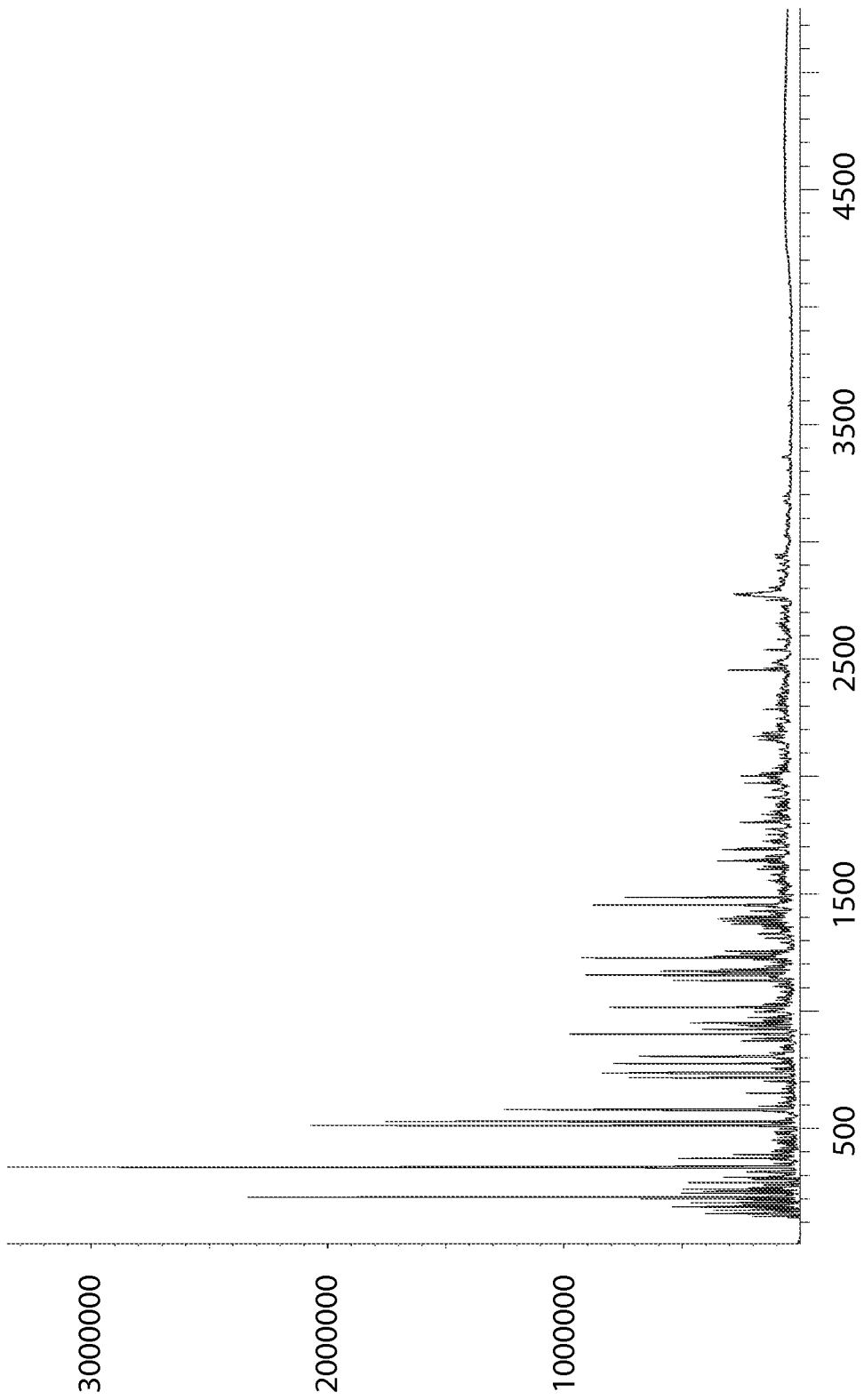
FIG. 51 is an image of a GC-MS spectrum of a sample of products created from 9.7% colloidal zirconia in water and algae oil at 550° C.
Figure 52:
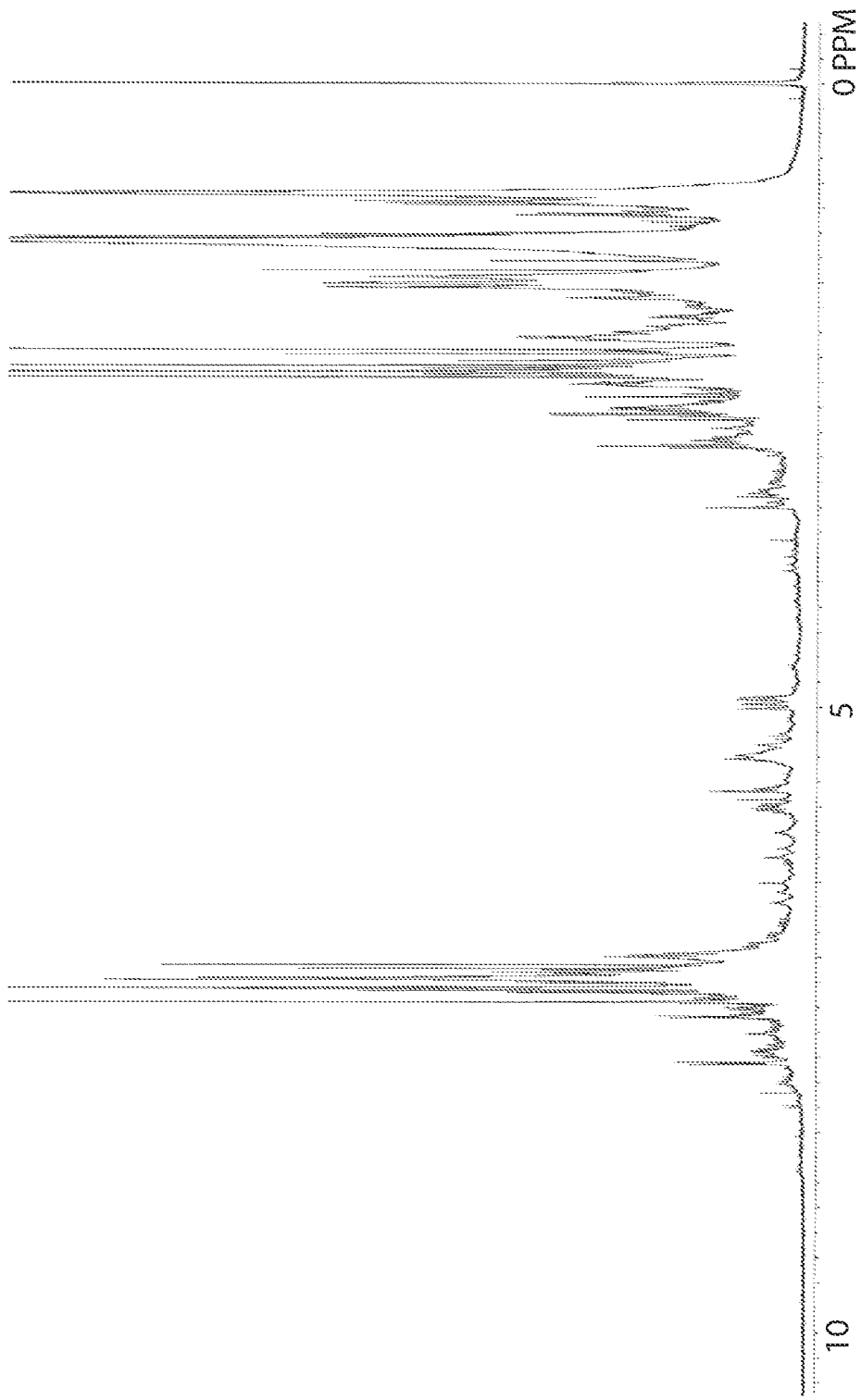
FIG. 52 is an image of a $^1$H-NMR spectrum (CDCl$_3$) of a sample of products created from 9.7% colloidal zirconia in water and algae oil at 550° C.

Experiment 758—The reaction of algae (kelp) oil with a 9.7% colloidal suspension of zirconia in water at 550° C. and under supercritical conditions yields a product mixture that is comprised of aromatic, aliphatic and olefinic compounds. The amount of ketones has greatly decreased, as compared to the fixed bed results, and the number of aromatic compounds has increased significantly. FIG. 51 shows GC-MS spectrum of the products obtained from experiment #758. FIG. 52 shows $^1$H-NMR spectrum (CDCl$_3$) of the products obtained from experiment #758.

Experiment 759—The reaction of a suspension of 7% powdered algae with a 9.7% colloidal suspension of zirconia in water at 550° C. and under supercritical conditions yields a relatively simple reaction mixture. The GC-MS indicates the presence of acetone, butanone and some long chain carboxylic acids and the $^1$H-NMR data indicates the presence of compounds such as methanol, acetone, acetic acid and 2-butanone.

Experiment 760—The reaction of a suspension of 5% microcrystalline cellulose with a 9.7% colloidal suspension of zirconia in water at 550° C. and under supercritical conditions yields a relatively simple reaction mixture. The GC-MS indicates the presence of acetone and butanone and the $^1$H-NMR data, indicates the presence of compounds such as methanol, ethanol, acetone, acetic acid and 2-butanone.

Example 15

Conversion of Biomass to Biofuels Under Supercritical Water Conditions and Colloidal Metal Oxide Catalyst with Open-Tube Reactor Materials Soybean oil, algae oil (oil was extracted from Kelp in China), cellulose (Fluka, USA), algae from SarTec Corp., Camelina meal from SarTec Corp., Fleishmann's yeast powder obtained from Cub Foods (Coon Rapids, Minn.). 9.7% (wt./wt.) zirconia colloids (100 nm particle size) was prepared by diluting 30% (wt./wt.) zirconia colloids produced by Nycol, USA.

Experimental

Figure 53:
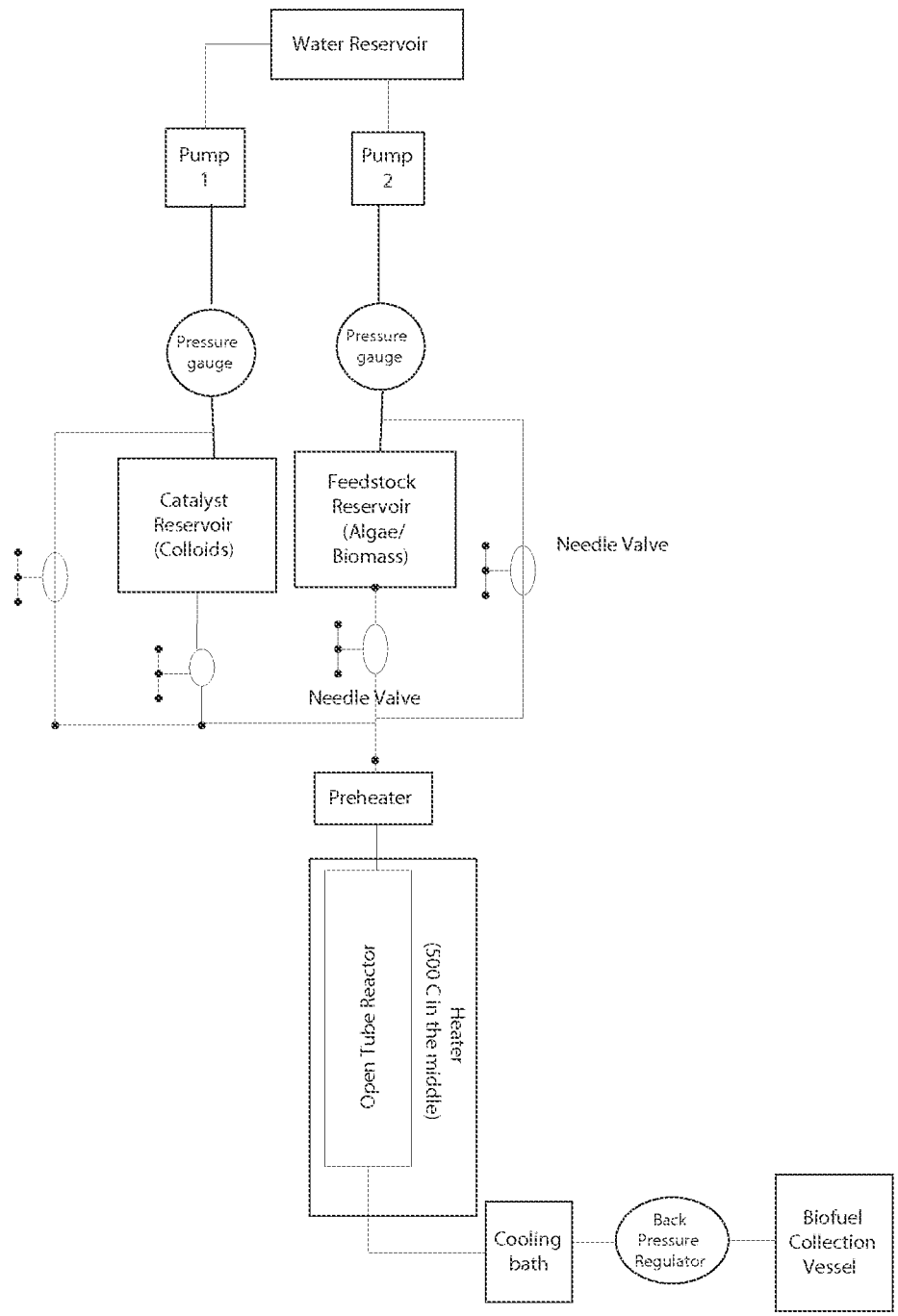
FIG. 53 is a schematic view of a continuous biofuel production process.

A schematic of the continuous biofuel production process is shown in FIG. 53. The diagram shows the use of two high pressure Waters 590 HPLC pump obtained from Waters Corporation (Milford, Mass.) that draw from water that are continuously sparged with nitrogen to minimize the effect of dissolved oxygen on the system. The water was pumped into two stainless steel tubes with volume of 700 mL each (12 in×2 in i.d.). One tube contains biomass feedstock (e.g. soybean oil, camelina oil, algae oil, Camelina meal, algae powder) in a water solution/suspension and one tube contains 7.0% (wt./wt.) zirconia colloids in water. The catalyst zirconia colloid and feedstock were pumped and combined via a "T", and then passed through an electrically driven preheater that was capable of bringing the reactants to the desired set point temperature before it enters the independently thermostated fixed bed catalytic reactor. The temperature control was achieved using some EZ-Zone PM Watlow (St. Louis, Mo.) temperature controllers. The custom preheater was used to bring the temperature of the flowing fluid up to the desired temperature before it entered an empty 1 cm×15 cm stainless steel tube reactor which consisted of wound stainless steel HPLC tubing in a grooved aluminum cylindrical block with an 800 watt Watlow heater in the center of the cylinder. The backpressure of the system was maintained through the use of a backpressure regulator obtained from Tescom (Elk River, Minn.). After the reactor, the effluent mixtures were cooled through a heat exchanger and the reaction products collected.

Soybean Oil/Salt Water

Using the reactor setup described in FIG. 53, the reaction of biomass in the presence of a salt water solution and catalyst were investigated at 515 and 550° C. The experimental conditions for the experiments are listed in tables A61 and A62 under experimental entries 761-769. The product streams were analyzed by GC-MS and $^1$H-NMR spectroscopy.

Figure 54:
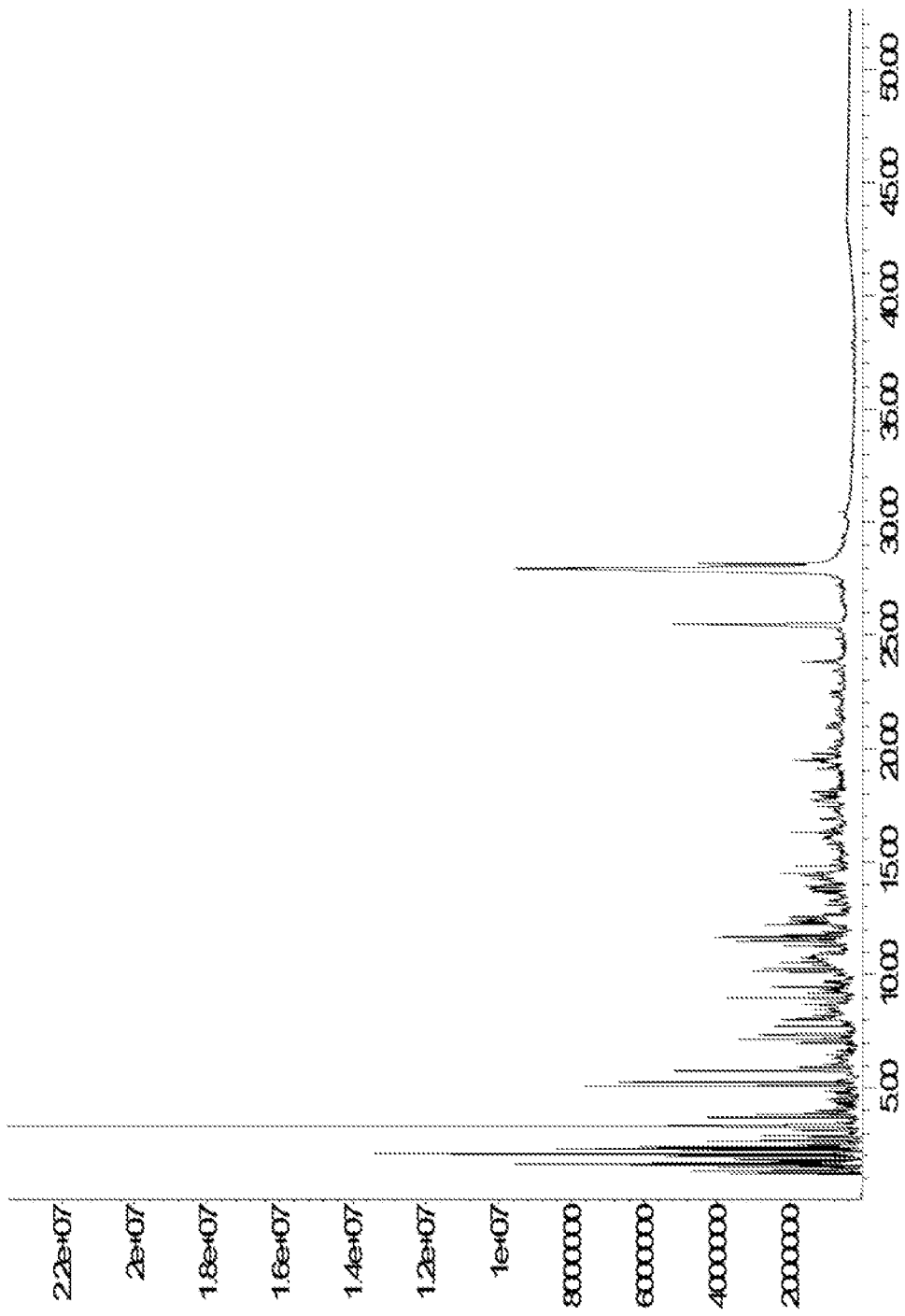
FIG. 54 is a GC-MS spectrum for products obtained at 515° C.

For the blank experiments, water versus salt water, no significant changes in product composition were observed although the conversion of soybean oil appears to be higher for the salt water based on the intensities of the remaining free fatty acids present in the GC-MS spectra. The GC-MS spectrum obtained at 515 C is presented in FIG. 54 and the MS data with the highest probability hits is presented in Table A63. The product profiles are similar and the relative peak ratios appear to be consistent. The proton NMR spectra are similar as well.

Figure 55:
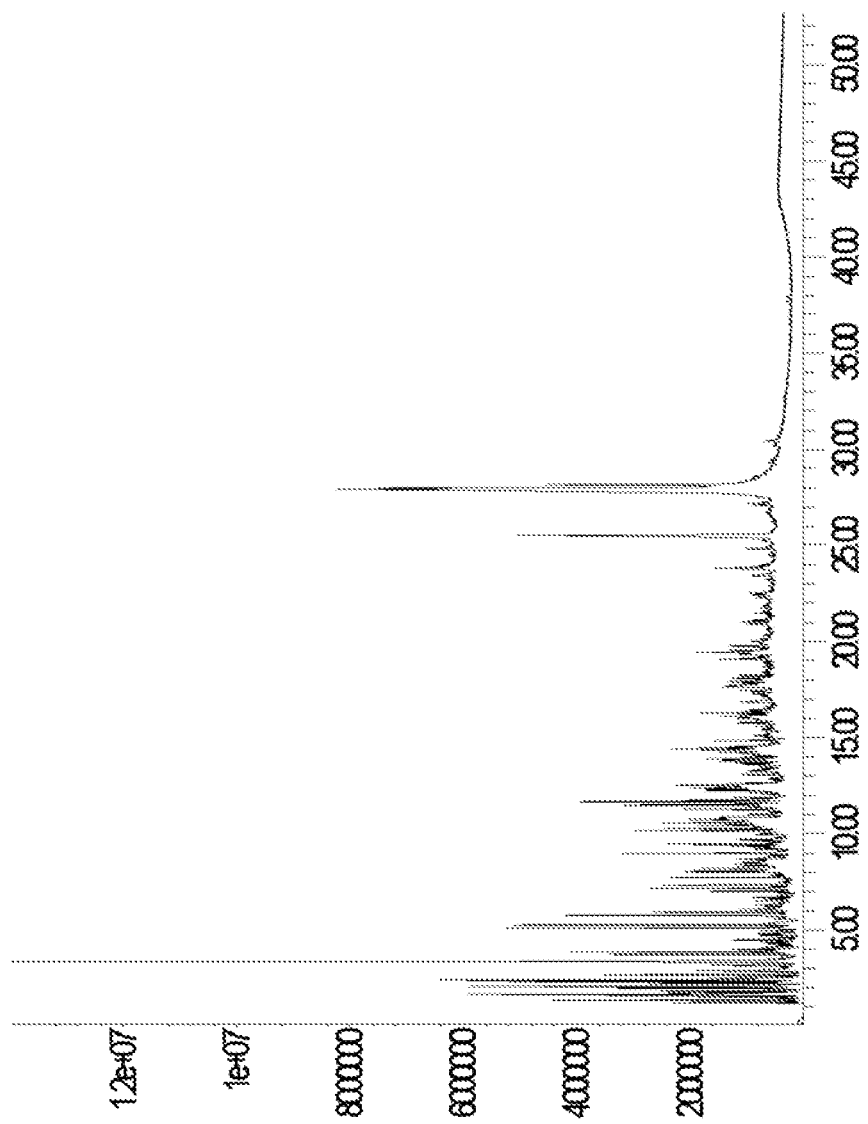
FIG. 55 is a GC-MS spectrum for products obtained at 515° C.
Figure 56:
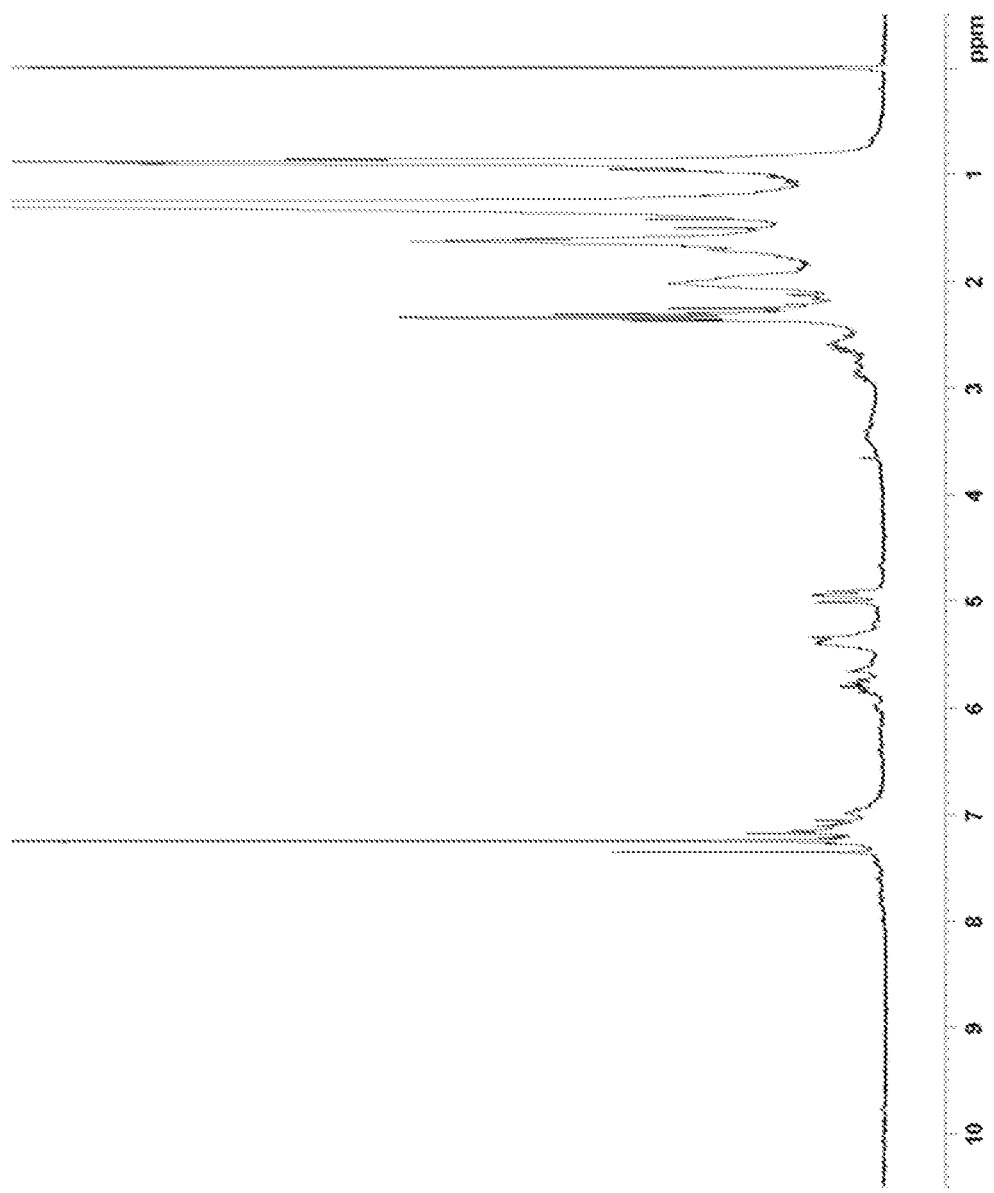
FIG. 56 is a $^1$H-NMR spectrum.

The GC-MS spectra for the reaction of colloidal zirconia, salt water and soybean oil show many similarities as well. A small amount of ketonized products are observed in the GC-MS. In the GC-MS spectrum of the colloidal sample there is still a significant amount of free fatty acids remaining. This is attributed to the low concentration of zirconia colloids used (4.4%) and their chelation by the free fatty acids present lowering the overall catalytic activity. The GC-MS spectrum obtained at 515° C. is presented in FIG. 55 and the MS data with the highest probability hits is presented in Table A64. A $^1$H-NMR spectrum is displayed in FIG. 56.

Aspen Wood

Figure 57:
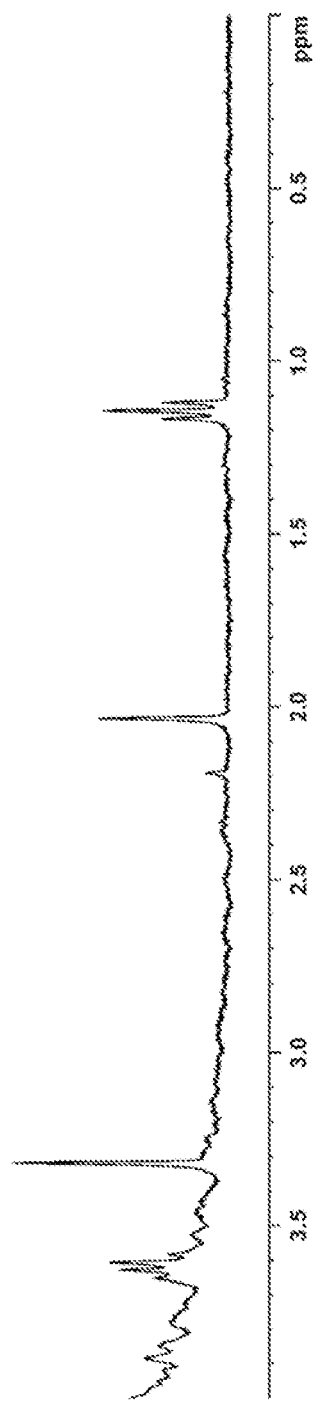
FIG. 57 is a $^1$H-NMR spectrum for the products obtained from the reaction of zirconia colloids, aspen wood and water at 500° C.

The reaction of supercritical water with aspen in the absence and presence of zirconia colloids was studied using the reactor setup described in FIG. 53. The reaction was conducted at 450 and 500° C. for both the blank and colloidal catalyst reaction. The experimental conditions are listed in tables A61 and A62 under experimental entries 770 and 771. The reaction mixtures were investigated by $^1$H-NMR spectroscopy. The blank versus the colloidal reaction yield similar reaction products under the conditions examined. The NMR data indicates the presence of methanol, ethanol, acetic acid for both reactions. However, in the reactions where colloids are present acetone is observed as a product. This is due to the ketonization of acetic acid catalyzed by zirconia. The NMR spectrum from the reaction of zirconia colloids, aspen wood and water at 500° C. is shown in FIG. 57.

Camelina Meal

The reaction of supercritical water, Camelina meal and zirconia colloids was investigated using the reactor setup described in FIG. 53. The Camelina meal used was the pelletized material obtained after the high temperature oil extraction of Camelina seeds. A suspension of was formed by taking the material up in water. A 5% suspension was found to form a suitable solution for pumping through the heated open-tubular reactor. This suspension was reacted with a 7% colloidal zirconia solution. The reaction was conducted at 500 and 525° C. The experimental conditions are listed in tables A61 and A62 under experimental entries 772 and 773. A sample of the aqueous phase was extracted with hexane and the hexane extract analyzed by GC-MS to determine the organic composition. A sample of aqueous phase was also extracted with $CDCl_3$ and analyzed by $^1$H-NMR to acquire information about the organic composition of the sample.

Figure 58:
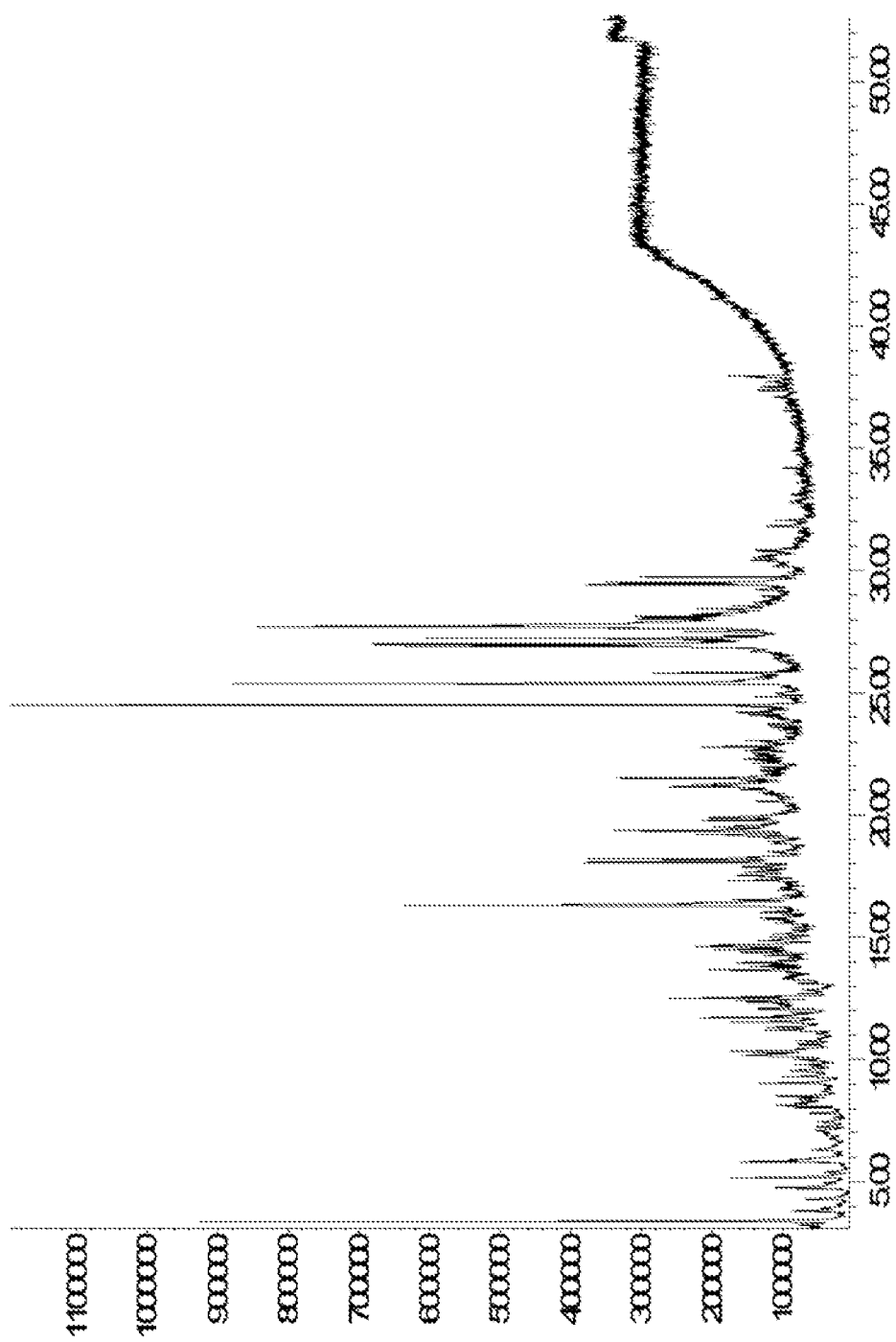
FIG. 58 is a GC-MS spectrum.

The GC-MS spectrum shown in FIG. 58 contained aromatics, terminal linear alkenes, alkanes, unreacted fatty acids and long chain ketones derived from ketonization of free fatty acid residue in the meal. Also present were a variety of substituted indoles, presumably derived from protein degradation. The MS data is presented in Table A65. The $^1$H-NMR of the aqueous layer contained signals consistent with methanol, acetic acid and acetone. There were also other unidentified organic compounds present. The $CDCl_3$ $^1$H-NMR extract confirms the presence of functional groups observed in the GC-MS and also indicates the presence of some aldehyde compounds.

1% $K_2CO_3$ Reaction with Soybean Oil

The reaction of 1% $K_2CO_3$ in water with soybean oil was studied using the setup described in FIG. 53 at temperatures ranging from 400 to 500° C. The experimental conditions are listed in tables A61 and A62 under experimental entries 775-778. The product mixtures were analyzed by GC-MS and $^1$H-NMR spectroscopy. The data collected is consistent with literature observations under similar conditions. The soybean oil is hydrolyzed and then decarboxylated. The major products are terminal alkenes and dienes with aromatic compounds present and unreacted free fatty acids. The conversion of free fatty acids increases with an increase in temperature.
Algae Powder The reaction of ground algae powder with supercritical water in the absence and presence of zirconia colloids was studied using the reactor setup in FIG. 53. The algae powder was obtained by ball milling dried *Dunaliella tertiolecta* cells. The ball milled powder was taken up in water. A 5.3% (wt./wt.) solution of algae powder was found to be stable and suitable for pumping. The reaction was studied at temperatures of 500 and 550° C. with and without catalytic zirconia colloids. The experimental conditions are listed in tables A61 and A62 under experimental entries 779 and 780. The aqueous phase was examined by GC-MS and $^1$H-NMR spectroscopy directly. A sample of the aqueous phase was extracted with hexane and the hexane extract analyzed by GC-MS to determine the organic composition. A sample of aqueous phase was also extracted with $CDCl_3$ and analyzed by $^1$H-NMR to acquire information about the organic composition of the sample.

The GC-MS spectra for the blank reaction (water and algae only) were very simple and contained few peaks. The most prominent peaks in the direct injection were ethanol, acetic acid and substituted indoles. The GC-MS of the hexane extract contained mainly free fatty acids and substituted indoles. The NMR data are consistent with the GC-MS data.

Figure 59:
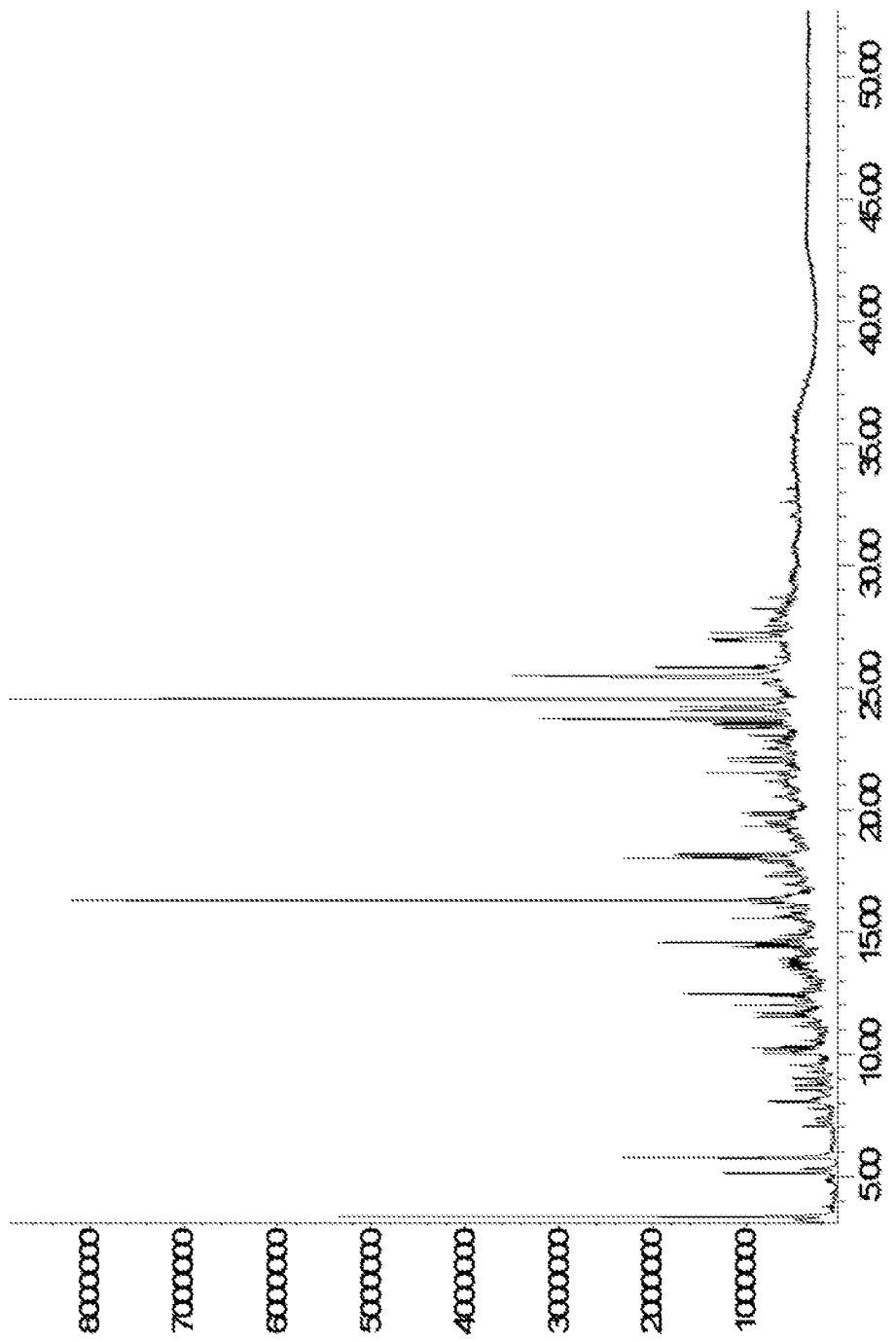
FIG. 59 is a GC-MS spectrum.

The GC-MS spectrum of the hexane extract, shown in FIG. 59, for the zirconia catalyzed reaction show more compounds produced than the corresponding blank. The MS data are listed in Table 6. The direct injection spectrum contains ethanol, acetic acid, substituted indoles and some traces of long chain ketones consistent with ketonization. The GC-MS of the hexane extract contains aromatics, phenols, linear alkenes, alkanes and long chain ketones. The $^1$H-NMR data are supportive of the GC-MS observations.

Yeast Powder

The reaction of baker's yeast powder (Fleischmann's yeast, Cub Foods, Coon Rapids, Minn.) with supercritical water in the absence and presence of catalytic zirconia colloids was studied using the reactor setup in FIG. 53. The yeast powder was mixed with water to form a 10% solution that was found to be stable and suitable for pumping. The reaction was studied at temperatures of 500 and 550° C. with and without zirconia colloids. The experimental conditions are listed in tables A61 and A62 under experimental entries 781-784. The aqueous phase was examined by GC-MS and $^1$H-NMR spectroscopy directly. A sample of the aqueous phase was extracted with hexane and the hexane extract analyzed by GC-MS to determine the organic composition. A sample of aqueous phase was also extracted with $CDCl_3$ and analyzed by $^1$H-NMR to acquire information about the organic composition of the sample.

The GC-MS and NMR data of the aqueous layer for the blank experiment (yeast powder and water only) indicate the presence of ethanol, acetic acid and a small number of unidentified organic compounds. The GC-MS of the hexane extract contains alkenes, aromatics, phenols, substituted indoles and unreacted free fatty acids. The $^1$H-NMR data of the extract is in agreement with the GC-MS data.

Figure 60:
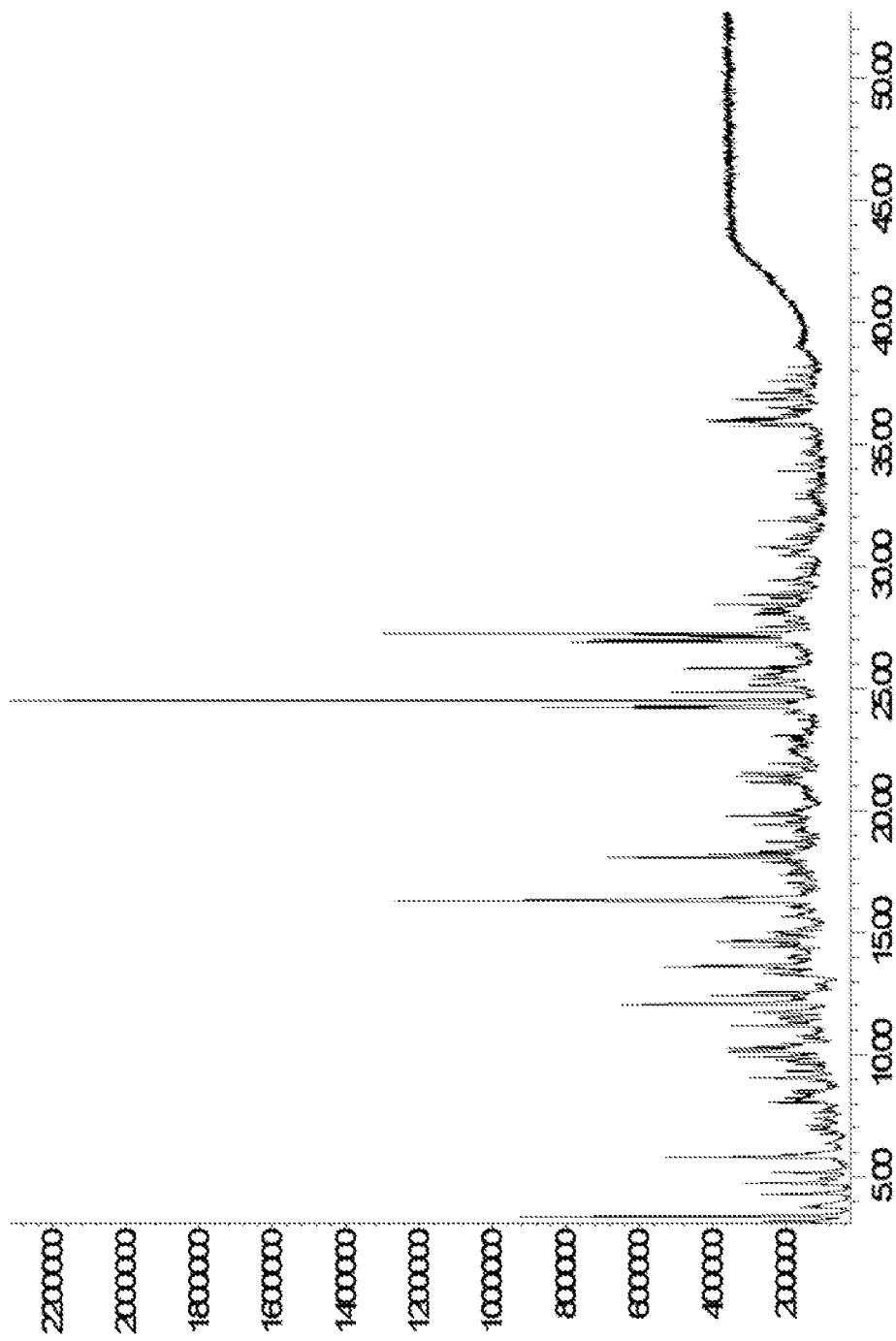
FIG. 60 is a GC-MS spectrum.
Figure 61:
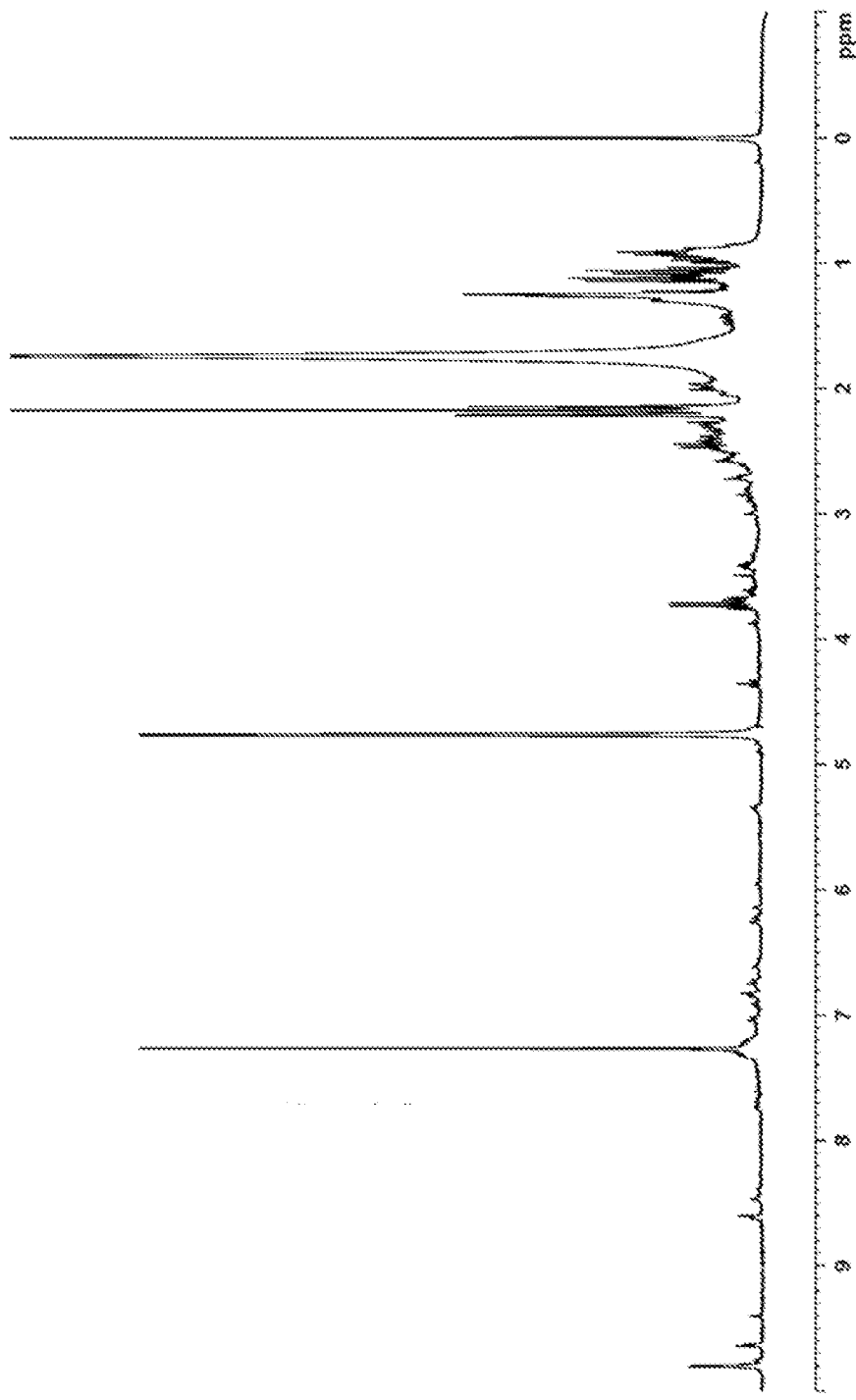
FIG. 61 is a $^1$H-NMR spectrum.

The GC-MS and $^1$H-NMR of data of the aqueous layer for the colloidal experiment indicated the presence of ethanol, acetic acid, methanol and acetone along with a small number of unidentified organic compounds. The GC-MS of the hexane extract contains linear alkenes, alkanes, aromatics, substituted indoles and long chain ketones. The GC-MS spectrum is shown in FIG. 60 and the MS data is displayed in Table A67. FIG. 61 shows the NMR obtained for a $CDCl_3$ extract of the aqueous layer.

Example 16

Hydrocarbon Production from Open Tubular Reactor

Experiments 785-786—The conversion of algae powder to a biofuel mixture was accomplished using the open tubular reactor design described in Example 15 above. The product profiles were similar to those reported in experiment 779 with appropriate increases in yield due to the higher loading of algae.

Experiment 792—The reaction of soybean oil with supercritical water over 5% CuO catalyst (<50 nm) in soybean oil was investigated using the open tubular reactor setup similar to as described with respect to Example 15 above. The product profile observed for CuO by GC-MS is very similar to that obtained for $K_2CO_3$, described in experiment 771.

Experiment 794—The reaction of soybean oil with supercritical water over 5% ZnO catalyst (<5 um) in soybean oil was investigated using the open tubular reactor setup similar to as described with respect to Example 15 above. The product profile observed for ZnO by GC-MS is very similar to that obtained for $K_2CO_3$ Experiment 796—The reaction of soybean oil with supercritical water over 2.5% $Y_2O_3$ catalyst (<50 nm) in soybean oil was investigated using the open tubular reactor similar to as described with respect to Example 15 above. The GC-MS profile was similar to that obtained for $Nb_2O_5$ with the added difference that small amounts of long chain ketone dimers were present in the biofuel.

Experiment 788—The reaction of soybean oil with 0.3% $MgCO_3$ in water under supercritical conditions was studied using the open tubular reactor design described in Example 15 above. The product profiles were similar to those reported in experiment 771. The major products were long chain free fatty acids with significant gas formation and 55% recovered yield.

Experiment 795—The reaction of soybean oil with 5% $KH_2PO_4$ in water under supercritical conditions was studied using the open tubular reactor design described in Example 15 above. The product profiles were similar to those reported in experiment 771. The major products were long chain free fatty acids with significant gas formation and 36% recovered yield.

Example 17

Hydrocarbon Production from Fixed Bed Reactors

Experiment 787—The reaction of soybean oil with supercritical water over zirconium dioxide at 600° C. was investigated using a fixed bed reactor setup, similar to as describe with respect to Example 3 above. The GC-MS displayed a similar profile to samples produced at 550° C. with an increase in the concentration of small aromatic compounds, a decrease in heavier molecular weight alkenes and ketones, a significant amount of gas production, and a marked decrease in yield of bio-oil (30% yield recovered).

Experiment 789—The reaction of soybean oil with supercritical water over niobium (V) oxide at 500° C. was investigated using a fixed bed reactor setup, similar to as described with respect to Example 3 above. The 150×10 reactor was only filled halfway with 325 mesh catalyst (12.5 g) and flow rates were adjusted accordingly (Table A69). The niobium oxide catalyst yielded a biofuel which had a GC-MS spectrum showing many similarities to those obtained for zirconium dioxide at 550° C. Significant numbers of aromatic compounds were formed, a small amount of 2-heptadecanone, large amounts of free fatty acids (acid number=91) and the unique presence of heptadecanal (confirmed by NMR as well).

Experiment 790—The reaction of soybean oil with supercritical water over $Fe_2O_3$ catalyst (<5 um) was investigated using the open tubular reactor setup. The major modification from the colloidal setup was that the iron catalyst was suspended in the soybean oil rather than the water layer. At 5% loading the suspension was stable for the duration of the experiment. The GC-MS results showed a product profile similar to that obtained for $K_2CO_3$ (experiment 771). The major products were long chain free fatty acids, aromatics and some alkenes.

Figure 62:
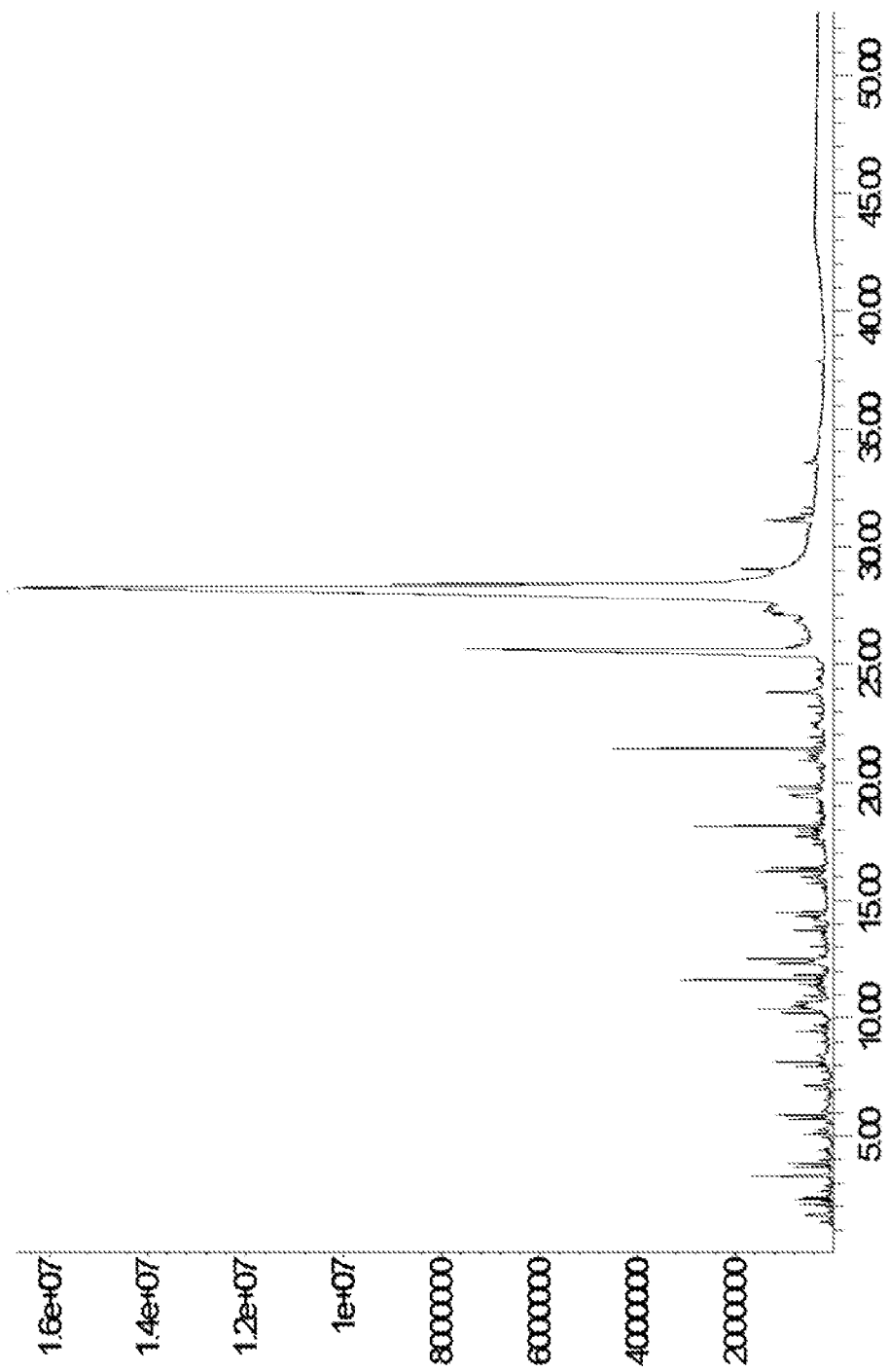
FIG. 62 is a GC-MS spectrum.
Figure 63:
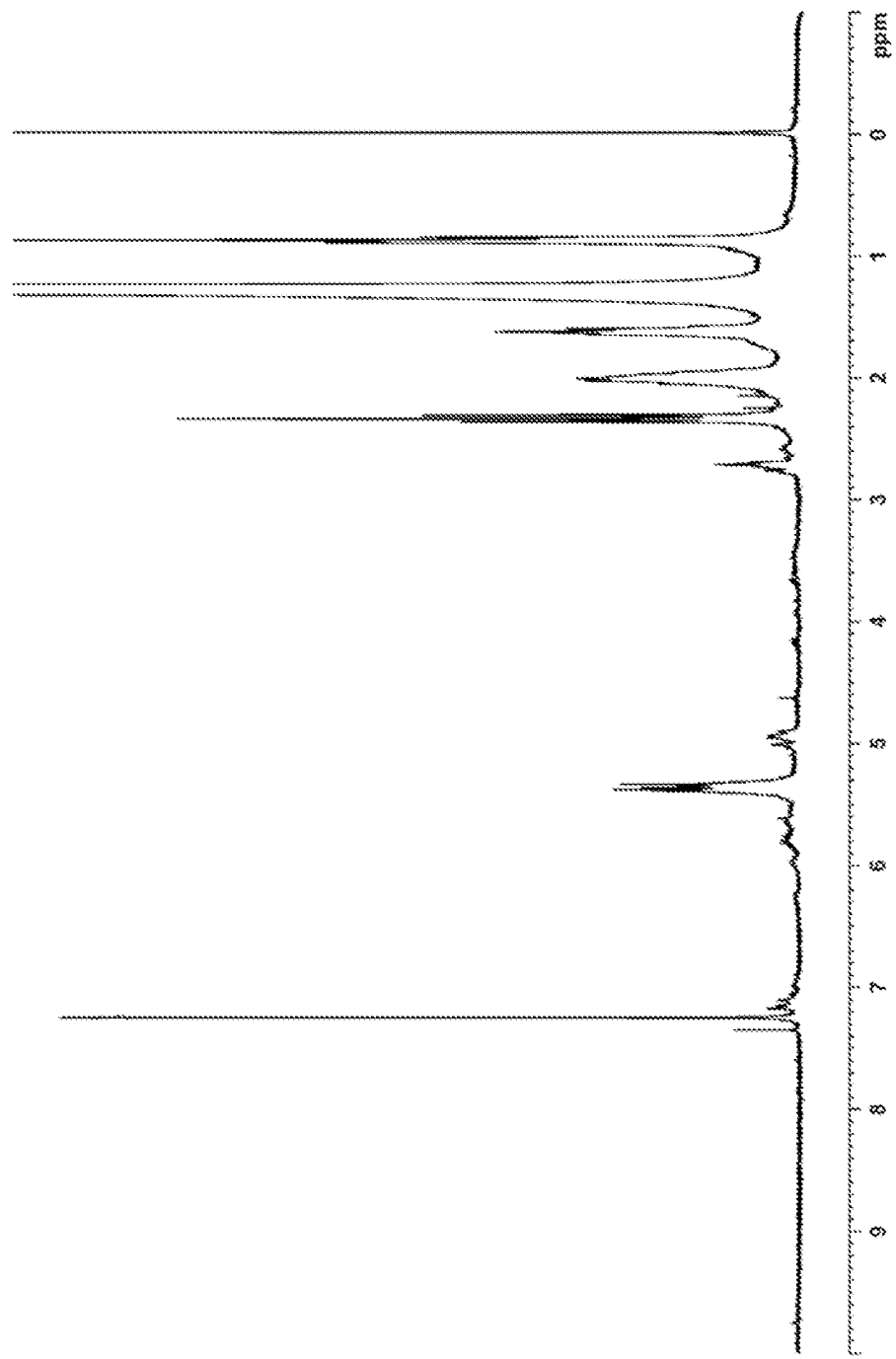
FIG. 63 is a $^1$H-NMR spectrum.

Experiment 791—The reaction of soybean oil with supercritical water over colbalt (IV) oxide at 500° C. was investigated using a fixed bed reactor setup, previously described in experiment 81. The setup was slightly modified in the way that a 150×4.6 mm reactor was used and filled with 2.5 g, 325 mesh $CoO_2$ catalyst and the flow rates were adjusted accordingly (Table A69). The results obtained for $CoO_2$ were very different from previously tested catalysts. While the major products from the reaction were free fatty acids (acid number 152), the organic components were dominated by alkanes rather than previously observed alkenes, a surprising result. The GC-MS spectrum is shown in FIG. 62, the $^1$H-NMR is shown in FIG. 63 and the product profile is shown in Table A70.

Experiment 793—The reaction of soybean oil with supercritical water over a 50/50 (v/v) zirconium dioxide-titanium dioxide at 500° C. was investigated using a fixed bed reactor setup, previously described in experiment 108. The product profile by GC-MS was similar to that observed for experiment 108 with an increase in the amounts of long chain ketone dimers.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

APPENDIX OF TABLES

TABLE A1

| | |
|---|---|
| Surface area ($m^2/g$) | 22.1 |
| Pore volume (mL/g) | 0.13 |
| Pore diameter (angstrom) | 240 |
| Internal Porosity | 0.44 |
| Average size range (micron) | 5-15 |
| Size Standard Deviation (um) | 2.62 |
| D90/D10 (Size Distribution) | 1.82 |

TABLE A2

Reaction conditions for the reaction of soybean oil with superheated water.

| Exp. No. | Oil Type | Catalyst Type | Particle Size, Pore size, Surface Area | Preheater Temperature Setting point (C) | Reactor Setpoint (° C.), T2 | Back Pressure (PSI) |
|---|---|---|---|---|---|---|
| 1 | Soybean Oil | Titania | 80 um/60 A/100 m^2/g | 530 | 530 | 2250 |
| 2 | Soybean Oil | Titania | 80 um/60 A/100 m^2/g | 530 | 530 | 2250 |
| 3 | Soybean Oil | Titania | 80 um/60 A/100 m^2/g | 530 | 530 | 2250 |
| 4 | Soybean Oil | Titania | 80 um/60 A/100 m^2/g | 530 | 530 | 2250 |
| 5 | Soybean Oil | Titania | 80 um/60 A/100 m^2/g | 530 | 530 | 2250 |
| 6 | Soybean Oil | Titania | 80 um/60 A/100 m^2/g | 530 | 530 | 2250 |
| 7 | Soybean Oil | Titania | 80 um/60 A/100 m^2/g | 530 | 530 | 2250 |
| 8 | Soybean Oil | Titania | 80 um/60 A/100 m^2/g | 530 | 530 | 2250 |
| 9 | Soybean Oil | Titania | 80 um/60 A/100 m^2/g | 530 | 530 | 2250 |
| 10 | Soybean Oil | Titania | 80 um/60 A/100 m^2/g | 530 | 530 | 2250 |
| 11 | Soybean Oil | Titania | 80 um/60 A/100 m^2/g | 530 | 530 | 2250 |
| 12 | Soybean Oil | Titania | 80 um/60 A/100 m^2/g | 500 | 500 | 2250 |
| 13 | Soybean Oil | Titania | 80 um/60 A/100 m^2/g | 500 | 500 | 2250 |
| 14 | Soybean Oil | Titania | 80 um/60 A/100 m^2/g | 500 | 500 | 2250 |
| 15 | Soybean Oil | Titania | 80 um/60 A/100 m^2/g | 500 | 500 | 2250 |
| 16 | Soybean Oil | Titania | 80 um/60 A/100 m^2/g | 515 | 515 | 3400 |
| 17 | Soybean Oil | Titania | 80 um/60 A/100 m^2/g | 515 | 515 | 3400 |
| 18 | Soybean Oil | Titania | 80 um/60 A/100 m^2/g | 515 | 515 | 3400 |
| 19 | Soybean Oil | Titania | 80 um/60 A/100 m^2/g | 515 | 515 | 3400 |
| 20 | Soybean Oil | Titania | 80 um/60 A/100 m^2/g | 515 | 515 | 3400 |
| 21 | Soybean Oil | Titania | 80 um/60 A/100 m^2/g | 515 | 515 | 3400 |
| 22 | Soybean Oil | Titania | 80 um/60 A/100 m^2/g | 530 | 530 | 3400 |

TABLE A2-continued

Reaction conditions for the reaction of soybean oil with superheated water.

| Exp. No. | Oil Type | Catalyst Type | Particle Size, Pore size, Surface Area | Preheater Temperature Setting point (C) | Reactor Setpoint (° C.), T2 | Back Pressure (PSI) |
|---|---|---|---|---|---|---|
| 23 | Soybean Oil | Titania | 80 um/60 A/100 m^2/g | 530 | 530 | 3400 |
| 24 | Soybean Oil | Titania | 80 um/60 A/100 m^2/g | 530 | 530 | 3400 |
| 25 | Soybean Oil | Titania | 80 um/60 A/100 m^2/g | 530 | 530 | 3400 |
| 26 | Soybean Oil | Titania | 80 um/60 A/100 m^2/g | 530 | 530 | 3400 |
| 27 | Soybean Oil | Titania | 80 um/60 A/100 m^2/g | 530 | 530 | 3400 |
| 28 | Soybean Oil | Titania | 80 um/60 A/100 m^2/g | 530 | 530 | 3400 |
| 29 | Soybean Oil | Titania | 80 um/60 A/100 m^2/g | 530 | 530 | 3450 |
| 30 | Soybean Oil | Titania | 80 um/60 A/100 m^2/g | 530 | 530 | 3450 |
| 31 | Soybean Oil | Titania | 80 um/60 A/100 m^2/g | 530 | 530 | 3400 |
| 32 | Soybean Oil | Zirconia | 80 um/60 A/100 m^2/g | 530 | 530 | 3400 |
| 33 | Soybean Oil | Zirconia | 80 um/60 A/100 m^2/g | 500 | 500 | 3400 |
| 34 | Soybean Oil | Zirconia | 10 um/60 A/100 m^2/g | 500 | 500 | 3400 |
| 35 | Soybean Oil | Zirconia | 10 um/60 A/100 m^2/g | 500 | 500 | 3400 |
| 36 | Soybean Oil | Zirconia | 10 um/60 A/100 m^2/g | 500 | 500 | 3400 |
| 37 | Soybean Oil | Zirconia | 10 um/60 A/100 m^2/g | 500 | 500 | 3000 |
| 38 | Soybean Oil | Zirconia | 10 um/60 A/100 m^2/g | 500 | 500 | 3000 |
| 39 | Soybean Oil | Zirconia | 10 um/60 A/100 m^2/g | 500 | 500 | 3650 |
| 40 | Soybean Oil | Zirconia | 10 um/60 A/100 m^2/g | 500 | 500 | 3650 |
| 41 | Soybean Oil | Zirconia | 10 um/60 A/100 m^2/g | 500 | 500 | 3650 |
| 42 | Soybean Oil | Zirconia | 10 um/60 A/100 m^2/g | 500 | 500 | 3650 |
| 43 | Soybean Oil | Zirconia | 10 um/300 A/30 m^2/g | 490 | 490 | 3250 |
| 44 | Soybean Oil | Zirconia | 10 um/300 A/30 m^2/g | 490 | 490 | 3250 |
| 45 | Soybean Oil | Zirconia | 10 um/300 A/30 m^2/g | 495 | 495 | 3250 |
| 46 | Soybean Oil | Zirconia | 10 um/300 A/30 m^2/g | 495 | 495 | 3250 |
| 47 | Soybean Oil | Zirconia | 10 um/300 A/30 m^2/g | 500 | 500 | 3250 |
| 48 | Soybean Oil | Zirconia | 10 um/300 A/30 m^2/g | 500 | 500 | 2200 |
| 49 | Soybean Oil | Zirconia | 10 um/300 A/30 m^2/g | 500 | 500 | 2200 |
| 50 | Soybean Oil | Zirconia | 10 um/300 A/30 m^2/g | 505 | 505 | 2500 |
| 51 | Soybean Oil | Zirconia | 10 um/300 A/30 m^2/g | 505 | 505 | 2500 |
| 52 | Soybean Oil | Zirconia | 10 um/300 A/30 m^2/g | 510 | 510 | 2800 |
| 53 | Soybean Oil | Zirconia | 10 um/300 A/30 m^2/g | 510 | 510 | 3000 |
| 54 | Soybean Oil | Zirconia | 10 um/300 A/30 m^2/g | 515 | 515 | 3000 |
| 55 | Soybean Oil | Zirconia | 10 um/300 A/30 m^2/g | 515 | 515 | 3150 |
| 56 | Soybean Oil | Zirconia | 10 um/300 A/30 m^2/g | 515 | 515 | 3150 |
| 57 | Soybean Oil | Zirconia | 10 um/300 A/30 m^2/g | 515 | 515 | 3000 |
| 58 | Soybean Oil | Zirconia | 10 um/300 A/30 m^2/g | 515 | 515 | 3150 |
| 59 | Soybean Oil | Zirconia | 10 um/300 A/30 m^2/g | 515 | 515 | 3150 |
| 60 | Soybean Oil | Zirconia | 10 um/300 A/30 m^2/g | 515 | 515 | 3150 |
| 61 | Soybean Oil | Zirconia | 10 um/300 A/30 m^2/g | 515 | 515 | 3150 |
| 62 | Soybean Oil | Zirconia | 10 um/300 A/30 m^2/g | 515 | 515 | 3400 |
| 63 | Soybean Oil | Zirconia | 10 um/300 A/30 m^2/g | 515 | 515 | 3400 |
| 64 | Soybean Oil | Zirconia | 10 um/300 A/30 m^2/g | 515 | 515 | 3400 |
| 65 | Soybean Oil | Zirconia | 10 um/300 A/30 m^2/g | 515 | 515 | 3400 |
| 66 | Soybean Oil | Zirconia | 10 um/300 A/30 m^2/g | 515 | 515 | 3400 |
| 67 | Soybean Oil | Zirconia | 10 um/300 A/30 m^2/g | 515 | 515 | 3400 |
| 68 | Soybean Oil | Zirconia | 10 um/300 A/30 m^2/g | 515 | 515 | 3400 |
| 69 | Soybean Oil | Zirconia | 10 um/300 A/30 m^2/g | 515 | 515 | 3400 |
| 70 | Soybean Oil | Zirconia | 5-15 um/300 A/ 30 m^2/g | 515 | 515 | 3450 |
| 71 | Soybean Oil | Zirconia | 5-15 um/300 A/ 30 m^2/g | 515 | 515 | 3450 |
| 72 | Soybean Oil | Zirconia | 5-15 um/300 A/ 30 m^2/g | 515 | 515 | 3450 |
| 73 | Soybean Oil | Zirconia | 5-15 um/300 A/ 30 m^2/g | 515 | 515 | 3450 |
| 74 | Soybean Oil | Zirconia | 5-15 um/300 A/ 30 m^2/g | 515 | 515 | 3450 |
| 75 | Soybean Oil | Zirconia | 10 um/300 A/30 m^2/g | 525 | 525 | 3500 |
| 76 | Soybean Oil | Zirconia | 10 um/300 A/30 m^2/g | 525 | 525 | 3500 |
| 77 | Soybean Oil | Zirconia | 10 um/300 A/30 m^2/g | 525 | 525 | 3500 |
| 78 | Soybean Oil | Zirconia | 10 um/300 A/30 m^2/g | 525 | 525 | 3500 |
| 79 | Soybean Oil | Zirconia | 10 um/300 A/30 m^2/g | 525 | 525 | 3500 |
| 80 | Soybean Oil | Zirconia | 10 um/300 A/30 m^2/g | 525 | 525 | 3500 |

TABLE A3

Data collected for sample conditions given in Table 1.

| Exp. No. | Actual Water Flow (min/min) | Total Flow Rate (ml/min) | Molar Ratio (water/triglyceride) | Acid number | Biofuel Production rate (g/min) |
|---|---|---|---|---|---|
| 3 | 5.223 | 2.063 | 137.5 | 5.99 | 1.142 g/min |
| 5 | 5.223 | 2.063 | 137.5 | 7.93 | 1.138 g/min |
| 7 | 5.223 | 2.063 | 137.5 | 12.19 | 1.12 g/min |
| 9 | 5.223 | 2.063 | 137.5 | 16.22 | 1.14 g/min |
| 11 | 5.223 | 2.063 | 137.5 | 20.47 | 1.14 g/min |
| 13 | 5.223 | 2.063 | 137.5 | 35.38 | 1.46 g/min |
| 15 | 5.223 | 2.063 | 137.5 | 39.91 | 1.43 g/min |
| 17 | 5.223 | 2.063 | 137.5 | 27.93 | 1.25 g/min |
| 19 | 5.223 | 2.063 | 137.5 | 29.82 | 1.22 g/min |
| 21 | 5.223 | 2.063 | 137.5 | 32.06 | 1.236 g/min |
| 23 | 5.223 | 2.063 | 137.5 | 8.36 | 1.085 g/min |
| 25 | 5.223 | 2.063 | 137.5 | 1.85 | 1.075 g/min |
| 27 | 5.223 | 2.063 | 137.5 | 1.8 | 1.07 g/min |
| 29 | 5.223 | 2.063 | 137.5 | 2.19 | 1.065 g/min |
| 31 | 5.223 | 2.063 | 137.5 | 2.41 | 1.07 g/min |
| 35 | 5.223 | 2.063 | 137.5 | 4.5 | 1.00 g/min |
| 37 | 5.223 | 2.063 | 137.5 | 6.56 | 1.00 g/min |
| 40 | 5.223 | 2.063 | 137.5 | 25.54 | 1.03 g/min |
| 42 | 5.223 | 2.063 | 137.5 | 57.15 | 1.08 g/min |
| 44 | 5.223 | 2.063 | 137.5 | 72.8 | 1.43 g/min |
| 46 | 5.223 | 2.063 | 137.5 | 45.9 | 1.46 g/min |
| 49 | 5.223 | 2.063 | 137.5 | 25.64 | 1.459 g/min |
| 51 | 5.223 | 2.063 | 137.5 | 12.32 | 1.40 g/min |
| 53 | 5.223 | 2.063 | 137.5 | 9.135 | 1.37 g/min |
| 55 | 5.223 | 2.063 | 137.5 | 5.37 | 1.22 g/min |
| 57 | 5.223 | 2.063 | 137.5 | 6.1 | 1.104 g/min |
| 59 | 5.223 | 2.063 | 137.5 | 7.37 | 1.106 g/min |
| 60 | 5.223 | 2.063 | 137.5 | 9.41 | 1.168 g/min |
| 61 | 5.223 | 2.063 | 137.5 | 11.47 | 1.267 g/min |
| 63 | 5.223 | 2.063 | 137.5 | 13.94 | 1.29 g/min |
| 64 | 5.223 | 2.063 | 137.5 | 13.15 | 1.24 g/min |
| 65 | 5.223 | 2.063 | 137.5 | 13.32 | 1.268 g/min |
| 66 | 5.223 | 2.063 | 137.5 | 14.03 | 1.25 g/min |
| 67 | 5.223 | 2.063 | 137.5 | 14.32 | 1.02 g/min |
| 68 | 5.223 | 2.063 | 137.5 | 15.14 | 1.24 g/min |
| 71 | 5.223 | 2.063 | 137.5 | 2.43 | 1.19 g/min |
| 72 | 5.223 | 2.063 | 137.5 | 2.8 | 1.16 g/min |
| 73 | 5.223 | 2.063 | 137.5 | 2.81 | 1.13 g/min |
| 74 | 5.223 | 2.063 | 137.5 | 2.43 | 1.14 g/min |
| 76 | 5.223 | 2.063 | 137.5 | 5.57 | 1.18 g/min |
| 77 | 5.223 | 2.063 | 137.5 | 5.79 | 0.97 g/min |
| 78 | 5.223 | 2.063 | 137.5 | 6.93 | 1.11 g/min |
| 79 | 5.223 | 2.063 | 137.5 | 8.25 | 1.128 g/min |
| 80 | 5.223 | 2.063 | 137.5 | 10.01 | 1.128 g/min |

TABLE A4

GC-MS data collected for sample 11.

| Peak # | Peak Name | % Probability | RT (min) | Area | % of Total |
|---|---|---|---|---|---|
| 1 | 1-Butene | 22 | 1.275 | 3346994 | 0.43% |
| 2 | 1-Pentene | 87 | 1.384 | 4294498 | 0.55% |
| 3 | Pentane | 86 | 1.398 | 3351076 | 0.43% |
| 4 | 2-Butene, 2-methyl- | 87 | 1.419 | 2958094 | 0.38% |
| 5 | 1-Butene, 2-methyl- | 86 | 1.436 | 2422836 | 0.31% |
| 6 | 1,3-Cyclopentadiene | 93 | 1.504 | 1459488 | 0.19% |
| 7 | Cyclopentene | 86 | 1.551 | 4803079 | 0.62% |
| 8 | Cyclobutane, methyl- | 83 | 1.58 | 2465239 | 0.32% |
| 9 | Pentane, 3-methyl- | 87 | 1.634 | 1688105 | 0.22% |
| 10 | 1-Hexene | 91 | 1.669 | 15362499 | 1.98% |
| 11 | Hexane | 83 | 1.706 | 9689628 | 1.25% |
| 12 | 3-Hexene | 90 | 1.741 | 8244854 | 1.06% |
| 13 | trans-1,4-Hexadiene | 64 | 1.792 | 5549954 | 0.71% |
| 14 | Cyclopentane, methyl- | 87 | 1.877 | 4816376 | 0.62% |
| 15 | 3-Cyclopentadiene, 1-methyl- | 68 | 1.973 | 1674825 | 0.22% |
| 16 | Cyclopentene, 3-methyl- | 90 | 2.048 | 8980322 | 1.16% |
| 17 | Benzene | 91 | 2.133 | 14616746 | 1.88% |
| 18 | Cyclohexene | 93 | 2.292 | 7026448 | 0.90% |
| 19 | 1-Heptene | 96 | 2.377 | 15857788 | 2.04% |
| 20 | Heptane | 91 | 2.467 | 7945283 | 1.02% |
| 21 | Cyclopentene, 4,4-dimethyl- | 60 | 2.518 | 3814835 | 0.49% |
| 22 | 2-Heptene | 90 | 2.558 | 3995766 | 0.51% |
| 23 | 3-Heptene | 90 | 2.657 | 3535201 | 0.46% |
| 24 | Cyclohexane, methyl- | 76 | 2.751 | 6387109 | 0.82% |
| 25 | Cyclopentane, ethyl- | 95 | 2.903 | 1811418 | 0.23% |
| 26 | Cyclohexene, 3-methyl- | 90 | 2.982 | 5018262 | 0.65% |
| 27 | Cyclopentene, 4,4-dimethyl- | 80 | 3.204 | 2998963 | 0.39% |
| 28 | Cyclopentene, 1-ethyl- | 91 | 3.236 | 7205751 | 0.93% |
| 29 | Toluene | 95 | 3.403 | 24186421 | 3.11% |
| 30 | Cyclohexene, 1-methyl- | 91 | 3.445 | 12638653 | 1.63% |
| 31 | 1-Octene | 95 | 3.796 | 13646718 | 1.76% |
| 32 | 4-Octene | 55 | 3.901 | 4619212 | 0.60% |
| 33 | Octane | 74 | 3.953 | 11930762 | 1.54% |
| 34 | 2-Octene | 93 | 4.087 | 5594875 | 0.72% |
| 35 | 2-Octene, (Z)- | 87 | 4.241 | 3175136 | 0.41% |
| 36 | Cyclopentene, 1-(1-methylethyl)- | 58 | 4.887 | 2987890 | 0.39% |
| 37 | cis-Bicyclo[3.3.0]oct-2-ene | 90 | 5.07 | 3610539 | 0.47% |
| 38 | Ethylbenzene | 91 | 5.199 | 15262340 | 1.96% |
| 39 | Cyclohexene, 1-ethyl- | 90 | 5.363 | 1779110 | 0.23% |
| 40 | p-Xylene | 97 | 5.392 | 3299148 | 0.43% |

TABLE A4-continued

GC-MS data collected for sample 11.

| Peak # | Peak Name | % Probability | RT (min) | Area | % of Total |
|---|---|---|---|---|---|
| 41 | 1-Nonene | 96 | 5.839 | 11564486 | 1.49% |
| 42 | Benzene, 1,3-dimethyl- | 95 | 5.881 | 12057810 | 1.55% |
| 43 | 3-Nonene | 38 | 5.946 | 3388532 | 0.44% |
| 44 | Nonane | 87 | 6.026 | 10947210 | 1.41% |
| 45 | cis-3-Nonene | 70 | 6.182 | 3067935 | 0.40% |
| 46 | Cyclopentene, 1-butyl- | 62 | 7.11 | 6119507 | 0.79% |
| 47 | Benzene, propyl- | 90 | 7.262 | 8588856 | 1.11% |
| 48 | Benzene, 1-ethyl-3-methyl- | 95 | 7.461 | 3027528 | 0.39% |
| 49 | Benzene, 1-ethyl-2-methyl- | 93 | 7.492 | 4548421 | 0.59% |
| 50 | Benzene, 1-ethyl-4-methyl- | 94 | 7.865 | 6147708 | 0.79% |
| 51 | 3-Octanone | 38 | 8.066 | 2430367 | 0.31% |
| 52 | 1-Decene | 95 | 8.11 | 9495142 | 1.22% |
| 53 | Benzene, 1,3,5-trimethyl- | 42 | 8.186 | 11052143 | 1.42% |
| 54 | Decane | 76 | 8.307 | 4942056 | 0.64% |
| 55 | 4-Decene | 96 | 8.452 | 2391644 | 0.31% |
| 56 | Benzene, 2-propenyl- | 80 | 9.123 | 9028940 | 1.16% |
| 57 | Cyclopentene, 1-pentyl- | 60 | 9.383 | 4704792 | 0.61% |
| 58 | Benzene, butyl- | 76 | 9.592 | 12060070 | 1.55% |
| 59 | Benzene, (1-methylpropyl)- | 60 | 9.847 | 4374245 | 0.56% |
| 60 | 1-Phenyl-1-butene | 83 | 0.261 | 4686660 | 0.60% |
| 61 | 3-Nonanone | 43 | 0.302 | 3145182 | 0.41% |
| 62 | 1-Undecene | 93 | 0.361 | 12810016 | 1.65% |
| 63 | 2-Nonanone | 81 | 0.439 | 2751237 | 0.35% |
| 64 | 3-Undecene | 83 | 0.488 | 3876822 | 0.50% |
| 65 | Undecane | 93 | 0.545 | 4265571 | 0.55% |
| 66 | 5-Undecene | 86 | 0.673 | 4378228 | 0.56% |
| 67 | 5-Undecene, (E)- | 72 | 0.859 | 1429317 | 0.18% |
| 68 | Benzene, 1,3-diethyl-5-methyl- | 53 | 1.378 | 330195 | 0.43% |
| 69 | Benzene, 1-methyl-2-(2-propenyl)- | 87 | 1.423 | 3572551 | 0.46% |
| 70 | Benzene, 1-methyl-4-(1-methylpropyl)- | 76 | 1.55 | 4511869 | 0.58% |
| 71 | Cyclopentene,1-hexyl- | 55 | 1.593 | 3685019 | 0.47% |
| 72 | Benzene, 2-ethenyl-1,4-dimethyl- | 86 | 1.646 | 8956999 | 1.15% |
| 73 | Benzene, pentyl- | 91 | 1.794 | 27109044 | 3.49% |
| 74 | Naphthalene, 1,2,3,4-tetrahydro- | 58 | 1.894 | 5353395 | 0.69% |
| 75 | Benzene, (1-methylbutyl)- | 59 | 2.016 | 8101639 | 1.04% |
| 76 | 1-Dodecene | 95 | 2.499 | 15946689 | 2.05% |
| 77 | 2-Decanone | 60 | 2.595 | 7746165 | 1.00% |
| 78 | Dodecane | 94 | 2.672 | 5434239 | 0.70% |
| 79 | Bicyclo[6.4.0]dodeca-9,11-diene | 87 | 3.913 | 7922203 | 1.02% |
| 80 | Benzene, 1-methyl-2-(1-ethylpropyl)- | 43 | 4.071 | 6488480 | 0.84% |
| 81 | 1-Tridecene | 97 | 4.517 | 9843415 | 1.27% |
| 82 | 2-Undecanone | 53 | 4.614 | 4350844 | 0.56% |
| 83 | Tridecane | 96 | 4.672 | 5507796 | 0.71% |
| 84 | Benzene, heptyl- | 83 | 5.917 | 3809471 | 0.49% |
| 85 | 2-Tetradecene | 97 | 6.412 | 13994264 | 1.80% |
| 86 | 2-Dodecanone | 62 | 6.523 | 2544488 | 0.33% |
| 87 | Tetradecane | 97 | 6.554 | 3219361 | 0.41% |
| 88 | Benzene, octyl- | 52 | 7.796 | 3915020 | 0.50% |
| 89 | 1-Pentadecene | 99 | 8.206 | 8739188 | 1.13% |
| 90 | Pentadecane | 96 | 8.335 | 16306321 | 2.10% |
| 91 | Spiro[4.5]decane | 76 | 9.591 | 5543392 | 0.71% |
| 92 | 1,15-Hexadecadiene | 70 | 9.659 | 4941398 | 0.64% |
| 93 | 1-Hexadecene | 97 | 9.9 | 6871497 | 0.88% |
| 94 | 2-Pentadecanone | 52 | 0.03 | 287945 | 0.37% |
| 95 | E-14-Hexadecenal | 94 | 1.264 | 714046 | 0.92% |
| 96 | 1-Heptadecanol | 86 | 1.366 | 6881151 | 0.89% |
| 97 | 1-Heptadecene | 93 | 1.508 | 3233725 | 0.42% |
| 98 | Heptadecane | 94 | 1.615 | 7587382 | 0.98% |
| 99 | Cyclooctane, phenyl- | 50 | 2.925 | 4026447 | 0.52% |
| 100 | 2-Heptadecanone | 96 | 4.633 | 36424969 | 4.69% |
| 101 | 3-Octadecanone | 96 | 5.954 | 10065472 | 1.30% |
| 102 | 1,11-Dodecadiene | 42 | 7.039 | 6731108 | 0.87% |
| 103 | 4-Dodecanone | 46 | 7.093 | 2879105 | 0.37% |
| 104 | (2-Acetyl-5-methyl-cyclopentyl)-acetic acid | 49 | 7.124 | 14122956 | 1.82% |
| 105 | 2-Nonadecanone | 99 | 7.374 | 21132038 | 2.72% |
| 106 | Phenol, 2-pentyl- | 35 | 7.855 | 4615216 | 0.59% |
| 107 | 5-Undecanone | 43 | 8.354 | 8014166 | 1.03% |
| 108 | 3-Eicosanone | 64 | 8.58 | 5701257 | 0.73% |
| 109 | 5-Decanone, 2-methyl- | 22 | 9.563 | 2889538 | 0.37% |
| 110 | 6-Dodecanone | 41 | 0.732 | 3608197 | 0.46% |

TABLE A6

| | | | | | |
|---|---|---|---|---|---|
| | | GC-MS data collected for sample 78. | | | |
| Peak # | Peak Name | % Probability | RT (min) | Area | % of Total |
| 1 | Butane | 47 | 1.283 | 5670632 | 0.59% |
| 2 | 1-Pentene | 87 | 1.394 | 5561480 | 0.58% |
| 3 | Pentane | 86 | 1.408 | 5634588 | 0.58% |
| 4 | 2-Butene, 2-methyl- | 91 | 1.43 | 3334022 | 0.35% |
| 5 | 1-Butene, 2-methyl- | 90 | 1.448 | 3500160 | 0.36% |
| 6 | 1,3-Cyclopentadiene | 87 | 1.517 | 1797716 | 0.19% |
| 7 | Cyclopentene | 90 | 1.563 | 5789360 | 0.60% |
| 8 | 1-Pentene | 72 | 1.593 | 2386807 | 0.25% |
| 9 | 1-Hexene | 91 | 1.682 | 18299930 | 1.90% |
| 10 | Hexane | 83 | 1.72 | 9120947 | 0.95% |
| 11 | 2-Hexene | 90 | 1.757 | 10561755 | 1.09% |
| 12 | 3-Hexene | 74 | 1.81 | 8910852 | 0.92% |
| 13 | Cyclopentane, methyl- | 91 | 1.893 | 6067286 | 0.63% |
| 14 | ,3-Cyclopentadiene, 1-methyl- | 76 | 1.996 | 2025597 | 0.21% |
| 15 | Cyclopentene, 1-methyl- | 90 | 2.066 | 12811904 | 1.33% |
| 16 | Benzene | 91 | 2.152 | 23092342 | 2.39% |
| 17 | 2,4-Hexadiene | 42 | 2.228 | 3573727 | 0.37% |
| 18 | Cyclohexene | 94 | 2.312 | 11150882 | 1.16% |
| 19 | 1-Heptene | 90 | 2.399 | 18385015 | 1.91% |
| 20 | Heptane | 91 | 2.489 | 13959199 | 1.45% |
| 21 | Cyclobutane, (1-methylethylidene)- | 64 | 2.546 | 6911910 | 0.72% |
| 22 | 2-Heptene | 95 | 2.586 | 6855627 | 0.71% |
| 23 | 3-Heptene | 81 | 2.688 | 6415131 | 0.67% |
| 24 | Cyclohexane, methyl- | 78 | 2.775 | 10584054 | 1.10% |
| 25 | Cyclopentane, ethyl- | 91 | 2.93 | 3153571 | 0.33% |
| 26 | Cyclohexene, 4-methyl- | 90 | 3.011 | 8055341 | 0.83% |
| 27 | Cyclobutane, (1-methylethylidene)- | 90 | 3.235 | 4690501 | 0.49% |
| 28 | Cyclopentene, 1-ethyl- | 91 | 3.269 | 6391072 | 0.66% |
| 29 | Toluene | 91 | 3.431 | 33101286 | 3.43% |
| 30 | Cyclohexene, 1-methyl- | 87 | 3.472 | 20753423 | 2.15% |
| 31 | 1-Octene | 91 | 3.827 | 16524346 | 1.71% |
| 32 | Cyclohexane, 1,2-dimethyl- | 96 | 3.927 | 6681285 | 0.69% |
| 33 | Octane | 80 | 3.985 | 13007881 | 1.35% |
| 34 | 4-Octene | 95 | 4.127 | 5759381 | 0.60% |
| 35 | 2-Octene, (Z)- | 95 | 4.286 | 3049175 | 0.32% |
| 36 | Cyclohexene, 1-ethyl- | 76 | 4.62 | 2933979 | 0.30% |
| 37 | Methyl ethyl cyclopentene | 81 | 4.742 | 2910047 | 0.30% |
| 38 | Cyclohexene, 1,6-dimethyl- | 89 | 4.872 | 2523064 | 0.26% |
| 39 | Cyclooctene | 46 | 4.933 | 3109224 | 0.32% |
| 40 | Cyclohexene, 1-ethyl- | 93 | 4.981 | 4342523 | 0.45% |
| 41 | 1,3-Cyclooctadiene | 64 | 5.108 | 5386493 | 0.56% |
| 42 | Ethylbenzene | 91 | 5.237 | 23260543 | 2.41% |
| 43 | Cyclohexene, 3-ethyl- | 74 | 5.4 | 4272395 | 0.44% |
| 44 | p-Xylene | 95 | 5.437 | 6458155 | 0.67% |
| 45 | Benzene, 1,3-dimethyl- | 87 | 5.481 | 8469845 | 0.88% |
| 46 | 1-Nonene | 96 | 5.874 | 11834079 | 1.23% |
| 47 | Benzene, 1,2-dimethyl- | 90 | 5.918 | 6848773 | 0.71% |
| 48 | Benzene, 1,3-dimethyl- | 93 | 5.939 | 13186837 | 1.37% |
| 49 | Nonane | 76 | 6.064 | 10900826 | 1.13% |
| 50 | Cyclohexene,3-propyl- | 43 | 6.233 | 8018431 | 0.83% |
| 51 | Cyclopentene, 1-butyl- | 58 | 7.154 | 5520010 | 0.57% |
| 52 | Benzene, propyl- | 87 | 7.312 | 9306102 | 0.96% |
| 53 | Benzene, 1-ethyl-2-methyl- | 93 | 7.51 | 3473965 | 0.36% |
| 54 | Benzene, 1-ethyl-3-methyl- | 90 | 7.536 | 5711135 | 0.59% |
| 55 | Benzene, 1-ethyl-2-methyl- | 95 | 7.915 | 5047547 | 0.52% |
| 56 | 3-Octanone | 46 | 8.1 | 3571585 | 0.37% |
| 57 | 1-Decene | 95 | 8.146 | 9574959 | 0.99% |
| 58 | 2-Octanone | 91 | 8.194 | 5352170 | 0.55% |
| 59 | Benzene, 1,2,3-trimethyl- | 70 | 8.225 | 12169569 | 1.26% |
| 60 | Decane | 90 | 8.344 | 5673213 | 0.59% |
| 61 | 4-Decene | 59 | 8.497 | 2826715 | 0.29% |
| 62 | Spiro[4.4]non-1-ene | 58 | 8.607 | 3194768 | 0.33% |
| 63 | Benzene, 1-ethenyl-2-methyl- | 64 | 9.164 | 12660018 | 1.31% |
| 64 | Benzene, 1-propynyl | 53 | 9.44 | 5161346 | 0.54% |
| 65 | Benzene, butyl- | 80 | 9.635 | 12936600 | 1.34% |
| 66 | Benzene, 1-methyl-2-propyl- | 42 | 9.894 | 2832793 | 0.29% |
| 67 | Benzene, (2-methyl-1-propenyl)- | 81 | 10.304 | 5380413 | 0.56% |
| 68 | 3-Nonanone | 46 | 10.333 | 6503445 | 0.67% |
| 69 | 1-Undecene | 95 | 10.393 | 11489842 | 1.19% |
| 70 | 2-Nonanone | 81 | 10.489 | 2570343 | 0.27% |
| 71 | 2-Nonanone | 49 | 10.524 | 4923301 | 0.51% |
| 72 | Undecane | 60 | 10.58 | 3949976 | 0.41% |
| 73 | 5-Undecene | 92 | 10.713 | 4015337 | 0.42% |
| 74 | 4-Undecene, (E) | 87 | 10.902 | 2158863 | 0.22% |
| 75 | 1-Phenyl-1-butene | 90 | 11.463 | 3916475 | 0.41% |

TABLE A6-continued

GC-MS data collected for sample 78.

| Peak # | Peak Name | % Probability | RT (min) | Area | % of Total |
|---|---|---|---|---|---|
| 76 | Benzene, 1,3-diethyl-5-methyl- | 72 | 11.585 | 4132783 | 0.43% |
| 77 | Benzene, 2-ethyl-1,4-dimethyl- | 38 | 11.627 | 2597871 | 0.27% |
| 78 | Benzene, (1-methyl-2-cyclopropen-1-yl) | 83 | 11.678 | 11701521 | 1.21% |
| 79 | Benzene, pentyl- | 93 | 11.826 | 30342329 | 3.14% |
| 80 | Naphthalene, 1,2,3,4-tetrahydro- | 76 | 11.926 | 9656848 | 1.00% |
| 81 | Benzene, 1-methyl-4-(2-methylpropyl) | 68 | 12.059 | 7128354 | 0.74% |
| 82 | Cyclododecane | 90 | 12.529 | 16665432 | 1.73% |
| 83 | 2-Decanone | 55 | 12.63 | 9285296 | 0.96% |
| 84 | Dodecane | 90 | 12.705 | 6621373 | 0.69% |
| 85 | 1,4,7,10-Cyclododecatetraene | 52 | 13.381 | 2974883 | 0.31% |
| 86 | Benzene, hexyl- | 68 | 13.95 | 9958639 | 1.03% |
| 87 | Benzene, (1-methylpentyl)- | 20 | 14.112 | 4796616 | 0.50% |
| 88 | 1H-Cyclopropa[b]naphthalene, 1a,2,7,7a-tetrahydro- | 70 | 14.219 | 6483344 | 0.67% |
| 89 | 1-Tridecene | 95 | 14.545 | 10757186 | 1.11% |
| 90 | 11-Dodecen-2-one | 50 | 14.653 | 5291769 | 0.55% |
| 91 | Tridecane | 89 | 14.7 | 5776536 | 0.60% |
| 92 | Naphthalene, 1-methyl- | 50 | 14.822 | 3605083 | 0.37% |
| 93 | Benzene, heptyl- | 53 | 15.962 | 2759087 | 0.29% |
| 94 | 1-Tetradecene | 98 | 16.438 | 15387723 | 1.59% |
| 95 | 3-Tetradecene, (Z) | 58 | 16.69 | 4618343 | 0.48% |
| 96 | Naphthalene, 1,2-dihydro-3,5,8-trimethyl | 70 | 17.913 | 3913971 | 0.41% |
| 97 | 1-Pentadecene | 99 | 18.232 | 6820324 | 0.71% |
| 98 | Pentadecane | 91 | 18.361 | 6333163 | 0.66% |
| 99 | 9-Methylbicyclo[3.3.1]nonane | 50 | 19.62 | 5059464 | 0.52% |
| 100 | Cyclooctene, 1,2-dimethyl- | 86 | 19.69 | 2735971 | 0.28% |
| 101 | 1-Hexadecene | 95 | 19.926 | 4458218 | 0.46% |
| 102 | 5-Eicosene, (E) | 81 | 21.534 | 1631849 | 0.17% |
| 103 | 3-Heptene, 7-phenyl- | 43 | 22.953 | 4871323 | 0.51% |
| 104 | 2-Heptadecanone | 96 | 24.655 | 583644351 | 6.05% |
| 105 | 3-Octadecanone | 90 | 25.975 | 15911534 | 1.65% |
| 106 | Cycloheptadecanone | 68 | 27.062 | 14168732 | 1.47% |
| 107 | 4-Tridecanone | 52 | 27.114 | 6324625 | 0.66% |
| 108 | (2-Acetyl-5-methyl-cyclopentyl)-acetic acid | 38 | 27.148 | 22271804 | 2.31% |
| 109 | 2-Nonadecanone | 97 | 27.396 | 23989164 | 2.49% |
| 110 | 9,12-Hexadecadienoic acid, methyl ester | 41 | 28.275 | 5267812 | 0.55% |
| 111 | 5-Tridecanone | 46 | 28.372 | 11319386 | 1.17% |
| 112 | 3-Eicosanone | 76 | 28.604 | 6183329 | 0.64% |
| 113 | 6-Undecanone | 43 | 29.588 | 3232453 | 0.34% |
| 114 | 3-Heptene, 4-methoxy | 38 | 30.755 | 3985305 | 0.41% |

TABLE A7

Reaction conditions for the reaction of soybean oil with superheated water.

| Exp. No. | Oil Type | Catalyst Type | Particle Size, Pore size, Surface Area | Preheater Temperature Setting point (C) | Reactor Setpoint (° C.) | Back Pressure (PSI) |
|---|---|---|---|---|---|---|
| 81 | Soybean Oil | Zirconia | 10 um/300 A/30 m^2/g | 550 | 550 | 3500 |
| 82 | Soybean Oil | Zirconia | 10 um/300 A/30 m^2/g | 550 | 550 | 3500 |
| 83 | Soybean Oil | Zirconia | 10 um/300 A/30 m^2/g | 550 | 550 | 3500 |
| 84 | Soybean Oil | Zirconia | 10 um/300 A/30 m^2/g | 550 | 550 | 3500 |
| 85 | Soybean Oil | Zirconia | 10 um/300 A/30 m^2/g | 550 | 550 | 3500 |
| 86 | Soybean Oil | Zirconia | 10 um/300 A/30 m^2/g | 453 | 450 | 3400 |
| 87 | Soybean Oil | Zirconia | 10 um/300 A/30 m^2/g | 478 | 475 | 3400 |
| 88 | Soybean Oil | Zirconia | 10 um/300 A/30 m^2/g | 478 | 475 | 3400 |
| 89 | Soybean Oil | Zirconia | 10 um/300 A/30 m^2/g | 478 | 475 | 3400 |
| 90 | Soybean Oil | Zirconia | 10 um/300 A/30 m^2/g | 478 | 475 | 3400 |
| 91 | Soybean Oil | Zirconia | 10 um/300 A/30 m^2/g | 478 | 475 | 3400 |
| 92 | Soybean Oil | Zirconia | 10 um/300 A/30 m^2/g | 478 | 475 | 3400 |
| 93 | Soybean Oil | Zirconia | 10 um/300 A/30 m^2/g | 500 | 500 | 3500 |
| 94 | Soybean Oil | Zirconia | 10 um/300 A/30 m^2/g | 500 | 500 | 3500 |
| 95 | Soybean Oil | Zirconia | 10 um/300 A/30 m^2/g | 500 | 500 | 3500 |
| 96 | Soybean Oil | Zirconia | 10 um/300 A/30 m^2/g | 500 | 500 | 3500 |
| 97 | Soybean Oil | Zirconia | 10 um/300 A/30 m^2/g | 500 | 500 | 3500 |

TABLE A7-continued

Reaction conditions for the reaction of soybean oil with superheated water.

| Exp. No. | Oil Type | Catalyst Type | Particle Size, Pore size, Surface Area | Preheater Temperature Setting point (C) | Reactor Setpoint (°C.) | Back Pressure (PSI) |
|---|---|---|---|---|---|---|
| 98 | Soybean Oil | Zirconia | 10 um/300 A/30 m^2/g | 423 | 420 | 3400 |
| 99 | Soybean Oil | Zirconia | 10 um/300 A/30 m^2/g | 423 | 420 | 3400 |
| 100 | Soybean Oil | Zirconia | 10 um/300 A/30 m^2/g | 433 | 430 | 3400 |
| 101 | Soybean Oil | Zirconia | 10 um/300 A/30 m^2/g | 433 | 430 | 3400 |
| 102 | Soybean Oil | Zirconia | 10 um/300 A/30 m^2/g | 433 | 430 | 3400 |
| 103 | Soybean Oil | Zirconia | 10 um/300 A/30 m^2/g | 433 | 430 | 3400 |
| 104 | Soybean Oil | Zirconia | 10 um/300 A/30 m^2/g | 350 | 350 | 3500 |
| 105 | Soybean Oil | Zirconia | 10 um/300 A/30 m^2/g | 350 | 350 | 3500 |
| 106 | Soybean Oil | Zirconia | 10 um/300 A/30 m^2/g | 350 | 350 | 3500 |
| 107 | Soybean Oil | Zirconia | 10 um/300 A/30 m^2/g | 350 | 350 | 3500 |
| 108 | Soybean Oil | Zirconia | 10 um/300 A/30 m^2/g | 500 | 500 | 3500 |
| 109 | Soybean Oil | Zirconia | 10 um/300 A/30 m^2/g | 500 | 500 | 3500 |
| 110 | Soybean Oil | Zirconia | 10 um/300 A/30 m^2/g | 500 | 500 | 3500 |
| 111 | Soybean Oil | Zirconia | 10 um/300 A/30 m^2/g | 500 | 500 | 3500 |
| 112 | Soybean Oil | Zirconia | 10 um/300 A/30 m^2/g | 500 | 500 | 3500 |
| 113 | Soybean Oil | Zirconia | 10 um/300 A/30 m^2/g | 500 | 500 | 3500 |
| 114 | Soybean Oil | Zirconia | 10 um/300 A/30 m^2/g | 500 | 500 | 3500 |
| 115 | Soybean Oil | Zirconia | 10 um/300 A/30 m^2/g | 500 | 500 | 3500 |
| 116 | Soybean Oil | Zirconia | 10 um/300 A/30 m^2/g | 500 | 500 | 3500 |
| 117 | Soybean Oil | Zirconia | 10 um/300 A/30 m^2/g | 500 | 500 | 3500 |
| 118 | Soybean Oil | Zirconia | 10 um/300 A/30 m^2/g | 500 | 500 | 3500 |
| 119 | Soybean Oil | Zirconia | 10 um/300 A/30 m^2/g | 488 | 485 | 3500 |
| 120 | Soybean Oil | Zirconia | 10 um/300 A/30 m^2/g | 488 | 485 | 3500 |
| 121 | Soybean Oil | Zirconia | 10 um/300 A/30 m^2/g | 488 | 485 | 3500 |
| 122 | Soybean Oil | Zirconia | 10 um/300 A/30 m^2/g | 488 | 485 | 3500 |
| 123 | Soybean Oil | Zirconia | 10 um/300 A/30 m^2/g | 488 | 485 | 3500 |
| 124 | Soybean Oil | Zirconia | 10 um/300 A/30 m^2/g | 488 | 485 | 3500 |
| 125 | Soybean Oil | Zirconia | 10 um/300 A/30 m^2/g | 500 | 500 | 3500 |
| 126 | Soybean Oil | Zirconia | 10 um/300 A/30 m^2/g | 500 | 500 | 3500 |
| 127 | Soybean Oil | Zirconia | 10 um/300 A/30 m^2/g | 500 | 500 | 3500 |
| 128 | Soybean Oil | Zirconia | 10 um/300 A/30 m^2/g | 500 | 500 | 3500 |
| 129 | Soybean Oil | NONE | NA | 515 | 515 | 3500 |
| 130 | Soybean Oil | NONE | NA | 515 | 515 | 3500 |
| 131 | Soybean Oil | NONE | NA | 515 | 515 | 3500 |
| 132 | Soybean Oil | NONE | NA | 515 | 515 | 3500 |
| 133 | Soybean Oil | NONE | NA | 515 | 515 | 3500 |
| 134 | Soybean Oil | Zirconia | 10 um/300 A/30 m^2/g | 535 | 530 | 3800 |
| 135 | Soybean Oil | Zirconia | 10 um/300 A/30 m^2/g | 535 | 530 | 3800 |
| 136 | Soybean Oil | Zirconia | 10 um/300 A/30 m^2/g | 535 | 530 | 3900 |
| 137 | Soybean Oil | Zirconia | 10 um/300 A/30 m^2/g | 535 | 530 | 4000 |
| 138 | Soybean Oil | Zirconia | 10 um/300 A/30 m^2/g | 535 | 530 | 4100 |
| 139 | Soybean Oil | Zirconia | 10 um/300 A/30 m^2/g | 535 | 530 | 4300 |
| 140 | Soybean Oil | Zirconia | 10 um/300 A/30 m^2/g | 530 | 530 | 4500 |
| 141 | Soybean Oil | NONE | NA | 515 | 515 | 3500 |
| 142 | Soybean Oil | NONE | NA | 515 | 515 | 3500 |
| 143 | Soybean Oil | NONE | NA | 515 | 515 | 3500 |
| 144 | Soybean Oil | NONE | NA | 515 | 515 | 3500 |
| 145 | Soybean Oil | NONE | NA | 515 | 515 | 3500 |
| 146 | Soybean Oil | NONE | NA | 515 | 515 | 3500 |
| 147 | Soybean Oil | Zirconia | 10 um/300 A/30 m^2/g | 410 | 410 | 3500 |
| 148 | Soybean Oil | Zirconia | 10 um/300 A/30 m^2/g | 410 | 410 | 3500 |
| 149 | Soybean Oil | Zirconia | 10 um/300 A/30 m^2/g | 410 | 410 | 3500 |
| 150 | Soybean Oil | Zirconia | 10 um/300 A/30 m^2/g | 410 | 410 | 3500 |
| 151 | Soybean Oil | Zirconia | 10 um/300 A/30 m^2/g | 410 | 410 | 3500 |
| 152 | Soybean Oil | Zirconia | 10 um/300 A/30 m^2/g | 410 | 410 | 3500 |
| 153 | Soybean Oil | NONE | NA | 450 | 450 | 3500 |
| 154 | Soybean Oil | NONE | NA | 450 | 450 | 3500 |
| 155 | Soybean Oil | NONE | NA | 450 | 450 | 3500 |
| 156 | Soybean Oil | NONE | NA | 450 | 450 | 3500 |
| 157 | Soybean Oil | NONE | NA | 450 | 450 | 3500 |
| 158 | Soybean Oil | Zirconia | 10 um/300 A/30 m^2/g | 560 | 560 | 3400 |
| 159 | Soybean Oil | Zirconia | 10 um/300 A/30 m^2/g | 560 | 560 | 3400 |
| 160 | Soybean Oil | Zirconia | 10 um/300 A/30 m^2/g | 555 | 560 | 3500 |
| 161 | Soybean Oil | Zirconia | 10 um/300 A/30 m^2/g | 555 | 560 | 3500 |
| 162 | Soybean Oil | Zirconia | 10 um/300 A/30 m^2/g | 555 | 560 | 3500 |
| 163 | Soybean Oil | Zirconia | 10 um/300 A/30 m^2/g | 555 | 560 | 3500 |
| 164 | Soybean Oil | Zirconia | 10 um/300 A/30 m^2/g | 510 | 505 | 3500 |
| 165 | Soybean Oil | Zirconia | 10 um/300 A/30 m^2/g | 505 | 500 | 3500 |
| 166 | Soybean Oil | Zirconia | 10 um/300 A/30 m^2/g | 505 | 500 | 3550 |
| 167 | Soybean Oil | Zirconia | 10 um/300 A/30 m^2/g | 505 | 500 | 3550 |
| 168 | Soybean Oil | Zirconia | 10 um/300 A/30 m^2/g | 505 | 500 | 3550 |
| 169 | Soybean Oil | Zirconia | 10 um/300 A/30 m^2/g | 505 | 500 | 3550 |
| 170 | Soybean Oil | NONE | NA | 550 | 550 | 3500 |

TABLE A7-continued

Reaction conditions for the reaction of soybean oil with superheated water.

| Exp. No. | Oil Type | Catalyst Type | Particle Size, Pore size, Surface Area | Preheater Temperature Setting point (C) | Reactor Setpoint (°C.) | Back Pressure (PSI) |
|---|---|---|---|---|---|---|
| 171 | Soybean Oil | NONE | NA | 550 | 550 | 3500 |
| 172 | Soybean Oil | NONE | NA | 550 | 550 | 3500 |
| 173 | Soybean Oil | NONE | NA | 550 | 550 | 3500 |
| 174 | Soybean Oil | NONE | NA | 550 | 550 | 3500 |

TABLE A8

Data collected for sample conditions given in Table 1.

| Exp. No. | Water Set-up Flow (min/min) | Actual Oil Flow rate (min/Min) | Total Flow Rate (ml/min) | Acid Number | Production Rate (fuel g/min) |
|---|---|---|---|---|---|
| 82 | 5.557 | 2.063 | 7.620 | 1.38 | 0.84 |
| 83 | 5.557 | 2.063 | 7.620 | 1.93 | 0.81 |
| 84 | 5.557 | 2.063 | 7.620 | 18.49 | 0.88 |
| 85 | 5.557 | 2.063 | 7.620 | 48.15 | 0.94 |
| 89 | 5.557 | 2.063 | 7.620 | 168 | 1.61 |
| 90 | 5.557 | 2.063 | 7.620 | 140 | 1.56 |
| 91 | 5.557 | 2.063 | 7.620 | 168 | 1.58 |
| 92 | 5.557 | 2.063 | 7.620 | 170 | 1.55 |
| 94 | 5.557 | 2.063 | 7.620 | 40.37 | 1.41 |
| 95 | 5.557 | 2.063 | 7.620 | 39.45 | 1.38 |
| 96 | 5.557 | 2.063 | 7.620 | 39.52 | 1.39 |
| 97 | 5.557 | 2.063 | 7.620 | 37.37 | 1.41 |
| 99 | 6.9 | 2.063 | 8.963 | 203 | 1.64 |
| 100 | 6.9 | 2.063 | 8.963 | 203 | 1.63 |
| 101 | 6.9 | 2.063 | 8.963 | 215 | 1.61 |
| 102 | 6.9 | 2.063 | 8.963 | 202 | 1.66 |
| 103 | 6.9 | 2.063 | 8.963 | 208 | 1.62 |
| 105 | 5.557 | 2.063 | 7.620 | 212.36 | 1.69 |
| 106 | 5.557 | 2.063 | 7.620 | 201.7 | 1.66 |
| 107 | 5.557 | 2.063 | 7.620 | 199.6 | 1.7 |
| 108 | 2.778 | 1.031 | 3.809 | 2.98 | 0.615 |
| 109 | 2.778 | 1.031 | 3.809 | 3.03 | 0.616 |
| 110 | 2.778 | 1.031 | 3.809 | 3.11 | 0.618 |
| 111 | 2.778 | 1.031 | 3.809 | 3.13 | 0.611 |
| 112 | 2.778 | 1.031 | 3.809 | 3.42 | 0.627 |
| 114 | 2.778 | 1.031 | 3.809 | 3.64 | 0.615 |
| 115 | 2.778 | 1.031 | 3.809 | 4.14 | 0.61 |
| 116 | 2.778 | 1.031 | 3.809 | 4.8 | 0.611 |
| 120 | 3.9 | 1.03 | 4.930 | 112 | 0.77 |
| 121 | 3.9 | 1.03 | 4.930 | 114 | 0.76 |
| 122 | 3.9 | 1.03 | 4.930 | 114 | 0.73 |
| 123 | 3.9 | 1.03 | 4.930 | 114 | 0.75 |
| 124 | 3.9 | 1.03 | 4.930 | 114 | 0.73 |
| 126 | 2.778 | 1.031 | 3.809 | 8.638 | 0.618 |
| 127 | 2.778 | 1.031 | 3.809 | 11.356 | 0.614 |
| 128 | 2.778 | 1.031 | 3.809 | 15.115 | 0.612 |
| 130 | 8.98 | 3.334 | 12.314 | 166 | 2.405 |
| 131 | 8.98 | 3.334 | 12.314 | 168 | 2.31 |
| 132 | 8.98 | 3.334 | 12.314 | 166 | 2.33 |
| 133 | 8.98 | 3.334 | 12.314 | 169 | 2.32 |
| 135 | 3.9 | 1.803 | 5.703 | 6.4 | 0.5 |
| 136 | 3.9 | 1.803 | 5.703 | 2.1 | 0.5 |
| 137 | 3.9 | 1.803 | 5.703 | 3 | 0.49 |
| 138 | 3.9 | 1.803 | 5.703 | 3.1 | 0.49 |
| 139 | 3.9 | 1.803 | 5.703 | 3.8 | 0.49 |
| 142 | 4.49 | 1.666 | 6.156 | 152.3 | 1.04 |
| 143 | 4.49 | 1.666 | 6.156 | 151 | 1.1 |
| 144 | 4.49 | 1.666 | 6.156 | 153.7 | 1.02 |
| 145 | 4.49 | 1.666 | 6.156 | 153.68 | 1.08 |
| 146 | 4.49 | 1.666 | 6.156 | 153.7 | 1.01 |
| 148 | 3.9 | 1.803 | 5.703 | 202 | 0.8 |
| 149 | 3.9 | 1.803 | 5.703 | 199 | 0.83 |
| 150 | 3.9 | 1.803 | 5.703 | 201 | 0.81 |
| 151 | 3.9 | 1.803 | 5.703 | 199 | 0.81 |
| 152 | 3.9 | 1.803 | 5.703 | 201 | 0.81 |
| 154 | 4.49 | 1.666 | 6.156 | 176.35 | 1.31 |
| 155 | 4.49 | 1.666 | 6.156 | 174.47 | 1.29 |
| 156 | 4.49 | 1.666 | 6.156 | 172.62 | 1.43 |
| 157 | 4.49 | 1.666 | 6.156 | 171.08 | 1.46 |
| 159 | 3.2 | 1.803 | 5.003 | 0.1887 | 0.42 |
| 160 | 3.2 | 1.803 | 5.003 | 0.4157 | 0.42 |
| 161 | 3.2 | 1.803 | 5.003 | 0.5828 | 0.42 |
| 162 | 3.2 | 1.803 | 5.003 | 0.7189 | 0.42 |
| 163 | 3.2 | 1.803 | 5.003 | 1.3671 | 0.43 |
| 165 | 6.6 | 2.713 | 9.313 | 20.8 | 0.96 |
| 166 | 6.6 | 2.713 | 9.313 | 22.7 | 0.98 |
| 167 | 6.6 | 2.713 | 9.313 | 24.9 | 0.98 |
| 168 | 6.6 | 2.713 | 9.313 | 27 | 0.98 |
| 169 | 6.6 | 2.713 | 9.313 | 26.4 | 0.99 |
| 171 | 6.096 | 1.558 | 7.654 | 103.71 | 0.695 |
| 172 | 6.096 | 1.558 | 7.654 | 99 | 0.721 |
| 173 | 6.096 | 1.558 | 7.654 | 100.04 | 0.675 |
| 174 | 6.096 | 1.558 | 7.654 | 99.9 | 0.715 |

TABLE A13

Reaction conditions for different feedstocks with superheated water.

| Exp. No. | Oil Type | Catalyst Type | Particle Size, Pore size, Surface Area | Preheater Temperature Setting point (C) | Reactor Setpoint (°C.), T2 | Back Pressure (PSI) |
|---|---|---|---|---|---|---|
| 179 | Soybean Oil | Zirconia | 10 um/300 A/30 m^2/g | 462 | 462 | 3500 |
| 180 | Soybean Oil | Zirconia | 10 um/300 A/30 m^2/g | 462 | 462 | 3500 |
| 181 | Soybean Oil | Zirconia | 10 um/300 A/30 m^2/g | 462 | 462 | 3500 |
| 182 | Soybean Oil | Zirconia | 10 um/300 A/30 m^2/g | 462 | 462 | 3500 |
| 183 | Soybean Oil | Zirconia | 10 um/300 A/30 m^2/g | 462 | 462 | 3500 |
| 184 | Soybean Oil | Zirconia | 10 um/300 A/30 m^2/g | 462 | 462 | 3500 |
| 185 | Soybean Oil | Zirconia | 10 um/300 A/30 m^2/g | 518 | 515 | 3500 |
| 186 | Soybean Oil | Zirconia | 10 um/300 A/30 m^2/g | 518 | 515 | 3500 |

TABLE A13-continued

Reaction conditions for different feedstocks with superheated water.

| Exp. No. | Oil Type | Catalyst Type | Particle Size, Pore size, Surface Area | Preheater Temperature Setting point (C) | Reactor Setpoint (° C.), T2 | Back Pressure (PSI) |
|---|---|---|---|---|---|---|
| 187 | Soybean Oil | Zirconia | 10 um/300 A/30 m^2/g | 518 | 515 | 3500 |
| 188 | Soybean Oil | Zirconia | 10 um/300 A/30 m^2/g | 518 | 515 | 3500 |
| 189 | Soybean Oil | Zirconia | 10 um/300 A/30 m^2/g | 520 | 517 | 3500 |
| 190 | Soybean Oil | Zirconia | 10 um/300 A/30 m^2/g | 518 | 517 | 3500 |
| 191 | Soybean Oil | Zirconia | 10 um/300 A/30 m^2/g | 525 | 525 | 3500 |
| 192 | Soybean Oil | Zirconia | 10 um/300 A/30 m^2/g | 525 | 525 | 3500 |
| 193 | Soybean Oil | Zirconia | 10 um/300 A/30 m^2/g | 525 | 525 | 3500 |
| 194 | Soybean Oil | Zirconia | 10 um/300 A/30 m^2/g | 525 | 525 | 3500 |
| 195 | Soybean Oil | Zirconia | 10 um/300 A/30 m^2/g | 525 | 525 | 3500 |
| 196 | Soybean Oil | Zirconia | 10 um/300 A/30 m^2/g | 500 | 500 | 3500 |
| 197 | Soybean Oil | Zirconia | 10 um/300 A/30 m^2/g | 500 | 500 | 3500 |
| 198 | Soybean Oil | Zirconia | 10 um/300 A/30 m^2/g | 500 | 500 | 3500 |
| 199 | Soybean Oil | Zirconia | 10 um/300 A/30 m^2/g | 500 | 500 | 3500 |
| 200 | Soybean Oil | Zirconia | 10 um/300 A/30 m^2/g | 500 | 500 | 3500 |
| 201 | Soybean Oil | Zirconia | 10 um/300 A/30 m^2/g | 500 | 500 | 3500 |
| 202 | Soybean Oil | Zirconia | 10 um/300 A/30 m^2/g | 519 | 515 | 3500 |
| 203 | Soybean Oil | Zirconia | 10 um/300 A/30 m^2/g | 517 | 515 | 3500 |
| 204 | Soybean Oil | Zirconia | 10 um/300 A/30 m^2/g | 517 | 515 | 3500 |
| 205 | Soybean Oil | Zirconia | 10 um/300 A/30 m^2/g | 517 | 515 | 3500 |
| 206 | Soybean Oil | Zirconia | 10 um/300 A/30 m^2/g | 517 | 515 | 3500 |
| 207 | Soybean Oil | Zirconia | 10 um/300 A/30 m^2/g | 517 | 515 | 3500 |
| 208 | Soybean Oil | Zirconia | 10 um/300 A/30 m^2/g | 517 | 515 | 3500 |
| 209 | Soybean Oil | Zirconia | 10 um/300 A/30 m^2/g | 450 | 450 | 3500 |
| 210 | Soybean Oil | Zirconia | 10 um/300 A/30 m^2/g | 460 | 458 | 3500 |
| 211 | Soybean Oil | Zirconia | 10 um/300 A/30 m^2/g | 460 | 458 | 3500 |
| 212 | Soybean Oil | Zirconia | 10 um/300 A/30 m^2/g | 460 | 458 | 3500 |
| 213 | Soybean Oil | Zirconia | 10 um/300 A/30 m^2/g | 460 | 458 | 3500 |
| 214 | Soybean Oil | Zirconia | 10 um/300 A/30 m^2/g | 461 | 460 | 3500 |
| 215 | Soybean Oil | Zirconia | 10 um/300 A/30 m^2/g | 525 | 525 | 3500 |
| 216 | Soybean Oil | Zirconia | 10 um/300 A/30 m^2/g | 525 | 525 | 3500 |
| 217 | Soybean Oil | Zirconia | 10 um/300 A/30 m^2/g | 525 | 525 | 3500 |
| 218 | Soybean Oil | Zirconia | 10 um/300 A/30 m^2/g | 525 | 525 | 3500 |
| 219 | Soybean Oil | Zirconia | 10 um/300 A/30 m^2/g | 525 | 525 | 3500 |
| 220 | Soybean Oil | Zirconia | 10 um/300 A/30 m^2/g | 525 | 525 | 3500 |
| 221 | Soybean Oil | Zirconia | 10 um/300 A/30 m^2/g | 515 | 516 | 3500 |
| 222 | Soybean Oil | Zirconia | 10 um/300 A/30 m^2/g | 515 | 516 | 3500 |
| 223 | Soybean Oil | Zirconia | 10 um/300 A/30 m^2/g | 515 | 506 | 3500 |
| 224 | Soybean Oil | Zirconia | 10 um/300 A/30 m^2/g | 515 | 515 | 3500 |
| 225 | Soybean Oil | Zirconia | 10 um/300 A/30 m^2/g | 520 | 520 | 3500 |
| 226 | Soybean Oil | Zirconia | 10 um/300 A/30 m^2/g | 507 | 506 | 3500 |
| 227 | Soybean Oil | Zirconia | 10 um/300 A/30 m^2/g | 515 | 515 | 3500 |
| 228 | Soybean Oil | Zirconia | 10 um/300 A/30 m^2/g | 525 | 525 | 3500 |
| 229 | Soybean Oil | Zirconia | 10 um/300 A/30 m^2/g | 410 | 410 | 3500 |
| 230 | Soybean Oil | Zirconia | 10 um/300 A/30 m^2/g | 411 | 410 | 3500 |
| 231 | Soybean Oil | Zirconia | 10 um/300 A/30 m^2/g | 411 | 410 | 3500 |
| 232 | Soybean Oil | Zirconia | 10 um/300 A/30 m^2/g | 409 | 408 | 3500 |
| 233 | Soybean Oil | Zirconia | 10 um/300 A/30 m^2/g | 409 | 408 | 3500 |
| 234 | Soybean Oil | Zirconia | 10 um/300 A/30 m^2/g | 408 | 408 | 3500 |
| 235 | Soybean Oil | Zirconia | 10 um/300 A/30 m^2/g | 400 | 400 | 3500 |
| 236 | Soybean Oil | Zirconia | 10 um/300 A/30 m^2/g | 400 | 400 | 3500 |
| 237 | Soybean Oil | Zirconia | 10 um/300 A/30 m^2/g | 400 | 400 | 3500 |
| 238 | Soybean Oil | Zirconia | 10 um/300 A/30 m^2/g | 400 | 400 | 3500 |
| 239 | Glycerol/H2O | Zirconia | 10 um/300 A/30 m^2/g | 495 | 495 | 3500 |
| 240 | Glycerol/H2O | Zirconia | 10 um/300 A/30 m^2/g | 495 | 495 | 3500 |
| 241 | Glycerol/H2O | Zirconia | 10 um/300 A/30 m^2/g | 492 | 492 | 3500 |
| 242 | Glycerol/H2O | Zirconia | 10 um/300 A/30 m^2/g | 492 | 492 | 3500 |
| 243 | Glycerol/H2O | Zirconia | 10 um/300 A/30 m^2/g | 492 | 492 | 3500 |
| 244 | Glycerol/H2O | Zirconia | 10 um/300 A/30 m^2/g | 492 | 492 | 3500 |
| 245 | Biodiesel | Zirconia | 10 um/300 A/30 m^2/g | 500 | 500 | 3500 |
| 246 | Biodiesel | Zirconia | 10 um/300 A/30 m^2/g | 500 | 500 | 3500 |
| 247 | Biodiesel | Zirconia | 10 um/300 A/30 m^2/g | 500 | 500 | 3500 |
| 248 | Biodiesel | Zirconia | 10 um/300 A/30 m^2/g | 500 | 500 | 3500 |
| 249 | Glycerol/H2O | Zirconia | 10 um/300 A/30 m^2/g | 453 | 454 | 3500 |
| 250 | Glycerol/H2O | Zirconia | 10 um/300 A/30 m^2/g | 452 | 452 | 3500 |
| 251 | Glycerol/H2O | Zirconia | 10 um/300 A/30 m^2/g | 452 | 452 | 3500 |
| 252 | Glycerol/H2O | Zirconia | 10 um/300 A/30 m^2/g | 452 | 452 | 3500 |
| 253 | Glycerol/H2O | Zirconia | 10 um/300 A/30 m^2/g | 452 | 452 | 3500 |
| 254 | Glycerol/H2O | Zirconia | 10 um/300 A/30 m^2/g | 452 | 452 | 3500 |
| 255 | Biodiesel | Zirconia | 10 um/300 A/30 m^2/g | 550 | 550 | 3500 |
| 256 | Biodiesel | Zirconia | 10 um/300 A/30 m^2/g | 550 | 550 | 3500 |
| 257 | Biodiesel | Zirconia | 10 um/300 A/30 m^2/g | 550 | 550 | 3500 |
| 258 | Biodiesel | Zirconia | 10 um/300 A/30 m^2/g | 550 | 550 | 3500 |
| 259 | Biodiesel | Zirconia | 10 um/300 A/30 m^2/g | 550 | 550 | 3500 |

TABLE A13-continued

Reaction conditions for different feedstocks with superheated water.

| Exp. No. | Oil Type | Catalyst Type | Particle Size, Pore size, Surface Area | Preheater Temperature Setting point (C) | Reactor Setpoint (° C.), T2 | Back Pressure (PSI) |
|---|---|---|---|---|---|---|
| 260 | Biodiesel | Zirconia | 10 um/300 A/30 m^2/g | 550 | 550 | 3500 |
| 261 | Biodiesel | Zirconia | 10 um/300 A/30 m^2/g | 500 | 500 | 3500 |
| 262 | Biodiesel | Zirconia | 10 um/300 A/30 m^2/g | 500 | 500 | 3500 |
| 263 | Glycerol/H2O | Zirconia | 10 um/300 A/30 m^2/g | 411 | 409 | 3500 |
| 264 | Glycerol/H2O | Zirconia | 10 um/300 A/30 m^2/g | 411 | 409 | 3500 |
| 265 | Glycerol/H2O | Zirconia | 10 um/300 A/30 m^2/g | 405 | 406 | 3500 |
| 266 | Cargill FS201201092100 | Zirconia | 10 um/300 A/30 m^2/g | 500 | 500 | 3500 |
| 267 | Cargill FS201201092100 | Zirconia | 10 um/300 A/30 m^2/g | 500 | 500 | 3500 |
| 268 | Cargill FS201201092100 | Zirconia | 10 um/300 A/30 m^2/g | 500 | 500 | 3500 |
| 269 | Cargill FS201201092100 | Zirconia | 10 um/300 A/30 m^2/g | 500 | 500 | 3500 |
| 270 | Glycerol/H2O | Zirconia | 10 um/300 A/30 m^2/g | 410 | 411 | 3500 |
| 271 | Glycerol/H2O | Zirconia | 10 um/300 A/30 m^2/g | 410 | 413 | 3500 |
| 272 | Glycerol/H2O | Zirconia | 10 um/300 A/30 m^2/g | 410 | 413 | 3500 |
| 273 | Glycerol/H2O | Zirconia | 10 um/300 A/30 m^2/g | 410 | 413 | 3500 |
| 274 | Glycerol/H2O | Zirconia | 10 um/300 A/30 m^2/g | 410 | 413 | 3500 |
| 275 | Glycerol/H2O | Zirconia | 10 um/300 A/30 m^2/g | 410 | 413 | 3500 |
| 276 | Cargill FS201201092100 | Zirconia | 10 um/300 A/30 m^2/g | 550 | 550 | 3500 |
| 277 | Cargill FS201201092100 | Zirconia | 10 um/300 A/30 m^2/g | 550 | 550 | 3500 |
| 278 | Oleic Acid | Zirconia | 10 um/300 A/30 m^2/g | 500 | 500 | 3600 |
| 279 | Oleic Acid | Zirconia | 10 um/300 A/30 m^2/g | 498 | 498 | 3600 |
| 280 | Oleic Acid | Zirconia | 10 um/300 A/30 m^2/g | 497 | 497 | 3600 |
| 281 | Oleic Acid | Zirconia | 10 um/300 A/30 m^2/g | 497 | 497 | 3600 |
| 282 | Oleic Acid | Zirconia | 10 um/300 A/30 m^2/g | 497 | 497 | 3600 |
| 283 | Oleic Acid | Zirconia | 10 um/300 A/30 m^2/g | 497 | 497 | 3550 |
| 284 | Hexadecane | Zirconia | 10 um/300 A/30 m^2/g | 500 | 500 | 3500 |
| 285 | Hexadecane | Zirconia | 10 um/300 A/30 m^2/g | 500 | 500 | 3500 |
| 286 | Hexadecane | Zirconia | 10 um/300 A/30 m^2/g | 500 | 500 | 3500 |
| 287 | Hexadecane | Zirconia | 10 um/300 A/30 m^2/g | 500 | 500 | 3500 |
| 288 | Hexadecane | Zirconia | 10 um/300 A/30 m^2/g | 500 | 500 | 3500 |
| 289 | Hexadecane | Zirconia | 10 um/300 A/30 m^2/g | 500 | 500 | 3500 |
| 290 | Oleic Acid | Zirconia | 10 um/300 A/30 m^2/g | 495 | 495 | 3500 |
| 291 | Oleic Acid | Zirconia | 10 um/300 A/30 m^2/g | 495 | 496 | 3500 |
| 292 | Oleic Acid | Zirconia | 10 um/300 A/30 m^2/g | 495 | 496 | 3500 |
| 293 | Oleic Acid | Zirconia | 10 um/300 A/30 m^2/g | 495 | 496 | 3500 |
| 294 | Oleic Acid | Zirconia | 10 um/300 A/30 m^2/g | 495 | 496 | 3500 |
| 295 | Oleic Acid | Zirconia | 10 um/300 A/30 m^2/g | 495 | 496 | 3500 |
| 296 | Hexadecane | Zirconia | 10 um/300 A/30 m^2/g | 550 | 550 | 3500 |
| 297 | Hexadecane | Zirconia | 10 um/300 A/30 m^2/g | 550 | 550 | 3500 |
| 298 | Hexadecane | Zirconia | 10 um/300 A/30 m^2/g | 550 | 550 | 3500 |
| 299 | Hexadecane | Zirconia | 10 um/300 A/30 m^2/g | 550 | 550 | 3500 |
| 300 | Hexadecane | Zirconia | 10 um/300 A/30 m^2/g | 550 | 550 | 3500 |

TABLE A14

Data collected for sample conditions given in Table A13.

| Exp. No. | Actual Water Flow (min/min) | Actual Oil Flow rate (min/Min) | Total Flow Rate (ml/min) | Acid Number | Production Rate (fuel g/min) |
|---|---|---|---|---|---|
| 179 | 5.7 | 1.55 | 7.250 | 22.7 | 0.98 |
| 180 | 5.7 | 1.55 | 7.250 | 27 | 0.98 |
| 181 | 5.7 | 1.55 | 7.250 | 26.4 | 0.99 |
| 182 | 5.7 | 1.55 | 7.250 | 24.9 | 0.98 |
| 184 | 5.7 | 1.55 | 7.250 | 20.8 | 0.96 |
| 185 | 5.7 | 1.55 | 7.250 | 13.4 | 0.91 |
| 186 | 5.7 | 1.55 | 7.250 | 12.79 | 0.91 |
| 187 | 5.7 | 1.55 | 7.250 | 12.5 | 0.90 |
| 188 | 5.7 | 1.55 | 7.250 | 13.4 | 0.91 |
| 190 | 5.7 | 1.55 | 7.250 | 17.7 | 0.90 |
| 192 | 5.730 | 1.558 | 7.288 | 5.06 | 0.84 |
| 193 | 5.730 | 1.558 | 7.288 | 5.75 | 0.79 |
| 194 | 5.730 | 1.558 | 7.288 | 5.92 | 0.84 |
| 195 | 5.730 | 1.558 | 7.288 | 7.18 | 0.79 |
| 197 | 4.103 | 3.183 | 7.286 | 51.55 | 2.18 |
| 198 | 4.103 | 3.183 | 7.286 | 53.3 | 2.28 |
| 199 | 4.103 | 3.183 | 7.286 | 52.19 | 2.19 |
| 200 | 4.103 | 3.183 | 7.286 | 53.6 | 2.52 |
| 201 | 4.103 | 3.183 | 7.286 | 51.3 | 2.11 |
| 203 | 5.7 | 1.55 | 7.250 | 15.6 | 0.90 |
| 204 | 5.7 | 1.55 | 7.250 | 17.2 | 0.90 |
| 205 | 5.7 | 1.55 | 7.250 | 20.1 | 0.89 |
| 206 | 5.7 | 1.55 | 7.250 | 23.8 | 0.60 |
| 207 | 5.7 | 1.55 | 7.250 | 29.3 | 0.91 |
| 208 | 5.7 | 1.55 | 7.250 | 13.8 | 0.90 |
| 210 | 4.1 | 3.18 | 7.280 | 180.4 | 2.54 |

TABLE A14-continued

Data collected for sample conditions given in Table A13.

| Exp. No. | Actual Water Flow (min/min) | Actual Oil Flow rate (min/Min) | Total Flow Rate (ml/min) | Acid Number | Production Rate (fuel g/min) |
|---|---|---|---|---|---|
| 211 | 4.1 | 3.18 | 7.280 | 172.9 | 2.54 |
| 212 | 4.1 | 3.18 | 7.280 | 175.8 | 2.54 |
| 213 | 4.1 | 3.18 | 7.280 | 174 | 2.51 |
| 214 | 4.1 | 3.18 | 7.280 | 172.9 | 2.53 |
| 216 | 4.103 | 3.183 | 7.286 | 3.55 | 1.78 |
| 217 | 4.103 | 3.183 | 7.286 | 3.72 | 1.82 |
| 218 | 4.103 | 3.183 | 7.286 | 4.52 | 1.73 |
| 219 | 4.103 | 3.183 | 7.286 | 7 | 1.79 |
| 220 | 4.103 | 3.183 | 7.286 | 9.8 | 1.79 |
| 221 | 4.1 | 3.18 | 7.280 | 21 | 1.95 |
| 222 | 4.1 | 3.18 | 7.280 | 19.3 | 1.93 |
| 223 | 4.1 | 3.18 | 7.280 | 13.9 | 1.92 |
| 224 | 4.1 | 3.18 | 7.280 | 22.7 | 1.98 |
| 226 | 4.1 | 3.18 | 7.280 | 11.3 | 1.93 |
| 227 | 4.1 | 3.18 | 7.280 | 8.6 | 1.90 |
| 228 | 4.103 | 3.183 | 7.286 | 9.8 | 1.79 |
| 230 | 4.1 | 3.18 | 7.280 | 196.1 | 2.61 |
| 231 | 4.1 | 3.18 | 7.280 | 187.1 | 2.63 |
| 232 | 4.1 | 3.18 | 7.280 | 186.4 | 2.59 |
| 233 | 4.1 | 3.18 | 7.280 | 188.8 | 2.62 |
| 234 | 4.1 | 3.18 | 7.280 | 186.0 | 2.52 |
| 236 | 5.3862 | 1.5575 | 6.944 | 191.8 | 1.22 |
| 237 | 5.3862 | 1.5575 | 6.944 | 191.8 | 1.26 |
| 238 | 5.3862 | 1.5575 | 6.944 | 191.4 | 1.27 |
| 240 | 6.153 | 1.134 | 7.287 | 11.5 | 0.14 |
| 241 | 6.153 | 1.134 | 7.287 | 7.8 | 0.14 |
| 242 | 6.153 | 1.134 | 7.287 | 8.3 | 0.13 |
| 243 | 6.153 | 1.134 | 7.287 | 9.8 | 0.13 |
| 244 | 6.153 | 1.134 | 7.287 | 9.6 | 0.12 |
| 246 | 5.63906 | 1.6485 | 7.288 | 41.9 | 1.00 |
| 247 | 5.63906 | 1.6485 | 7.288 | 41.6 | 1.04 |
| 250 | 6.153 | 1.134 | 7.287 | 36.6 | 0.17 |
| 251 | 6.153 | 1.134 | 7.287 | 39.5 | 0.16 |
| 252 | 6.153 | 1.134 | 7.287 | 41.9 | 0.15 |
| 253 | 6.153 | 1.134 | 7.287 | 43.7 | 0.16 |
| 254 | 6.153 | 1.134 | 7.287 | 44.2 | 0.16 |
| 256 | 5.63906 | 1.6485 | 7.288 | 2.8 | 0.65 |
| 257 | 5.63906 | 1.6485 | 7.288 | 0.6 | 0.58 |
| 258 | 5.63906 | 1.6485 | 7.288 | 0.6 | 0.59 |
| 259 | 5.63906 | 1.6485 | 7.288 | 1.1 | 0.54 |
| 260 | 5.63906 | 1.6485 | 7.288 | 1.9 | 0.55 |
| 267 | 5.63906 | 1.6485 | 7.288 | 29.3 | 1.04 |
| 268 | 5.63906 | 1.6485 | 7.288 | 27.9 | 0.95 |
| 269 | 5.63906 | 1.6485 | 7.288 | 27.5 | 0.96 |
| 271 | 6.153 | 1.134 | 7.287 | 94.1 | 0.06 |
| 272 | 6.153 | 1.134 | 7.287 | 95.4 | 0.05 |
| 273 | 6.153 | 1.134 | 7.287 | 90.6 | 0.05 |
| 274 | 6.153 | 1.134 | 7.287 | 85.4 | 0.03 |
| 275 | 6.153 | 1.134 | 7.287 | 86.7 | 0.03 |
| 278 | 5.6 | 1.65 | 7.250 | | |
| 279 | 5.6 | 1.65 | 7.250 | 37.3 | 1.09 |
| 280 | 5.6 | 1.65 | 7.250 | 41.3 | 1.09 |
| 281 | 5.6 | 1.65 | 7.250 | 40.8 | 1.09 |
| 282 | 5.6 | 1.65 | 7.250 | 39.4 | 1.09 |
| 283 | 5.6 | 1.65 | 7.250 | 39.2 | 1.10 |
| 287 | 5.63906 | 1.65725 | 7.296 | 0.5 | 1.01 |
| 288 | 5.63906 | 1.65725 | 7.296 | 0.2 | 1.14 |
| 289 | 5.63906 | 1.65725 | 7.296 | 0.1 | 1.13 |
| 291 | 5.6 | 1.65 | 7.250 | 57.7 | 1.08 |
| 292 | 5.6 | 1.65 | 7.250 | 57.3 | 1.07 |
| 293 | 5.6 | 1.65 | 7.250 | 57.0 | 1.10 |
| 294 | 5.6 | 1.65 | 7.250 | 58.4 | 1.09 |
| 295 | 5.6 | 1.65 | 7.250 | 53.9 | 1.08 |
| 297 | 5.63906 | 1.65725 | 7.296 | 0.5 | 1.05 |
| 298 | 5.63906 | 1.65725 | 7.296 | 0.0 | 0.99 |
| 299 | 5.63906 | 1.65725 | 7.296 | 0.0 | 1.04 |
| 300 | 5.63906 | 1.65725 | 7.296 | 0.0 | 1.04 |

TABLE A15

GC-MS results for the decomposition of glycerol at 500° C. in supercritical water over zirconium dioxide.

| Peak # | Peak Name | % Probability | RT | Area | % of Total |
|---|---|---|---|---|---|
| 1 | 1,1'-Biphenyl, 2-methoxy- | 35 | 0.1652 | 68730060 | 0.77% |
| 2 | Acetone | 80 | 1.388 | 82391866 | 0.92% |
| 3 | Cyclopentene | 58 | 1.5548 | 13336618 | 0.15% |
| 4 | 2-Butanone | 80 | 1.7044 | 324583830 | 3.62% |
| 5 | Cyclopentene, 3-methylene- | 76 | 1.9652 | 15587398 | 0.17% |
| 6 | 1,3-Cyclopentadiene, 1-methyl- | 76 | 1.9994 | 12104691 | 0.13% |
| 7 | 1,4-Pentadiene, 2-methyl- | 91 | 2.0465 | 23305622 | 0.26% |
| 8 | 2-Butanone, 3-methyl- | 72 | 2.1021 | 205282712 | 2.29% |
| 9 | Ethylidenecyclobutane | 90 | 2.2944 | 11182853 | 0.12% |
| 10 | 2-Pentanone | 90 | 2.3543 | 159911656 | 1.78% |
| 11 | Propanal, 2,2-dimethyl- | 40 | 2.4697 | 275095035 | 3.07% |
| 12 | Cyclopentene, 4,4-dimethyl- | 49 | 2.504 | 18818962 | 0.21% |
| 13 | 1,3,5-Hexatriene, 3-methyl-, (Z)- | 93 | 3.0128 | 60082323 | 0.67% |
| 14 | 1,3,5-Hexatriene, 3-methyl-, (Z)- | 94 | 3.0683 | 13841706 | 0.15% |
| 15 | Cyclopentane, 1,3-bis(methylene)- | 90 | 3.1197 | 13495983 | 0.15% |
| 16 | 3-Pentanone, 2-methyl- | 59 | 3.1581 | 170764586 | 1.90% |
| 17 | 2-Pentanone, 3-methyl- | 68 | 3.1881 | 86664646 | 0.97% |
| 18 | Cyclopentane, ethylidene- | 91 | 3.2265 | 34401485 | 0.38% |
| 19 | Toluene | 93 | 3.4018 | 37998768 | 0.42% |
| 20 | Cyclohexene, 4-methyl- | 90 | 3.4446 | 24664642 | 0.27% |
| 21 | 3-Hexanone | 72 | 3.7182 | 176313453 | 1.97% |
| 22 | Oxirane, 2-methyl-2-(1-methylethyl)- | 64 | 3.7995 | 145693105 | 1.62% |
| 23 | 3-Methylene-cyclohexene | 87 | 3.9876 | 33221503 | 0.37% |

TABLE A15-continued

GC-MS results for the decomposition of glycerol at 500° C. in supercritical water over zirconium dioxide.

| Peak # | Peak Name | % Probability | RT | Area | % of Total |
|---|---|---|---|---|---|
| 24 | Cyclopentene, 1,2,3-trimethyl- | 87 | 4.1415 | 18625610 | 0.21% |
| 25 | Octa-2,4,6-triene | 93 | 4.6375 | 20233263 | 0.23% |
| 26 | Methyl ethyl cyclopentene | 50 | 4.6845 | 22555385 | 0.25% |
| 27 | 3-Hexanone, 2-methyl- | 58 | 4.7016 | 37166463 | 0.41% |
| 28 | Cyclopentanone, 2-methyl- | 81 | 4.7615 | 151118351 | 1.68% |
| 29 | 2,4,6-Octatriene, all-E- | 91 | 4.8171 | 51940834 | 0.58% |
| 30 | 2-Hexanone, 3-methyl- | 30 | 4.8812 | 138653956 | 1.55% |
| 31 | 1,3-Cyclohexadiene, 5,6-dimethyl- | 90 | 5.1506 | 24903318 | 0.28% |
| 32 | Ethylbenzene | 90 | 5.1976 | 26608910 | 0.30% |
| 33 | Cyclopentene, 1,2-dimethyl-4-methylene- | 91 | 5.2831 | 33535080 | 0.37% |
| 34 | Benzene, 1,3-dimethyl- | 95 | 5.3601 | 56270909 | 0.63% |
| 35 | 1-Methoxycyclohexane | 53 | 5.4541 | 34220175 | 0.38% |
| 36 | Cyclopentanone, 2,5-dimethyl- | 95 | 5.6551 | 21245195 | 0.24% |
| 37 | 3-Heptanone | 80 | 5.7619 | 116366363 | 1.30% |
| 38 | 2-Heptanone | 49 | 5.8517 | 43900707 | 0.49% |
| 39 | Benzene, 1,2-dimethyl- | 86 | 5.8774 | 54029234 | 0.60% |
| 40 | Cyclohexanone, 3-methyl- | 50 | 6.0014 | 24323022 | 0.27% |
| 41 | Cyclopentene, 3-ethylidene-1-methyl- | 94 | 6.0741 | 32622249 | 0.36% |
| 42 | Cyclopentene, 3-ethylidene-1-methyl- | 94 | 6.1083 | 39608668 | 0.44% |
| 43 | 2-Cyclopenten-1-one, 2-methyl- | 90 | 6.2023 | 19773072 | 0.22% |
| 44 | Cyclopentene,1-(2-propenyl)- | 43 | 6.2451 | 21995408 | 0.25% |
| 45 | 2-Cyclopenten-1-one, 2-methyl- | 93 | 6.2836 | 51182079 | 0.57% |
| 46 | 3,3-Dimethyl-6-methylenecyclohexene | 90 | 6.6555 | 18446988 | 0.21% |
| 47 | Ethanone, 1-cyclopentyl- | 93 | 6.7069 | 82519120 | 0.92% |
| 48 | Spiro[4.4]non-1-ene | 35 | 6.7667 | 37925517 | 0.42% |
| 49 | Cyclopentanone, 2-ethyl- | 81 | 6.8993 | 116392620 | 1.30% |
| 50 | 1,3-Cyclopentadiene, 5,5-dimethyl-1-ethyl- | 50 | 7.0147 | 28851155 | 0.32% |
| 51 | 1,6-Dimethylhepta-1,3,5-triene | 83 | 7.0916 | 99567873 | 1.11% |
| 52 | Silane, (4-methylphenyl)- | 27 | 7.2627 | 20646835 | 0.23% |
| 53 | Benzene, 1-ethyl-2-methyl- | 94 | 7.4337 | 42101597 | 0.47% |
| 54 | 1,3-Cyclopentadiene, 5,5-dimethyl-2-ethyl- | 93 | 7.5962 | 18433508 | 0.21% |
| 55 | 4-Octanone | 93 | 7.7202 | 15384943 | 0.17% |
| 56 | Benzene, 1-ethyl-2-methyl- | 86 | 7.8527 | 12176679 | 0.14% |
| 57 | Phenol | 93 | 8.0537 | 448357881 | 5.00% |
| 58 | 3-Octanone | 38 | 8.1477 | 40447563 | 0.45% |
| 59 | Benzene, ethenylmethyl- | 91 | 8.1948 | 22508683 | 0.25% |
| 60 | Cyclohexene, 1,2-dimethyl- | 76 | 8.3786 | 45249701 | 0.50% |
| 61 | Bicyclo[3.1.0]hexane, 6-isopropylidene- | 70 | 8.4812 | 62141197 | 0.69% |
| 62 | 1,3-Cyclopentadiene, 5,5-dimethyl-2-ethyl- | 93 | 8.6608 | 37939860 | 0.42% |
| 63 | Furan, 2,3-dihydro-3-(1-methylpropyl)- | 53 | 8.8532 | 43456746 | 0.48% |
| 64 | 1,3-Cyclopentadiene, 5,5-dimethyl-2-propyl- | 45 | 9.0028 | 18247561 | 0.20% |
| 65 | Benzene, cyclopropyl- | 64 | 9.1012 | 69139770 | 0.77% |
| 66 | Furan, 2,3-dihydro-4-methyl- | 46 | 9.2166 | 57362157 | 0.64% |
| 67 | Benzene, 1-propynyl- | 94 | 9.3107 | 29701111 | 0.33% |
| 68 | 2-Cyclopenten-1-one, 2,3-dimethyl- | 64 | 9.4518 | 18981775 | 0.21% |
| 69 | 2-Cyclopenten-1-one, 2,3-dimethyl- | 64 | 9.486 | 35632733 | 0.40% |
| 70 | Phenol, 2-methyl- | 95 | 9.7211 | 949156871 | 10.58% |
| 71 | 2-Cyclopenten-1-one, 2,3,4-trimethyl- | 93 | 9.8793 | 57702723 | 0.64% |
| 72 | Acetophenone | 93 | 9.9392 | 35210313 | 0.39% |
| 73 | Phenol, 3-methyl- | 93 | 10.1359 | 200058163 | 2.23% |
| 74 | Indan, 1-methyl- | 70 | 10.2513 | 55623506 | 0.62% |

TABLE A15-continued

GC-MS results for the decomposition of glycerol at 500° C. in supercritical water over zirconium dioxide.

| Peak # | Peak Name | % Probability | RT | Area | % of Total |
|---|---|---|---|---|---|
| 75 | 2-Cyclopenten-1-one, 2-pentyl- | 53 | 10.4095 | 29479406 | 0.33% |
| 76 | 2-Cyclopenten-1-one, 2,3,4-trimethyl- | 87 | 10.4437 | 47176740 | 0.53% |
| 77 | 4,7-Methano-1H-indene, octahydro- | 78 | 10.5848 | 20222665 | 0.23% |
| 78 | Phenol, 2,6-dimethyl- | 93 | 10.7558 | 191958719 | 2.14% |
| 79 | Benzene, (1-methyl-1-propenyl)-, (E)- | 89 | 11.2646 | 696077 | 0.01% |
| 80 | Benzene, 2-butenyl- | 64 | 11.41 | 31493857 | 0.35% |
| 81 | Phenol, 2-ethyl- | 94 | 11.4656 | 311978278 | 3.48% |
| 82 | 1H-Indene, 3-methyl- | 95 | 11.6195 | 70286008 | 0.78% |
| 83 | Phenol, 2,4-dimethyl- | 97 | 11.7007 | 235622333 | 2.63% |
| 84 | 2-Methoxy-5-methylphenol | 58 | 11.7948 | 29787524 | 0.33% |
| 85 | 1H-Pyrazole, 1,3,5-trimethyl- | 49 | 11.8247 | 18887501 | 0.21% |
| 86 | 1-Propanone, 1-phenyl- | 64 | 12.0342 | 17654486 | 0.20% |
| 87 | Phenol, 2-ethyl- | 81 | 12.0727 | 25950441 | 0.29% |
| 88 | Phenol, 3-ethyl- | 94 | 12.124 | 74045943 | 0.83% |
| 89 | Phenol, 2,6-dimethyl- | 81 | 12.1625 | 18372117 | 0.20% |
| 90 | Ethanone, 1-(3-methylphenyl)- | 95 | 12.2095 | 36921975 | 0.41% |
| 91 | Phenol, 2,3-dimethyl- | 96 | 12.2907 | 84252888 | 0.94% |
| 92 | Phenol, 2-ethyl-5-methyl- | 91 | 12.4019 | 114022565 | 1.27% |
| 93 | 2-Ethyl-2,3-dihydro-1H-indene | 43 | 12.5516 | 47596737 | 0.53% |
| 94 | Phenol, 3,4-dimethyl- | 64 | 12.6328 | 68594366 | 0.76% |
| 95 | Phenol, 2,4,6-trimethyl- | 93 | 12.8124 | 38383737 | 0.43% |
| 96 | 1H-Benzimidazole, 5,6-dimethyl- | 64 | 12.8851 | 32351462 | 0.36% |
| 97 | Phenol, 4-propyl- | 56 | 13.1844 | 103241581 | 1.15% |
| 98 | Bicyclo[4.1.0]heptane, 3,7,7-trimethyl-, [1S-(1.alpha.,3.beta.,6.alpha.)]- | 70 | 13.2656 | 29754090 | 0.33% |
| 99 | Phenol, 2-ethyl-5-methyl- | 90 | 13.3169 | 47205219 | 0.53% |
| 100 | Phenol, 2-ethyl-6-methyl- | 90 | 13.3853 | 77636902 | 0.87% |
| 101 | Phenol, 2-ethyl-6-methyl- | 91 | 13.5264 | 61927143 | 0.69% |
| 102 | Phenol, 3-ethyl-5-methyl- | 87 | 13.6162 | 51762522 | 0.58% |
| 103 | 1H-Indene, 1,3-dimethyl- | 89 | 13.8086 | 19277637 | 0.21% |
| 104 | Benzene, 1-ethyl-4-methoxy- | 53 | 13.9582 | 90706667 | 1.01% |
| 105 | 2-Methyl-6-propylphenol | 70 | 14.0737 | 50932230 | 0.57% |
| 106 | Phenol, 3,4,5-trimethyl- | 76 | 14.1036 | 54909256 | 0.61% |
| 107 | Isobutyrophenone | 87 | 14.1934 | 68722927 | 0.77% |
| 108 | Thymol | 81 | 14.3046 | 10786793 | 0.12% |
| 109 | Ethanone, 1-(3,4-dimethylphenyl)- | 91 | 14.3516 | 29836980 | 0.33% |
| 110 | Phenol, 2,4,6-trimethyl- | 76 | 14.792 | 17612340 | 0.20% |
| 111 | Naphthalene, 1,2,3,4-tetrahydro-6-methyl- | 56 | 14.9074 | 40110393 | 0.45% |
| 112 | 2,5-Diethylphenol | 90 | 14.9758 | 13697710 | 0.15% |
| 113 | Phenol, 4-(1-methylpropyl)- | 64 | 15.0271 | 15646496 | 0.17% |
| 114 | Benzaldehyde, 4-ethyl- | 70 | 15.0955 | 77874274 | 0.87% |
| 115 | 1H-Inden-1-ol, 2,3-dihydro- | 86 | 15.5231 | 52254948 | 0.58% |
| 116 | Phenol, 2,3,5,6-tetramethyl- | 64 | 15.6257 | 25597897 | 0.29% |
| 117 | Phenol, 2,3,5,6-tetramethyl- | 50 | 15.6642 | 24880383 | 0.28% |
| 118 | Ethanone, 1-(3,4-dimethylphenyl)- | 60 | 15.7241 | 22944346 | 0.26% |
| 119 | Ethanone, 1-(2,4-dimethylphenyl)- | 35 | 15.878 | 48759763 | 0.54% |
| 120 | Phenol, 2,3,5,6-tetramethyl- | 60 | 15.9421 | 24782597 | 0.28% |
| 121 | 1,2,3-Trimethylindene | 60 | 16.1516 | 23252089 | 0.26% |
| 122 | 6-Methyl-4-indanol | 74 | 16.3782 | 41626430 | 0.46% |
| 123 | Ethanone, 1-(3,4-dimethylphenyl)- | 46 | 16.4637 | 38146998 | 0.43% |
| 124 | 2-Propanamine, N-(phenylmethylene)- | 55 | 16.7245 | 20310916 | 0.23% |
| 125 | 6-Methyl-4-indanol | 93 | 16.9169 | 23560576 | 0.26% |
| 126 | 6-Methyl-4-indanol | 81 | 16.9725 | 65122189 | 0.73% |
| 127 | Phenol, p-(2-methylallyl)- | 55 | 17.1435 | 20610489 | 0.23% |

TABLE A15-continued

GC-MS results for the decomposition of glycerol at 500° C. in supercritical water over zirconium dioxide.

| Peak # | Peak Name | % Probability | RT | Area | % of Total |
|---|---|---|---|---|---|
| 128 | 1H-Inden-1-ol, 2,3-dihydro-2-methyl- | 55 | 17.2205 | 71671324 | 0.80% |
| 129 | Benzene, hexamethyl- | 68 | 17.4556 | 24861329 | 0.28% |
| 130 | 6-Methyl-4-indanol | 90 | 17.5155 | 37477749 | 0.42% |
| 131 | benzene, hexamethyl- | 70 | 17.6053 | 21156545 | 0.24% |
| 132 | Benzene, 1-methoxy-4-(1-methyl-2-propenyl)- | 64 | 17.7207 | 32920600 | 0.37% |
| 133 | Benzene, 1-methoxy-4-(1-methyl-2-propenyl)- | 83 | 17.8062 | 15380359 | 0.17% |
| 134 | Benzene, 1,2-diethyl-4,5-dimethyl- | 74 | 18.345 | 25333142 | 0.28% |
| 135 | Pyrazine, trimethyl-1-propenyl-, (Z)- | 58 | 19.1317 | 27906477 | 0.31% |
| 136 | 1,3,5-Cycloheptatriene, 2,4-diethyl-7,7-dimethyl- | 60 | 20.098 | 20060237 | 0.22% |
| 137 | 1-Naphthalenol, 2-methyl- | 64 | 20.3631 | 17024482 | 0.19% |
| 138 | 1-Naphthalenol, 2-methyl- | 58 | 20.4272 | 11763181 | 0.13% |
| 139 | 1-Naphthalenol, 2-methyl- | 35 | 20.8462 | 34444468 | 0.38% |
| 140 | Naphthalene, 1,2,3,4-tetrahydro-1,5,7-trimethyl- | 64 | 20.9574 | 23707683 | 0.26% |

TABLE A19

GC-MS results for the decomposition of oleic at 500° C. in supercritical water over zirconium dioxide.

| Peak # | Peak Name | % Probability | RT | Area | % of Total |
|---|---|---|---|---|---|
| 1 | 2-Cyclopenten-1-one, 5-hydroxy-2,3-dimethyl- | 50 | 1.288 | 20848003 | 0.11% |
| 2 | 1-Pentene | 68 | 1.401 | 60079414 | 0.31% |
| 3 | 1-Hexene | 91 | 1.682 | 137923603 | 0.71% |
| 4 | Cyclopentene, 1-methyl- | 90 | 2.063 | 29625271 | 0.15% |
| 5 | Cyclohexene | 93 | 2.308 | 21023520 | 0.11% |
| 6 | 1-Heptene | 96 | 2.392 | 116302998 | 0.60% |
| 7 | Heptane | 91 | 2.481 | 70468318 | 0.36% |
| 8 | Cyclohexane, methyl- | 93 | 2.771 | 25490040 | 0.13% |
| 9 | Cyclohexene, 1-methyl- | 90 | 3.461 | 45924650 | 0.24% |
| 10 | 1-Octene | 97 | 3.812 | 75414732 | 0.39% |
| 11 | Octane | 94 | 3.966 | 43749797 | 0.23% |
| 12 | 1-Nonene | 97 | 5.855 | 70489887 | 0.36% |
| 13 | Nonane | 91 | 6.041 | 27427034 | 0.14% |
| 14 | Cyclopentene, 1-butyl- | 74 | 7.114 | 24107294 | 0.12% |
| 15 | 2-Octanone | 45 | 8.13 | 77694939 | 0.40% |
| 16 | Decane | 93 | 8.316 | 35692083 | 0.18% |
| 17 | 4-Decene | 95 | 8.452 | 53411179 | 0.27% |
| 18 | Cyclopentene, 1-pentyl- | 74 | 9.388 | 31214621 | 0.16% |
| 19 | Cyclodecene, (Z)- | 93 | 9.789 | 19101413 | 0.10% |
| 20 | 1-Undecene | 97 | 10.374 | 111868177 | 0.58% |
| 21 | 3-Undecene, (E)- | 90 | 10.504 | 24198976 | 0.12% |
| 22 | Undecane | 70 | 10.558 | 29419137 | 0.15% |
| 23 | 5-Undecene | 98 | 10.68 | 99398410 | 0.51% |
| 24 | 5-Undecene, (E)- | 94 | 10.864 | 44970006 | 0.23% |
| 25 | Cyclodecene, (E)- | 80 | 11.114 | 30631826 | 0.16% |
| 26 | Pentylidenecyclohexane | 72 | 11.451 | 51902641 | 0.27% |
| 27 | Pentylidenecyclohexane | 72 | 11.655 | 62796825 | 0.32% |
| 28 | Undeca-2E,4E-diene | 95 | 11.753 | 55068126 | 0.28% |
| 29 | Undeca-2E,4E-diene | 96 | 11.874 | 62102002 | 0.32% |
| 30 | 1-Dodecene | 95 | 12.51 | 108293821 | 0.56% |
| 31 | 2-Dodecene, (Z)- | 96 | 12.792 | 18638972 | 0.10% |
| 32 | Cyclodecene, (Z)- | 87 | 13.208 | 40694731 | 0.21% |
| 33 | 5,7-Dodecadiene, (E,E)- | 52 | 13.476 | 54626514 | 0.28% |
| 34 | 7-Hexadecyne | 59 | 13.587 | 15202926 | 0.08% |
| 35 | 5,7-Dodecadiene, (E,E)- | 68 | 13.666 | 42462388 | 0.22% |
| 36 | 2,4-Dodecadiene, (E,Z)- | 87 | 13.822 | 65028241 | 0.33% |
| 37 | 2,4-Dodecadiene, (E,Z)- | 90 | 13.922 | 47156330 | 0.24% |
| 38 | 2-Tridecene, (E)- | 93 | 14.526 | 23754715 | 0.12% |
| 39 | 4-Cyclononen-1-one | 76 | 15.184 | 29387384 | 0.15% |
| 40 | Cyclopentene, 1-octyl- | 95 | 15.697 | 14950213 | 0.08% |
| 41 | (8E,10E)-Dodecadienal | 72 | 15.757 | 14014599 | 0.07% |

TABLE A19-continued

GC-MS results for the decomposition of oleic at 500° C. in supercritical water over zirconium dioxide.

| Peak # | Peak Name | % Probability | RT | Area | % of Total |
|---|---|---|---|---|---|
| 42 | 2-Tetradecene, (E)- | 98 | 16.423 | 29750031 | 0.15% |
| 43 | Phenol, 4-pentyl- | 64 | 16.957 | 23125469 | 0.12% |
| 44 | Cyclopentene, 1-pentyl- | 68 | 17.575 | 43068445 | 0.22% |
| 45 | Cyclohexene, 1-octyl- | 90 | 17.79 | 32253708 | 0.17% |
| 46 | 2-n-Hexylphenol | 78 | 18.216 | 30049154 | 0.15% |
| 47 | Heptylcyclohexane | 70 | 18.725 | 53839533 | 0.28% |
| 48 | Cycloundecene, 1-methyl- | 83 | 19.241 | 42278056 | 0.22% |
| 49 | Cyclododecanemethanol | 46 | 19.323 | 30291538 | 0.16% |
| 50 | Z-1,6-Tridecadiene | 94 | 19.503 | 30223652 | 0.16% |
| 51 | 5-Nonadecen-1-ol | 91 | 19.608 | 134224489 | 0.69% |
| 52 | 1-Hexadecene | 96 | 19.682 | 120097089 | 0.62% |
| 53 | Cyclopentane, 1,1,3-trimethyl- | 38 | 19.917 | 41329284 | 0.21% |
| 54 | 9-Eicosyne | 91 | 20.004 | 21691426 | 0.11% |
| 55 | Naphthalene, decahydro-, cis- | 89 | 21.172 | 52095979 | 0.27% |
| 56 | 8-Heptadecene | 98 | 21.276 | 71655533 | 0.37% |
| 57 | 1,9-Tetradecadiene | 48 | 21.378 | 36362097 | 0.19% |
| 58 | 2-Heptadecanone | 94 | 21.637 | 21636912 | 0.11% |
| 59 | n-Hexadecanoic acid | 97 | 24.644 | 33180227 | 0.17% |
| 60 | 4-Nonylphenol | 41 | 25.566 | 31534562 | 0.16% |
| 61 | (2-Acetyl-5-methyl-cyclopentyl)-acetic acid | 49 | 26.847 | 83931822 | 0.43% |
| 62 | (2-Acetyl-5-methyl-cyclopentyl)-acetic acid | 46 | 27.115 | 671281363 | 3.45% |
| 63 | 2-Nonadecanone | 99 | 27.222 | 783104573 | 4.02% |
| 64 | (3,7-Dimethylocta-2,6-dienylthio)benzene | 41 | 27.412 | 108583010 | 0.56% |
| 65 | d-Tyrosine | 38 | 27.768 | 66956757 | 0.34% |
| 66 | 9-Octadecenoic acid, (E)- | 99 | 27.87 | 95647090 | 0.49% |
| 67 | 1-Nonadecene | 38 | 28.112 | 708214988 | 3.64% |
| 68 | E,E,Z-1,3,12-Nonadecatriene-5,14-diol | 60 | 28.285 | 205730039 | 1.06% |
| 69 | 3-Eicosanone | 53 | 28.376 | 166852249 | 0.86% |
| 70 | 1-Propen-3-imine, N-cyclohexyl-, N-oxide | 30 | 28.604 | 22980595 | 0.12% |
| 71 | Cyclopropane, 1-(1-hydroxy-1-heptyl)-2-methylene-3-pentyl- | 43 | 29.399 | 37441482 | 0.19% |
| 72 | 12-Methyl-E,E-2,13-octadecadien-1-ol | 50 | 30.57 | 77260089 | 0.40% |
| 73 | 1-Pentacosanol | 38 | 31.695 | 158820834 | 0.82% |
| 74 | Cyclohexane, 1,1'-dodecylidenebis[4-methyl- | 42 | 32.733 | 130353666 | 0.67% |
| 75 | 1-Hexacosene | 40 | 32.793 | 133610143 | 0.69% |
| 76 | 1-Cyclohexylnonene | 91 | 33.831 | 105227283 | 0.54% |
| 77 | [1,2'-Binaphthalene]-5,5',8,8'-tetrone, 1',4-dihydroxy-2,3'-dimethyl-, (−)- | 38 | 34.808 | 64103614 | 0.33% |
| 78 | Cyclohexaneethanol, 4-methyl-.beta.-methylene-, trans- | 30 | 35.837 | 55096051 | 0.28% |
| 79 | Anthracene, 9,10-dihydro-9,9,10-trimethyl- | 27 | 36.804 | 58221067 | 0.30% |
| 80 | 2-Butoxy-6-(4-nitro-phenyl)-naphthalene | 38 | 40.39 | 27198637 | 0.14% |
| 81 | E-11-Methyl-12-tetradecen-1-ol acetate | 25 | 41.197 | 291613012 | 1.50% |
| 82 | Cyclopropaneundecanal, 2-nonyl- | 45 | 41.32 | 58611252 | 0.30% |
| 83 | 2,4-Cyclohexadien-1-one, 3,5-bis(1,1-dimethylethyl)-4-hydroxy- | 30 | 42.01 | 363789452 | 1.87% |
| 84 | Butanedioic acid, (triphenylphosphoranylidene)-, dimethyl ester | 38 | 42.204 | 136162754 | 0.70% |

TABLE A19-continued

GC-MS results for the decomposition of oleic at 500° C. in supercritical water over zirconium dioxide.

| Peak # | Peak Name | % Probability | RT | Area | % of Total |
|---|---|---|---|---|---|
| 85 | 9,26-Pentatriacontadien-18-one | 90 | 42.931 | 11290126433 | 57.98% |
| 86 | 1,3-Bis(trimethylsilyl)benzene | 25 | 43.358 | 417045308 | 2.14% |
| 87 | 1,3-Bis(trimethylsilyl)benzene | 89 | 43.642 | 183428184 | 0.94% |

TABLE A21

Reaction conditions for the reaction of soybean oil with superheated water.

| Exp. No. | Oil Type | Catalyst Type | Particle Size, Pore size, Surface Area | Preheater Temperature Setting point (° C.) | Reactor Inlet Temp. (° C.), T2 | Back Pressure (PSI) |
|---|---|---|---|---|---|---|
| 301 | Lecithin | Zirconia | 10 um/300 A/ 30 m^2/g | 500 | 500 | 3500 |
| 302 | Lecithin/Hexane | Zirconia | 10 um/300 A/ 30 m^2/g | 500 | 500 | 3500 |
| 303 | Lecithin/Hexane | Zirconia | 10 um/300 A/ 30 m^2/g | 500 | 500 | 3500 |
| 304 | Corn Oil | Zirconia | 10 um/300 A/ 30 m^2/g | 500 | 500 | 3500 |
| 305 | Corn Oil | Zirconia | 10 um/300 A/ 30 m^2/g | 500 | 500 | 3500 |
| 306 | Corn Oil | Zirconia | 10 um/300 A/ 30 m^2/g | 500 | 500 | 3500 |
| 307 | Corn Oil | Zirconia | 10 um/300 A/ 30 m^2/g | 500 | 500 | 3500 |
| 308 | Corn Oil | Zirconia | 10 um/300 A/ 30 m^2/g | 500 | 500 | 3500 |
| 309 | 10% Glucose | Zirconia | 10 um/300 A/ 30 m^2/g | 412 | 405 | 3400 |
| 310 | 10% Glucose | Zirconia | 10 um/300 A/ 30 m^2/g | 412 | 414 | 3500 |
| 311 | 10% Glucose | Zirconia | 10 um/300 A/ 30 m^2/g | 410 | 409 | 3500 |
| 312 | Corn Oil | Zirconia | 10 um/300 A/ 30 m^2/g | 550 | 547 | 3500 |
| 313 | Corn Oil | Zirconia | 10 um/300 A/ 30 m^2/g | 550 | 556 | 3500 |
| 314 | Corn Oil | Zirconia | 10 um/300 A/ 30 m^2/g | 550 | 550 | 3500 |
| 315 | Corn Oil | Zirconia | 10 um/300 A/ 30 m^2/g | 550 | 550 | 3500 |
| 316 | Corn Oil | Zirconia | 10 um/300 A/ 30 m^2/g | 550 | 550 | 3500 |
| 317 | Corn Oil | Zirconia | 10 um/300 A/ 30 m^2/g | 550 | 550 | 3500 |
| 318 | Oleic Acid | Zirconia | 10 um/300 A/ 30 m^2/g | 558 | 553 | 3500 |
| 319 | Oleic Acid | Zirconia | 10 um/300 A/ 30 m^2/g | 558 | 556 | 3500 |
| 320 | Oleic Acid | Zirconia | 10 um/300 A/ 30 m^2/g | 553 | 552 | 3500 |
| 321 | Oleic Acid | Zirconia | 10 um/300 A/ 30 m^2/g | 553 | 552 | 3500 |
| 322 | Oleic Acid | Zirconia | 10 um/300 A/ 30 m^2/g | 553 | 552 | 3500 |
| 323 | Oleic Acid | Zirconia | 10 um/300 A/ 30 m^2/g | 553 | 552 | 3500 |
| 324 | UCO-FS2012020 708 | Zirconia | 10 um/300 A/ 30 m^2/g | 500 | 500 | 3500 |
| 325 | UCO-FS2012020 709 | Zirconia | 10 um/300 A/ 30 m^2/g | 500 | 500 | 3500 |

TABLE A21-continued

Reaction conditions for the reaction of soybean oil with superheated water.

| Exp. No. | Oil Type | Catalyst Type | Particle Size, Pore size, Surface Area | Preheater Temperature Setting point (° C.) | Reactor Inlet Temp. (° C.), T2 | Back Pressure (PSI) |
|---|---|---|---|---|---|---|
| 326 | UCO-FS2012020710 | Zirconia | 10 um/300 A/ 30 m^2/g | 500 | 500 | 3500 |
| 327 | UCO-FS2012020711 | Zirconia | 10 um/300 A/ 30 m^2/g | 500 | 500 | 3500 |
| 328 | UCO-FS2012020708 | Zirconia | 10 um/300 A/ 30 m^2/g | 550 | 550 | 3500 |
| 329 | UCO-FS2012020709 | Zirconia | 10 um/300 A/ 30 m^2/g | 550 | 550 | 3500 |
| 330 | UCO-FS2012020710 | Zirconia | 10 um/300 A/ 30 m^2/g | 550 | 550 | 3500 |
| 331 | UCO-FS2012020711 | Zirconia | 10 um/300 A/ 30 m^2/g | 550 | 550 | 3500 |
| 332 | Soybean | Zirconia | 10 um/300 A/ 30 m^2/g | 518 | 516 | 3500 |
| 333 | Soybean | Zirconia | 10 um/300 A/ 30 m^2/g | 518 | 516 | 3500 |
| 334 | Soybean | Zirconia | 10 um/300 A/ 30 m^2/g | 517 | 515 | 3500 |
| 335 | Soybean | Zirconia | 10 um/300 A/ 30 m^2/g | 517 | 515 | 3500 |
| 336 | Soybean | Zirconia | 10 um/300 A/ 30 m^2/g | 517 | 515 | 3500 |
| 337 | Soybean | Zirconia | 10 um/300 A/ 30 m^2/g | 517 | 515 | 3500 |
| 338 | Soybean | Zirconia | 10 um/300 A/ 30 m^2/g | 517 | 515 | 3500 |
| 339 | Soybean | Zirconia | 10 um/300 A/ 30 m^2/g | 517 | 515 | 3500 |
| 340 | Soybean | Zirconia | 10 um/300 A/ 30 m^2/g | 518 | 518 | 3500 |
| 341 | Soybean | Zirconia | 10 um/300 A/ 30 m^2/g | 518 | 518 | 3500 |
| 342 | Soybean | Zirconia | 10 um/300 A/ 30 m^2/g | 518 | 518 | 3500 |
| 343 | Soybean | Zirconia | 10 um/300 A/ 30 m^2/g | 518 | 518 | 3500 |
| 344 | Soybean | Zirconia | 10 um/300 A/ 30 m^2/g | 521 | 512 | 3500 |
| 345 | Soybean | Zirconia | 10 um/300 A/ 30 m^2/g | 518 | 514 | 3500 |
| 346 | Soybean | Zirconia | 10 um/300 A/ 30 m^2/g | 518 | 514 | 3500 |
| 347 | Soybean | Zirconia | 10 um/300 A/ 30 m^2/g | 521 | 519 | 3500 |
| 348 | Soybean | Zirconia | 10 um/300 A/ 30 m^2/g | 521 | 519 | 3500 |
| 349 | Soybean | Zirconia | 10 um/300 A/ 30 m^2/g | 521 | 519 | 3500 |
| 350 | Soybean | Zirconia | 10 um/300 A/ 30 m^2/g | 518 | 518 | 3500 |
| 351 | Soybean | Zirconia | 10 um/300 A/ 30 m^2/g | 518 | 518 | 3500 |
| 352 | Soybean | Zirconia | 10 um/300 A/ 30 m^2/g | 518 | 518 | 3500 |
| 353 | Soybean | Zirconia | 10 um/300 A/ 30 m^2/g | 518 | 518 | 3500 |
| 354 | Soybean | Zirconia | 10 um/300 A/ 30 m^2/g | 518 | 518 | 3500 |
| 355 | Soybean | Zirconia | 10 um/300 A/ 30 m^2/g | 518 | 514 | 3600 |
| 356 | Soybean | Zirconia | 10 um/300 A/ 30 m^2/g | 518 | 514 | 3600 |
| 357 | Soybean | Zirconia | 10 um/300 A/ 30 m^2/g | 518 | 514 | 3600 |
| 358 | Soybean | Zirconia | 10 um/300 A/ 30 m^2/g | 518 | 514 | 3600 |

TABLE A21-continued

Reaction conditions for the reaction of soybean oil with superheated water.

| Exp. No. | Oil Type | Catalyst Type | Particle Size, Pore size, Surface Area | Preheater Temperature Setting point (° C.) | Reactor Inlet Temp. (° C.), T2 | Back Pressure (PSI) |
|---|---|---|---|---|---|---|
| 359 | Soybean | Zirconia | 10 um/300 A/ 30 m^2/g | 518 | 514 | 4000 |
| 360 | Soybean | Zirconia | 10 um/300 A/ 30 m^2/g | 518 | 515 | 3600 |
| 361 | Soybean | Zirconia | 10 um/300 A/ 30 m^2/g | 518 | 515 | 3600 |
| 362 | Soybean | Zirconia | 10 um/300 A/ 30 m^2/g | 521 | 516 | 3600 |
| 363 | Soybean | Zirconia | 10 um/300 A/ 30 m^2/g | 521 | 516 | 3600 |
| 364 | Soybean | Zirconia | 10 um/300 A/ 30 m^2/g | 525 | 520 | 3600 |
| 365 | Soybean | Zirconia | 10 um/300 A/ 30 m^2/g | 525 | 520 | 3600 |
| 366 | Soybean | Zirconia | 10 um/300 A/ 30 m^2/g | 536 | 526 | 3600 |
| 367 | Soybean | Zirconia | 10 um/300 A/ 30 m^2/g | 518 | 518 | 3500 |
| 368 | Soybean | Zirconia | 10 um/300 A/ 30 m^2/g | 518 | 518 | 3500 |
| 369 | Soybean | Zirconia | 10 um/300 A/ 30 m^2/g | 518 | 518 | 3500 |
| 370 | Soybean | Zirconia | 10 um/300 A/ 30 m^2/g | 518 | 518 | 3500 |
| 371 | Soybean | Zirconia | 10 um/300 A/ 30 m^2/g | 520 | 513 | 3600 |
| 372 | Soybean | Zirconia | 10 um/300 A/ 30 m^2/g | 520 | 513 | 3600 |
| 373 | Soybean | Zirconia | 10 um/300 A/ 30 m^2/g | 520 | 514 | 3600 |
| 374 | Soybean | Zirconia | 10 um/300 A/ 30 m^2/g | 520 | 514 | 3600 |
| 375 | Soybean | Zirconia | 10 um/300 A/ 30 m^2/g | 520 | 515 | 3600 |
| 376 | Soybean | Zirconia | 10 um/300 A/ 30 m^2/g | 520 | 515 | 3600 |
| 377 | Soybean | Zirconia | 10 um/300 A/ 30 m^2/g | 520 | 515 | 3600 |
| 378 | Soybean | Zirconia | 10 um/300 A/ 30 m^2/g | 522 | 515 | 3700 |
| 379 | Soybean | Zirconia | 10 um/300 A/ 30 m^2/g | 522 | 516 | 3700 |
| 380 | Soybean | Zirconia | 10 um/300 A/ 30 m^2/g | 528 | 520 | 3700 |
| 381 | Soybean | Zirconia | 10 um/300 A/ 30 m^2/g | 528 | 521 | 3700 |
| 382 | Soybean | Zirconia | 10 um/300 A/ 30 m^2/g | 532 | 525 | 3700 |
| 383 | Soybean | Zirconia | 10 um/300 A/ 30 m^2/g | 520 | 520 | 3500 |
| 384 | Soybean | Zirconia | 10 um/300 A/ 30 m^2/g | 520 | 520 | 3500 |
| 385 | Soybean | Zirconia | 10 um/300 A/ 30 m^2/g | 520 | 520 | 3500 |
| 386 | Soybean | Zirconia | 10 um/300 A/ 30 m^2/g | 520 | 520 | 3500 |
| 387 | Soybean | Zirconia | 10 um/300 A/ 30 m^2/g | 518 | 521 | 3600 |
| 388 | Soybean | Zirconia | 10 um/300 A/ 30 m^2/g | 515 | 522 | 3600 |
| 389 | Soybean | Zirconia | 10 um/300 A/ 30 m^2/g | 510 | 517 | 3600 |
| 390 | Soybean | Zirconia | 10 um/300 A/ 30 m^2/g | 510 | 517 | 3600 |
| 391 | Soybean | Zirconia | 10 um/300 A/ 30 m^2/g | 510 | 517 | 3600 |
| 392 | Soybean | Zirconia | 10 um/300 A/ 30 m^2/g | 510 | 516 | 3600 |
| 393 | Soybean | Zirconia | 10 um/300 A/ 30 m^2/g | 510 | 516 | 3600 |
| 394 | Soybean | Zirconia | 10 um/300 A/ 30 m^2/g | 520 | 520 | 3500 |

TABLE A21-continued

Reaction conditions for the reaction of soybean oil with superheated water.

| Exp. No. | Oil Type | Catalyst Type | Particle Size, Pore size, Surface Area | Preheater Temperature Setting point (° C.) | Reactor Inlet Temp. (° C.), T2 | Back Pressure (PSI) |
|---|---|---|---|---|---|---|
| 395 | Soybean | Zirconia | 10 um/300 A/ 30 m^2/g | 520 | 520 | 3500 |
| 396 | Soybean | Zirconia | 10 um/300 A/ 30 m^2/g | 520 | 520 | 3500 |
| 397 | Soybean | Zirconia | 10 um/300 A/ 30 m^2/g | 520 | 520 | 3500 |
| 398 | Soybean | Zirconia | 10 um/300 A/ 30 m^2/g | 525 | 525 | 3500 |
| 399 | Soybean | Zirconia | 10 um/300 A/ 30 m^2/g | 520 | 517 | 3500 |
| 400 | Soybean | Zirconia | 10 um/300 A/ 30 m^2/g | 516 | 517 | 3500 |
| 401 | Soybean | Zirconia | 10 um/300 A/ 30 m^2/g | 515 | 517 | 3500 |
| 402 | Soybean | Zirconia | 10 um/300 A/ 30 m^2/g | 515 | 516 | 3500 |
| 403 | Soybean | Zirconia | 10 um/300 A/ 30 m^2/g | 518 | 518 | 3500 |
| 404 | Soybean | Zirconia | 10 um/300 A/ 30 m^2/g | 518 | 518 | 3500 |
| 405 | Soybean | Zirconia | 10 um/300 A/ 30 m^2/g | 518 | 518 | 3500 |
| 406 | Soybean | Zirconia | 10 um/300 A/ 30 m^2/g | 518 | 518 | 3500 |
| 407 | Soybean | Zirconia | 10 um/300 A/ 30 m^2/g | 520 | 520 | 3500 |
| 408 | Soybean | Zirconia | 10 um/300 A/ 30 m^2/g | 520 | 520 | 3500 |
| 409 | Soybean | Zirconia | 10 um/300 A/ 30 m^2/g | 520 | 520 | 3500 |
| 410 | Soybean | Zirconia | 10 um/300 A/ 30 m^2/g | 520 | 520 | 3500 |
| 411 | Soybean | Zirconia | 10 um/300 A/ 30 m^2/g | 515 | 515 | 3500 |
| 412 | Soybean | Zirconia | 10 um/300 A/ 30 m^2/g | 515 | 515 | 3500 |
| 413 | Soybean | Zirconia | 10 um/300 A/ 30 m^2/g | 518 | 518 | 3500 |
| 414 | Soybean | Zirconia | 10 um/300 A/ 30 m^2/g | 518 | 518 | 3500 |
| 415 | Soybean | Zirconia | 10 um/300 A/ 30 m^2/g | 520 | 520 | 3500 |
| 416 | Soybean | Zirconia | 10 um/300 A/ 30 m^2/g | 520 | 520 | 3500 |
| 417 | Soybean | Zirconia | 10 um/300 A/ 30 m^2/g | 520 | 520 | 3500 |
| 418 | Soybean | Zirconia | 10 um/300 A/ 30 m^2/g | 520 | 520 | 3500 |
| 419 | Soybean | Zirconia | 10 um/300 A/ 30 m^2/g | 503 | 515 | 3500 |
| 420 | Soybean | Zirconia | 10 um/300 A/ 30 m^2/g | 505 | 514 | 3500 |
| 421 | Soybean | Zirconia | 10 um/300 A/ 30 m^2/g | 505 | 516 | 3500 |
| 422 | Soybean | Zirconia | 10 um/300 A/ 30 m^2/g | 505 | 515 | 3500 |
| 423 | Soybean | Zirconia | 10 um/300 A/ 30 m^2/g | 510 | 520 | 3500 |
| 424 | Soybean | Zirconia | 10 um/300 A/ 30 m^2/g | 510 | 520 | 3500 |
| 425 | Soybean | Zirconia | 10 um/300 A/ 30 m^2/g | 510 | 521 | 3500 |
| 426 | Soybean | Zirconia | 10 um/300 A/ 30 m^2/g | 513 | 527 | 3500 |
| 427 | Soybean | Zirconia | 10 um/300 A/ 30 m^2/g | 513 | 529 | 3500 |
| 428 | Soybean | Zirconia | 10 um/300 A/ 30 m^2/g | 516 | 531 | 3500 |
| 429 | Soybean | Zirconia | 10 um/300 A/ 30 m^2/g | 499 | 514 | 3500 |
| 430 | Soybean | Zirconia | 10 um/300 A/ 30 m^2/g | 499 | 514 | 3500 |

TABLE A21-continued

Reaction conditions for the reaction of soybean oil with superheated water.

| Exp. No. | Oil Type | Catalyst Type | Particle Size, Pore size, Surface Area | Preheater Temperature Setting point (° C.) | Reactor Inlet Temp. (° C.), T2 | Back Pressure (PSI) |
|---|---|---|---|---|---|---|
| 431 | Soybean | Zirconia | 10 um/300 A/ 30 m^2/g | 500 | 515 | 3500 |
| 432 | Soybean | Zirconia | 10 um/300 A/ 30 m^2/g | 500 | 515 | 3500 |
| 433 | Soybean | Zirconia | 10 um/300 A/ 30 m^2/g | 500 | 516 | 3500 |
| 434 | Bio-Oil/H2O Mix | Zirconia | 10 um/300 A/ 30 m^2/g | 515 | 515 | 3500 |
| 435 | Soybean | Zirconia | 10 um/300 A/ 30 m^2/g | 497 | 518 | 3500 |
| 436 | Soybean | Zirconia | 10 um/300 A/ 30 m^2/g | 497 | 518 | 3500 |
| 437 | Soybean | Zirconia | 10 um/300 A/ 30 m^2/g | 497 | 519 | 3500 |
| 438 | Soybean | Zirconia | 10 um/300 A/ 30 m^2/g | 499 | 522 | 3500 |
| 439 | Soybean | Zirconia | 10 um/300 A/ 30 m^2/g | 499 | 524 | 3500 |
| 440 | Soybean | Zirconia | 10 um/300 A/ 30 m^2/g | 503 | 527 | 3500 |
| 441 | Soybean | Zirconia | 10 um/300 A/ 30 m^2/g | 503 | 529 | 3500 |
| 442 | Bio-Oil/Soybean Mix | Zirconia | 10 um/300 A/ 30 m^2/g | 515 | 515 | 3500 |
| 443 | Bio-Oil/Soybean Mix | Zirconia | 10 um/300 A/ 30 m^2/g | 515 | 515 | 3500 |
| 444 | Bio-Oil/Soybean Mix | Zirconia | 10 um/300 A/ 30 m^2/g | 515 | 515 | 3500 |
| 445 | Bio-Oil/Soybean Mix | Zirconia | 10 um/300 A/ 30 m^2/g | 515 | 515 | 3500 |
| 446 | 70% Octanoic/30% Stearic | Zirconia | 10 um/300 A/ 30 m^2/g | 500 | 500 | 3500 |
| 447 | 70% Octanoic/30% Stearic | Zirconia | 10 um/300 A/ 30 m^2/g | 500 | 500 | 3500 |
| 448 | 70% Octanoic/30% Stearic | Zirconia | 10 um/300 A/ 30 m^2/g | 500 | 500 | 3500 |
| 449 | 70% Octanoic/30% Stearic | Zirconia | 10 um/300 A/ 30 m^2/g | 550 | 543 | 3500 |
| 450 | 70% Octanoic/30% Stearic | Zirconia | 10 um/300 A/ 30 m^2/g | 550 | 550 | 3500 |
| 451 | 70% Octanoic/30% Stearic | Zirconia | 10 um/300 A/ 30 m^2/g | 550 | 550 | 3500 |
| 452 | Octanoic Acid | Zirconia | 10 um/300 A/ 30 m^2/g | 510 | 496 | 3500 |
| 453 | Octanoic Acid | Zirconia | 10 um/300 A/ 30 m^2/g | 510 | 496 | 3500 |
| 454 | Octanoic Acid | Zirconia | 10 um/300 A/ 30 m^2/g | 511 | 500 | 3500 |
| 455 | Octanoic Acid | Zirconia | 10 um/300 A/ 30 m^2/g | 511 | 500 | 3500 |
| 456 | Octanoic Acid | Zirconia | 10 um/300 A/ 30 m^2/g | 511 | 500 | 3500 |
| 457 | Octanoic Acid | Zirconia | 10 um/300 A/ 30 m^2/g | 560 | 551 | 3500 |
| 458 | Octanoic Acid | Zirconia | 10 um/300 A/ 30 m^2/g | 554 | 550 | 3500 |
| 459 | Octanoic Acid | Zirconia | 10 um/300 A/ 30 m^2/g | 553 | 551 | 3500 |
| 460 | Octanoic Acid | Zirconia | 10 um/300 A/ 30 m^2/g | 552 | 550 | 3500 |
| 461 | Octanoic Acid | Zirconia | 10 um/300 A/ 30 m^2/g | 552 | 550 | 3500 |

TABLE A21-continued

Reaction conditions for the reaction of soybean oil with superheated water.

| Exp. No. | Oil Type | Catalyst Type | Particle Size, Pore size, Surface Area | Preheater Temperature Setting point (° C.) | Reactor Inlet Temp. (° C.), T2 | Back Pressure (PSI) |
|---|---|---|---|---|---|---|
| 462 | 25% Acetone/ 75% H2O | Zirconia | 10 um/300 A/ 30 m^2/g | 500 | 500 | 3500 |
| 463 | 25% Acetone/ 75% H2O | Zirconia | 10 um/300 A/ 30 m^2/g | 500 | 500 | 3500 |
| 464 | 25% Acetone/ 75% H2O | Zirconia | 10 um/300 A/ 30 m^2/g | 550 | 550 | 3500 |
| 465 | 25% Acetone/ 75% H2O | Zirconia | 10 um/300 A/ 30 m^2/g | 550 | 550 | 3500 |
| 466 | Acetone | Zirconia | 10 um/300 A/ 30 m^2/g | 410 | 395 | 3500 |
| 467 | 25% Acetone | Zirconia | 10 um/300 A/ 30 m^2/g | 414 | 397 | 3500 |
| 468 | 50% Acetone | Zirconia | 10 um/300 A/ 30 m^2/g | 414 | 400 | 3500 |
| 469 | 50% Acetone | Zirconia | 10 um/300 A/ 30 m^2/g | 414 | 402 | 3500 |
| 470 | 75% Acetone | Zirconia | 10 um/300 A/ 30 m^2/g | 409 | 401 | 3500 |
| 471 | Acetone | Zirconia | 10 um/300 A/ 30 m^2/g | 407 | 402 | 3500 |
| 472 | 25% Acetone | Zirconia | 10 um/300 A/ 30 m^2/g | 473 | 450 | 3500 |
| 473 | 50% Acetone | Zirconia | 10 um/300 A/ 30 m^2/g | 457 | 450 | 3500 |
| 474 | 75% Acetone | Zirconia | 10 um/300 A/ 30 m^2/g | 454 | 449 | 3500 |
| 475 | Acetone | Zirconia | 10 um/300 A/ 30 m^2/g | 453 | 450 | 3500 |
| 476 | Acetone | Zirconia | 10 um/300 A/ 30 m^2/g | 350 | 348 | 3500 |
| 477 | 90% Acetone | Zirconia | 10 um/300 A/ 30 m^2/g | 350 | 348 | 3500 |
| 478 | 95% Acetone | Zirconia | 10 um/300 A/ 30 m^2/g | 350 | 350 | 3500 |
| 479 | Acetone | Zirconia | 10 um/300 A/ 30 m^2/g | 350 | 362 | 3500 |
| 480 | Acetone | Zirconia | 10 um/300 A/ 30 m^2/g | 360 | 380 | 3500 |
| 481 | 95% Acetone | Zirconia | 10 um/300 A/ 30 m^2/g | 375 | 377 | 3500 |
| 482 | 90% Acetone | Zirconia | 10 um/300 A/ 30 m^2/g | 375 | 376 | 3500 |
| 483 | 3% Lecithin in Soybean | Zirconia | 10 um/300 A/ 30 m^2/g | 519 | 500 | 3500 |
| 484 | 3% Lecithin in Soybean | Zirconia | 10 um/300 A/ 30 m^2/g | 519 | 500 | 3500 |
| 485 | 1-Octanol | Zirconia | 10 um/300 A/ 30 m^2/g | 500 | 520 | 3500 |
| 486 | 1-Octanol | Zirconia | 10 um/300 A/ 30 m^2/g | 500 | 524 | 3500 |
| 487 | 1-Octanol | Zirconia | 10 um/300 A/ 30 m^2/g | 500 | 524 | 3500 |
| 488 | 1-Octanol | Zirconia | 10 um/300 A/ 30 m^2/g | 500 | 523 | 3600 |
| 489 | 1-Octanol | Zirconia | 10 um/300 A/ 30 m^2/g | 500 | 522 | 3600 |
| 490 | 1-Octanol | Zirconia | 10 um/300 A/ 30 m^2/g | 530 | 556 | 3600 |
| 491 | 1-Octanol | Zirconia | 10 um/300 A/ 30 m^2/g | 535 | 555 | 3600 |
| 492 | 1-Octanol | Zirconia | 10 um/300 A/ 30 m^2/g | 526 | 551 | 3600 |
| 493 | 1-Octanol | Zirconia | 10 um/300 A/ 30 m^2/g | 526 | 552 | 3700 |
| 494 | 1-Octanol | Zirconia | 10 um/300 A/ 30 m^2/g | 526 | 552 | 3700 |
| 495 | Ethanol | Zirconia | 10 um/300 A/ 30 m^2/g | 500 | 493 | 3500 |
| 496 | Ethanol | Zirconia | 10 um/300 A/ 30 m^2/g | 500 | 500 | 3500 |
| 497 | Ethanol | Zirconia | 10 um/300 A/ 30 m^2/g | 500 | 500 | 3500 |

TABLE A21-continued

Reaction conditions for the reaction of soybean oil with superheated water.

| Exp. No. | Oil Type | Catalyst Type | Particle Size, Pore size, Surface Area | Preheater Temperature Setting point (° C.) | Reactor Inlet Temp. (° C.), T2 | Back Pressure (PSI) |
|---|---|---|---|---|---|---|
| 498 | Ethanol | Zirconia | 10 um/300 A/ 30 m^2/g | 400 | 398 | 3500 |
| 499 | Ethanol | Zirconia | 10 um/300 A/ 30 m^2/g | 400 | 398 | 3500 |
| 500 | Ethanol | Zirconia | 10 um/300 A/ 30 m^2/g | 400 | 400 | 3500 |
| 501 | Acetic Acid | Zirconia | 10 um/300 A/ 30 m^2/g | 500 | 500 | 3500 |
| 502 | Acetic Acid | Zirconia | 10 um/300 A/ 30 m^2/g | 500 | 500 | 3500 |
| 503 | Acetic Acid | Zirconia | 10 um/300 A/ 30 m^2/g | 350 | 350 | 3500 |
| 504 | Acetic Acid | Zirconia | 10 um/300 A/ 30 m^2/g | 250 | 250 | 3500 |
| 505 | Acetic Acid | Zirconia | 10 um/300 A/ 30 m^2/g | 270 | 270 | 3500 |
| 506 | Acetic Acid | Zirconia | 10 um/300 A/ 30 m^2/g | 300 | 300 | 3500 |
| 507 | Acetic Acid | Zirconia | 10 um/300 A/ 30 m^2/g | 350 | 350 | 3500 |
| 508 | Acetic Acid | Zirconia | 10 um/300 A/ 30 m^2/g | 350 | 350 | 3500 |
| 509 | Acetic Acid | Zirconia | 10 um/300 A/ 30 m^2/g | 350 | 350 | 3500 |
| 510 | Camelina | Zirconia | 10 um/300 A/ 30 m^2/g | 525 | 500 | 3500 |
| 511 | Camelina | Zirconia | 10 um/300 A/ 30 m^2/g | 530 | 503 | 3500 |
| 512 | Camelina | Zirconia | 10 um/300 A/ 30 m^2/g | 525 | 502 | 3500 |
| 513 | Camelina | Zirconia | 10 um/300 A/ 30 m^2/g | 525 | 502 | 3500 |
| 514 | Camelina | Zirconia | 10 um/300 A/ 30 m^2/g | 525 | 503 | 3500 |
| 515 | Acetic Acid | Zirconia | 10 um/300 A/ 30 m^2/g | 400 | 400 | 3500 |
| 516 | Acetic Acid | Zirconia | 10 um/300 A/ 30 m^2/g | 400 | 400 | 3500 |
| 517 | Acetic Acid | Zirconia | 10 um/300 A/ 30 m^2/g | 450 | 450 | 3500 |
| 518 | Acetic Acid | Zirconia | 10 um/300 A/ 30 m^2/g | 450 | 450 | 3500 |
| 519 | Acetic Acid | Zirconia | 10 um/300 A/ 30 m^2/g | 450 | 450 | 3500 |
| 520 | Acetic Acid | Zirconia | 10 um/300 A/ 30 m^2/g | 450 | 450 | 3500 |
| 521 | Camelina | Zirconia | 10 um/300 A/ 30 m^2/g | 559 | 536 | 3600 |
| 522 | Camelina | Zirconia | 10 um/300 A/ 30 m^2/g | 559 | 536 | 3600 |
| 523 | Camelina | Zirconia | 10 um/300 A/ 30 m^2/g | 558 | 537 | 3700 |
| 524 | Camelina | Zirconia | 10 um/300 A/ 30 m^2/g | 558 | 538 | 3700 |
| 525 | Camelina | Zirconia | 10 um/300 A/ 30 m^2/g | 558 | 539 | 3700 |
| 526 | Jatropha | Blank | NA | 500 | 500 | 3500 |
| 527 | Jatropha | Blank | NA | 500 | 500 | 3500 |
| 528 | Jatropha | Blank | NA | 500 | 500 | 3500 |
| 529 | Jatropha | Blank | NA | 550 | 550 | 3500 |
| 530 | Jatropha | Blank | NA | 550 | 550 | 3500 |
| 531 | Soybean | Zirconia | 10 um/300 A/ 30 m^2/g | 525 | 508 | 3500 |
| 532 | Soybean | Zirconia | 10 um/300 A/ 30 m^2/g | 525 | 510 | 3500 |
| 533 | Soybean | Zirconia | 10 um/300 A/ 30 m^2/g | 525 | 512 | 3500 |
| 534 | Soybean | Zirconia | 10 um/300 A/ 30 m^2/g | 525 | 512 | 3500 |
| 535 | Soybean | Zirconia | 10 um/300 A/ 30 m^2/g | 525 | 512 | 3500 |
| 536 | Soybean | Zirconia | 10 um/300 A/ 30 m^2/g | 525 | 512 | 3500 |

TABLE A21-continued

Reaction conditions for the reaction of soybean oil with superheated water.

| Exp. No. | Oil Type | Catalyst Type | Particle Size, Pore size, Surface Area | Preheater Temperature Setting point (° C.) | Reactor Inlet Temp. (° C.), T2 | Back Pressure (PSI) |
|---|---|---|---|---|---|---|
| 537 | Soybean | Zirconia | 10 um/300 A/ 30 m^2/g | 525 | 512 | 3500 |
| 538 | Soybean | Zirconia | 10 um/300 A/ 30 m^2/g | 522 | 510 | 3500 |
| 539 | Soybean | Zirconia | 10 um/300 A/ 30 m^2/g | 528 | 524 | 3500 |
| 540 | Soybean | Zirconia | 10 um/300 A/ 30 m^2/g | 531 | 519 | 3500 |
| 541 | Soybean | Zirconia | 10 um/300 A/ 30 m^2/g | 547 | 527 | 3500 |
| 542 | Soybean | Zirconia | 10 um/300 A/ 30 m^2/g | 547 | 527 | 3500 |
| 543 | Jatropha | Blank | NA | 550 | 550 | 3500 |
| 544 | Jatropha | Blank | NA | 550 | 550 | 3500 |
| 545 | Jatropha | Blank | NA | 550 | 550 | 3500 |
| 546 | Soybean | Zirconia | 10 um/300 A/ 30 m^2/g | 525 | 512 | 3500 |
| 547 | Soybean | Zirconia | 10 um/300 A/ 30 m^2/g | 525 | 512 | 3500 |
| 548 | Soybean | Zirconia | 10 um/300 A/ 30 m^2/g | 525 | 511 | 4200 |
| 549 | Soybean | Zirconia | 10 um/300 A/ 30 m^2/g | 525 | 510 | 3700 |
| 550 | Soybean | Zirconia | 10 um/300 A/ 30 m^2/g | 525 | 510 | 3600 |
| 551 | Soybean | Zirconia | 10 um/300 A/ 30 m^2/g | 525 | 510 | 3800 |
| 552 | Jatropha | Zirconia | 10 um/300 A/ 30 m^2/g | 500 | 501 | 3500 |
| 553 | Jatropha | Zirconia | 10 um/300 A/ 30 m^2/g | 500 | 501 | 3500 |
| 554 | Jatropha | Zirconia | 10 um/300 A/ 30 m^2/g | 550 | 550 | 3500 |
| 555 | Jatropha | Zirconia | 10 um/300 A/ 30 m^2/g | 550 | 550 | 3500 |
| 556 | Soybean | Zirconia | 10 um/300 A/ 30 m^2/g | 515 | 515 | 3500 |
| 557 | Soybean | Zirconia | 10 um/300 A/ 30 m^2/g | 515 | 515 | 3500 |
| 558 | Soybean | Zirconia | 10 um/300 A/ 30 m^2/g | 515 | 515 | 3500 |
| 559 | Soybean | Zirconia | 10 um/300 A/ 30 m^2/g | 525 | 512 | 3400 |
| 560 | Soybean | Zirconia | 10 um/300 A/ 30 m^2/g | 521 | 513 | 3500 |
| 561 | Soybean | Zirconia | 10 um/300 A/ 30 m^2/g | 531 | 520 | 3400 |
| 562 | Soybean | Zirconia | 10 um/300 A/ 30 m^2/g | 531 | 521 | 3500 |
| 563 | Soybean | Zirconia | 10 um/300 A/ 30 m^2/g | 537 | 527 | 3400 |
| 564 | Soybean | Zirconia | 10 um/300 A/ 30 m^2/g | 515 | 515 | 3500 |
| 565 | Soybean | Zirconia | 10 um/300 A/ 30 m^2/g | 515 | 515 | 3500 |
| 566 | Soybean | Zirconia | 10 um/300 A/ 30 m^2/g | 515 | 515 | 3500 |

TABLE A22

Data collected for sample conditions given in Table 1.

| Exp. No. | Actual Water Flow (min/min) | Actual Oil Flow rate (min/Min) | Total Flow Rate (ml/min) | Acid Number | Production Rate (fuel g/min) |
|---|---|---|---|---|---|
| 306 | 5.639 | 1.66 | 7.30 | 48.91 | 1.19 |
| 307 | 5.639 | 1.66 | 7.30 | 46.84 | 1.13 |
| 308 | 5.639 | 1.66 | 7.30 | 47.96 | 1.19 |
| 313 | 5.639 | 1.66 | 7.30 | 0.96 | 0.67 |
| 315 | 5.639 | 1.66 | 7.30 | 1.00 | 0.70 |
| 316 | 5.639 | 1.66 | 7.30 | 1.10 | 0.70 |
| 317 | 5.639 | 1.66 | 7.30 | 1.00 | 0.68 |
| 319 | 5.6 | 1.65 | 7.25 | 0.80 | 0.61 |

TABLE A22-continued

Data collected for sample conditions given in Table 1.

| Exp. No. | Actual Water Flow (min/min) | Actual Oil Flow rate (min/Min) | Total Flow Rate (ml/min) | Acid Number | Production Rate (fuel g/min) |
|---|---|---|---|---|---|
| 320 | 5.6 | 1.65 | 7.25 | 0.16 | 0.57 |
| 321 | 5.6 | 1.65 | 7.25 | 0.30 | 0.56 |
| 322 | 5.6 | 1.65 | 7.25 | 4.78 | 0.57 |
| 325 | 5.63906 | 1.65 | 7.29 | 40.26 | 1.10 |
| 326 | 5.63906 | 1.65 | 7.29 | 37.88 | 1.13 |
| 329 | 5.63906 | 1.65 | 7.29 | 1.73 | 0.75 |
| 330 | 5.63906 | 1.65 | 7.29 | 0.62 | 0.70 |
| 331 | 5.63906 | 1.65 | 7.29 | 0.95 | 0.74 |
| 334 | 5.55 | 2.06 | 7.61 | 5.74 | 1.21 |
| 335 | 5.55 | 2.06 | 7.61 | 6.87 | 1.22 |
| 336 | 5.55 | 2.06 | 7.61 | 7.92 | 1.25 |
| 337 | 5.55 | 2.06 | 7.61 | 8.93 | 1.17 |
| 338 | 5.55 | 2.06 | 7.61 | 11.14 | 1.21 |
| 339 | 5.55 | 2.06 | 7.61 | 13.38 | 1.20 |
| 341 | 5.557 | 2.06 | 7.62 | 8.20 | 1.29 |
| 342 | 5.557 | 2.06 | 7.62 | 8.91 | 1.22 |
| 344 | 5.55 | 2.06 | 7.61 | 31.43 | 1.27 |
| 345 | 5.55 | 2.06 | 7.61 | 26.75 | 1.26 |
| 346 | 5.55 | 2.06 | 7.61 | 29.80 | 1.25 |
| 347 | 5.55 | 2.06 | 7.61 | 29.80 | 1.23 |
| 348 | 5.55 | 2.06 | 7.61 | 42.00 | 1.23 |
| 349 | 5.55 | 2.06 | 7.61 | 57.10 | 1.23 |
| 351 | 5.557 | 2.06 | 7.62 | 7.45 | 1.26 |
| 352 | 5.557 | 2.06 | 7.62 | 8.33 | 1.32 |
| 353 | 5.557 | 2.06 | 7.62 | 9.53 | 1.28 |
| 354 | 5.557 | 2.06 | 7.62 | 11.37 | 1.32 |
| 360 | 5.55 | 2.06 | 7.61 | 9.60 | 1.24 |
| 368 | 5.557 | 2.06 | 7.62 | 10.28 | 1.32 |
| 369 | 5.557 | 2.06 | 7.62 | 18.43 | 1.33 |
| 375 | 5.6 | 2.06 | 7.66 | 8.90 | 1.22 |
| 378 | 5.6 | 2.06 | 7.66 | 8.90 | 1.21 |
| 379 | 5.6 | 2.06 | 7.66 | 10.80 | 1.21 |
| 380 | 5.6 | 2.06 | 7.66 | 7.20 | 1.16 |
| 381 | 5.6 | 2.06 | 7.66 | 10.60 | 1.16 |
| 382 | 5.6 | 2.06 | 7.66 | 7.00 | 1.12 |
| 384 | 5.557 | 2.06 | 7.62 | 3.76 | 1.23 |
| 385 | 5.557 | 2.06 | 7.62 | 4.89 | 1.23 |
| 386 | 5.557 | 2.06 | 7.62 | 6.68 | 1.15 |
| 393 | 5.6 | 2.06 | 7.66 | 20.81 | 1.24 |
| 395 | 5.557 | 2.06 | 7.62 | 34.00 | 1.29 |
| 397 | 2.8 | 2.06 | 4.86 | 18.48 | 1.23 |
| 398 | 2.8 | 2.06 | 4.86 | 25.71 | 1.22 |
| 404 | 2.8 | 2.06 | 4.86 | 8.19 | 1.27 |
| 405 | 2.8 | 2.06 | 4.86 | 8.97 | 1.23 |
| 408 | 2.8 | 2.06 | 4.86 | 13.33 | 1.25 |
| 409 | 2.8 | 2.06 | 4.86 | 24.27 | 1.27 |
| 410 | 2.8 | 2.06 | 4.86 | 35.58 | 1.27 |
| 412 | 5.557 | 2.06 | 7.62 | 31.92 | 1.36 |
| 414 | 5.557 | 2.06 | 7.62 | 26.59 | 1.29 |
| 416 | 5.557 | 2.06 | 7.62 | 16.82 | 1.31 |
| 417 | 5.557 | 2.06 | 7.62 | 18.28 | 1.31 |
| 421 | 5.6 | 2.06 | 7.66 | 16.50 | 1.20 |
| 424 | 5.6 | 2.06 | 7.66 | 8.70 | 1.17 |
| 425 | 5.6 | 2.06 | 7.66 | 11.20 | 1.16 |
| 426 | 5.6 | 2.06 | 7.66 | 7.30 | 1.09 |
| 427 | 5.6 | 2.06 | 7.66 | 9.20 | 1.06 |
| 428 | 5.6 | 2.06 | 7.66 | 11.00 | 1.02 |
| 430 | 5.6 | 2.06 | 7.66 | 8.40 | 1.17 |
| 431 | 5.6 | 2.06 | 7.66 | 9.00 | 1.17 |
| 432 | 5.6 | 2.06 | 7.66 | 9.10 | 1.16 |
| 433 | 5.6 | 2.06 | 7.66 | 9.10 | 1.14 |
| 436 | 5.6 | 2.06 | 7.66 | 7.80 | 1.21 |
| 437 | 5.6 | 2.06 | 7.66 | 9.70 | 1.19 |
| 438 | 5.6 | 2.06 | 7.66 | 11.30 | 1.15 |
| 439 | 5.6 | 2.06 | 7.66 | 20.40 | 1.14 |
| 440 | 5.6 | 2.06 | 7.66 | 27.90 | 1.08 |
| 441 | 5.6 | 2.06 | 7.66 | 58.30 | 1.13 |
| 444 | 5.557 | 2.06 | 7.62 | 41.00 | 1.39 |
| 445 | 5.557 | 2.06 | 7.62 | 26.69 | 1.13 |
| 453 | 5.8 | 1.54 | 7.34 | 274.00 | 0.84 |
| 454 | 5.8 | 1.54 | 7.34 | 273.00 | 0.84 |
| 455 | 5.8 | 1.54 | 7.34 | 249.00 | 0.83 |
| 456 | 5.8 | 1.54 | 7.34 | 250.00 | 0.87 |
| 458 | 5.8 | 1.54 | 7.34 | 5.72 | 0.85 |
| 459 | 5.8 | 1.54 | 7.34 | 6.10 | 0.85 |
| 460 | 5.8 | 1.54 | 7.34 | 8.43 | 0.86 |
| 461 | 5.8 | 1.54 | 7.34 | 8.90 | 0.85 |
| 484 | 5.6 | 2.06 | 7.66 | 82.35 | 1.39 |
| 486 | 5.8 | 1.54 | 7.34 | 23.90 | 1.02 |
| 487 | 5.8 | 1.54 | 7.34 | 23.50 | 1.02 |
| 488 | 5.8 | 1.54 | 7.34 | 26.50 | 1.04 |
| 489 | 5.8 | 1.54 | 7.34 | 26.80 | 1.05 |
| 491 | 5.8 | 1.54 | 7.34 | 1.00 | 0.76 |
| 492 | 5.8 | 1.54 | 7.34 | 1.27 | 0.80 |
| 493 | 5.8 | 1.54 | 7.34 | 1.48 | 0.82 |
| 494 | 5.8 | 1.54 | 7.34 | 1.92 | 0.82 |
| 511 | 5.6 | 2.06 | 7.66 | 11.10 | 1.25 |
| 512 | 5.6 | 2.06 | 7.66 | 12.35 | 1.26 |
| 513 | 5.6 | 2.06 | 7.66 | 12.20 | 1.16 |
| 514 | 5.6 | 2.06 | 7.66 | 13.93 | 1.26 |
| 516 | 0 | 5.25 | 5.25 | 823.76 | 4.74 |
| 518 | 0 | 5.25 | 5.25 | 261.17 | 2.28 |
| 522 | 5.8 | 2.06 | 7.86 | 2.57 | 0.96 |
| 523 | 5.8 | 2.06 | 7.86 | 3.07 | 0.97 |
| 524 | 5.8 | 2.06 | 7.86 | 24.90 | 1.00 |
| 525 | 5.8 | 2.06 | 7.86 | 93.10 | 1.11 |
| 528 | 5.999 | 2.06 | 8.06 | 174.95 | 1.43 |
| 532 | 5.8 | 2.06 | 7.86 | 21.28 | 1.30 |
| 533 | 5.8 | 2.06 | 7.86 | 18.86 | 1.29 |
| 534 | 5.8 | 2.06 | 7.86 | 21.00 | 1.28 |
| 535 | 5.8 | 2.06 | 7.86 | 21.43 | 1.26 |
| 537 | 5.8 | 2.06 | 7.86 | 12.33 | 1.26 |
| 538 | 5.8 | 2.06 | 7.86 | 15.16 | 1.27 |
| 539 | 5.8 | 2.06 | 7.86 | 5.97 | 1.21 |
| 540 | 5.8 | 2.06 | 7.86 | 5.97 | 1.21 |
| 541 | 5.8 | 2.06 | 7.86 | 3.23 | 1.13 |
| 542 | 5.8 | 2.06 | 7.86 | 4.01 | 1.31 |
| 547 | 5.8 | 2.06 | 7.86 | 10.18 | 1.20 |
| 548 | 5.8 | 2.06 | 7.86 | 8.20 | 1.20 |
| 549 | 5.8 | 2.06 | 7.86 | 8.94 | 1.18 |
| 550 | 5.8 | 2.06 | 7.86 | 8.91 | 1.20 |
| 551 | 5.8 | 2.06 | 7.86 | 8.26 | 1.20 |
| 553 | 5.999 | 2.06 | 8.06 | 80.12 | 1.45 |
| 555 | 5.999 | 2.06 | 8.06 | 8.59 | 1.09 |
| 557 | 5.999 | 2.06 | 8.06 | 27.70 | 1.17 |
| 559 | 5.8 | 2.06 | 7.86 | 6.37 | 1.19 |
| 560 | 5.8 | 2.06 | 7.86 | 10.52 | 1.21 |
| 561 | 5.8 | 2.06 | 7.86 | 5.99 | 1.15 |
| 562 | 5.8 | 2.06 | 7.86 | 8.54 | 1.12 |
| 563 | 5.8 | 2.06 | 7.86 | 8.61 | 1.09 |
| 565 | 5.999 | 2.06 | 8.06 | 2.69 | 1.27 |

TABLE A23

GC-MS data for the reaction of corn oil with water at 500° C. over zirconium dioxide (experiments 304-308).

| Peak # | Peak Name | % Probability | RT (min) | % of Total |
|---|---|---|---|---|
| 1 | 2-Oxetanone, 4,4-dimethyl- | 38 | 1.28 | 0.25% |
| 2 | Pentane | 80 | 1.397 | 0.76% |
| 3 | 1-Hexene | 94 | 1.679 | 1.46% |
| 4 | 1,4-Pentadiene, 2-methyl- | 91 | 2.051 | 0.65% |
| 5 | 1-Heptene | 96 | 2.379 | 1.05% |
| 6 | Heptane | 91 | 2.469 | 0.48% |
| 7 | 2-Heptene | 91 | 2.554 | 0.37% |
| 8 | Cyclohexane, methyl- | 90 | 2.755 | 0.41% |
| 9 | Cyclohexene, 4-methyl- | 91 | 2.983 | 0.26% |
| 10 | Cyclopentene, 1-ethyl- | 72 | 3.224 | 0.30% |
| 11 | Toluene | 81 | 3.417 | 0.86% |
| 12 | 1-Octene | 95 | 3.796 | 0.83% |
| 13 | Octane | 87 | 3.952 | 0.60% |

TABLE A23-continued

GC-MS data for the reaction of corn oil with water at 500° C. over zirconium dioxide (experiments 304-308).

| Peak # | Peak Name | % Probability | RT (min) | % of Total |
|---|---|---|---|---|
| 14 | 2-Octene, (E)- | 96 | 4.081 | 0.39% |
| 15 | 2-Octene, (Z)- | 94 | 4.233 | 0.20% |
| 16 | Cyclohexane, 1,2-dimethyl-, cis- | 92 | 4.475 | 0.33% |
| 17 | 2,4-Octadiene | 90 | 5.018 | 0.63% |
| 18 | p-Xylene | 46 | 5.201 | 0.77% |
| 19 | 1-Nonene | 87 | 5.845 | 0.84% |
| 20 | Nonane | 90 | 6.022 | 0.31% |
| 21 | 2-Nonene, (E)- | 86 | 6.166 | 0.47% |
| 22 | 3,4-Octadiene, 7-methyl- | 59 | 7.1 | 0.40% |
| 23 | Benzene, propyl- | 81 | 7.251 | 0.44% |
| 24 | 2-Octanone | 90 | 8.122 | 1.30% |
| 25 | Decane | 93 | 8.3 | 1.10% |
| 26 | Indane | 42 | 9.11 | 0.26% |
| 27 | Benzene, butyl- | 81 | 9.574 | 0.65% |
| 28 | Cyclopropane, 1-heptyl-2-methyl- | 95 | 10.367 | 1.30% |
| 29 | 4-Undecene, (E)- | 91 | 10.666 | 1.61% |
| 30 | 5-Undecene | 97 | 10.852 | 0.31% |
| 31 | Cyclopentene, 1-butyl- | 59 | 11.108 | 0.35% |
| 32 | Benzene, pentyl- | 91 | 11.794 | 2.96% |
| 33 | 1-Dodecene | 95 | 12.499 | 2.15% |
| 34 | Spiro[2.4]heptane, 1,5-dimethyl-6-methylene- | 70 | 12.795 | 0.35% |
| 35 | Bicyclo[4.1.0]heptane | 76 | 13.188 | 0.20% |
| 36 | Tricyclo[3.2.1.0(2,4)]octane, 3-methylene- | 64 | 13.902 | 0.90% |
| 37 | Nonanoic acid | 83 | 14.353 | 0.66% |
| 38 | 1-Tridecene | 97 | 14.51 | 0.56% |
| 39 | Tridecane | 97 | 14.672 | 0.44% |
| 40 | Benzene, heptyl- | 60 | 15.899 | 0.22% |
| 41 | n-Decanoic acid | 55 | 16.153 | 0.72% |
| 42 | 1-Tetradecene | 98 | 16.418 | 1.58% |
| 43 | Phenol, 2-pentyl- | 74 | 16.961 | 0.22% |
| 44 | 3,4-Octadiene, 7-methyl- | 58 | 17.557 | 0.25% |
| 45 | Cyclohexene, 1-octyl- | 64 | 17.773 | 1.09% |
| 46 | 1-Pentadecene | 99 | 18.2 | 1.08% |
| 47 | E-1,9-Tetradecadiene | 94 | 19.588 | 2.46% |
| 48 | 1-Hexadecene | 99 | 19.896 | 0.84% |
| 49 | Tetradecanal | 93 | 20.249 | 0.32% |
| 50 | Bicyclo[7.7.0]hexadec-1(9)-ene | 58 | 21.14 | 0.36% |
| 51 | Z,Z-8,10-Hexadecadien-1-ol | 86 | 21.249 | 0.64% |
| 52 | 2-Undecanone, 6,10-dimethyl- | 45 | 21.617 | 0.30% |
| 53 | Tetradecanoic acid | 96 | 22.653 | 0.77% |
| 54 | 10-Phenyl-n-decanol | 47 | 22.881 | 0.58% |
| 55 | Tetradecanal | 94 | 23.397 | 0.18% |
| 56 | 1H-Indene, 2-butyl-5-hexyloctahydro- | 93 | 24.399 | 0.68% |
| 57 | 2-Heptadecanone | 96 | 24.674 | 4.65% |
| 58 | n-Hexadecanoic acid | 99 | 25.686 | 5.86% |
| 59 | Octadecan-4-one | 90 | 25.966 | 1.35% |
| 60 | (2-Acetyl-5-methyl-cyclopentyl)-acetic acid | 49 | 27.082 | 5.77% |
| 61 | Z,E-2,13-Octadecadien-1-ol | 95 | 27.178 | 3.92% |
| 62 | 2-Nonadecanone | 98 | 27.395 | 1.89% |
| 63 | 9-Octadecenoic acid, (E)- | 97 | 28.032 | 6.77% |
| 64 | Octadecanoic acid | 78 | 28.232 | 2.74% |
| 65 | E,E,Z-1,3,12-Nonadecatriene-5,14-diol | 58 | 28.367 | 1.55% |
| 66 | E-11-Methyl-12-tetradecen-1-ol acetate | 53 | 28.587 | 0.94% |
| 67 | 6-Pentadecanone | 30 | 29.572 | 0.61% |
| 68 | 2-Pentadecanone, 6,10,14-trimethyl- | 50 | 29.885 | 0.17% |
| 69 | 7-Tridecanone | 49 | 30.741 | 1.21% |
| 70 | 2-Octadecyl-propane-1,3-diol | 51 | 31.671 | 0.57% |
| 71 | 8-Pentadecanone | 22 | 31.866 | 0.30% |
| 72 | 2-Methyl-Z,Z-3,13-octadecadienol | 53 | 32.759 | 0.96% |
| 73 | 9-Heptadecanone | 49 | 32.962 | 0.52% |
| 74 | [1,2'-Binaphthalene]-5,5',8,8'-tetrone, 1',4-dihydroxy-2,3'-dimethyl-, (-)- | 68 | 35.045 | 0.37% |
| 75 | 5.alpha.-Ergost-8(14)-ene | 83 | 36.772 | 0.69% |
| 76 | Tetradecanoic acid, 2-oxo-, ethyl ester | 46 | 36.993 | 0.40% |
| 77 | Cholesta-8,24-dien-3.beta.-ol, 4.beta.-methyl- | 70 | 37.623 | 1.16% |
| 78 | Diphenyldimethylsilane | 42 | 37.86 | 0.44% |
| 79 | Stigmastan-3,5-dien | 95 | 38.078 | 0.48% |
| 80 | cis-4-Benzyl-2,6-diphenyltetrahydropyran | 38 | 39.116 | 0.21% |
| 81 | 1,10-Dioxa-4,7-dithiadecane, 1,10-bis(9-borabicyclo[3.3.1]non-9-yl)-2,9-dimethyl- | 43 | 39.651 | 1.44% |
| 82 | Silane, t-butyldiphenyl(norbornan-5-on-2-ylmethoxy)- | 14 | 41.189 | 4.50% |
| 83 | 1,22-Docosanediol | 38 | 42.646 | 6.57% |
| 84 | Propiophenone, 2'-(trimethylsiloxy)- | 46 | 43.064 | 0.80% |
| 85 | 1H-Indole, 2-methyl-3-phenyl- | 50 | 43.311 | 2.39% |
| 86 | 1,3-Bis(trimethylsilyl)benzene | 64 | 44.504 | 0.38% |

TABLE A24

GC-MS data for the reaction of corn oil with water at 550° C. over zirconium dioxide (experiments 312-317).

| Peak # | Peak Name | % Probability | RT (min) | % of Total |
|---|---|---|---|---|
| 1 | Benzene, 1,3-bis(3-phenoxyphenoxy)- | 80 | 0.1331 | 0.13% |
| 2 | Pentane | 47 | 1.4021 | 0.39% |
| 3 | Cyclopentene | 90 | 1.5559 | 0.18% |
| 4 | Cyclopentane | 64 | 1.5816 | 0.09% |
| 5 | 1-Hexene | 94 | 1.6713 | 0.60% |
| 6 | Butanal, 2-ethyl- | 32 | 1.7098 | 0.55% |
| 7 | 2-Hexene, (Z)- | 91 | 1.7418 | 0.57% |
| 8 | 2-Hexene | 90 | 1.7931 | 0.53% |
| 9 | Cyclopentane, methyl- | 90 | 1.8764 | 0.28% |
| 10 | 1,3-Cyclopentadiene, 1-methyl- | 70 | 1.9661 | 0.14% |
| 11 | 1,3-Cyclopentadiene, 1-methyl- | 81 | 1.9982 | 0.11% |
| 12 | Cyclopentene, 1-methyl- | 90 | 2.0494 | 0.89% |
| 13 | Benzene | 91 | 2.1327 | 1.34% |
| 14 | 2,4-Hexadiene | 94 | 2.1712 | 0.20% |
| 15 | Cyclohexene | 93 | 2.293 | 0.68% |
| 16 | 1-Heptene | 96 | 2.3763 | 1.29% |
| 17 | Heptane | 64 | 2.466 | 0.90% |
| 18 | Cyclopentene, 4,4-dimethyl- | 70 | 2.5173 | 0.49% |
| 19 | 2-Heptene | 94 | 2.5557 | 0.53% |
| 20 | 2-Heptene | 93 | 2.6519 | 0.59% |
| 21 | Cyclohexane, methyl- | 52 | 2.748 | 0.81% |
| 22 | Cyclopentane, ethyl- | 95 | 2.8954 | 0.21% |
| 23 | Cyclohexene, 4-methyl- | 91 | 2.9787 | 0.58% |
| 24 | 1,4-Cyclohexadiene, 1-methyl- | 95 | 3.0172 | 0.25% |

TABLE A24-continued

GC-MS data for the reaction of corn oil with water at 550° C. over zirconium dioxide (experiments 312-317).

| Peak # | Peak Name | % Probability | RT (min) | % of Total |
|---|---|---|---|---|
| 25 | 1,3-Cyclopentadiene, 5-methyl- | 72 | 3.1133 | 0.16% |
| 26 | Cyclopentane, 1-methyl-2-methylene- | 86 | 3.203 | 0.45% |
| 27 | Cyclopentane, ethylidene- | 91 | 3.2287 | 0.70% |
| 28 | Toluene | 94 | 3.4017 | 3.83% |
| 29 | Cyclohexene, 1-methyl- | 91 | 3.4466 | 1.05% |
| 30 | 2-Butynamide, N-methyl- | 59 | 3.5619 | 0.25% |
| 31 | 3-Hexanone | 64 | 3.7157 | 0.25% |
| 32 | 1-Octene | 46 | 3.7927 | 1.52% |
| 33 | 4-Octene, (E)- | 55 | 3.9016 | 0.31% |
| 34 | Octane | 72 | 3.9529 | 1.10% |
| 35 | 2-Octene, (E)- | 93 | 4.0811 | 0.54% |
| 36 | 5,5-Dimethyl-1,3-hexadiene | 87 | 4.1387 | 0.28% |
| 37 | 2-Octene, (E)- | 91 | 4.2284 | 0.42% |
| 38 | Cyclopentene, 3-propyl- | 72 | 4.3246 | 0.10% |
| 39 | Cyclohexene, 3,5-dimethyl- | 91 | 4.4271 | 0.33% |
| 40 | 1,4-Dimethyl-1-cyclohexene | 94 | 4.4784 | 0.20% |
| 41 | Cyclohexane, ethyl- | 94 | 4.5809 | 0.30% |
| 42 | Methyl ethyl cyclopentene | 94 | 4.6899 | 0.27% |
| 43 | Cyclohexene, 1,6-dimethyl- | 94 | 4.8181 | 0.32% |
| 44 | 4-Octyne | 53 | 4.8758 | 0.40% |
| 45 | Cyclohexene, 1-ethyl- | 93 | 4.927 | 0.28% |
| 46 | cis-Bicyclo[3.3.0]oct-2-ene | 90 | 5.0616 | 0.26% |
| 47 | Ethylbenzene | 91 | 5.1898 | 2.39% |
| 48 | Cyclooctene, (Z)- | 53 | 5.2987 | 0.23% |
| 49 | p-Xylene | 95 | 5.3628 | 1.68% |
| 50 | Cyclohexene, 1,2-dimethyl- | 96 | 5.4462 | 0.30% |
| 51 | 6-Propenylbicyclo[3.1.0]hexan-2-one | 64 | 5.6897 | 0.25% |
| 52 | 3-Heptanone | 49 | 5.7602 | 0.35% |
| 53 | 2-Heptanone | 46 | 5.8563 | 2.87% |
| 54 | Nonane | 90 | 6.0294 | 0.87% |
| 55 | cis-2-Nonene | 93 | 6.1704 | 0.54% |
| 56 | 2-Nonene, (E)- | 96 | 6.3434 | 0.32% |
| 57 | Bicyclo[3.3.1]nonane | 60 | 6.4203 | 0.19% |
| 58 | Benzene, (1-methylethyl)- | 45 | 6.5805 | 0.32% |
| 59 | Cyclopentane, butyl- | 53 | 6.7728 | 0.21% |
| 60 | Cycloheptanol, 1-methyl-2-methylene- | 46 | 6.8753 | 0.31% |
| 61 | Bicyclo[2.2.1]heptane, 2-ethenyl- | 58 | 7.0996 | 0.64% |
| 62 | Pentaleno[1,2-b]oxirene, octahydro-, (1a.alpha.,1b.alpha.,4a.beta.,5a.alpha.)- | 72 | 7.1894 | 0.17% |
| 63 | Benzene, propyl- | 91 | 7.2406 | 1.00% |
| 64 | Bicyclo[3.3.1]nonane | 64 | 7.3432 | 0.17% |
| 65 | Benzene, 1-ethyl-2-methyl- | 95 | 7.4329 | 0.70% |
| 66 | Benzene, 1-ethyl-2-methyl- | 94 | 7.4585 | 0.67% |
| 67 | 3-Penten-2-one, 3-ethyl-4-methyl- | 64 | 7.6444 | 0.25% |
| 68 | 4-Octanone | 91 | 7.7213 | 0.15% |
| 69 | Benzene, 1-ethyl-2-methyl- | 95 | 7.8431 | 0.85% |
| 70 | 3-Octanone | 38 | 8.0289 | 0.56% |
| 71 | 2-Octanone | 81 | 8.1443 | 2.62% |
| 72 | 4-Decene | 92 | 8.2725 | 0.33% |
| 73 | Decane | 95 | 8.3109 | 0.46% |
| 74 | 4-Decene | 96 | 8.4455 | 0.57% |
| 75 | 1H-Indene, 2,3,4,5,6,7-hexahydro- | 95 | 8.5673 | 0.31% |
| 76 | 4-Decene | 98 | 8.625 | 0.38% |
| 77 | Benzene, 1,2-diethyl- | 89 | 8.8108 | 0.45% |
| 78 | Benzene, 1-ethenyl-2-methyl- | 93 | 8.9262 | 0.20% |
| 79 | Benzene, cyclopropyl- | 81 | 9.0992 | 1.29% |
| 80 | Indene | 93 | 9.3107 | 0.33% |
| 81 | Cyclopentene, 1-pentyl- | 93 | 9.3748 | 0.19% |
| 82 | Benzene, 1,4-diethyl- | 94 | 9.4325 | 0.34% |
| 83 | Benzene, 1-methyl-3-propyl- | 94 | 9.4773 | 0.36% |
| 84 | Benzene, butyl- | 90 | 9.5799 | 1.20% |
| 85 | Phenol, 2-methyl- | 86 | 9.6376 | 0.42% |
| 86 | Benzene, 1,2-diethyl- | 92 | 9.6952 | 0.26% |
| 87 | Benzene, 1-methyl-2-propyl- | 90 | 9.817 | 0.36% |
| 88 | Benzene, (1-methylethyl)- | 50 | 9.8555 | 0.35% |
| 89 | 4-Nonanone | 55 | 9.9708 | 0.20% |
| 90 | Benzene, 2-ethyl-1,4-dimethyl- | 94 | 10.0477 | 0.25% |
| 91 | Benzene, (2-methyl-1-propenyl)- | 96 | 10.1247 | 0.25% |
| 92 | Indan, 1-methyl- | 93 | 10.24 | 1.15% |
| 93 | 3-Nonanone | 93 | 10.2849 | 0.40% |
| 94 | Cyclopropane, 1-heptyl-2-methyl- | 97 | 10.3682 | 0.65% |
| 95 | 2-Nonanone | 94 | 10.4066 | 0.76% |
| 96 | 5-Undecene, (E)- | 86 | 10.49 | 0.41% |
| 97 | Undecane | 96 | 10.5476 | 0.44% |
| 98 | 5-Undecene | 98 | 10.6694 | 0.65% |
| 99 | 5-Undecene | 96 | 10.8553 | 0.36% |
| 100 | 1,6-Cyclodecadiene | 78 | 11.1309 | 0.43% |
| 101 | 1H-Indene, 2,3-dihydro-5-methyl- | 94 | 11.3936 | 0.86% |
| 102 | Benzene, 1-methyl-4-(1-methylpropyl)- | 81 | 11.5346 | 0.56% |
| 103 | 1H-Indene, 2,3-dihydro-4-methyl- | 50 | 11.6243 | 1.41% |
| 104 | N-(4-Bromomethylphenyl)acetamide | 43 | 11.7012 | 0.35% |
| 105 | Benzene, pentyl- | 90 | 11.8038 | 2.63% |
| 106 | Naphthalene, 1,2,3,4-tetrahydro- | 96 | 11.8807 | 1.00% |
| 107 | 2-Methylindan-2-ol | 72 | 12.0025 | 0.74% |
| 108 | 4-Decanone | 52 | 12.1242 | 0.27% |
| 109 | Benzene, 1-methyl-4-(1-methylpropyl)- | 87 | 12.1627 | 0.32% |
| 110 | 1H-Indene, 1,3-dimethyl- | 96 | 12.2716 | 0.20% |
| 111 | Azulene | 90 | 12.3614 | 0.62% |
| 112 | 1H-Indene, 2,3-dihydro-1,3-dimethyl- | 87 | 12.4319 | 0.48% |
| 113 | Cyclododecane | 95 | 12.5024 | 0.74% |
| 114 | 2-Decanone | 64 | 12.5536 | 0.77% |
| 115 | 1H-Indene,2,3-dihydro-2,2-dimethyl- | 86 | 12.6562 | 0.69% |
| 116 | 3-Dodecene, (Z)- | 95 | 12.7844 | 0.29% |
| 117 | 3-Dodecene, (Z)- | 95 | 12.9702 | 0.20% |
| 118 | Benzene, (1-methyl-1-butenyl)- | 91 | 13.2009 | 0.32% |
| 119 | 2-Ethyl-2,3-dihydro-1H-indene | 62 | 13.374 | 0.24% |
| 120 | 2-Ethyl-2,3-dihydro-1H-indene | 90 | 13.4124 | 0.43% |
| 121 | 1H-Indene, 1-ethenyl-2,3-dihydro- | 86 | 13.6175 | 0.20% |
| 122 | 1H-Indene, 2,3-dihydro-1,2-dimethyl- | 83 | 13.7072 | 0.28% |
| 123 | 1H-Indene, 2,3-dihydro-2,3-dihydro- | 64 | 13.7521 | 0.31% |
| 124 | 1H-Indene, 1,3-dimethyl- | 95 | 13.8098 | 0.23% |
| 125 | Benzene, hexyl- | 74 | 13.8995 | 0.92% |
| 126 | Benzene, (1-methylpentyl)- | 11 | 14.0405 | 0.92% |

TABLE A24-continued

GC-MS data for the reaction of corn oil with water at 550° C. over zirconium dioxide (experiments 312-317).

| Peak # | Peak Name | % Probability | RT (min) | % of Total |
|---|---|---|---|---|
| 127 | 1H-Indene, 1,3-dimethyl- | 93 | 14.1302 | 0.46% |
| 128 | 1H-Indene, 2,3-dihydro-1,2-dimethyl- | 86 | 14.3545 | 0.27% |
| 129 | 3-Undecanone | 90 | 14.4699 | 0.35% |
| 130 | 1-Tridecene | 93 | 14.5212 | 0.51% |
| 131 | 2-Undecanone | 64 | 14.5788 | 0.55% |
| 132 | Naphthalene, 2-methyl- | 93 | 14.6109 | 0.49% |
| 133 | Tridecane | 97 | 14.675 | 0.53% |
| 134 | 2-Tridecene, (Z)- | 95 | 14.7711 | 0.29% |
| 135 | Naphthalene, 2-methyl- | 87 | 14.9506 | 0.49% |
| 136 | 2,4-Cycloheptadien-1-one, 2,6,6-trimethyl- | 44 | 15.1556 | 0.16% |
| 137 | 1,4-Methanonaphthalen-9-ol, 1,2,3,4-tetrahydro-, stereoisomer | 22 | 15.4953 | 0.23% |
| 138 | (1-Methylpenta-2,4-dienyl)benzene | 81 | 15.6684 | 0.36% |
| 139 | Naphthalene, 6-ethyl-1,2,3,4-tetrahydro- | 60 | 15.8478 | 0.21% |
| 140 | Benzene, heptyl- | 93 | 15.8991 | 0.46% |
| 141 | 2-Tetradecene, (E)- | 98 | 16.4182 | 0.94% |
| 142 | 2-Dodecanone | 60 | 16.4951 | 0.65% |
| 143 | Tetradecane | 95 | 16.5592 | 0.39% |
| 144 | 3-Tetradecene, (Z)- | 99 | 16.6553 | 0.45% |
| 145 | 3-Tetradecene, (Z)- | 99 | 16.8348 | 0.31% |
| 146 | Naphthalene, 2,7-dimethyl- | 86 | 16.9886 | 0.25% |
| 147 | Cyclopentene, 1-octyl- | 38 | 17.559 | 0.33% |
| 148 | Benzene, octyl- | 55 | 17.7769 | 0.42% |
| 149 | Naphthalene, 1,2-dihydro-1,4,6-trimethyl- | 45 | 17.8602 | 0.35% |
| 150 | 1-Pentadecene | 99 | 18.2063 | 0.73% |
| 151 | 2-Tridecanone | 91 | 18.296 | 0.30% |
| 152 | Pentadecane | 97 | 18.3345 | 0.37% |
| 153 | 1-Pentadecene | 74 | 18.4242 | 0.23% |
| 154 | Cyclododecane | 70 | 18.6101 | 0.20% |
| 155 | Cyclohexane, (1-methylethyl)- | 49 | 19.2189 | 0.21% |
| 156 | Benzene, nonyl- | 18 | 19.565 | 0.54% |
| 157 | Z-8-Hexadecene | 96 | 19.8982 | 0.52% |
| 158 | 2-Undecanone, 6,10-dimethyl- | 46 | 20.0072 | 0.33% |
| 159 | Z-8-Hexadecene | 84 | 20.0969 | 0.24% |
| 160 | 1,1'-Biphenyl, 2-methyl- | 90 | 20.2828 | 0.17% |
| 161 | Benz[f]azulene, 1,2,3,3a,4,9,10,10a-octahydro- | 50 | 21.2505 | 0.41% |
| 162 | 1-Docosene | 91 | 21.5069 | 0.29% |
| 163 | 2-Pentadecanone | 93 | 21.6222 | 0.44% |
| 164 | 9,9-Dimethoxybicyclo[3.3.1]nona-2,4-dione | 95 | 21.6927 | 0.20% |
| 165 | 3-Heptene, 7-phenyl- | 50 | 22.8848 | 0.33% |
| 166 | 1-Pyrrolidinyloxy, 3-hydroxy-2,2,5,5-tetramethyl- | 38 | 23.0771 | 0.12% |
| 167 | Azetidine, 2-phenyl-1-(phenylmethyl)- | 16 | 24.3332 | 0.20% |
| 168 | 2-Heptadecanone | 96 | 24.6793 | 3.97% |
| 169 | 3-Octadecanone | 91 | 25.9611 | 0.99% |
| 170 | Cyclotetradecane, 1,7,11-trimethyl-4-(1-methylethyl)- | 95 | 27.0314 | 0.45% |
| 171 | (2-Acetyl-5-methyl-cyclopentyl)-acetic acid | 49 | 27.1275 | 1.26% |
| 172 | 2-Nonadecanone | 99 | 27.3774 | 0.82% |
| 173 | 5-Tridecanone | 50 | 28.3516 | 0.49% |
| 174 | 3-Eicosanone | 53 | 28.5759 | 0.21% |
| 175 | Naphthalene, 2-(phenylmethyl)- | 90 | 29.4347 | 0.20% |
| 176 | 1-Mercapto-2-heptadecanone | 27 | 29.5565 | 0.21% |
| 177 | Cyclohexanecarboxylic acid, 2-ethenyl-6-hydroxy-, methyl ester, [1s-(1.alpha.,2.alpha.,6.beta.)]- | 60 | 30.7293 | 0.34% |
| 178 | 1,2-Benzenedicarboxylic acid, diisooctyl ester | 62 | 32.6327 | 1.64% |
| 179 | 16-Hentriacontanone | 68 | 39.6313 | 0.15% |

TABLE A25

GC-MS data for the reaction of oleic acid with water at 550° C. over zirconium dioxide (experiments 318-323).

| Peak # | Peak Name | % Probability | RT | % of Total |
|---|---|---|---|---|
| 1 | 2-Butene, (E)- | 52 | 1.2803 | 0.43% |
| 2 | 1-Butene, 2-methyl- | 91 | 1.4213 | 1.37% |
| 3 | Cyclopropane, 1,2-dimethyl-, cis- | 90 | 1.4405 | 0.40% |
| 4 | 1,3-Cyclopentadiene | 91 | 1.511 | 0.15% |
| 5 | Cyclopentene | 87 | 1.5559 | 0.49% |
| 6 | 1-Pentene | 80 | 1.5879 | 0.25% |
| 7 | 1-Hexene | 91 | 1.6712 | 1.28% |
| 8 | Hexane | 68 | 1.7097 | 1.09% |
| 9 | 2-Hexene, (Z)- | 91 | 1.7481 | 1.18% |
| 10 | 2-Hexene | 76 | 1.7994 | 0.84% |
| 11 | Cyclopentane, methyl- | 91 | 1.8827 | 0.49% |
| 12 | 1,3-Cyclopentadiene, 5-methyl- | 76 | 1.9724 | 0.32% |
| 13 | 1,3-Cyclopentadiene, 5-methyl- | 81 | 2.0045 | 0.27% |
| 14 | Cyclopentene, 1-methyl- | 90 | 2.0558 | 1.27% |
| 15 | Benzene | 91 | 2.1391 | 2.07% |
| 16 | 2,4-Hexadiene | 95 | 2.1839 | 0.15% |
| 17 | Cyclohexene | 93 | 2.2993 | 0.93% |
| 18 | 1-Heptene | 96 | 2.389 | 2.08% |
| 19 | Heptane | 87 | 2.4787 | 2.02% |
| 20 | 1,4-Hexadiene, 4-methyl- | 60 | 2.5236 | 0.71% |
| 21 | 2-Heptene | 94 | 2.5684 | 0.79% |
| 22 | 2-Heptene | 95 | 2.6646 | 0.73% |
| 23 | Cyclohexane, methyl- | 93 | 2.7607 | 0.96% |
| 24 | Cyclopentane, ethyl- | 96 | 2.9081 | 0.32% |
| 25 | Cyclohexene, 4-methyl- | 91 | 2.9914 | 0.56% |
| 26 | 1,3,5-Hexatriene, 3-methyl-, (Z)- | 91 | 3.0299 | 0.25% |
| 27 | Bicyclo[4.1.0]hept-2-ene | 90 | 3.0555 | 0.27% |
| 28 | Cyclopentane, 1,3-bis(methylene)- | 87 | 3.1324 | 0.17% |
| 29 | 1,4-Cyclohexadiene, 1-methyl- | 93 | 3.1645 | 0.19% |
| 30 | Cyclobutane, (1-methylethylidene)- | 87 | 3.2157 | 0.41% |
| 31 | Cyclopentene, 1-ethyl- | 91 | 3.2478 | 0.93% |
| 32 | Toluene | 94 | 3.4209 | 4.71% |
| 33 | Cyclohexene, 1-methyl- | 91 | 3.4657 | 0.94% |
| 34 | Cyclopentene, 1-ethyl- | 64 | 3.5811 | 0.29% |
| 35 | 3-Hexanone | 43 | 3.7413 | 0.21% |
| 36 | 1-Octene | 64 | 3.8118 | 1.68% |
| 37 | 4-Octene, (E)- | 64 | 3.9207 | 0.31% |
| 38 | Octane | 64 | 3.9784 | 1.65% |
| 39 | 2-Octene, (Z)- | 94 | 4.1002 | 0.49% |
| 40 | 1,3-Dimethyl-1-cyclohexene | 87 | 4.1579 | 0.30% |
| 41 | 4-Octene, (Z)- | 93 | 4.2476 | 0.38% |
| 42 | Cyclohexene, 1-ethyl- | 80 | 4.3117 | 0.07% |
| 43 | Cyclopentene, 1-propyl- | 72 | 4.3437 | 0.10% |
| 44 | Spiro[2.5]octane | 91 | 4.3694 | 0.18% |

TABLE A25-continued

GC-MS data for the reaction of oleic acid with water at 550° C. over zirconium dioxide (experiments 318-323).

| Peak # | Peak Name | % Probability | RT | % of Total |
|---|---|---|---|---|
| 45 | trans-3,5-Dimethylcyclohexene | 91 | 4.4399 | 0.19% |
| 46 | 1,4-Dimethyl-1-cyclohexene | 76 | 4.5039 | 0.13% |
| 47 | Cyclohexane, ethyl- | 94 | 4.6001 | 0.39% |
| 48 | E,Z-3-Ethylidenecyclohexene | 93 | 4.6578 | 0.05% |
| 49 | Methyl ethyl cyclopentene | 91 | 4.709 | 0.21% |
| 50 | 2,4,6-Octatriene, all-E- | 90 | 4.8372 | 0.31% |
| 51 | Cyclopentene, 1-propyl- | 53 | 4.8949 | 0.39% |
| 52 | Cyclohexene, 1-ethyl- | 94 | 4.9526 | 0.27% |
| 53 | Pentalene, 1,2,3,3a,4,6a-hexahydro- | 87 | 5.0808 | 0.28% |
| 54 | 2,4,6-Octatriene, all-E- | 90 | 5.1705 | 0.07% |
| 55 | Ethylbenzene | 91 | 5.2089 | 2.26% |
| 56 | Cyclopentene,1-(2-propenyl)- | 52 | 5.3115 | 0.21% |
| 57 | Benzene, 1,3-dimethyl- | 95 | 5.382 | 1.75% |
| 58 | Cyclohexene, 1-methyl- | 58 | 5.4973 | 0.26% |
| 59 | 3-Heptanone | 46 | 5.7857 | 0.28% |
| 60 | 2-Heptanone | 49 | 5.8754 | 3.17% |
| 61 | 4-Nonene | 94 | 5.9716 | 0.18% |
| 62 | Nonane | 91 | 6.0549 | 1.09% |
| 63 | cis-2-Nonene | 90 | 6.1895 | 0.60% |
| 64 | Pentaleno[1,2-b]oxirene, octahydro-, (1a.alpha.,1b.alpha.,4a.beta.,5a.alpha.)- | 53 | 6.2792 | 0.16% |
| 65 | cis-3-Nonene | 93 | 6.3689 | 0.30% |
| 66 | Bicyclo[3.3.1]nonane | 62 | 6.4394 | 0.19% |
| 67 | Benzene, 1,3,5-trimethyl- | 46 | 6.5997 | 0.29% |
| 68 | Cyclohexane, propyl- | 93 | 6.6894 | 0.26% |
| 69 | Cyclopentane, butyl- | 96 | 6.7855 | 0.29% |
| 70 | Spiro[4.4]non-1-ene | 43 | 6.9009 | 0.20% |
| 71 | Cyclopentene, 1-butyl- | 68 | 7.1188 | 0.56% |
| 72 | Benzene, propyl- | 91 | 7.2598 | 0.92% |
| 73 | Cyclohexene,1-propyl- | 90 | 7.3687 | 0.14% |
| 74 | Benzene, 1-ethyl-3-methyl- | 95 | 7.452 | 0.79% |
| 75 | Benzene, 1-ethyl-2-methyl- | 94 | 7.4777 | 0.54% |
| 76 | Cyclohexane, propyl- | 43 | 7.6635 | 0.42% |
| 77 | 4-Octanone | 60 | 7.7469 | 0.13% |
| 78 | Benzene, 1-ethyl-2-methyl- | 95 | 7.8622 | 0.97% |
| 79 | Phenol | 50 | 8.0545 | 0.50% |
| 80 | 2-Octanone | 90 | 8.1634 | 2.67% |
| 81 | cis-3-Decene | 89 | 8.2852 | 0.34% |
| 82 | Decane | 94 | 8.3301 | 0.52% |
| 83 | 4-Decene | 96 | 8.4647 | 0.48% |
| 84 | 4-Decene | 95 | 8.6505 | 0.34% |
| 85 | Benzene, 1,2-diethyl- | 86 | 8.83 | 0.43% |
| 86 | Cyclohexane, butyl- | 70 | 9.0222 | 0.15% |
| 87 | Tetracyclo[3.3.1.0(2,8).0(4,6)]-non-2-ene | 83 | 9.1184 | 1.31% |
| 88 | Benzene, 1-propynyl- | 94 | 9.3299 | 0.36% |
| 89 | Cyclopentene, 1-pentyl- | 92 | 9.394 | 0.19% |
| 90 | Benzene, 1,3-diethyl- | 93 | 9.4516 | 0.31% |
| 91 | Benzene, 1-methyl-3-propyl- | 94 | 9.4965 | 0.32% |
| 92 | Benzene, butyl- | 87 | 9.5926 | 0.94% |
| 93 | Phenol, 2-methyl- | 96 | 9.6503 | 0.53% |
| 94 | Benzene, 1,2-diethyl- | 92 | 9.7144 | 0.29% |
| 95 | Cyclohexane, 1-propenyl- | 68 | 9.7977 | 0.24% |
| 96 | Benzene, 1-methyl-2-propyl- | 90 | 9.8362 | 0.43% |
| 97 | Acetophenone | 76 | 9.8746 | 0.50% |
| 98 | 4-Nonanone | 60 | 9.9964 | 0.18% |
| 99 | Benzene, 2-ethyl-1,4-dimethyl- | 97 | 10.0733 | 0.21% |
| 100 | Benzene, 2-ethenyl-1,4-dimethyl- | 86 | 10.1566 | 0.27% |
| 101 | Indan, 1-methyl- | 93 | 10.2592 | 0.92% |
| 102 | 3-Nonanone | 91 | 10.304 | 0.32% |
| 103 | Cyclopropane, 1-heptyl-2-methyl- | 95 | 10.3873 | 0.75% |
| 104 | 2-Nonanone | 92 | 10.4258 | 0.97% |
| 105 | 3-Undecene, (E)- | 90 | 10.5091 | 0.61% |
| 106 | Undecane | 96 | 10.5732 | 0.66% |
| 107 | 5-Undecene | 96 | 10.6885 | 0.88% |
| 108 | 3-Undecene, (Z)- | 97 | 10.8744 | 0.47% |
| 109 | Indan, 1-methyl- | 90 | 11.4128 | 0.79% |
| 110 | Benzene, 1-methyl-4-(1-methylpropyl)- | 90 | 11.5538 | 0.49% |
| 111 | Benzene, (2-methyl-1-propenyl)- | 60 | 11.6435 | 1.35% |
| 112 | Benzenamine, N-propyl- | 42 | 11.714 | 0.30% |
| 113 | 1H-Indene, 1-methyl- | 94 | 11.7716 | 0.26% |
| 114 | Benzene, pentyl- | 74 | 11.8101 | 0.98% |
| 115 | Naphthalene, 1,2,3,4-tetrahydro- | 92 | 11.8934 | 0.38% |
| 116 | Benzene, 1,4-diethyl-2-methyl- | 90 | 11.9319 | 0.30% |
| 117 | 4-Methylphenyl acetone | 70 | 12.0216 | 0.42% |
| 118 | 4-Decanone | 52 | 12.1434 | 0.23% |
| 119 | Benzene, 1-methyl-4-(1-methylpropyl)- | 93 | 12.1818 | 0.14% |
| 120 | 1H-Indene, 2,3-dimethyl- | 94 | 12.2972 | 0.24% |
| 121 | Azulene | 90 | 12.3805 | 0.68% |
| 122 | 1H-Indene, 2,3-dihydro-1,2-dimethyl- | 81 | 12.451 | 0.48% |
| 123 | 2-Dodecene, (Z)- | 95 | 12.5215 | 0.77% |
| 124 | 2-Decanone | 60 | 12.5664 | 0.73% |
| 125 | 3-Dodecene, (E)- | 93 | 12.6176 | 0.42% |
| 126 | Dodecane | 96 | 12.6881 | 0.74% |
| 127 | 2-Dodecene, (Z)- | 97 | 12.8035 | 0.34% |
| 128 | 2-Dodecene, (Z)- | 98 | 12.9829 | 0.18% |
| 129 | Benzene, (2-chloro-2-butenyl)- | 53 | 13.2201 | 0.26% |
| 130 | 2,3,4,5,6,7-Hexahydro-1H-cyclopenta[a]pentalene | 90 | 13.3931 | 0.28% |
| 131 | Bicyclo[4.2.1]nona-2,4,7-triene, 7-ethyl- | 68 | 13.4316 | 0.24% |
| 132 | Cyclohexane, (cyclopentylmethyl)- | 38 | 13.4636 | 0.22% |
| 133 | Benzene, 1,4-dimethyl-2-(2-methylpropyl)- | 52 | 13.5854 | 0.16% |
| 134 | 2-Ethyl-1-H-indene | 81 | 13.6302 | 0.23% |
| 135 | 1H-Indene, 2,3-dihydro-4,7-dimethyl- | 92 | 13.7264 | 0.22% |
| 136 | 1H-Indene, 1,3-dimethyl- | 90 | 13.7712 | 0.24% |
| 137 | 1H-Indene, 1,3-dimethyl- | 94 | 13.8289 | 0.22% |
| 138 | Benzene, hexyl- | 74 | 13.9186 | 0.46% |
| 139 | 1H-Indene, 1,3-dimethyl- | 96 | 13.9507 | 0.30% |
| 140 | Benzene, 1-methyl-2-(1-ethylpropyl)- | 14 | 14.0596 | 0.87% |
| 141 | 1H-Indene, 1,3-dimethyl- | 93 | 14.143 | 0.45% |
| 142 | Benzene, 1-(2-butenyl)-2,3-dimethyl- | 83 | 14.3288 | 0.15% |
| 143 | Benzene, 2-ethenyl-1,3,5-trimethyl- | 64 | 14.3737 | 0.29% |
| 144 | 6-Tridecene, (Z)- | 40 | 14.489 | 0.34% |
| 145 | 2-Tridecene, (E)- | 96 | 14.5339 | 0.42% |
| 146 | 2-Undecanone | 64 | 14.598 | 0.47% |
| 147 | Naphthalene, 1-methyl- | 90 | 14.63 | 0.57% |
| 148 | Tridecane | 96 | 14.6877 | 0.41% |
| 149 | 2-Tridecene, (Z)- | 94 | 14.7838 | 0.24% |
| 150 | Naphthalene, 2-methyl- | 94 | 14.9633 | 0.47% |
| 151 | Benzene, 1,3,5-trimethyl-2-(1-methylethenyl)- | 70 | 15.1235 | 0.14% |
| 152 | N-(2-Aminophenyl)piperidine | 41 | 15.5081 | 0.25% |

TABLE A25-continued

GC-MS data for the reaction of oleic acid with water at 550° C. over zirconium dioxide (experiments 318-323).

| Peak # | Peak Name | % Probability | RT | % of Total |
|---|---|---|---|---|
| 153 | 1,2,3-Trimethylindene | 70 | 15.6939 | 0.22% |
| 154 | Benzene, heptyl- | 70 | 15.9118 | 0.47% |
| 155 | 1,2,3-Trimethylindene | 60 | 16.2835 | 0.21% |
| 156 | Cyclotetradecane | 98 | 16.4245 | 0.35% |
| 157 | 2-Dodecanone | 93 | 16.5078 | 0.55% |
| 158 | Tetradecane | 96 | 16.5719 | 0.22% |
| 159 | Naphthalene, 2,7-dimethyl- | 90 | 17.0077 | 0.44% |
| 160 | Cyclopentane, nonyl- | 97 | 17.45 | 0.38% |
| 161 | 3-Octyne, 2-methyl- | 46 | 17.5781 | 0.36% |
| 162 | Benzene, octyl- | 81 | 17.7896 | 0.66% |
| 163 | Benzene, (1-methylheptyl)- | 10 | 17.8858 | 0.33% |
| 164 | Trifluoroacetic acid, n-heptadecyl ester | 38 | 18.1165 | 0.22% |
| 165 | 1-Pentadecene | 96 | 18.2126 | 0.53% |
| 166 | 2-Tridecanone | 87 | 18.3087 | 0.21% |
| 167 | Pentadecane | 98 | 18.3472 | 0.30% |
| 168 | n-Nonylcyclohexane | 83 | 19.2316 | 0.38% |
| 169 | Benzene, nonyl- | 95 | 19.5777 | 0.66% |
| 170 | Benzene, [1-(1-cyclohexen-1-yl)ethyl]- | 27 | 19.661 | 0.26% |
| 171 | 1-Hexadecene | 97 | 19.911 | 0.57% |
| 172 | Hexadecane | 91 | 20.0263 | 0.38% |
| 173 | Z-8-Hexadecene | 95 | 20.1096 | 0.21% |
| 174 | 1,1'-Biphenyl, 2-methyl- | 87 | 20.2955 | 0.12% |
| 175 | Benzene, decyl- | 60 | 21.2696 | 0.33% |
| 176 | Hexane, 2-phenyl-3-propyl- | 43 | 21.3402 | 0.24% |
| 177 | 3-Heptadecene, (Z)- | 96 | 21.5196 | 0.14% |
| 178 | Tetradecane | 91 | 21.6286 | 0.30% |
| 179 | 2-Heptadecanone | 95 | 24.6408 | 0.29% |
| 180 | cis-cisoid-cis-perhydroanthracene | 58 | 26.839 | 0.22% |
| 181 | 1-Cyclohexylheptene | 60 | 27.0056 | 0.12% |
| 182 | Z,E-3,13-Octadecadien-1-ol | 56 | 27.0441 | 0.25% |
| 183 | Z,E-2,13-Octadecadien-1-ol | 92 | 27.1338 | 0.59% |
| 184 | 2-Nonadecanone | 99 | 27.3966 | 1.24% |
| 185 | 3-Eicosanone | 64 | 28.5886 | 0.19% |

TABLE A29

GC-MS data for the reaction of 70/30 octanoic acid/stearic acid with water at 500° C. over zirconium dioxide (experiments 446-448).

| Peak # | Peak Name | % Probability | RT | % of Total |
|---|---|---|---|---|
| 1 | 1-Propene, 2-methyl- | 52 | 1.2866 | 0.11% |
| 2 | Pentane | 78 | 1.4084 | 0.40% |
| 3 | 1-Hexene | 95 | 1.6776 | 0.70% |
| 4 | 3-Hexene, (E)- | 91 | 1.7545 | 0.16% |
| 5 | 3-Hexene | 90 | 1.8057 | 0.09% |
| 6 | 1-Heptene | 96 | 2.3954 | 0.28% |
| 7 | Heptane | 91 | 2.4851 | 0.30% |
| 8 | 1-Octene | 95 | 3.8181 | 0.16% |
| 9 | Octane | 91 | 3.9719 | 0.11% |
| 10 | 2-Octene, (Z)- | 94 | 4.1065 | 0.21% |
| 11 | 1-Nonene | 97 | 5.8626 | 0.14% |
| 12 | Nonane | 94 | 6.0484 | 0.13% |
| 13 | cis-2-Nonene | 96 | 6.1958 | 0.09% |
| 14 | 1-Decene | 97 | 8.1313 | 0.16% |
| 15 | Decane | 96 | 8.3236 | 0.08% |
| 16 | 1-Undecene | 95 | 10.3744 | 0.17% |
| 17 | 2-Nonanone | 97 | 10.4514 | 3.35% |
| 18 | Undecane | 95 | 10.5667 | 0.10% |
| 19 | 3-Decanone | 94 | 12.4573 | 0.68% |
| 20 | 1-Dodecene | 96 | 12.515 | 0.34% |

TABLE A29-continued

GC-MS data for the reaction of 70/30 octanoic acid/stearic acid with water at 500° C. over zirconium dioxide (experiments 446-448).

| Peak # | Peak Name | % Probability | RT | % of Total |
|---|---|---|---|---|
| 21 | Octanoic Acid | 58 | 12.6816 | 0.82% |
| 22 | Octanoic Acid | 95 | 12.7393 | 0.11% |
| 23 | Octanoic Acid | 94 | 12.8098 | 0.52% |
| 24 | Octanoic Acid | 96 | 13.0982 | 2.78% |
| 25 | Octanoic Acid | 96 | 13.1687 | 0.97% |
| 26 | Octanoic Acid | 91 | 13.2392 | 0.88% |
| 27 | Octanoic Acid | 97 | 13.2648 | 0.38% |
| 28 | Octanoic Acid | 95 | 13.3097 | 0.68% |
| 29 | Octanoic Acid | 96 | 13.3738 | 1.21% |
| 30 | Octanoic Acid | 97 | 13.3995 | 0.72% |
| 31 | Octanoic Acid | 97 | 13.4315 | 0.49% |
| 32 | Octanoic Acid | 97 | 13.4764 | 0.94% |
| 33 | Octanoic Acid | 90 | 13.534 | 2.04% |
| 34 | Octanoic Acid | 96 | 13.6109 | 1.49% |
| 35 | Octanoic Acid | 97 | 13.6494 | 1.15% |
| 36 | Octanoic Acid | 97 | 13.7391 | 2.93% |
| 37 | Octanoic Acid | 97 | 13.7904 | 1.66% |
| 38 | Octanoic Acid | 97 | 13.816 | 0.97% |
| 39 | Octanoic Acid | 97 | 13.8417 | 1.10% |
| 40 | Octanoic Acid | 97 | 13.8609 | 1.53% |
| 41 | Octanoic Acid | 94 | 13.8993 | 1.63% |
| 42 | Octanoic Acid | 96 | 13.9442 | 0.87% |
| 43 | Octanoic Acid | 97 | 13.9955 | 2.65% |
| 44 | Octanoic Acid | 97 | 14.0596 | 2.77% |
| 45 | Octanoic Acid | 97 | 14.0788 | 1.01% |
| 46 | Octanoic Acid | 97 | 14.1172 | 2.76% |
| 47 | Octanoic Acid | 97 | 14.2326 | 6.14% |
| 48 | Octanoic Acid | 97 | 14.2967 | 4.00% |
| 49 | 1-Tridecene | 98 | 14.5274 | 0.17% |
| 50 | 5-Dodecanone | 97 | 16.1168 | 0.19% |
| 51 | 2-Tetradecene, (E)- | 98 | 16.4309 | 0.20% |
| 52 | 6-Tridecanone | 97 | 17.9113 | 0.14% |
| 53 | 1-Pentadecene | 99 | 18.219 | 0.16% |
| 54 | Pentadecane | 98 | 18.3535 | 0.23% |
| 55 | 7-Octadecanone | 72 | 19.6161 | 0.17% |
| 56 | 1-Hexadecene | 96 | 19.9301 | 0.71% |
| 57 | 7-Hexadecene, (Z)- | 99 | 20.1224 | 0.12% |
| 58 | 7-Hexadecene, (Z)- | 97 | 20.3083 | 0.11% |
| 59 | 8-Pentadecanone | 99 | 21.3401 | 12.70% |
| 60 | 1-Heptadecene | 99 | 21.5324 | 0.19% |
| 61 | Heptadecane | 98 | 21.6413 | 0.17% |
| 62 | Octadecanal | 90 | 23.4166 | 0.11% |
| 63 | 2-Heptadecanone | 76 | 24.6471 | 0.12% |
| 64 | n-Hexadecanoic acid | 99 | 25.5443 | 0.27% |
| 65 | 2-Nonadecanone | 99 | 27.4093 | 1.67% |
| 66 | Octadecanoic acid | 94 | 28.4732 | 18.20% |
| 67 | 3-Heptadecanone | 55 | 28.6142 | 0.55% |
| 68 | 2-Nonadecanone | 30 | 30.7996 | 0.11% |
| 69 | 8-Octadecanone | 50 | 31.8763 | 0.43% |
| 70 | 4-BOC-aminophenylacetic acid, methyl ester | 14 | 33.7734 | 0.33% |
| 71 | 8-Pentadecanone | 50 | 34.1259 | 9.29% |
| 72 | Benzaldehyde, 2,4-bis(trimethylsiloxy)- | 38 | 42.8868 | 0.69% |

TABLE A30

GC-MS data for the reaction of 70/30 octanoic acid/stearic acid with water at 550° C. over zirconium dioxide (experiments 449-451).

| Peak # | Peak Name | % Probability | RT | % of Total |
|---|---|---|---|---|
| 1 | Furan, 2,5-dihydro- | 83 | 1.2353 | 0.06% |
| 2 | 1-Butene | 58 | 1.2802 | 0.32% |
| 3 | Pentane | 80 | 1.402 | 1.53% |
| 4 | Cyclopentene | 90 | 1.5558 | 0.12% |
| 5 | 1-Pentene | 64 | 1.5878 | 0.10% |
| 6 | 1-Hexene | 91 | 1.6711 | 1.58% |

TABLE A30-continued

GC-MS data for the reaction of 70/30 octanoic acid/stearic acid with water at 550° C. over zirconium dioxide (experiments 449-451).

| Peak # | Peak Name | % Probability | RT | % of Total |
|---|---|---|---|---|
| 7 | Pentane | 43 | 1.7096 | 0.65% |
| 8 | 3-Hexene, (E)- | 91 | 1.7416 | 0.98% |
| 9 | 2-Hexene | 91 | 1.7929 | 0.67% |
| 10 | Cyclopentane, methyl- | 91 | 1.8762 | 0.20% |
| 11 | 1,4-Pentadiene, 2-methyl- | 91 | 2.0492 | 0.26% |
| 12 | Benzene | 94 | 2.1326 | 0.35% |
| 13 | Cyclohexene | 94 | 2.2928 | 0.21% |
| 14 | 1-Heptene | 96 | 2.3825 | 1.60% |
| 15 | Heptane | 87 | 2.4722 | 1.36% |
| 16 | 2-Pentenal, 2-methyl- | 68 | 2.5171 | 0.22% |
| 17 | 2-Heptene | 94 | 2.5556 | 0.48% |
| 18 | 2-Heptene | 95 | 2.6581 | 0.40% |
| 19 | Cyclohexane, methyl- | 94 | 2.7542 | 0.27% |
| 20 | Cyclopentane, ethyl- | 94 | 2.9016 | 0.08% |
| 21 | Cyclohexene, 4-methyl- | 90 | 2.985 | 0.15% |
| 22 | Cyclobutane, (1-methylethylidene)- | 68 | 3.2092 | 0.07% |
| 23 | Cyclopentane, ethylidene- | 91 | 3.2349 | 0.18% |
| 24 | Toluene | 94 | 3.4079 | 0.38% |
| 25 | Cyclohexene, 1-methyl- | 91 | 3.4528 | 0.22% |
| 26 | 3-Hexanone | 50 | 3.7348 | 0.14% |
| 27 | 1-Octene | 49 | 3.7989 | 1.00% |
| 28 | 4-Octene, (E)- | 92 | 3.9078 | 0.11% |
| 29 | Octane | 80 | 3.9591 | 0.77% |
| 30 | 2-Octene, (E)- | 94 | 4.0873 | 0.37% |
| 31 | 2-Octene, (E)- | 95 | 4.2411 | 0.21% |
| 32 | Ethylbenzene | 90 | 5.2088 | 0.20% |
| 33 | p-Xylene | 95 | 5.3819 | 0.22% |
| 34 | 3-Heptanone | 68 | 5.7728 | 0.17% |
| 35 | 2-Hexanone, 5-methyl- | 47 | 5.8561 | 0.96% |
| 36 | Nonane | 90 | 6.042 | 0.56% |
| 37 | 2-Nonene | 95 | 6.183 | 0.45% |
| 38 | 2-Nonene, (E)- | 96 | 6.356 | 0.22% |
| 39 | Benzene, 1-ethyl-2-methyl- | 94 | 7.4584 | 0.16% |
| 40 | 4-Octanone | 76 | 7.7404 | 0.13% |
| 41 | 2-Methyl-1-nonene | 64 | 8.0031 | 0.09% |
| 42 | 3-Octanone | 95 | 8.048 | 0.15% |
| 43 | 1-Decene | 97 | 8.1313 | 0.66% |
| 44 | Benzene, 1,3,5-trimethyl- | 68 | 8.189 | 0.22% |
| 45 | 3-Nonene, 2-methyl- | 83 | 8.2851 | 0.30% |
| 46 | Decane | 96 | 8.3236 | 0.37% |
| 47 | 4-Decene | 96 | 8.4581 | 0.40% |
| 48 | cis-3-Decene | 96 | 8.644 | 0.23% |
| 49 | Phenol, 3-methyl- | 95 | 9.8938 | 0.18% |
| 50 | 4-Octanone | 52 | 9.9963 | 0.15% |
| 51 | 1-Phenyl-1-butene | 78 | 10.2719 | 0.18% |
| 52 | 3-Undecene, (E)- | 95 | 10.3808 | 0.36% |
| 53 | 2-Nonanone | 97 | 10.5475 | 15.82% |
| 54 | Undecane | 97 | 10.5987 | 0.35% |
| 55 | 5-Undecene | 95 | 10.7077 | 0.17% |
| 56 | 5-Undecene | 98 | 10.8871 | 0.12% |
| 57 | 2-Hexanone, 3,4-dimethyl- | 64 | 11.528 | 0.20% |
| 58 | 5-Decanone | 81 | 12.1497 | 0.09% |
| 59 | 3-Decanone | 95 | 12.515 | 5.18% |
| 60 | 2-Decanone | 50 | 12.5855 | 0.31% |
| 61 | Octanoic Acid | 62 | 12.624 | 0.28% |
| 62 | Dodecane | 90 | 12.6945 | 0.71% |
| 63 | Octanoic Acid | 53 | 12.8034 | 0.84% |
| 64 | Octanoic Acid | 91 | 12.9187 | 0.82% |
| 65 | 2-Dodecene, (Z)- | 98 | 12.9893 | 0.12% |
| 66 | 3-Decanone, 2-methyl- | 68 | 13.4571 | 0.13% |
| 67 | 4-Undecanone | 96 | 14.2198 | 1.81% |
| 68 | 6-Tridecene, (E)- | 93 | 14.4761 | 0.16% |
| 69 | 1-Tridecene | 99 | 14.5338 | 0.38% |
| 70 | 2-Undecanone | 94 | 14.6107 | 0.19% |
| 71 | Tridecane | 96 | 14.6876 | 0.24% |
| 72 | 3-Tridecene, (E)- | 97 | 14.7902 | 0.16% |
| 73 | 3-Tridecene, (E)- | 97 | 14.976 | 0.10% |
| 74 | 5-Dodecanone | 98 | 16.1296 | 2.16% |
| 75 | 2-Tetradecene, (E)- | 98 | 16.4308 | 0.39% |
| 76 | 2-Dodecanone | 95 | 16.5142 | 0.17% |
| 77 | Tetradecane | 98 | 16.5718 | 0.17% |
| 78 | 3-Tetradecene, (Z)- | 98 | 16.6616 | 0.20% |
| 79 | 5-Tetradecene, (E)- | 94 | 16.8474 | 0.15% |
| 80 | 2-Butenamide, N,2,3-trimethyl- | 38 | 17.6613 | 0.15% |
| 81 | 6-Tridecanone | 98 | 17.9113 | 1.50% |
| 82 | 1-Pentadecanol | 91 | 18.11 | 0.13% |
| 83 | 1-Pentadecene | 99 | 18.2189 | 0.35% |
| 84 | Pentadecane | 98 | 18.3535 | 0.53% |
| 85 | Cyclopentadecane | 94 | 18.4368 | 0.12% |
| 86 | 1-Pentadecene | 94 | 18.6227 | 0.14% |
| 87 | Cyclohexanone, 3-methyl-, (R)- | 43 | 18.7893 | 0.11% |
| 88 | Diethyldivinylsilane | 59 | 19.2828 | 0.17% |
| 89 | Thiazole, 4-ethyl-2-propyl- | 45 | 19.4751 | 0.10% |
| 90 | 1-Methylcycloheptanol | 52 | 19.6032 | 0.68% |
| 91 | 1-Hexadecene | 99 | 19.9237 | 0.80% |
| 92 | Z-8-Hexadecene | 99 | 19.9686 | 0.10% |
| 93 | Pentadecane | 96 | 20.0327 | 0.22% |
| 94 | Z-8-Hexadecene | 99 | 20.1224 | 0.39% |
| 95 | 7-Hexadecene, (Z)- | 99 | 20.3082 | 0.29% |
| 96 | 8-Pentadecanone | 99 | 21.3849 | 24.85% |
| 97 | 1-Heptadecene | 99 | 21.5515 | 1.38% |
| 98 | Heptadecane | 96 | 21.6605 | 0.58% |
| 99 | 3-Heptadecene, (Z)- | 96 | 21.7246 | 0.21% |
| 100 | 8-Heptadecene | 94 | 21.9105 | 0.03% |
| 101 | 9-Heptadecanone | 59 | 22.7757 | 0.21% |
| 102 | 3-Buten-2-one, 4-(2-hydroxy-2,6,6-trimethylcyclohexyl)- | 25 | 24.16 | 0.09% |
| 103 | 10-Nonadecanone | 53 | 24.2497 | 0.24% |
| 104 | 2-Heptadecanone | 91 | 24.6471 | 0.19% |
| 105 | 8-Octadecanone | 99 | 25.6597 | 0.20% |
| 106 | 12-Tricosanone | 62 | 27.0119 | 0.24% |
| 107 | 2-Nonadecanone | 99 | 27.4285 | 3.16% |
| 108 | Octadecanoic acid | 99 | 28.1463 | 0.12% |
| 109 | 6-Tridecanone | 53 | 28.3001 | 0.14% |
| 110 | 3-Octadecanone | 72 | 28.6014 | 0.80% |
| 111 | 8-Octadecanone | 76 | 29.5371 | 0.18% |
| 112 | 4-Tridecanone | 47 | 29.6332 | 0.38% |
| 113 | 8-Octadecanone | 70 | 30.7227 | 0.15% |
| 114 | 2-Benzylidenehydrazono-3-methyl-2,3-dihydrobenzothiazole | 53 | 30.7996 | 0.40% |
| 115 | 8-Octadecanone | 60 | 31.8763 | 0.36% |
| 116 | Diethyl-di(prop-2-enyl)-silane | 27 | 31.9083 | 0.19% |
| 117 | Cyclohexanecarboxylic acid, 2-ethenyl-6-hydroxy-, methyl ester, [1s-(1.alpha.,2.alpha.,6.beta.)]- | 53 | 32.9851 | 0.11% |
| 118 | 8-Pentadecanone | 46 | 34.1066 | 6.94% |
| 119 | 6H-Dibenzo[b,d]pyran-1-ol, 6,6,9-trimethyl-3-propyl- | 38 | 42.8868 | 0.28% |

TABLE A31

GC-MS data for the reaction octanoic acid with water at 550° C. over zirconium dioxide (experiments 457-461).

| Peak # | Peak Name | % Probability | RT | % of Total |
|---|---|---|---|---|
| 1 | 1-Propene, 2-methyl- | 80 | 1.2804 | 0.06% |
| 2 | 1-Pentene | 83 | 1.3958 | 0.20% |

TABLE A31-continued

GC-MS data for the reaction octanoic acid with water at 550° C. over zirconium dioxide (experiments 457-461).

| Peak # | Peak Name | % Probability | RT | % of Total |
|---|---|---|---|---|
| 3 | 1-Hexene | 91 | 1.6714 | 0.94% |
| 4 | Hexane | 90 | 1.7162 | 0.38% |
| 5 | 3-Hexene, (Z)- | 91 | 1.7483 | 0.30% |
| 6 | 3-Hexene | 91 | 1.7996 | 0.23% |
| 7 | 1-Heptene | 96 | 2.3828 | 0.82% |
| 8 | Heptane | 87 | 2.4725 | 0.44% |
| 9 | 2-Heptene | 94 | 2.5622 | 0.16% |
| 10 | 2-Heptene | 95 | 2.6583 | 0.16% |
| 11 | 1-Octene | 95 | 3.8055 | 0.16% |
| 12 | 2-Octene, (Z)- | 95 | 4.0875 | 0.12% |
| 13 | 2-Heptanone | 91 | 5.8564 | 0.25% |
| 14 | 2-Nonanone | 96 | 10.5349 | 11.89% |
| 15 | 2-Hexanone, 3-methyl- | 78 | 11.5219 | 0.11% |
| 16 | 1-Decen-3-one | 83 | 12.3166 | 0.09% |
| 17 | 3-Decanone | 70 | 12.4896 | 2.99% |
| 18 | Octanoic Acid | 96 | 12.5537 | 0.08% |
| 19 | Octanoic Acid | 91 | 12.6498 | 0.31% |
| 20 | 4-Undecanone | 96 | 14.2072 | 1.37% |
| 21 | 5-Dodecanone | 98 | 16.1106 | 1.31% |
| 22 | 2-Butenamide, N,2,3-trimethyl- | 35 | 17.6552 | 0.22% |
| 23 | 6-Tridecanone | 93 | 17.918 | 2.12% |
| 24 | 1-Hexadecanol | 90 | 18.0205 | 0.10% |
| 25 | 1-Tridecene | 91 | 18.1038 | 0.17% |
| 26 | Pentadecane | 96 | 18.3409 | 0.09% |
| 27 | Cyclopentane, pentyl- | 70 | 19.0011 | 0.08% |
| 28 | t-Butyl peroxidecyclohexanecarboxylate | 53 | 19.283 | 0.08% |
| 29 | Cyclopentane, undecyl- | 78 | 19.3856 | 0.13% |
| 30 | Thiazole, 4-ethyl-2-propyl- | 30 | 19.4689 | 0.11% |
| 31 | 1-Methylcycloheptanol | 49 | 19.5907 | 0.17% |
| 32 | Octanethioic acid, S-propyl ester | 47 | 20.0713 | 0.26% |
| 33 | 8-Pentadecanone | 99 | 21.4749 | 44.42% |
| 34 | 8-Pentadecanone | 98 | 21.5518 | 29.20% |
| 35 | 3-Decanone | 53 | 21.7249 | 0.25% |
| 36 | Pentadecane, 8-heptylidene- | 91 | 26.6725 | 0.07% |
| 37 | 8-Pentadecanone | 87 | 27.0058 | 0.17% |

TABLE A38

ASTM D4814 testing results.

| Sample Identification | Units | ST44-05D | ASTM D4814 Specification Min | Max |
|---|---|---|---|---|
| SwRI Lab ID | | 6786 | | |
| TEST Method | | | | |
| ASTM D5191 Vapor Pressure | | | | |
| RVP | psi | 4.49 | — | 7.8-15.01 |
| pTot | psi | 5.06 | — | — |
| ASTM D130 Copper Corrosion | | | | |
| Cu Corrosion | rating | 1A | — | 1 |
| ASTM D1319 Hydrocarbon Type | | | | |
| Aromatics | vol % | 19.1 | — | — |
| Olefins | vol % | 65.1 | — | — |
| Saturates | vol % | 15.7 | — | — |
| ASTM D2699 Research Octane Number | | | | |
| RON | ON | 81.4 | — | — |
| ASTM D2700 Motor Octane Number | | | | |
| MON | ON | 73 | — | — |
| ASTM D4814 Anti Knock Index | | | | |
| AKI (R + M)/2 | ON | 77.2 | 85.02 | — |
| ASTM D3231 Phosphorus | | | | |
| Phosphorus | mg/L | 0.48 | — | 1.3 |
| ASTM D3237 Lead Content | | | | |
| Lead | g/gal | <0.001 | — | 0.05 |
| ASTM D381 Gum Content | | | | |
| Unwashed Gum | mg/100 ml | 11 | — | — |
| Washed Gum | mg/100 ml | 6 | — | 5 |
| ASTM D4052 API, Specific Gravity | | | | |
| API @ 60° F. | ° | 50 | — | — |
| Sp. Gravity @ 60° F. | g/ml | 0.7797 | — | — |
| Density @ 15° C. | g/ml | 0.7795 | — | — |

TABLE A38-continued

ASTM D4814 testing results.

| Sample Identification | Units | ST44-05D | ASTM D4814 Specification Min | Max |
|---|---|---|---|---|
| ASTM D4814 Annex 1 Silver Corrosion | | | | |
| Agcorrosion | rating | 0 | — | 1 |
| ASTM D5188 Vapor Liquid Ratio | | | | |
| V/L | °F. | >176.0 | 95-140 | — |
| ASTM D525 Oxidation Stability | | | | |
| Run Time | min | 1440 | — | — |
| Break | Y/N | Y | — | — |
| Induction period | min | 80 | 240 | — |
| ASTM D5453 Sulfur Content | | | | |
| Sulfur | ppm | 1.4 | — | 80 |
| ASTM D5599 Oxygenate Content | | | | |
| Ethanol | wt % | <0.1 | — | — |
| MTBE | wt % | <0.1 | — | — |
| DIPE | wt % | <0.1 | — | — |
| Total Oxygen | wt % | 1.563 | — | — |
| ASTM D86 Distillation | | | | |
| Initial Boiling Point | °F. | 112.4 | — | — |
| 5% Evap | °F. | 160.2 | — | — |
| 10% Evap | °F. | 181.8 | — | 122-158 |
| 15% Evap | °F. | 195.5 | — | — |
| 20% Evap | °F. | 206.3 | — | — |
| 30% Evap | °F. | 225.3 | — | — |
| 40% Evap | °F. | 244.1 | — | — |
| 50% Evap | °F. | 263.2 | 170 | 230-250 |
| 60% Evap | °F. | 282.5 | — | — |
| 70% Evap | °F. | 304.4 | — | — |
| 80% Evap | °F. | 327.1 | — | — |
| 90% Evap | °F. | 358.3 | — | 365-374 |
| 95% Evap | °F. | 385.9 | — | — |
| Final Boiling Point | °F. | 433 | — | 437 |
| Recovered | % | 98 | — | — |
| Residue | % | 1 | — | 2 |
| Loss | % | 1 | — | — |
| E200 | % | 17.05 | — | — |
| E300 | % | 68.26 | — | — |
| Driveability Index | | 1420.6 | — | 1200-12501 |

TABLE A39

Reaction conditions for the reaction of soybean oil with superheated water.

| Exp. No. | Oil Type | Catalyst Type | Particle Size, Pore size, Surface Area | Preheater Temperature Setting point (C) | Reactor Inlet Temp. (°C.), T2 | Back Pressure (PSI) |
|---|---|---|---|---|---|---|
| 567 | Soybean | Zirconia | 10 um/300 A/30 m^2/g | 545 | 503 | 3500 |
| 568 | Soybean | Zirconia | 10 um/300 A/30 m^2/g | 545 | 503 | 3500 |
| 569 | Soybean | Zirconia | 10 um/300 A/30 m^2/g | 545 | 507 | 3500 |
| 570 | Soybean | Zirconia | 10 um/300 A/30 m^2/g | 545 | 508 | 3500 |
| 571 | Soybean | Zirconia | 10 um/300 A/30 m^2/g | 545 | 508 | 3500 |
| 572 | Soybean | Zirconia | 10 um/300 A/30 m^2/g | 548 | 501 | 3300 |
| 573 | Soybean | Zirconia | 10 um/300 A/30 m^2/g | 517 | 513 | 3500 |
| 574 | Soybean | Zirconia | 10 um/300 A/30 m^2/g | 517 | 512 | 3500 |
| 575 | Soybean | Zirconia | 10 um/300 A/30 m^2/g | 524 | 520 | 3500 |
| 576 | Soybean | Zirconia | 10 um/300 A/30 m^2/g | 533 | 527 | 3600 |
| 577 | Soybean | Zirconia | 10 um/300 A/30 m^2/g | 535 | 529 | 3600 |
| 578 | Soybean | Zirconia | 10 um/300 A/30 m^2/g | 525 | 511 | 3500 |
| 579 | Soybean | Zirconia | 10 um/300 A/30 m^2/g | 525 | 511 | 3600 |
| 580 | Soybean | Zirconia | 10 um/300 A/30 m^2/g | 522 | 513 | 3600 |
| 581 | Soybean | Zirconia | 10 um/300 A/30 m^2/g | 522 | 511 | 3500 |
| 582 | Soybean | Zirconia | 10 um/300 A/30 m^2/g | 522 | 512 | 3500 |

TABLE A39-continued

Reaction conditions for the reaction of soybean oil with superheated water.

| Exp. No. | Oil Type | Catalyst Type | Particle Size, Pore size, Surface Area | Preheater Temperature Setting point (C) | Reactor Inlet Temp. (° C.), T2 | Back Pressure (PSI) |
|---|---|---|---|---|---|---|
| 583 | Soybean | Manganese Oxide | 325 mesh | 350 | 350 | 3500 |
| 584 | Soybean | Zirconia | 10 um/300 A/30 m^2/g | 525 | 514 | 3500 |
| 585 | Soybean | Zirconia | 10 um/300 A/30 m^2/g | 525 | 516 | 3500 |
| 586 | Soybean | Zirconia | 10 um/300 A/30 m^2/g | 528 | 519 | 3500 |
| 587 | Soybean | Zirconia | 10 um/300 A/30 m^2/g | 532 | 522 | 3600 |
| 588 | Soybean | Zirconia | 10 um/300 A/30 m^2/g | 535 | 526 | 3600 |
| 589 | Soybean | Zirconia | 10 um/300 A/30 m^2/g | 535 | 525 | 3600 |
| 590 | Soybean | Tungsten(VI) oxide | 20 um | 400 | 400 | 3500 |
| 591 | Soybean | Tungsten(VI) oxide | 20 um | 400 | 400 | 3500 |
| 592 | Soybean | Tungsten(VI) oxide | 20 um | 450 | 450 | 3500 |
| 593 | Soybean | Tungsten(VI) oxide | 20 um | 450 | 450 | 3500 |
| 594 | Soybean | Tungsten(VI) oxide | 20 um | 500 | 497 | 3500 |
| 595 | Soybean | Tungsten(VI) oxide | 20 um | 500 | 499 | 3500 |
| 596 | Soybean | Tungsten(VI) oxide | 20 um | 500 | 500 | 3500 |
| 597 | Soybean | Zirconia | 10 um/300 A/30 m^2/g | 530 | 508 | 3600 |
| 598 | Soybean | Zirconia | 10 um/300 A/30 m^2/g | 530 | 510 | 3600 |
| 599 | Soybean | Zirconia | 10 um/300 A/30 m^2/g | 530 | 509 | 3600 |
| 600 | Soybean | Zirconia | 10 um/300 A/30 m^2/g | 533 | 510 | 3600 |
| 601 | Soybean | Zirconia | 10 um/300 A/30 m^2/g | 533 | 510 | 3700 |
| 602 | Soybean | Tungsten(VI) oxide | 20 um | 550 | 550 | 3500 |
| 603 | Soybean | Tungsten(VI) oxide | 20 um | 550 | 550 | 3500 |
| 604 | Soybean | Tungsten(VI) oxide | 20 um | 550 | 540 | 3500 |
| 605 | Soybean | Tungsten(VI) oxide | 20 um | 515 | 515 | 3500 |
| 606 | Soybean | Tungsten(VI) oxide | 20 um | 515 | 515 | 3500 |
| 607 | Soybean | Zirconia | 10 um/300 A/30 m^2/g | 200 | 193 | 3500 |
| 608 | Soybean | Zirconia | 10 um/300 A/30 m^2/g | | | |
| 609 | Soybean | Zirconia | 10 um/300 A/30 m^2/g | 532 | 514 | 3500 |
| 610 | Soybean | Zirconia | 10 um/300 A/30 m^2/g | 535 | 516 | 3500 |
| 611 | Soybean | Zirconia | 10 um/300 A/30 m^2/g | 538 | 519 | 3500 |
| 612 | Soybean | Zirconia | 10 um/300 A/30 m^2/g | 541 | 521 | 3500 |
| 613 | Soybean | Zirconia | 10 um/300 A/30 m^2/g | 543 | 524 | 3500 |
| 614 | Soybean | Zirconia | 10 um/300 A/30 m^2/g | | | |
| 615 | Soybean | Zirconia | 10 um/300 A/30 m^2/g | 0 | 150 | 3500 |
| 616 | Soybean | Zirconia | 10 um/300 A/30 m^2/g | | | |
| 617 | Soybean | Zirconia | 10 um/300 A/30 m^2/g | 520 | 512 | 4000 |
| 618 | Soybean | Zirconia | 10 um/300 A/30 m^2/g | 520 | 512 | 3600 |
| 619 | Soybean | Zirconia | 10 um/300 A/30 m^2/g | 520 | 513 | 3600 |
| 620 | Soybean | Zirconia | 10 um/300 A/30 m^2/g | 520 | 513 | 3600 |
| 621 | Soybean | Zirconia | 10 um/300 A/30 m^2/g | 517 | 513 | 3600 |
| 622 | Soybean | Zirconia | 10 um/300 A/30 m^2/g | 517 | 512 | 3600 |
| 623 | Soybean | Zirconia | 10 um/300 A/30 m^2/g | 526 | 511 | 3500 |
| 624 | Soybean | Zirconia | 10 um/300 A/30 m^2/g | 529 | 515 | 3500 |
| 625 | Soybean | Zirconia | 10 um/300 A/30 m^2/g | 534 | 518 | 3500 |
| 626 | Soybean | Zirconia | 10 um/300 A/30 m^2/g | 536 | 520 | 3500 |
| 627 | Soybean | Zirconia | 10 um/300 A/30 m^2/g | 539 | 522 | 3500 |
| 628 | Soybean | Zirconia | 10 um/300 A/30 m^2/g | 544 | 528 | 3500 |
| 629 | Soybean | Zirconia | 10 um/300 A/30 m^2/g | 530 | 510 | 3500 |
| 630 | Soybean | Zirconia | 10 um/300 A/30 m^2/g | 530 | 509 | 3500 |
| 631 | Soybean | Zirconia | 10 um/300 A/30 m^2/g | 530 | 510 | 3500 |
| 632 | Soybean | Zirconia | 10 um/300 A/30 m^2/g | 530 | 511 | 3500 |
| 633 | Soybean | Zirconia | 10 um/300 A/30 m^2/g | 530 | 511 | 3500 |
| 634 | Soybean | Zirconia | 10 um/300 A/30 m^2/g | 522 | 514 | 3500 |
| 635 | Soybean | Zirconia | 10 um/300 A/30 m^2/g | 525 | 518 | 3500 |
| 636 | Soybean | Zirconia | 10 um/300 A/30 m^2/g | 527 | 519 | 3500 |
| 637 | Soybean | Zirconia | 10 um/300 A/30 m^2/g | 532 | 522 | 3500 |
| 638 | Soybean | Zirconia | 10 um/300 A/30 m^2/g | 535 | 525 | 3500 |
| 639 | Soybean | Tungsten(VI) oxide | 20 um | 450 | 447 | 3650 |

TABLE A39-continued

Reaction conditions for the reaction of soybean oil with superheated water.

| Exp. No. | Oil Type | Catalyst Type | Particle Size, Pore size, Surface Area | Preheater Temperature Setting point (C) | Reactor Inlet Temp. (°C.), T2 | Back Pressure (PSI) |
|---|---|---|---|---|---|---|
| 640 | Soybean | Tungsten(VI) oxide | 20 um | 450 | 449 | 3400 |
| 641 | Soybean | Tungsten(VI) oxide | 20 um | 450 | 450 | 3500 |
| 642 | Soybean | Tungsten(VI) oxide | 20 um | 500 | 498 | 3500 |
| 643 | Soybean | Tungsten(VI) oxide | 20 um | 500 | 498 | 3500 |
| 644 | Soybean | Tungsten(VI) oxide | 20 um | 500 | 500 | 3500 |
| 645 | Soybean | Tungsten(VI) oxide | 20 um | 525 | 522 | 3600 |
| 646 | Soybean | Tungsten(VI) oxide | 20 um | 525 | 525 | 3600 |
| 647 | Soybean | Tungsten(VI) oxide | 20 um | 525 | 525 | 3600 |
| 648 | Soybean | Nicklel Oxide | 325 mesh | 500 | 500 | 3700 |
| 649 | Soybean | Nicklel Oxide | 325 mesh | 500 | 500 | 3700 |
| 650 | Cuphea | Zirconia | 10 um/300 A/30 m^2/g | 515 | 501 | 3500 |
| 651 | Cuphea | Zirconia | 10 um/300 A/30 m^2/g | 515 | 502 | 3500 |
| 652 | Cuphea | Zirconia | 10 um/300 A/30 m^2/g | 515 | 504 | 3500 |
| 653 | Cuphea | Zirconia | 10 um/300 A/30 m^2/g | 515 | 504 | 3500 |
| 654 | Cuphea | Zirconia | 10 um/300 A/30 m^2/g | 515 | 499 | 3500 |
| 655 | Cuphea | Zirconia | 10 um/300 A/30 m^2/g | 515 | 500 | 3500 |
| 656 | Cuphea | Zirconia | 10 um/300 A/30 m^2/g | 560 | 552 | 3500 |
| 657 | Cuphea | Zirconia | 10 um/300 A/30 m^2/g | 560 | 551 | 3500 |
| 658 | Cuphea | Zirconia | 10 um/300 A/30 m^2/g | 560 | 553 | 3500 |
| 659 | Soybean | Zirconia | 10 um/300 A/30 m^2/g | 517 | 500 | 3500 |
| 660 | Soybean | Zirconia | 10 um/300 A/30 m^2/g | 515 | 503 | 3500 |

TABLE A40

Data collected for sample conditions given in Table 1.

| Exp. No. | Actual Water Flow (min/min) | Actual Oil Flow rate (min/Min) | Total Flow Rate (ml/min) | Acid Number | Production Rate (fuel g/min) |
|---|---|---|---|---|---|
| 568 | 5.6 | 2.06 | 7.660 | 6.62 | 1.15 |
| 569 | 5.6 | 2.06 | 7.660 | 8.48 | 1.143 |
| 570 | 5.6 | 2.06 | 7.660 | 9.25 | 1.121 |
| 571 | 5.6 | 2.06 | 7.660 | 7.56 | 1.077 |
| 572 | 5.6 | 2.06 | 7.660 | 5.1 | 1.036 |
| 573 | 5.6 | 2.06 | 7.660 | 23.58 | 1.246 |
| 574 | 5.6 | 2.06 | 7.660 | 31.69 | 1.258 |
| 575 | 5.6 | 2.06 | 7.660 | 27.58 | 1.213 |
| 576 | 5.6 | 2.06 | 7.660 | 19.92 | 1.13 |
| 577 | 5.6 | 2.06 | 7.660 | 31.99 | 1.113 |
| 578 | 5.6 | 2.06 | 7.660 | 13.98 | 1.253 |
| 579 | 5.6 | 2.06 | 7.660 | 14.28 | 1.25 |
| 580 | 5.6 | 2.06 | 7.660 | 16.85 | 1.281 |
| 582 | 5.6 | 2.06 | 7.660 | 15.51 | 1.256 |
| 584 | 5.8 | 2.06 | 7.860 | 10.96 | 1.243 |
| 585 | 5.8 | 2.06 | 7.860 | 11.37 | 1.245 |
| 586 | 5.8 | 2.06 | 7.860 | 9.62 | 1.21 |
| 587 | 5.8 | 2.06 | 7.860 | 8.93 | 1.178 |
| 588 | 5.8 | 2.06 | 7.860 | 8.35 | 1.125 |
| 589 | 5.8 | 2.06 | 7.860 | 14.28 | 1.128 |
| 591 | 5.999 | 2.06325 | 8.062 | 191.7906 | 1.77 |
| 593 | 5.999 | 2.06325 | 8.062 | 197.2756 | 1.16 |
| 596 | 5.999 | 2.06325 | 8.062 | 171.4292 | 1.52 |
| 597 | 5.6 | 2.06 | 7.660 | 12.77 | 1.235 |
| 598 | 5.6 | 2.06 | 7.660 | 12.67 | 1.23 |
| 599 | 5.6 | 2.06 | 7.660 | 11.81 | 1.211 |
| 600 | 5.6 | 2.06 | 7.660 | 11.5 | 1.208 |
| 601 | 5.6 | 2.06 | 7.660 | 13.7 | 1.2 |
| 603 | 5.999 | 2.06325 | 8.062 | 120.3252 | 0.985 |
| 604 | 5.999 | 2.06325 | 8.062 | 126.0118 | 1.006 |
| 606 | 5.999 | 2.06325 | 8.062 | 169.902 | 1.326 |
| 609 | 5.6 | 2.06 | 7.660 | 11.05 | 1.22 |
| 610 | 5.6 | 2.06 | 7.660 | 11.66 | 1.22 |
| 611 | 5.6 | 2.06 | 7.660 | 9.15 | 1.19 |
| 612 | 5.6 | 2.06 | 7.660 | 10.75 | 1.17 |
| 613 | 5.6 | 2.06 | 7.660 | 10.47 | 1.15 |
| 618 | 5.6 | 2.06 | 7.660 | 9.21 | 1.21 |
| 619 | 5.6 | 2.06 | 7.660 | 8.09 | 1.19 |
| 620 | 5.6 | 2.06 | 7.660 | 9.24 | 1.19 |
| 621 | 5.6 | 2.06 | 7.660 | 9.54 | 1.22 |
| 622 | 5.6 | 2.06 | 7.660 | 11.24 | 1.09 |
| 623 | 5.6 | 2.06 | 7.660 | 7.34 | 1.21 |
| 624 | 5.6 | 2.06 | 7.660 | 7.85 | 1.2 |
| 625 | 5.6 | 2.06 | 7.660 | 8.45 | 1.18 |
| 626 | 5.6 | 2.06 | 7.660 | 10.11 | 1.15 |
| 627 | 5.6 | 2.06 | 7.660 | 12.28 | 1.13 |
| 628 | 5.6 | 2.06 | 7.660 | 14.12 | 1.09 |
| 629 | 5.6 | 2.06 | 7.660 | 11.5 | 1.23 |
| 630 | 5.6 | 2.06 | 7.660 | 12.34 | 1.22 |
| 631 | 5.6 | 2.06 | 7.660 | 11.92 | 1.23 |
| 632 | 5.6 | 2.06 | 7.660 | 12.9 | 1.26 |
| 633 | 5.6 | 2.06 | 7.660 | 12.72 | 1.22 |
| 634 | 5.6 | 2.06 | 7.660 | 11.32 | 1.24 |
| 635 | 5.6 | 2.06 | 7.660 | 9.4 | 1.21 |
| 636 | 5.6 | 2.06 | 7.660 | 8.4 | 1.19 |
| 637 | 5.6 | 2.06 | 7.660 | 9.03 | 1.15 |

TABLE A40-continued

Data collected for sample conditions given in Table 1.

| Exp. No. | Actual Water Flow (min/min) | Actual Oil Flow rate (min/Min) | Total Flow Rate (ml/min) | Acid Number | Production Rate (fuel g/min) |
|---|---|---|---|---|---|
| 644 | 5.999 | 2.06325 | 8.062 | 166.45 | 1.51 |
| 646 | 5.999 | 2.06325 | 8.062 | 152.49 | 1.37 |
| 647 | 5.999 | 2.06325 | 8.062 | 152.97 | 1.28 |
| 649 | 5.999 | 2.06325 | 8.062 | 167.0148 | 1.44 |
| 650 | 5.6 | 2.06 | 7.660 | 52.1 | 0.543 |
| 651 | 5.6 | 2.06 | 7.660 | 48.8 | 0.571 |
| 652 | 5.6 | 2.06 | 7.660 | 69.9 | 0.778 |
| 653 | 5.6 | 2.06 | 7.660 | 73.9 | 1.238 |
| 654 | 5.6 | 2.7 | 8.300 | 108.9 | 1.458 |
| 655 | 5.6 | 2.7 | 8.300 | 99.36 | 1.385 |
| 656 | 5.6 | 2.7 | 8.300 | 8.04 | 0.963 |
| 657 | 5.6 | 2.7 | 8.300 | 2.19 | 0.866 |
| 658 | 5.6 | 2.7 | 8.300 | 2.45 | 0.908 |
| 659 | 5.6 | 2.06 | 7.660 | 172 | 1.111 |
| 660 | 5.6 | 2.06 | 7.660 | 170 | 0.855 |
| 661 | 5.6 | 2.06 | 7.660 | 167 | 0.715 |
| 662 | 5.6 | 2.06 | 7.660 | 167 | 0.608 |

TABLE A41

GC-MS data for the reaction of soybean oil with water at 515° C. over tungsten (VI) oxide (experiments 605-606).

| Peak # | Peak Name | % Probability | RT | % of Total |
|---|---|---|---|---|
| 1 | Benzene, 1,3-bis(3-phenoxyphenoxy)- | 90 | 0.1524 | 2.28% |
| 2 | 3-Butenoic acid | 83 | 1.2354 | 0.08% |
| 3 | 1-Propene, 2-methyl- | 49 | 1.2803 | 0.38% |
| 4 | Pentane | 58 | 1.4021 | 0.98% |
| 5 | Cyclopentene | 90 | 1.5559 | 0.32% |
| 6 | 1-Hexene | 91 | 1.6712 | 0.99% |
| 7 | Hexane | 86 | 1.7033 | 0.57% |
| 8 | 3-Hexene, (Z)- | 94 | 1.7417 | 0.23% |
| 9 | Cyclopentene, 1-methyl- | 64 | 1.793 | 0.29% |
| 10 | Cyclopentane, methyl- | 87 | 1.8764 | 0.24% |
| 11 | Cyclopentene, 1-methyl- | 90 | 2.0494 | 0.45% |
| 12 | Benzene | 94 | 2.1327 | 1.01% |
| 13 | Cyclohexene | 93 | 2.2929 | 0.46% |
| 14 | 1-Heptene | 96 | 2.3762 | 1.16% |
| 15 | Heptane | 91 | 2.466 | 0.54% |
| 16 | 2-Heptene, (E)- | 93 | 2.5557 | 0.29% |
| 17 | (Z)-3-Heptene | 70 | 2.6518 | 0.16% |
| 18 | Cyclohexane, methyl- | 91 | 2.7479 | 0.60% |
| 19 | Cyclopentane, ethyl- | 96 | 2.8954 | 0.11% |
| 20 | Cyclohexene, 4-methyl- | 86 | 2.9787 | 0.32% |
| 21 | Cyclopentane, ethylidene- | 72 | 3.2286 | 0.39% |
| 22 | Toluene | 93 | 3.3952 | 1.02% |
| 23 | Cyclohexene, 4-methyl- | 83 | 3.4337 | 0.72% |
| 24 | 1-Octene | 96 | 3.7926 | 0.81% |
| 25 | Cyclohexane, 1,2-dimethyl-, trans- | 94 | 3.8887 | 0.15% |
| 26 | Hexane, 3-ethyl- | 87 | 3.9464 | 0.36% |
| 27 | 2-Octene, (E)- | 94 | 4.0746 | 0.34% |
| 28 | 2-Octene, (Z)- | 93 | 4.2284 | 0.15% |
| 29 | Cyclohexane, 1,2-dimethyl-, cis- | 89 | 4.4784 | 0.13% |
| 30 | Cyclohexene, 1-ethyl- | 91 | 4.927 | 0.14% |
| 31 | 2,4-Octadiene | 94 | 5.0103 | 0.15% |
| 32 | 2,4-Octadiene | 49 | 5.0488 | 0.25% |
| 33 | Ethylbenzene | 90 | 5.1898 | 0.59% |
| 34 | p-Xylene | 95 | 5.3692 | 0.20% |
| 35 | 1-Nonene | 97 | 5.8306 | 1.05% |
| 36 | Nonane | 83 | 6.0165 | 0.45% |
| 37 | 2-Nonene, (E)- | 42 | 6.1639 | 0.32% |
| 38 | Bicyclo[2.2.1]heptane, 2-ethenyl- | 64 | 7.0932 | 0.42% |
| 39 | Benzene, propyl- | 90 | 7.2406 | 0.45% |
| 40 | Benzene, 1-ethyl-2-methyl- | 81 | 7.4649 | 0.29% |
| 41 | Benzene, 1-ethyl-2-methyl- | 93 | 7.8495 | 0.19% |
| 42 | 1-Decene | 96 | 8.0994 | 0.54% |
| 43 | Benzene, 1,2,3-trimethyl- | 50 | 8.1763 | 0.34% |
| 44 | Benzene, 2-propenyl- | 68 | 8.2532 | 0.23% |
| 45 | Decane | 96 | 8.2981 | 0.35% |
| 46 | 2,6-Dimethylbicyclo[3.2.1]octane | 42 | 8.4391 | 0.44% |
| 47 | 1H-Indene, 2,3,4,5,6,7-hexahydro- | 70 | 8.5544 | 0.40% |
| 48 | Heptanoic acid | 50 | 8.7723 | 0.80% |
| 49 | Benzene, 1,1'-(1-ethenyl-1,3-propanediyl)bis- | 72 | 9.0992 | 0.35% |
| 50 | Benzene, butyl- | 90 | 9.567 | 0.69% |
| 51 | Benzene, (1-methylpropyl)- | 50 | 9.8298 | 0.18% |
| 52 | Indan, 1-methyl- | 70 | 10.24 | 0.21% |
| 53 | 1-Undecene | 97 | 10.3489 | 0.88% |
| 54 | Cyclopropane, 1,1-dimethyl-2-(1-methyl-2-propenyl)- | 38 | 10.4771 | 0.41% |
| 55 | Undecane | 56 | 10.5348 | 0.38% |
| 56 | Cyclopentane, hexyl- | 78 | 10.6565 | 1.16% |
| 57 | Bicyclo[3.1.0]hexan-3-one, 4-methyl-1-(1-methylethyl)-, [1S-(1.alpha.,4.beta.,5.alpha.)]- | 46 | 10.7399 | 0.54% |
| 58 | 1-Trifluoroacetoxy-10-undecene | 38 | 10.8424 | 1.10% |
| 59 | 3-Nonyne | 62 | 11.0988 | 0.44% |
| 60 | Benzene, 1-methyl-4-(1-methylpropyl)- | 81 | 11.5218 | 0.38% |
| 61 | Cyclododecyne | 72 | 11.5794 | 0.16% |
| 62 | 2-Methylindene | 90 | 11.6115 | 0.42% |
| 63 | Benzene, pentyl- | 90 | 11.7845 | 2.02% |
| 64 | Naphthalene, 1,2,3,4-tetrahydro- | 64 | 11.8678 | 0.48% |
| 65 | 2-Methylindan-2-ol | 64 | 11.9896 | 0.39% |
| 66 | 1H-Indene, 2,3-dihydro-1,2-dimethyl- | 35 | 12.4254 | 0.53% |
| 67 | 1-Dodecene | 95 | 12.4895 | 1.06% |
| 68 | 7-Octenoic acid | 62 | 12.592 | 0.56% |
| 69 | Octanoic Acid | 27 | 12.6561 | 0.56% |
| 70 | Benzene, hexyl- | 91 | 13.8866 | 0.44% |
| 71 | Benzene, 1-methyl-2-(1-ethylpropyl)- | 46 | 14.0405 | 0.28% |
| 72 | 1,3-Dithiolane, 2-methyl-2-propyl- | 38 | 14.252 | 0.25% |
| 73 | 1,19-Eicosadiene | 52 | 14.3545 | 0.65% |
| 74 | 1-Tridecene | 97 | 14.5019 | 0.85% |
| 75 | Tridecane | 96 | 14.6557 | 0.15% |
| 76 | Benzene, heptyl- | 70 | 15.8926 | 0.15% |
| 77 | Methanone, dicyclopropyl- | 38 | 16.1874 | 1.12% |
| 78 | Tridecanoic acid | 58 | 16.2836 | 0.35% |
| 79 | 1-Tetradecene | 98 | 16.4053 | 0.68% |
| 80 | n-Octylidencyclohexane | 52 | 17.5461 | 0.14% |
| 81 | 5-Nonadecen-1-ol | 43 | 17.7769 | 0.21% |
| 82 | Undecylenic Acid | 89 | 17.8794 | 0.83% |
| 83 | Undecanoic acid | 83 | 17.9691 | 0.23% |
| 84 | 7-Hexadecenoic acid, methyl ester, (Z)- | 53 | 18.0845 | 0.51% |
| 85 | 1-Pentadecene | 99 | 18.187 | 0.21% |
| 86 | 13-Tetradecenal | 46 | 18.2511 | 0.20% |
| 87 | Pentadecane | 97 | 18.3216 | 0.17% |
| 88 | E-11-Hexadecenal | 52 | 19.4944 | 0.35% |
| 89 | 1,11-Dodecadiene | 95 | 19.5778 | 0.45% |
| 90 | Spiro[5.6]dodecane | 92 | 19.597 | 0.54% |
| 91 | 1-Hexadecene | 98 | 19.8854 | 0.39% |
| 92 | Z-12-Tetradecenal | 90 | 21.071 | 0.17% |

TABLE A41-continued

GC-MS data for the reaction of soybean oil with water at 515° C. over tungsten (VI) oxide (experiments 605-606).

| Peak # | Peak Name | % Probability | RT | % of Total |
|---|---|---|---|---|
| 93 | 7-Phenylheptanoic acid | 81 | 22.4233 | 0.27% |
| 94 | 7,11-Hexadecadienal | 89 | 22.5835 | 0.31% |
| 95 | Tetradecanoic acid | 95 | 22.6797 | 0.18% |
| 96 | 8-Phenyloctanoic acid | 95 | 24.0063 | 1.53% |
| 97 | N-(3-Phenyl-butyl)-undecafluoro-hexanamide | 22 | 24.064 | 0.30% |
| 98 | n-Hexadecanoic acid | 99 | 25.615 | 2.85% |
| 99 | n-Hexadecanoic acid | 99 | 25.7816 | 12.18% |
| 100 | 9,12-Octadecadienoic acid (Z,Z)- | 52 | 27.4222 | 0.76% |
| 101 | Hepta-4,6-dienoic acid, ethyl ester | 53 | 27.4735 | 0.19% |
| 102 | 9,12-Octadecadienoic acid (Z,Z)- | 81 | 27.5633 | 0.58% |
| 103 | Bicyclo[7.7.0]hexadec-1(9)-ene | 76 | 27.8132 | 0.56% |
| 104 | 9,12-Octadecadienoic acid (Z,Z)- | 98 | 27.935 | 2.21% |
| 105 | Z,E-2,13-Octadecadien-1-ol | 95 | 28.1785 | 24.93% |
| 106 | Octadecanoic acid | 98 | 28.4156 | 7.28% |
| 107 | 9,12-Octadecadienoic acid (Z,Z)- | 99 | 29.0117 | 0.55% |

TABLE A42

GC-MS data for the reaction of soybean oil with water at 550° C. over tungsten (VI) oxide (experiments 602-604).

| Peak # | Peak Name | % Probability | RT | % of Total |
|---|---|---|---|---|
| 1 | Benzene | 94 | 2.152 | 0.26% |
| 2 | 1-Heptene | 87 | 2.3955 | 0.51% |
| 3 | Heptane | 91 | 2.4788 | 0.75% |
| 4 | 2-Heptene | 90 | 2.5686 | 0.25% |
| 5 | 2-Heptene | 78 | 2.6711 | 0.18% |
| 6 | Cyclohexane, methyl- | 91 | 2.7672 | 0.38% |
| 7 | Cyclopentane, ethyl- | 97 | 2.9146 | 0.13% |
| 8 | Cyclohexene, 3-methyl- | 83 | 2.9979 | 0.22% |
| 9 | Cyclopropane, 1-methyl-1-isopropenyl- | 87 | 3.2223 | 0.15% |
| 10 | Cyclopentane, ethylidene- | 91 | 3.2479 | 0.41% |
| 11 | Toluene | 94 | 3.4145 | 2.65% |
| 12 | 1-Octene | 93 | 3.8119 | 1.26% |
| 13 | Cyclohexane, 1,2-dimethyl-, trans- | 64 | 3.9144 | 0.27% |
| 14 | Octane | 72 | 3.9657 | 1.15% |
| 15 | 2-Octene, (E)- | 93 | 4.1003 | 0.55% |
| 16 | 2-Octene, (E)- | 93 | 4.2541 | 0.27% |
| 17 | Cyclohexane, 1,2-dimethyl-, cis- | 92 | 4.5041 | 0.16% |
| 18 | Cyclohexane, ethyl- | 87 | 4.5938 | 0.33% |
| 19 | Methyl ethyl cyclopentene | 91 | 4.7155 | 0.18% |
| 20 | Cyclohexene, 1,2-dimethyl- | 94 | 4.8437 | 0.18% |
| 21 | Cyclopentene, 1-propyl- | 53 | 4.9014 | 0.20% |
| 22 | 3-Cyclohexene-1-carboxaldehyde | 64 | 5.0744 | 0.40% |
| 23 | Ethylbenzene | 91 | 5.2026 | 1.55% |
| 24 | p-Xylene | 95 | 5.3757 | 1.18% |
| 25 | Cyclohexene, 1,6-dimethyl- | 95 | 5.459 | 0.37% |
| 26 | 3-Heptanone | 49 | 5.7922 | 0.17% |
| 27 | p-Xylene | 94 | 5.882 | 2.28% |
| 28 | Nonane | 90 | 6.0422 | 0.98% |
| 29 | 3-Nonene | 70 | 6.1896 | 0.63% |
| 30 | cis-2-Nonene | 96 | 6.3626 | 0.16% |
| 31 | Cyclooctene, 3-methyl- | 81 | 6.4331 | 0.14% |
| 32 | Benzene, 1,3,5-trimethyl- | 38 | 6.5998 | 0.24% |
| 33 | Cyclopentane, butyl- | 95 | 6.7856 | 0.17% |
| 34 | Bicyclo[2.2.1]heptane, 2-ethenyl- | 68 | 7.1125 | 0.52% |
| 35 | Benzene, propyl- | 90 | 7.2599 | 0.79% |
| 36 | Benzene, 1-ethyl-2-methyl- | 95 | 7.4521 | 0.53% |
| 37 | Benzene, 1-ethyl-4-methyl- | 95 | 7.4778 | 0.50% |
| 38 | Benzene, 1-ethyl-2-methyl- | 95 | 7.8559 | 0.64% |
| 39 | 1H-Indene, octahydro-, cis- | 64 | 7.9969 | 0.18% |
| 40 | 3-Octanone | 47 | 8.0482 | 0.34% |
| 41 | 2-Octanone | 91 | 8.1443 | 1.58% |
| 42 | Benzene, 1,3,5-trimethyl- | 95 | 8.1763 | 0.69% |
| 43 | 4-Decene | 47 | 8.2789 | 0.27% |
| 44 | Decane | 96 | 8.3173 | 0.70% |
| 45 | 4-Decene | 93 | 8.4583 | 0.55% |
| 46 | 1H-Indene, 2,3,4,5,6,7-hexahydro- | 87 | 8.5801 | 0.32% |
| 47 | 2-Decene, (Z)- | 95 | 8.6442 | 0.23% |
| 48 | Benzene, 1,2-diethyl- | 43 | 8.8365 | 0.36% |
| 49 | Indane | 81 | 9.1121 | 0.96% |
| 50 | Benzene, 1-propynyl- | 93 | 9.3492 | 0.12% |
| 51 | Trans-2,3-dimethylbicyclo[2.2.2]octane | 47 | 9.3941 | 0.26% |
| 52 | Benzene, 1,2-diethyl- | 91 | 9.4517 | 0.29% |
| 53 | Benzene, 1-methyl-3-propyl- | 93 | 9.4902 | 0.40% |
| 54 | Benzene, butyl- | 87 | 9.5863 | 1.11% |
| 55 | Phenol, 2-methyl- | 93 | 9.6632 | 0.36% |
| 56 | Benzene, (1-methylpropyl)- | 91 | 9.8362 | 0.41% |
| 57 | Benzene, 2-ethyl-1,4-dimethyl- | 95 | 10.0734 | 0.18% |
| 58 | Indan, 1-methyl- | 93 | 10.2528 | 1.01% |
| 59 | 3-Nonanone | 90 | 10.2977 | 0.41% |
| 60 | Cyclopropane, 1-heptyl-2-methyl- | 95 | 10.3746 | 0.82% |
| 61 | 2-Nonanone | 93 | 10.4131 | 0.80% |
| 62 | 5-Undecene | 53 | 10.5028 | 0.52% |
| 63 | Undecane | 96 | 10.5605 | 0.78% |
| 64 | 5-Undecene | 98 | 10.6758 | 0.79% |
| 65 | 5-Undecene | 98 | 10.8617 | 0.29% |
| 66 | 4-Decyne | 52 | 11.1309 | 0.50% |
| 67 | Benzene, 1-methyl-4-(1-methylpropyl)- | 81 | 11.3744 | 0.36% |
| 68 | 1H-Indene, 2,3-dihydro-5-methyl- | 91 | 11.4064 | 0.52% |
| 69 | Benzene, 2-ethyl-1,4-dimethyl- | 70 | 11.5474 | 0.71% |
| 70 | Benzene, 2-ethenyl-1,4-dimethyl- | 87 | 11.6372 | 1.17% |
| 71 | Benzenamine, 2-propyl- | 38 | 11.7077 | 0.40% |
| 72 | Benzene, pentyl- | 87 | 11.8038 | 2.57% |
| 73 | Naphthalene, 1,2,3,4-tetrahydro- | 91 | 11.8871 | 0.45% |
| 74 | 2-Methylindan-2-ol | 72 | 12.0153 | 0.71% |
| 75 | 4-Decanone | 52 | 12.1435 | 0.26% |
| 76 | Benzene, 1-methyl-4-(1-methylpropyl)- | 90 | 12.1819 | 0.24% |
| 77 | 1H-Indene, 2,3-dimethyl- | 96 | 12.2909 | 0.21% |
| 78 | Azulene | 90 | 12.3806 | 0.58% |
| 79 | 1H-Indene, 2,3-dihydro-1,6-dimethyl- | 70 | 12.4447 | 0.78% |
| 80 | 1-Dodecene | 95 | 12.5088 | 1.12% |
| 81 | 2-Decanone | 91 | 12.5665 | 0.93% |
| 82 | Dodecane | 94 | 12.6754 | 0.88% |
| 83 | 4-Dodecene | 93 | 12.7908 | 0.24% |
| 84 | 2-Dodecene, (E)- | 90 | 12.9766 | 0.17% |

TABLE A42-continued

GC-MS data for the reaction of soybean oil with water at 550° C. over tungsten (VI) oxide (experiments 602-604).

| Peak # | Peak Name | % Probability | RT | % of Total |
|---|---|---|---|---|
| 85 | Naphthalene, 1,2,3,4-tetrahydro-5-methyl- | 62 | 13.2202 | 0.34% |
| 86 | 1H-Indene,2,3-dihydro-2,2-dimethyl- | 70 | 13.3868 | 0.31% |
| 87 | Cyclohexene,3-hexyl- | 25 | 13.4573 | 0.51% |
| 88 | Benzene, (2-chloro-2-butenyl)- | 47 | 13.7201 | 0.32% |
| 89 | p-Xylene | 25 | 13.7649 | 0.39% |
| 90 | 1H-Indene, 1,3-dimethyl- | 95 | 13.8354 | 0.24% |
| 91 | Benzene, hexyl- | 86 | 13.9123 | 0.77% |
| 92 | Benzene, (1,3-dimethylbutyl)- | 38 | 14.0597 | 0.81% |
| 93 | 1H-Indene, 1,3-dimethyl- | 64 | 14.1559 | 0.46% |
| 94 | Naphthalene, 1,2,3,4-tetrahydro-1,5-dimethyl- | 70 | 14.3225 | 0.37% |
| 95 | Benzene, (1-methyl-1-butenyl)- | 46 | 14.3674 | 0.45% |
| 96 | 2-Butanone, 4-cyclohexyl- | 52 | 14.4571 | 0.24% |
| 97 | 3-Undecanone | 89 | 14.4827 | 0.16% |
| 98 | 1-Tridecene | 95 | 14.5276 | 0.66% |
| 99 | 2-Undecanone | 64 | 14.5917 | 0.53% |
| 100 | Naphthalene, 1-methyl- | 90 | 14.6301 | 0.43% |
| 101 | Tridecane | 96 | 14.6814 | 0.72% |
| 102 | 1,4-Methanonaphthalen-9-ol, 1,2,3,4-tetrahydro-, stereoisomer | 50 | 14.7839 | 0.23% |
| 103 | Naphthalene, 1-methyl- | 93 | 14.9634 | 0.47% |
| 104 | 2-Methyl-1-phenyl-1-pentanol | 70 | 15.1685 | 0.21% |
| 105 | Hexa-2,4-dienylbenzene | 25 | 15.5082 | 0.39% |
| 106 | Benzene, (1,2,2-trimethylpropyl)- | 30 | 15.7196 | 0.30% |
| 107 | Benzene, heptyl- | 60 | 15.9055 | 0.53% |
| 108 | Nonanoic acid | 30 | 16.1554 | 0.66% |
| 109 | 1-Tetradecene | 98 | 16.4246 | 1.28% |
| 110 | 2-Dodecanone | 62 | 16.4951 | 0.57% |
| 111 | Tetradecane | 95 | 16.5592 | 0.30% |
| 112 | Naphthalene, 2-ethyl- | 64 | 16.5977 | 0.28% |
| 113 | Naphthalene, 1,5-dimethyl- | 50 | 16.7899 | 0.22% |
| 114 | 2-Tetradecene, (E)- | 96 | 16.8412 | 0.17% |
| 115 | 2-Butanone, 4-(4-hydroxyphenyl)- | 64 | 16.9758 | 0.13% |
| 116 | Naphthalene, 1,5-dimethyl- | 86 | 17.0142 | 0.36% |
| 117 | Bicyclo[2.2.1]heptane, 2-chloro-1,3,3-trimethyl-, endo- | 40 | 17.5654 | 0.48% |
| 118 | 4-Thujen-2.alpha.-yl acetate | 49 | 17.7833 | 0.52% |
| 119 | Benzene, 1,2-bis(1-buten-3-yl)- | 47 | 17.8794 | 0.71% |
| 120 | 1-Pentadecene | 99 | 18.2063 | 0.90% |
| 121 | Pentadecane | 97 | 18.3409 | 0.86% |
| 122 | n-Nonylcyclohexane | 70 | 19.2253 | 0.33% |
| 123 | Spiro[4.5]decane | 55 | 19.5714 | 0.92% |
| 124 | 1,11-Dodecadiene | 95 | 19.6611 | 0.51% |
| 125 | Z-8-Hexadecene | 99 | 19.9047 | 0.88% |
| 126 | Hexadecane | 47 | 20.0136 | 0.46% |
| 127 | 1-Pentadecene | 59 | 20.1033 | 0.31% |
| 128 | Naphthalene, 1-(2-propenyl)- | 46 | 20.2892 | 0.30% |
| 129 | Benzeneacetaldehyde, .alpha.-phenyl- | 38 | 20.9237 | 0.18% |
| 130 | Z,Z-8,10-Hexadecadien-1-ol | 83 | 21.2633 | 0.69% |
| 131 | 3-Eicosene, (E)- | 87 | 21.5133 | 0.33% |
| 132 | 2-Undecanone, 6,10-dimethyl- | 81 | 21.6287 | 0.52% |
| 133 | 9H-Fluorene, 2-methyl- | 96 | 21.8786 | 0.17% |
| 134 | (5-Methylhepta-1,3-dienyl)benzene | 80 | 22.6477 | 0.38% |
| 135 | 3-Heptene, 7-phenyl- | 47 | 22.8976 | 0.59% |
| 136 | 6-Phenyl-n-hexanol | 37 | 24.346 | 0.22% |
| 137 | 2-Heptadecanone | 96 | 24.6793 | 4.68% |
| 138 | n-Hexadecanoic acid | 99 | 25.5765 | 1.77% |
| 139 | 3-Octadecanone | 93 | 25.9675 | 1.34% |
| 140 | Z-7-Hexadecenal | 53 | 26.8263 | 0.29% |
| 141 | Z,E-2,13-Octadecadien-1-ol | 93 | 27.057 | 2.13% |
| 142 | (2-Acetyl-5-methyl-cyclopentyl)-acetic acid | 43 | 27.1531 | 3.14% |
| 143 | 2-Nonadecanone | 98 | 27.4031 | 2.48% |
| 144 | 2-Oxazolidinone, 4,5-diphenyl-, trans- | 38 | 27.8517 | 0.99% |
| 145 | Octadecanoic acid | 98 | 28.1593 | 0.98% |
| 146 | p-Menth-8(10)-en-9-ol, cis- | 50 | 28.2555 | 0.71% |
| 147 | Tetrahydropyran Z-8,10-dodecadienoate | 64 | 28.3644 | 1.30% |
| 148 | 3-Eicosanone | 55 | 28.5887 | 0.68% |
| 149 | 9,10-Anthracenedione, 1-amino-4-hydroxy- | 25 | 29.5693 | 0.57% |
| 150 | 4-Tridecanone | 53 | 29.6206 | 0.19% |
| 151 | Methyl n-hexadecyl ketone | 83 | 29.8833 | 0.16% |
| 152 | Silacyclohexane, 1,1-dimethyl- | 46 | 30.7357 | 0.70% |
| 153 | 9,10-Anthracenedione, 1,8-diethoxy- | 81 | 30.7806 | 0.24% |
| 154 | Thiazole, 4-ethyl-2-methyl- | 30 | 31.8637 | 0.25% |
| 155 | Phytol | 25 | 31.8957 | 0.21% |
| 156 | 2-Pentadecanone | 83 | 32.1905 | 0.13% |
| 157 | Silacyclohexane, 1,1-dimethyl- | 45 | 32.9724 | 0.45% |
| 158 | Octadecanoic acid, ethenyl ester | 38 | 34.0107 | 0.42% |
| 159 | 11-Heneicosanone | 41 | 35.0233 | 0.09% |
| 160 | 16-Hentriacontanone | 74 | 39.6377 | 0.80% |
| 161 | 2,4-Cyclohexadien-1-one, 3,5-bis(1,1-dimethylethyl)-4-hydroxy- | 15 | 41.1694 | 0.85% |
| 162 | 1-Phenazinecarboxylic acid, 6-(1-hydroxyethyl)-, methyl ester | 60 | 41.2976 | 0.77% |
| 163 | Cyclotrisiloxane, hexamethyl- | 46 | 42.746 | 0.30% |

TABLE A44

Reaction conditions for the reaction of algae oil with superheated water.

| Exp. No. | Oil Type | Reactor ID | Catalyst Type | Particle Size, Pore size, Surface Area | Preheater Temperature Setting point (C) | Reactor Inlet Temp. (° C.), T2 | Temp. before heater exchanger, T5 |
|---|---|---|---|---|---|---|---|
| 665 | Algae Oil | CAT-Z052512B | Zirconia | 10 um/300 A/30 m^2/g | 506 | 501 | 502 |
| 666 | Algae Oil | CAT-Z052512B | Zirconia | 10 um/300 A/30 m^2/g | 508 | 501 | 505 |
| 667 | Algae Oil | CAT-Z052512B | Zirconia | 10 um/300 A/30 m^2/g | 558 | 549 | 555 |
| 668 | Algae Oil | CAT-Z052112B | Zirconia | 10 um/300 A/30 m^2/g | 558 | 549 | 554 |

TABLE A45

Data collected for sample conditions given in Table A44.

| Exp. No. | Actual Water Flow (min/min) | Actual Oil Flow rate (min/Min) | Total Flow Rate (ml/min) | Acid Number | Production Rate (fuel g/min) |
|---|---|---|---|---|---|
| 665 | 5.6 | 2.06 | 7.660 | 55 | 1.425 |
| 666 | 5.6 | 2.06 | 7.660 | 47.5 | 1.438 |
| 667 | 5.6 | 2.06 | 7.660 | 2.42 | 0.918 |
| 668 | 5.6 | 2.06 | 7.660 | 1.35 | 0.877 |

TABLE A48

Reaction conditions for the reaction of glucose, starch, cellobiose with superheated water, and soybean oil with open tubular experiments with superheated water

| Exp. No. | Oil Type | Catalyst Type | Particle Size, Pore size, Surface Area | Actual Preheater Temp. (° C.) (T1) | Reactor Inlet Temp. (° C.), T2 | Temp. before heater exchanger, T5 | Back Pressure (PSI) |
|---|---|---|---|---|---|---|---|
| 669 | Soybean Oil | Zirconia | 10 um/300 A/30 m^2/g | 512 | 515 | 502 | 3500 |
| 670 | Soybean Oil | Zirconia | 10 um/300 A/30 m^2/g | 515 | 515 | 507 | 3500 |
| 671 | Soybean Oil | Zirconia | 10 um/300 A/30 m^2/g | 515 | 515 | 506 | 3500 |
| 673 | Soybean Oil | Zirconia | 10 um/300 A/30 m^2/g | 515 | 515 | 509 | 3400 |
| 674 | Soybean Oil | Zirconia | 10 um/300 A/30 m^2/g | 515 | 515 | 509 | 3400 |
| 676 | Soybean Oil | Zirconia | 10 um/300 A/30 m^2/g | 515 | 515 | 509 | 3700 |
| 677 | Soybean Oil | Zirconia | 10 um/300 A/30 m^2/g | 515 | 515 | 509 | 3700 |
| 678 | Soybean Oil | Zirconia | 10 um/300 A/30 m^2/g | 515 | 515 | 509 | 3700 |
| 680 | Soybean Oil | Zirconia | 10 um/300 A/30 m^2/g | 515 | 515 | 502 | 3500 |
| 681 | Soybean Oil | Zirconia | 10 um/300 A/30 m^2/g | 516 | 515 | 502 | 3900 |
| 682 | Soybean Oil | Zirconia | 10 um/300 A/30 m^2/g | 515 | 515 | 502 | 3500 |
| 689 | Camelina | Zirconia | 10 um/300 A/30 m^2/g | 522 | 516 | 527 | 3500 |
| 690 | Camelina | Zirconia | 10 um/300 A/30 m^2/g | 524 | 517 | 528 | 3550 |
| 691 | Camelina | Zirconia | 10 um/300 A/30 m^2/g | 530 | 519 | 528 | 3550 |
| 692 | Camelina | Zirconia | 10 um/300 A/30 m^2/g | 532 | 525 | 535 | 3550 |
| 693 | Camelina | Zirconia | 10 um/300 A/30 m^2/g | 524 | 516 | 525 | 3600 |
| 694 | Camelina | Zirconia | 10 um/300 A/30 m^2/g | 524 | 515 | 526 | 3800 |
| 695 | Camelina | Zirconia | 10 um/300 A/30 m^2/g | 528 | 513 | 529 | 3800 |
| 696 | Camelina | Zirconia | 10 um/300 A/30 m^2/g | 530 | 514 | 532 | 4200 |
| 704 | 10%/90% Glucose/H2O | Zirconia | 10 um/300 A/30 m^2/g | 505 | 500 | 508 | 3600 |
| 705 | 10%/90% Glucose/H2O | Zirconia | 10 um/300 A/30 m^2/g | 505 | 500 | 509 | 3600 |
| 706 | 10%/90% Glucose/H2O | Zirconia | 10 um/300 A/30 m^2/g | 505 | 500 | 508 | 3600 |
| 707 | 10%/90% Glucose/H2O | Zirconia | 10 um/300 A/30 m^2/g | 505 | 500 | 509 | 3600 |
| 708 | 10%/90% Glucose/H2O | Zirconia | 10 um/300 A/30 m^2/g | 508 | 500 | 509 | 3600 |
| 709 | 10%/90% Glucose/H2O | Zirconia | 10 um/300 A/30 m^2/g | 508 | 492 | 506 | 3800 |
| 710 | 10%/90% Glucose/H2O | Zirconia | 10 um/300 A/30 m^2/g | 506 | 504 | 510 | 3700 |
| 711 | 10%/90% Glucose/H2O | Zirconia | 10 um/300 A/30 m^2/g | 506 | 511 | 509 | 3600 |

TABLE A48-continued

Reaction conditions for the reaction of glucose, starch, cellobiose with superheated water, and soybean oil with open tubular experiments with superheated water

| Exp. No. | Oil Type | Catalyst Type | Particle Size, Pore size, Surface Area | Actual Preheater Temp. (° C.) (T1) | Reactor Inlet Temp. (° C.), T2 | Temp. before heater exchanger, T5 | Back Pressure (PSI) |
|---|---|---|---|---|---|---|---|
| 712 | 10%/90% Glucose/H2O | Zirconia | 10 um/300 A/30 m^2/g | 505 | 501 | 513 | 3500 |
| 716 | 5%/95% Sucrose/H2O | Zirconia | 10 um/300 A/30 m^2/g | 505 | 508 | 507 | 3700 |
| 723 | 2%/98% Starch/H2O | Zirconia | 10 um/300 A/30 m^2/g | 499 | 498 | 509 | 3800 |
| 727 | 5% Cellobiose/95% H2O | Zirconia | 10 um/300 A/30 m^2/g | 505 | 483 | 505 | 3700 |

TABLE A49

Data collected for sample conditions given in Table A48.

| Exp. No. | Actual Water Flow (min/min) | Feedstock Flow rate (min/Min) | Total Flow Rate (ml/min) | Acid Number | Production Rate (fuel g/min) |
|---|---|---|---|---|---|
| 671 | 5.999 | 2.06325 | 8.062 | 47.5 | 1.286 |
| 673 | 5.999 | 2.06325 | 8.062 | 2.42 | 1.252 |
| 674 | 5.999 | 2.06325 | 8.062 | 1.35 | 1.272 |
| 676 | 5.999 | 2.06325 | 8.062 | 20.6262 | 1.244 |
| 677 | 5.999 | 2.06325 | 8.062 | 25.7809 | 1.340 |
| 678 | 5.999 | 2.06325 | 8.062 | 36.2428 | 1.207 |
| 680 | 5.999 | 2.06325 | 8.062 | 56.8097 | 1.294 |
| 681 | 5.999 | 2.06325 | 8.062 | 75.0489 | 1.359 |
| 682 | 5.999 | 2.06325 | 8.062 | 86.8379 | 1.309 |
| 689 | 5.6 | 2.06 | 7.660 | 46.7 | 1.357 |
| 690 | 5.6 | 2.06 | 7.660 | 50.8 | 1.342 |
| 691 | 5.6 | 2.06 | 7.660 | 63.3 | 1.332 |
| 692 | 5.6 | 2.06 | 7.660 | 92.5 | 1.370 |
| 693 | 5.6 | 2.06 | 7.660 | 151 | 1.457 |
| 694 | 5.6 | 2.06 | 7.660 | 163 | 1.490 |
| 695 | 5.6 | 2.06 | 7.660 | 165 | 1.540 |
| 696 | 5.6 | 2.06 | 7.660 | 171 | 1.531 |

TABLE A50

Fuel Production from experiments 704-712 given in Table A48.

| Exp. No. | Actual Water Flow (min/min) | Feedstock Flow rate (min/Min) | Total Flow Rate (ml/min) | Production Rate (fuel g/min) |
|---|---|---|---|---|
| 704 | 6.57 | 0.73 | 7.300 | 6.980 |
| 705 | 6.57 | 0.73 | 7.300 | 7.065 |
| 706 | 6.57 | 0.73 | 7.300 | 7.113 |
| 707 | 6.57 | 0.73 | 7.300 | 6.648 |
| 708 | 6.57 | 0.73 | 7.300 | 6.08 |
| 709 | 6.57 | 0.73 | 7.300 | 6.346 |
| 710 | 6.57 | 0.73 | 7.300 | 5.321 |
| 711 | 6.57 | 0.73 | 7.300 | 7.102 |
| 712 | 6.57 | 0.73 | 7.300 | 4.800 |

TABLE A51

GC-MS data for the reaction of 10% glucose in water at 500° C. over zirconium dioxide (experiment 705).

| Peak # | Peak Name | % Probability | RT | Area | % of Total |
|---|---|---|---|---|---|
| 1 | Acetone | 80 | 1.37 | 3988184 | 0.48% |
| 2 | 2-Butanone | 80 | 1.669 | 15360339 | 1.84% |
| 3 | 1,3-Cyclopentadiene, 1-methyl- | 76 | 1.929 | 1350840 | 0.16% |
| 4 | 1,3-Cyclohexadiene | 76 | 1.963 | 1201309 | 0.14% |
| 5 | Cyclopentene, 3-methyl- | 90 | 2.005 | 2262677 | 0.27% |
| 6 | 2-Butanone, 3-methyl- | 72 | 2.068 | 7656365 | 0.92% |
| 7 | 2-Pentanone | 90 | 2.324 | 8996490 | 1.08% |
| 8 | 3-Pentanone | 90 | 2.42 | 10070628 | 1.21% |
| 9 | 1,3,5-Hexatriene, 3-methyl-, (Z)- | 94 | 2.974 | 4672867 | 0.56% |
| 10 | 1,4-Cyclohexadiene, 1-methyl- | 94 | 3.03 | 905606 | 0.11% |
| 11 | 3-Pentanone, 2-methyl- | 72 | 3.118 | 5412462 | 0.65% |
| 12 | 1,3-Pentadiene, 2,3-dimethyl- | 43 | 3.148 | 2561302 | 0.31% |
| 13 | Cyclopentene, 1-ethyl- | 90 | 3.178 | 1341594 | 0.16% |
| 14 | Toluene | 83 | 3.374 | 2404310 | 0.29% |
| 15 | 3-Hexanone | 72 | 3.669 | 8142726 | 0.98% |
| 16 | Cyclopentanone | 49 | 3.749 | 11736637 | 1.41% |

TABLE A51-continued

GC-MS data for the reaction of 10% glucose in water at 500° C. over zirconium dioxide (experiment 705).

| Peak # | Peak Name | % Probability | RT | Area | % of Total |
|---|---|---|---|---|---|
| 17 | E,Z-3-Ethylidenecyclohexene | 81 | 3.948 | 2512430 | 0.30% |
| 18 | 5,5-Dimethyl-1,3-hexadiene | 91 | 4.089 | 1805095 | 0.22% |
| 19 | 2,4,6-Octatriene, all-E- | 91 | 4.59 | 1637238 | 0.20% |
| 20 | Cyclopentene, 3-ethylidene-1-methyl- | 55 | 4.633 | 2611575 | 0.31% |
| 21 | 3-Pentanone, 2,4-dimethyl- | 49 | 4.662 | 2201080 | 0.26% |
| 22 | Cyclopentanone, 2-methyl- | 95 | 4.697 | 10685347 | 1.28% |
| 23 | 2,4,6-Octatriene, all-E- | 87 | 4.758 | 5564644 | 0.67% |
| 24 | Cyclopentene, 1,2-dimethyl-4-methylene- | 93 | 4.806 | 6246696 | 0.75% |
| 25 | Cyclopentanone, 3-methyl- | 60 | 4.847 | 7866102 | 0.94% |
| 26 | Cyclopentene, 1,2-dimethyl-4-methylene- | 91 | 5.097 | 1626883 | 0.20% |
| 27 | Benzene, 1,3-dimethyl- | 81 | 5.162 | 1747001 | 0.21% |
| 28 | 2,3-Dimethyl-cyclohexa-1,3-diene | 95 | 5.227 | 5295650 | 0.64% |
| 29 | Benzene, 1,3-dimethyl- | 91 | 5.329 | 2594763 | 0.31% |
| 30 | 4-Heptanone | 43 | 5.442 | 1290002 | 0.16% |
| 31 | Cyclopentanone, 2,5-dimethyl- | 58 | 5.62 | 1936782 | 0.23% |
| 32 | 3-Heptanone | 46 | 5.713 | 7577146 | 0.91% |
| 33 | Benzene, 1,3-dimethyl- | 38 | 5.829 | 4125905 | 0.50% |
| 34 | 2-Octene, (Z)- | 49 | 5.865 | 3356154 | 0.40% |
| 35 | Cyclopentene, 3-ethylidene-1-methyl- | 95 | 6.025 | 2924874 | 0.35% |
| 36 | Cyclopentene, 3-ethylidene-1-methyl- | 94 | 6.057 | 4453603 | 0.54% |
| 37 | 3-Methylenecycloheptene | 43 | 6.197 | 1585211 | 0.19% |
| 38 | 2-Cyclopenten-1-one, 2-methyl- | 60 | 6.256 | 2452661 | 0.29% |
| 39 | 1,3-Cyclopentadiene, 5,5-dimethyl-2-ethyl- | 94 | 6.601 | 1433392 | 0.17% |
| 40 | 1,3-Cyclopentadiene, 5,5-dimethyl-2-ethyl- | 93 | 6.652 | 1519479 | 0.18% |
| 41 | Ethanone, 1-cyclopentyl- | 72 | 6.684 | 1475067 | 0.18% |
| 42 | 3-Ethylidenecycloheptene | 38 | 6.722 | 2839447 | 0.34% |
| 43 | Cyclopentanone, 2-ethyl- | 95 | 6.85 | 7291018 | 0.88% |
| 44 | 3,3-Dimethyl-6-methylenecyclohexene | 81 | 7.033 | 7097780 | 0.85% |
| 45 | Benzene, 1-ethyl-2-methyl- | 76 | 7.392 | 1538625 | 0.19% |
| 46 | 1,3-Cyclopentadiene, 1,2,5,5-tetramethyl- | 91 | 7.536 | 2627719 | 0.32% |
| 47 | Benzene, 1-ethyl-3-methyl- | 25 | 7.799 | 1674938 | 0.20% |
| 48 | 1,3-Cyclohexanedione, 2-methyl- | 30 | 7.95 | 2557587 | 0.31% |
| 49 | Phenol | 62 | 7.993 | 6882409 | 0.83% |
| 50 | Benzene, 1,2,4-trimethyl- | 50 | 8.117 | 4000432 | 0.48% |
| 51 | 4-Pentenal, 2-methylene- | 49 | 8.238 | 4191698 | 0.50% |
| 52 | Bicyclo[3.1.0]hexane, 6-isopropylidene- | 76 | 8.411 | 7146236 | 0.86% |
| 53 | 1,3-Cyclopentadiene, 1,2,5,5-tetramethyl- | 93 | 8.596 | 4129015 | 0.50% |
| 54 | Benzene, cyclopropyl- | 50 | 9.039 | 8259763 | 0.99% |
| 55 | 2,3,4,5-Tetrahydropyridazine | 59 | 9.099 | 4075157 | 0.49% |
| 56 | 2-Cyclopenten-1-one, 2,3-dimethyl- | 91 | 9.166 | 7778712 | 0.93% |
| 57 | Indene | 76 | 9.252 | 5315042 | 0.64% |
| 58 | Phenol, 2-methyl- | 97 | 9.568 | 10676755 | 1.28% |
| 59 | Ethanone, 1-(2-methyl-1-cyclopenten-1-yl)- | 76 | 9.711 | 6842259 | 0.82% |
| 60 | Acetophenone | 74 | 9.843 | 2954165 | 0.36% |
| 61 | Phenol, 3-methyl- | 91 | 10.054 | 15219348 | 1.83% |

TABLE A51-continued

GC-MS data for the reaction of 10% glucose in water at 500° C. over zirconium dioxide (experiment 705).

| Peak # | Peak Name | % Probability | RT | Area | % of Total |
|---|---|---|---|---|---|
| 62 | Benzene, (1-methyl-1-propenyl)-, (E)- | 86 | 10.176 | 8350134 | 1.00% |
| 63 | 2-Cyclopenten-1-one, 3,4,4-trimethyl- | 64 | 10.31 | 7176322 | 0.86% |
| 64 | Bicyclo[3.3.1]nonane | 53 | 10.603 | 4004055 | 0.48% |
| 65 | Benzofuran, 2-methyl- | 55 | 10.706 | 6258583 | 0.75% |
| 66 | Cis-4-methyl-exo-tricyclo[5.2.1.0(2.6)]decane | 55 | 11.251 | 4173537 | 0.50% |
| 67 | 1H-Indene, 2,3-dihydro-5-methyl- | 90 | 11.328 | 6245694 | 0.75% |
| 68 | Phenol, 3-ethyl- | 81 | 11.381 | 9972455 | 1.20% |
| 69 | 1H-Indene, 3-methyl- | 93 | 11.541 | 10699042 | 1.28% |
| 70 | Phenol, 2,4-dimethyl- | 95 | 11.585 | 10611918 | 1.27% |
| 71 | Phenol, 2,3-dimethyl- | 93 | 11.625 | 9901722 | 1.19% |
| 72 | Benzene, 1-butynyl- | 91 | 11.695 | 11627188 | 1.40% |
| 73 | Phenol, 3-ethyl- | 93 | 12.028 | 21221923 | 2.55% |
| 74 | Ethanone, 1-(3-methylphenyl)- | 92 | 12.158 | 4130345 | 0.50% |
| 75 | Phenol, 2,3-dimethyl- | 86 | 12.208 | 11090020 | 1.33% |
| 76 | 1H-Indene, 2,3-dihydro-1,6-dimethyl- | 70 | 12.349 | 5726828 | 0.69% |
| 77 | 3-Phenyl-3-pentene | 60 | 12.468 | 6657697 | 0.80% |
| 78 | Benzene, (1,1-dimethyl-2-propenyl)- | 80 | 12.572 | 10012481 | 1.20% |
| 79 | 1H-Indazole, 4,5,6,7-tetrahydro-7-methyl- | 64 | 12.743 | 5085026 | 0.61% |
| 80 | Phenol, 2-propyl- | 45 | 13.145 | 5305230 | 0.64% |
| 81 | Phenol, 2-ethyl-6-methyl- | 87 | 13.253 | 4680193 | 0.56% |
| 82 | Phenol, 2-ethyl-6-methyl- | 93 | 13.322 | 10391140 | 1.25% |
| 83 | Phenol, 2-ethyl-6-methyl- | 81 | 13.456 | 6946848 | 0.83% |
| 84 | Phenol, 3-ethyl-5-methyl- | 76 | 13.547 | 7026401 | 0.84% |
| 85 | 1H-Indene, 1,3-dimethyl- | 93 | 13.738 | 4130859 | 0.50% |
| 86 | Phenol, 2-ethyl-6-methyl- | 55 | 13.87 | 17007488 | 2.04% |
| 87 | 1H-Indene, 1,3-dimethyl- | 92 | 13.966 | 6635470 | 0.80% |
| 88 | 1H-Indene, 2,3-dimethyl- | 89 | 14.041 | 10367487 | 1.25% |
| 89 | Phenol, 2,4,6-trimethyl- | 95 | 14.121 | 10655745 | 1.28% |
| 90 | Phenol, 2-ethyl-6-methyl- | 46 | 14.276 | 6332675 | 0.76% |
| 91 | Benzene, 1-(2-butenyl)-2,3-dimethyl- | 46 | 14.375 | 3708097 | 0.45% |
| 92 | 2-Undecanone | 50 | 14.524 | 7843375 | 0.94% |
| 93 | Phenol, 2,4,6-trimethyl- | 95 | 14.734 | 3873778 | 0.47% |
| 94 | 1H-Inden-1-one, 2,3-dihydro-2-methyl- | 64 | 14.852 | 3382447 | 0.41% |
| 95 | Acetophenone, 4'-methoxy- | 38 | 14.907 | 3562386 | 0.43% |
| 96 | 1H-Inden-5-ol, 2,3-dihydro- | 50 | 15.024 | 8814214 | 1.06% |
| 97 | 1H-Inden-1-ol, 2,3-dihydro- | 68 | 15.461 | 4915500 | 0.59% |
| 98 | 1H-Inden-1-ol, 2,3-dihydro- | 83 | 15.502 | 1838563 | 0.22% |
| 99 | Benzene, 1-methoxy-4-(1-methylethyl)- | 60 | 15.552 | 4383988 | 0.53% |
| 100 | Phenol, 2-methyl-5-(1-methylethyl)- | 46 | 15.591 | 4981574 | 0.60% |
| 101 | 4-tert-Butyltoluene | 58 | 15.645 | 10675696 | 1.28% |
| 102 | Ethanone, 1-(2-hydroxy-5-methylphenyl)- | 70 | 15.8 | 8150442 | 0.98% |
| 103 | Phenol, 2,3,5,6-tetramethyl- | 64 | 15.866 | 6025151 | 0.72% |
| 104 | Benzene, pentamethyl- | 90 | 15.923 | 8263964 | 0.99% |
| 105 | Benzene, 1,4-bis(1-methylethenyl)- | 70 | 16.077 | 3820906 | 0.46% |
| 106 | Benzene, 1,4-bis(1-methylethenyl)- | 86 | 16.192 | 1533064 | 0.18% |
| 107 | 6-Methyl-4-indanol | 55 | 16.275 | 2773137 | 0.33% |
| 108 | Benzene, pentamethyl- | 74 | 16.339 | 6903202 | 0.83% |
| 109 | Benzene, pentamethyl- | 76 | 16.378 | 7862588 | 0.94% |

TABLE A51-continued

GC-MS data for the reaction of 10% glucose in water at 500° C. over zirconium dioxide (experiment 705).

| Peak # | Peak Name | % Probability | RT | Area | % of Total |
|---|---|---|---|---|---|
| 110 | (2-Methoxyphenyl)acetonitrile | 38 | 16.663 | 2971757 | 0.36% |
| 111 | 1H-1-Silaindene, 2,3-dihydro-1,1-dimethyl- | 52 | 16.748 | 2389076 | 0.29% |
| 112 | 6-Methyl-4-indanol | 91 | 16.842 | 3502622 | 0.42% |
| 113 | 6-Methyl-4-indanol | 64 | 16.904 | 8090663 | 0.97% |
| 114 | 6-Methyl-4-indanol | 64 | 17.06 | 9542193 | 1.15% |
| 115 | 2-Isopropenyl-3,6-dimethylpyrazine | 52 | 17.139 | 8405066 | 1.01% |
| 116 | 3-Buten-2-one, 4-phenyl- | 22 | 17.213 | 6429145 | 0.77% |
| 117 | Dewar benzene, hexamethyl- | 72 | 17.373 | 6444145 | 0.77% |
| 118 | 6-Methyl-4-indanol | 70 | 17.435 | 7683443 | 0.92% |
| 119 | Benzene, 1-methoxy-4-(1-methyl-2-propenyl)- | 87 | 17.549 | 6649472 | 0.80% |
| 120 | Benzene, 1-methoxy-4-(1-methyl-2-propenyl)- | 70 | 17.656 | 10605253 | 1.27% |
| 121 | 1H-Inden-1-ol, 2,3-dihydro-3,3-dimethyl- | 60 | 17.731 | 12339627 | 1.48% |
| 122 | Silane, trimethyl(2-phenylethenyl)- | 30 | 18.074 | 5768503 | 0.69% |
| 123 | Benzene, 1,2-diethyl-4,5-dimethyl- | 81 | 18.265 | 6867565 | 0.82% |
| 124 | Benzene, 1,2,4-triethyl-5-methyl- | 53 | 18.534 | 4319080 | 0.52% |
| 125 | 1H-2-Silaindene,2,3-dihydro-2,2-dimethyl- | 60 | 18.597 | 5434700 | 0.65% |
| 126 | 2-Naphthalenol | 53 | 18.781 | 2827671 | 0.34% |
| 127 | 7-Methyltryptamine | 46 | 18.837 | 3897260 | 0.47% |
| 128 | Benzofuran, 2,3-dihydro-2,2,4,6-tetramethyl- | 49 | 18.94 | 7221191 | 0.87% |
| 129 | 1H-2-Silaindene,2,3-dihydro-2,2-dimethyl- | 49 | 19.051 | 3967304 | 0.48% |
| 130 | Benzene, 1,2,4-triethyl-5-methyl- | 27 | 19.094 | 3188197 | 0.38% |
| 131 | Benzene, 1,2,4-triethyl-5-methyl- | 27 | 19.132 | 3795050 | 0.46% |
| 132 | Naphthalene, 1,2,3,4-tetrahydro-6,7-dimethyl- | 55 | 19.242 | 2613407 | 0.31% |
| 133 | Benzene, 1-methoxy-4-(1-methyl-2-propenyl)- | 46 | 19.421 | 2232024 | 0.27% |
| 134 | 1-Naphthalenol, 2-methyl- | 38 | 19.477 | 2591904 | 0.31% |
| 135 | Benzo[b]thiophene, 2,5,7-trimethyl- | 55 | 19.619 | 3992179 | 0.48% |
| 136 | Silane, trimethyl(2-phenylethenyl)- | 59 | 19.724 | 3818807 | 0.46% |
| 137 | 1,3,5-Cycloheptatriene, 3,4-diethyl-7,7-dimethyl- | 60 | 20.015 | 3696121 | 0.44% |
| 138 | 1-Naphthalenol, 2-methyl- | 70 | 20.287 | 11450363 | 1.38% |
| 139 | 1-Naphthalenol, 2-methyl- | 89 | 20.374 | 2596064 | 0.31% |
| 140 | 1-Naphthalenol, 2-methyl- | 58 | 20.748 | 4403322 | 0.53% |
| 141 | 1-Naphthalenol, 4-methyl- | 59 | 20.786 | 2476159 | 0.30% |
| 142 | 1-Naphthalenol, 4-methyl- | 38 | 20.879 | 6321130 | 0.76% |
| 143 | 1,2-Dimethyltryptamine | 38 | 21.15 | 2463917 | 0.30% |
| 144 | Naphthalene, 1,2-dihydro-2,5,8-trimethyl- | 46 | 21.555 | 1653690 | 0.20% |
| 145 | 1H-Pyrrole-2-carboxaldehyde, 4-bromo- | 25 | 21.708 | 1449644 | 0.17% |
| 146 | Benzofuran, 3-methyl-2-(1-methylethenyl)- | 81 | 21.961 | 3675989 | 0.44% |
| 147 | 1-Naphthol, 5,7-dimethyl- | 81 | 21.999 | 2253005 | 0.27% |
| 148 | Naphthalene, 1,4-dihydro-2,5,8-trimethyl- | 74 | 22.217 | 2866894 | 0.34% |
| 149 | Benzofuran, 3-methyl-2-(1-methylethenyl)- | 81 | 22.443 | 1104985 | 0.13% |

TABLE A51-continued

GC-MS data for the reaction of 10% glucose in water at 500° C. over zirconium dioxide (experiment 705).

| Peak # | Peak Name | % Probability | RT | Area | % of Total |
|---|---|---|---|---|---|
| 150 | Naphthalene, 1,4-dihydro-2,5,8-trimethyl- | 60 | 22.76 | 2588971 | 0.31% |
| 151 | Naphthalene, 3-(1,1-dimethylethyl)-1,2-dihydro- | 59 | 23.475 | 1816747 | 0.22% |
| 152 | 4,6(1H,5H)-Pyrimidinedione, 2-methoxy-1-methyl-5-(1-methylethyl)-5-(2-propenyl)- | 38 | 26.368 | 1228033 | 0.15% |

TABLE A52

Reaction conditions for the reaction of cellulose with superheated water at 3.2 ml/min in 90 min collection.

| Exp. No. | Oil Type | Catalyst Type | Particle Size, Pore size, Surface Area | Actual Preheater Temp. (° C.) (T1) | Reactor Inlet Temp. (° C.), T2 | Temp. before heater exchanger, T5 | Back Pressure (PSI) |
|---|---|---|---|---|---|---|---|
| 728 | 5 g cellulose in 150 × 10 mm column | Zirconia | 10 um/300 A/30 m^2/g | 439 | 479 | 454 | 3500 |

TABLE A53

Reaction conditions for the reaction of soybean oil with superheated zirconia colloids suspended in water through open tubular reactor

| Exp. No. | Oil Type | Catalyst Type | Particle Size, Pore size, Surface Area | Actual Preheater Temp. (° C.) (T1) | Reactor Inlet Temp. (° C.), T2 | Temp. before heater exchanger, T5 | Back Pressure (PSI) |
|---|---|---|---|---|---|---|---|
| 733 | Soybean | No Catalyst | N/A | No Preheater | 538 | 440 | 3500 |
| 734 | Soybean | No Catalyst | N/A | No Preheater | 550 | 438 | 3500 |
| 735 | Soybean | Zirconia in open tube | 1% Zirconia colloids | No Preheater | 532 | 455 | 3500 |
| 736 | Soybean | Zirconia in open tube | 1% Zirconia colloids | No Preheater | 541 | 423 | 3500 |
| 737 | Soybean | Zirconia in open tube | 1% Zirconia colloids | No Preheater | 538 | 432 | 3500 |
| 743 | Soybean | Zirconia in open tube | 1% Zirconia colloids (120 nm) suspended in water | No Preheater | 430 | 533 | 3500 |
| 744 | Soybean | Zirconia in open tube | 1% Zirconia colloids (120 nm) suspended in water | No Preheater | 447 | 559 | 3500 |
| 745 | Soybean | Zirconia in open tube | 1% Zirconia colloids (120 nm) suspended in water | No Preheater | 434 | 542 | 3500 |
| 746 | Soybean | No Catalyst | N/A | No Preheater | 480 | 583 | 3500 |
| 748 | Soybean | Zirconia in open tube | 8.4% Zirconia colloids (120 nm) suspended in water | No Preheater | 480 | 600 | 3500 |
| 749 | Soybean | Zirconia in open tube | 8.4% Zirconia colloids (120 nm) suspended in water | No Preheater | 486 | 593 | 3500 |
| 751 | Soybean | Zirconia in open tube | 8.4% Zirconia colloids (120 nm) suspended in water | No Preheater | 468 | 558 | 3500 |

TABLE A54

Data collected for sample conditions given in Table A53.

| Exp. No. | Actual Water Flow (min/min) | Actual Oil Flow rate (min/Min) | Total Flow Rate (ml/min) | Acid Number | Production Rate (fuel g/min) |
|---|---|---|---|---|---|
| 733 | 2.88 | 1.12 | 4.000 | 159.0 | 0.678 |
| 734 | 2.88 | 1.12 | 4.000 | 167.0 | 1.143 |
| 735 | 2.88 | 1.12 | 4.000 | 165.0 | 0.211 |
| 736 | 2.88 | 1.12 | 4.000 | 169.0 | 0.740 |
| 737 | 2.88 | 1.12 | 4.000 | 168.0 | 0.780 |
| 743 | 2.88 | 1.12 | 4.000 | 171.0 | 0.781 |
| 744 | 2.88 | 1.12 | 4.000 | 179.0 | 0.673 |
| 745 | 2.88 | 1.12 | 4.000 | 181.0 | 0.791 |
| 746 | 2.88 | 1.12 | 4.000 | 150.0 | 0.600 |
| 748 | 2.88 | 1.12 | 4.000 | 123.0 | 0.421 |
| 749 | 2.88 | 1.12 | 4.000 | 80.0 | 0.43 |
| 751 | 2.88 | 1.12 | 4.000 | 6.9 | 0.480 |

TABLE A55

GC-MS data for the reaction of soybean oil with supercritical water and no catalyst at 500° C. (experiment 746).

| Peak # | Peak Name | % Probability | RT | Area | % of Total |
|---|---|---|---|---|---|
| 1 | 2-Nonynoic acid | 38 | 1.198 | 2617288 | 0.41% |
| 2 | 1-Pentene | 90 | 1.296 | 8913520 | 1.39% |
| 3 | 1,4-Pentadiene | 91 | 1.375 | 974721 | 0.15% |
| 4 | 1,3-Cyclopentadiene | 90 | 1.402 | 2798771 | 0.44% |
| 5 | Cyclopentene | 90 | 1.444 | 3688622 | 0.58% |
| 6 | 1-Hexene | 94 | 1.545 | 15322663 | 2.39% |
| 7 | Hexane | 72 | 1.581 | 5768995 | 0.90% |
| 8 | 3-Hexene, (E)- | 90 | 1.615 | 2154942 | 0.34% |
| 9 | Cyclopropane, 1,1-dimethyl-2-methylene- | 86 | 1.653 | 3361825 | 0.53% |
| 10 | Cyclopentane, methyl- | 76 | 1.731 | 3276703 | 0.51% |
| 11 | 1,3-Cyclopentadiene, 1-methyl- | 93 | 1.814 | 2746069 | 0.43% |
| 12 | 1,3-Cyclopentadiene, 1-methyl- | 93 | 1.845 | 2158509 | 0.34% |
| 13 | Cyclopentene, 3-methyl- | 87 | 1.881 | 5878405 | 0.92% |
| 14 | Benzene | 91 | 1.955 | 15563713 | 2.43% |
| 15 | 1,3-Cyclohexadiene | 70 | 2.02 | 4419746 | 0.69% |
| 16 | Cyclohexene | 90 | 2.099 | 6893141 | 1.08% |
| 17 | 1-Heptene | 96 | 2.17 | 15469302 | 2.42% |
| 18 | Heptane | 58 | 2.257 | 4992863 | 0.78% |
| 19 | 2-Heptene, (E)- | 90 | 2.346 | 2926618 | 0.46% |
| 20 | Cyclohexane, methyl- | 81 | 2.533 | 5813211 | 0.91% |
| 21 | Cyclohexene, 1-methyl- | 93 | 2.764 | 4489968 | 0.70% |
| 22 | Cyclopentane, ethylidene- | 72 | 3.018 | 3213590 | 0.50% |
| 23 | 1,3,5-Hexatriene, 3-methyl-, (E)- | 91 | 3.117 | 1999427 | 0.31% |
| 24 | Toluene | 93 | 3.178 | 20599013 | 3.22% |
| 25 | Cyclohexene, 4-methyl- | 76 | 3.217 | 9072600 | 1.42% |
| 26 | 1,3-Cycloheptadiene | 90 | 3.412 | 2832078 | 0.44% |
| 27 | cis-1-Butyl-2-methylcyclopropane | 94 | 3.568 | 9684056 | 1.51% |
| 28 | Heptane, 2,4-dimethyl- | 64 | 3.731 | 3133388 | 0.49% |
| 29 | 2-Octene, (E)- | 62 | 3.869 | 2101606 | 0.33% |
| 30 | Ethylbenzene | 91 | 5.008 | 7503587 | 1.17% |
| 31 | Benzene, 1,3-dimethyl- | 95 | 5.215 | 3655829 | 0.57% |
| 32 | 1-Nonene | 96 | 5.652 | 6451929 | 1.01% |
| 33 | p-Xylene | 55 | 5.691 | 8633153 | 1.35% |
| 34 | Nonane | 38 | 5.848 | 6314855 | 0.99% |
| 35 | Cyclopentene, 1-(2-methylpropyl)- | 43 | 6.958 | 3457631 | 0.54% |
| 36 | Benzene, propyl- | 87 | 7.112 | 5120330 | 0.80% |
| 37 | 1-Decene | 93 | 7.978 | 10073046 | 1.57% |
| 38 | Benzene, 1,3,5-trimethyl- | 55 | 8.067 | 3240524 | 0.51% |
| 39 | Heptanoic acid | 43 | 8.178 | 6544367 | 1.02% |
| 40 | Hexanoic acid | 64 | 8.221 | 2220051 | 0.35% |
| 41 | Indane | 68 | 9.002 | 4070328 | 0.64% |
| 42 | Benzene, butyl- | 90 | 9.477 | 6700767 | 1.05% |
| 43 | Benzene, (2-methyl-1-propenyl)- | 83 | 10.164 | 4635530 | 0.72% |
| 44 | 7-Octen-4-ol, 2-methyl-6-methylene-, (S)- | 37 | 10.192 | 3576142 | 0.56% |
| 45 | 1-Undecanol | 80 | 10.256 | 24317656 | 3.80% |
| 46 | Heptanoic acid | 72 | 10.397 | 6646008 | 1.04% |
| 47 | Heptanoic acid | 86 | 10.429 | 7822034 | 1.22% |
| 48 | 3,4-Octadiene, 7-methyl- | 52 | 11.027 | 3771656 | 0.59% |
| 49 | Benzene, 1-butynyl- | 60 | 11.546 | 9119280 | 1.42% |
| 50 | Benzene, pentyl- | 95 | 11.696 | 20724751 | 3.24% |
| 51 | Naphthalene, 1,2,3,4-tetrahydro- | 78 | 11.798 | 4199838 | 0.66% |
| 52 | Benzene, 1-methyl-4-(2-methylpropyl)- | 76 | 11.926 | 4648545 | 0.73% |
| 53 | 7-Octenoic acid | 64 | 12.185 | 3462368 | 0.54% |
| 54 | Cyclohexanepropanol- | 38 | 12.212 | 4475956 | 0.70% |
| 55 | Octanoic Acid | 87 | 12.326 | 4643006 | 0.73% |
| 56 | 1-Dodecene | 95 | 12.409 | 7438370 | 1.16% |
| 57 | Benzene, pentyl- | 47 | 13.826 | 4217715 | 0.66% |
| 58 | Undecylenic Acid | 38 | 14.082 | 5792166 | 0.91% |
| 59 | 6-Tridecene | 94 | 14.434 | 3953454 | 0.62% |
| 60 | 3-Pentenoic acid, 3-methyl-, methyl ester | 45 | 15.911 | 4009579 | 0.63% |
| 61 | 1-Tetradecene | 97 | 16.326 | 7225436 | 1.13% |
| 62 | Undecylenic Acid | 58 | 17.652 | 5091764 | 0.80% |
| 63 | Cyclohexadecane | 91 | 18.118 | 1478540 | 0.23% |
| 64 | 1-Hexadecene | 98 | 19.81 | 3299587 | 0.52% |
| 65 | 8-Phenyloctanoic acid | 64 | 23.813 | 4859446 | 0.76% |
| 66 | n-Hexadecanoic acid | 99 | 25.447 | 73925826 | 11.55% |
| 67 | 9-Octadecenoic acid, (E)- | 98 | 27.799 | 99834717 | 15.59% |
| 68 | 9,17-Octadecadienal, (Z)- | 98 | 27.849 | 15435125 | 2.41% |
| 69 | 9,12-Octadecadienoic acid (Z,Z)- | 97 | 27.879 | 24765057 | 3.87% |
| 70 | Octadecanoic acid | 99 | 28.063 | 29204848 | 4.56% |
| 71 | Tetrasiloxane, decamethyl- | 59 | 43.87 | 851750 | 0.13% |

TABLE A57

Reaction conditions for open tubular reactor (experiments 755-760).

| Exp. No. | Oil Type | Reactor Type | Particle Size, Pore size, Surface Area | Actual Preheater Temp. (° C.) (T1) | Reactor Inlet Temp. (° C.), T2 | Back Pressure (PSI) |
|---|---|---|---|---|---|---|
| 755 | Soybean Oil | Open Tube | 9.7% Zirconia colloids | 515 | 515 | 3400 |
| 756 | Soybean Oil | Open Tube | 9.7% Zirconia colloids | 550 | 550 | 3400 |
| 757 | Soybean Oil | Open Tube | Blank (no colloids) | 550 | 550 | 3400 |
| 758 | Algae Oil | Open Tube | 9.7% Zirconia colloids | 550 | 550 | 3400 |

TABLE A57-continued

Reaction conditions for open tubular reactor (experiments 755-760).

| Exp. No. | Oil Type | Reactor Type | Particle Size, Pore size, Surface Area | Actual Preheater Temp. (° C.) (T1) | Reactor Inlet Temp. (° C.), T2 | Back Pressure (PSI) |
|---|---|---|---|---|---|---|
| 759 | 5% Algae powder | Open Tube | 9.7% Zirconia colloids | 550 | 550 | 550 |
| 760 | 5% Cellulose | Open Tube | 9.7% Zirconia colloids | 550 | 550 | 550 |

TABLE A58

Further reaction conditions for open tubular reactor (experiments 755-760).

| Exp. No. | Actual Water Flow (min/min) | Actual Oil Flow rate (min/Min) | Total Flow Rate (ml/min) | Acid Number |
|---|---|---|---|---|
| 755 | 3.7 | 1.44 | 5.14 | 14.5 |
| 756 | 3.7 | 1.44 | 5.14 | 13.1 |
| 757 | 3.7 | 1.44 | 5.14 | 66.7 |
| 758 | 3.7 | 1.44 | 5.14 | 0.95 |
| 759 | 3 | 2.7 | 5.7 | 2.94 |
| 760 | 3 | 2.7 | 5.7 | 2.96 |

TABLE A60

GC-MS data for the reaction of soybean oil with supercritical water with 9.7% colloidal zirconia at 550° C. (experiment 756).

| Peak # | Peak Name | % Probability | RT | Area | % of Total |
|---|---|---|---|---|---|
| 1 | Benzene, 1,3-bis(3-phenoxyphenoxy)- | 93 | 0.147 | 80031864 | 0.55% |
| 2 | Pentane | 9 | 1.369 | 19049044 | 0.13% |
| 3 | 2-Butanone | 53 | 1.673 | 26241623 | 0.18% |
| 4 | Cyclopentane, methyl- | 90 | 1.833 | 11426084 | 0.08% |
| 5 | Benzene | 91 | 2.078 | 229857602 | 1.59% |
| 6 | Hexane, 3-methyl- | 47 | 2.319 | 20942564 | 0.15% |
| 7 | Cyclohexane, methyl- | 94 | 2.69 | 17549439 | 0.12% |
| 8 | Toluene | 91 | 3.35 | 887801118 | 6.13% |
| 9 | 2-Hexanone | 49 | 3.731 | 19019583 | 0.13% |
| 10 | Benzene, 1,3-dimethyl- | 91 | 5.128 | 655483555 | 4.52% |
| 11 | p-Xylene | 97 | 5.303 | 587857915 | 4.06% |
| 12 | p-Xylene | 95 | 5.805 | 577210166 | 3.98% |
| 13 | Benzene, (1-methylethyl)- | 91 | 6.489 | 46810327 | 0.32% |
| 14 | Tetracyclo[3.3.1.0(2,8).0(4,6)]-non-2-ene | 95 | 6.995 | 18570635 | 0.13% |
| 15 | Benzene, propyl- | 91 | 7.152 | 116255497 | 0.80% |
| 16 | Benzene, 1-ethyl-2-methyl- | 95 | 7.362 | 513765595 | 3.55% |
| 17 | Benzene, 1,3,5-trimethyl- | 94 | 7.501 | 27852807 | 0.19% |
| 18 | Benzene, 1-ethyl-2-methyl- | 94 | 7.759 | 258345830 | 1.78% |
| 19 | .alpha.-Methylstyrene | 95 | 7.817 | 27429259 | 0.19% |
| 20 | Benzene, 1,2,4-trimethyl- | 95 | 8.074 | 305684114 | 2.11% |
| 21 | Benzene, 1-ethenyl-2-methyl- | 95 | 8.133 | 40372476 | 0.28% |
| 22 | Benzene, ethenylmethyl- | 95 | 8.175 | 46570685 | 0.32% |
| 23 | Benzene, 1,2-diethyl- | 76 | 8.715 | 74642933 | 0.52% |
| 24 | Benzene, 1-methyl-2-(1-methylethyl)- | 97 | 8.775 | 14238987 | 0.10% |
| 25 | Benzene, cyclopropyl- | 95 | 8.819 | 51768852 | 0.36% |
| 26 | Tetracyclo[3.3.1.0(2,8).0(4,6)]-non-2-ene | 83 | 9.013 | 239735550 | 1.66% |
| 27 | Indene | 94 | 9.227 | 372864499 | 2.57% |
| 28 | Benzene, 1,2-diethyl- | 96 | 9.34 | 74978876 | 0.52% |
| 29 | Benzene, 1-methyl-3-propyl- | 91 | 9.38 | 43601748 | 0.30% |

TABLE A60-continued

GC-MS data for the reaction of soybean oil with supercritical water with 9.7% colloidal zirconia at 550° C. (experiment 756).

| Peak # | Peak Name | % Probability | RT | Area | % of Total |
|---|---|---|---|---|---|
| 30 | Naphthalene, 1,2,3,5,8,8a-hexahydro- | 90 | 9.48 | 116228908 | 0.80% |
| 31 | Benzene, 4-ethyl-1,2-dimethyl- | 93 | 9.538 | 61477255 | 0.42% |
| 32 | Benzene, 1,2-diethyl- | 96 | 9.602 | 43501561 | 0.30% |
| 33 | Benzene, 1-methyl-4-propyl- | 90 | 9.722 | 28192820 | 0.20% |
| 34 | Acetophenone | 93 | 9.761 | 37184541 | 0.26% |
| 35 | Benzene, 1-ethyl-2,3-dimethyl- | 96 | 9.955 | 71839578 | 0.50% |
| 36 | Benzene, 1,2,4,5-tetramethyl- | 94 | 9.995 | 49098485 | 0.34% |
| 37 | Benzene, 1-butynyl- | 95 | 10.055 | 64601680 | 0.45% |
| 38 | Benzene, (2-methyl-1-propenyl)- | 78 | 10.144 | 229512446 | 1.58% |
| 39 | Benzene, 1-ethenyl-3-ethyl- | 55 | 10.315 | 22918595 | 0.16% |
| 40 | Benzene, 4-ethyl-1,2-dimethyl- | 95 | 10.589 | 22997781 | 0.16% |
| 41 | Benzene, 1,2,4,5-tetramethyl- | 60 | 10.806 | 24273112 | 0.17% |
| 42 | 2,4-Dimethylstyrene | 96 | 11.016 | 27968313 | 0.19% |
| 43 | Benzene, 1-methyl-4-(2-propenyl)- | 95 | 11.135 | 16271572 | 0.11% |
| 44 | 1H-Indene, 2,3-dihydro-5-methyl- | 95 | 11.297 | 130505902 | 0.90% |
| 45 | Benzene, 1,3-diethyl-5-methyl- | 93 | 11.428 | 26551959 | 0.18% |
| 46 | 2-Methylindene | 94 | 11.549 | 555065755 | 3.83% |
| 47 | Benzene, 1,3-diethyl- | 38 | 11.611 | 23078409 | 0.16% |
| 48 | 2-Methylindene | 94 | 11.675 | 432754307 | 2.99% |
| 49 | Naphthalene, 1,2,3,4-tetrahydro- | 95 | 11.787 | 41925800 | 0.29% |
| 50 | Benzene, 2,4-diethyl-1-methyl- | 95 | 11.816 | 53968575 | 0.37% |
| 51 | Benzene, 1,4-diethyl-2-methyl- | 87 | 11.95 | 28275216 | 0.20% |
| 52 | Isobutyrophenone | 93 | 12.096 | 39714124 | 0.27% |
| 53 | 1H-Indene, 2,3-dimethyl- | 96 | 12.207 | 23364956 | 0.16% |
| 54 | Naphthalene | 95 | 12.295 | 703454883 | 4.86% |
| 55 | Benzene, (2-methyl-1-butenyl)- | 64 | 12.45 | 40708206 | 0.28% |
| 56 | 1H-Indene, 2,3-dihydro-1,2-dimethyl- | 62 | 12.547 | 58452874 | 0.40% |
| 57 | Bicyclo[4.2.0]octa-1,3,5-triene, 7-butyl- | 64 | 13.092 | 19559174 | 0.14% |
| 58 | 2-Ethyl-2,3-dihydro-1H-indene | 87 | 13.269 | 33121350 | 0.23% |
| 59 | Bicyclo[4.2.1]nona-2,4,7-triene, 7-ethyl- | 76 | 13.304 | 35686879 | 0.25% |
| 60 | 1H-Indene, 1-ethenyl-2,3-dihydro- | 87 | 13.404 | 28402491 | 0.20% |
| 61 | 2-Ethyl-1-H-indene | 94 | 13.506 | 76587579 | 0.53% |
| 62 | 1H-Indene, 2,3-dihydro-4,7-dimethyl- | 96 | 13.606 | 26346034 | 0.18% |
| 63 | 2-Ethyl-1-H-indene | 93 | 13.653 | 16230336 | 0.11% |
| 64 | 1H-Indene, 1,1-dimethyl- | 94 | 13.704 | 86628935 | 0.60% |
| 65 | 1H-Indene, 1,3-dimethyl- | 97 | 13.827 | 174506586 | 1.20% |
| 66 | 1H-Indene, 2,3-dihydro-1,2-dimethyl- | 93 | 13.883 | 15458345 | 0.11% |
| 67 | 1H-Indene, 1,3-dimethyl- | 90 | 13.938 | 159943857 | 1.10% |
| 68 | 1H-Indene, 1,3-dimethyl- | 96 | 14.017 | 58930703 | 0.41% |
| 69 | Benzene, 1-(2-butenyl)-2,3-dimethyl- | 70 | 14.11 | 26242344 | 0.18% |
| 70 | Naphthalene, 1,2-dihydro-6-methyl- | 55 | 14.212 | 27008249 | 0.19% |
| 71 | 1H-Indene, 2,3-dihydro-1,2-dimethyl- | 70 | 14.252 | 36911462 | 0.26% |
| 72 | Naphthalene, 1,2-dihydro-6-methyl- | 70 | 14.432 | 36943696 | 0.26% |
| 73 | Naphthalene, 2-methyl- | 91 | 14.539 | 517304231 | 3.57% |
| 74 | 1,4-Methanonaphthalene, 1,4-dihydro- | 91 | 14.86 | 385977767 | 2.66% |

TABLE A60-continued

GC-MS data for the reaction of soybean oil with supercritical water with 9.7% colloidal zirconia at 550° C. (experiment 756).

| Peak # | Peak Name | % Probability | RT | Area | % of Total |
|---|---|---|---|---|---|
| 75 | 1,2,3-Trimethylindene | 95 | 15.484 | 25643775 | 0.18% |
| 76 | 1H-Indene, 1,1,3-trimethyl- | 93 | 15.557 | 46539775 | 0.32% |
| 77 | (1-Methylpenta-2,4-dienyl)benzene | 91 | 15.653 | 32700134 | 0.23% |
| 78 | 1,2,3-Trimethylindene | 94 | 15.809 | 23040004 | 0.16% |
| 79 | 1H-Indene, 1,1,3-trimethyl- | 93 | 16.042 | 41394717 | 0.29% |
| 80 | Biphenyl | 93 | 16.127 | 61430928 | 0.42% |
| 81 | Naphthalene, 1-ethyl- | 96 | 16.397 | 161980790 | 1.12% |
| 82 | Naphthalene, 1-ethyl- | 95 | 16.461 | 84154914 | 0.58% |
| 83 | Naphthalene, 2,7-dimethyl- | 97 | 16.599 | 91859827 | 0.63% |
| 84 | Naphthalene, 2,7-dimethyl- | 97 | 16.872 | 130480153 | 0.90% |
| 85 | Naphthalene, 2,7-dimethyl- | 96 | 16.932 | 83484571 | 0.58% |
| 86 | Naphthalene, 2-ethenyl- | 87 | 17.064 | 17625242 | 0.12% |
| 87 | Benzene, 2,4-cyclohexadien-1-yl- | 53 | 17.162 | 38766993 | 0.27% |
| 88 | Naphthalene, 2,7-dimethyl- | 97 | 17.227 | 53344435 | 0.37% |
| 89 | Naphthalene, 1,5-dimethyl- | 97 | 17.281 | 43255010 | 0.30% |
| 90 | Biphenylene | 81 | 17.406 | 43641645 | 0.30% |
| 91 | Naphthalene, 1,5-dimethyl- | 95 | 17.502 | 49209927 | 0.34% |
| 92 | Benzene, [1-(2,4-cyclopentadien-1-ylidene)ethyl]- | 64 | 18.027 | 127597677 | 0.88% |
| 93 | Naphthalene, 1-propyl- | 87 | 18.093 | 15714131 | 0.11% |
| 94 | 1,1'-Biphenyl, 2-methyl- | 93 | 18.197 | 20550179 | 0.14% |
| 95 | Naphthalene, 1,4,6-trimethyl- | 95 | 18.225 | 13769874 | 0.10% |
| 96 | Naphthalene, 2-(1-methylethyl)- | 94 | 18.366 | 48656115 | 0.34% |
| 97 | Naphthalene, 1,4,6-trimethyl- | 94 | 18.423 | 16222467 | 0.11% |
| 98 | Azulene, 4,6,8-trimethyl- | 94 | 18.458 | 24735678 | 0.17% |
| 99 | Naphthalene, 1,4,6-trimethyl- | 95 | 18.565 | 25098161 | 0.17% |
| 100 | Naphthalene, 1,4,6-trimethyl- | 95 | 18.674 | 39180361 | 0.27% |
| 101 | Naphthalene, 1,6,7-trimethyl- | 95 | 18.758 | 34327380 | 0.24% |
| 102 | Naphthalene, 1,4,5-trimethyl- | 97 | 18.826 | 33862530 | 0.23% |
| 103 | Naphthalene, 2,3,6-trimethyl- | 96 | 19.096 | 64621148 | 0.45% |
| 104 | Naphthalene, 1,4,5-trimethyl- | 94 | 19.157 | 25682699 | 0.18% |
| 105 | 1H-Phenalene | 76 | 19.402 | 107877073 | 0.75% |
| 106 | Fluorene | 72 | 19.632 | 32982462 | 0.23% |
| 107 | Fluorene | 91 | 19.717 | 158573255 | 1.09% |
| 108 | Naphthalene, 1,4,5-trimethyl- | 74 | 19.792 | 48034113 | 0.33% |
| 109 | 1-Isopropenylnaphthalene | 94 | 19.938 | 60007028 | 0.41% |
| 110 | Naphthalene, 1-(2-propenyl)- | 90 | 20.016 | 85873649 | 0.59% |
| 111 | Fluorene-9-methanol | 59 | 20.061 | 62941169 | 0.43% |
| 112 | 1-Hydroxy-4-(1-hydroxyiminoethyl)-2,2,5,5-tetramethyl-3-imidazoline | 80 | 20.14 | 53522031 | 0.37% |
| 113 | Fluorene | 90 | 20.312 | 44118608 | 0.30% |
| 114 | Fluorene | 83 | 20.412 | 42135969 | 0.29% |
| 115 | 3,3'-Dimethylbiphenyl | 46 | 21.44 | 19267169 | 0.13% |
| 116 | 3,3'-Dimethylbiphenyl | 81 | 21.498 | 21099463 | 0.15% |
| 117 | 9H-Fluorene, 2-methyl- | 97 | 21.55 | 59857286 | 0.41% |
| 118 | 9H-Fluorene, 1-methyl- | 98 | 21.59 | 66896231 | 0.46% |
| 119 | 9H-Fluorene, 3-methyl- | 97 | 21.697 | 97285015 | 0.67% |
| 120 | 9H-Fluorene, 9,9-dimethyl- | 55 | 21.811 | 30066632 | 0.21% |

TABLE A60-continued

GC-MS data for the reaction of soybean oil with supercritical water with 9.7% colloidal zirconia at 550° C. (experiment 756).

| Peak # | Peak Name | % Probability | RT | Area | % of Total |
|---|---|---|---|---|---|
| 121 | 9H-Fluorene, 2-methyl- | 95 | 21.866 | 68766092 | 0.48% |
| 122 | 3H-Benz[e]indene, 2-methyl- | 94 | 22.227 | 33517820 | 0.23% |
| 123 | Phenanthrene | 93 | 22.83 | 104105201 | 0.72% |
| 124 | Diphenylethyne | 93 | 22.986 | 38618934 | 0.27% |
| 125 | 9H-Fluoren-9-one, hydrazone | 49 | 23.025 | 17114226 | 0.12% |
| 126 | Phenanthrene, 9,10-dihydro-1-methyl- | 83 | 23.131 | 33201589 | 0.23% |
| 127 | 9H-Fluorene, 2,3-dimethyl- | 94 | 23.351 | 31427126 | 0.22% |
| 128 | 9H-Fluorene, 2,3-dimethyl- | 95 | 23.428 | 25311717 | 0.18% |
| 129 | 9H-Fluorene, 2,3-dimethyl- | 95 | 23.482 | 22191680 | 0.15% |
| 130 | 9H-Fluorene, 2,3-dimethyl- | 97 | 23.554 | 18279718 | 0.13% |
| 131 | 9H-Fluorene, 2,3-dimethyl- | 95 | 23.761 | 38301471 | 0.26% |
| 132 | Phenanthrene, 1-methyl- | 96 | 24.509 | 45672918 | 0.32% |
| 133 | Phenanthrene, 1-methyl- | 96 | 24.595 | 47211396 | 0.33% |
| 134 | Anthracene, 1-methyl- | 96 | 24.73 | 37737529 | 0.26% |
| 135 | 4H-Cyclopenta[def]phenanthrene | 49 | 24.824 | 40624600 | 0.28% |
| 136 | Phenanthrene, 1-methyl- | 96 | 24.868 | 47764148 | 0.33% |
| 137 | 1H-Cyclopropa[l]phenanthrene, 1a,9b-dihydro- | 96 | 24.938 | 46518674 | 0.32% |
| 138 | n-Hexadecanoic acid | 99 | 25.42 | 85824501 | 0.59% |
| 139 | 1,1,4a-Trimethyl-5,6-dimethylenedecahydronaphthalene | 74 | 25.578 | 16615452 | 0.12% |
| 140 | Phenanthrene, 4,5-dimethyl- | 91 | 26.048 | 15561141 | 0.11% |
| 141 | Phenanthrene, 2,3-dimethyl- | 94 | 26.191 | 20143239 | 0.14% |
| 142 | Dibenzo[a,e]cyclooctene | 78 | 26.377 | 30402123 | 0.21% |
| 143 | Phenanthrene, 2,5-dimethyl- | 93 | 26.436 | 23332198 | 0.16% |
| 144 | 1,4-Ethenoanthracene, 1,4-dihydro- | 81 | 26.495 | 26696255 | 0.18% |
| 145 | Dibenzo[a,e]cyclooctene | 78 | 26.514 | 30210531 | 0.21% |
| 146 | 2,4(1H,3H)-Pyrimidinedione, 5-bromo-6-methyl-3-(1-methylethyl)- | 89 | 26.69 | 44550768 | 0.31% |
| 147 | Fluoranthene | 94 | 26.809 | 27229994 | 0.19% |
| 148 | Fluoranthene | 42 | 27.152 | 20700448 | 0.14% |
| 149 | Pyrene | 96 | 27.481 | 99779321 | 0.69% |
| 150 | Naphthalene, 1-phenyl- | 78 | 27.576 | 15923902 | 0.11% |
| 151 | 9,12-Octadecadienoic acid (Z,Z)- | 96 | 27.803 | 224664445 | 1.55% |
| 152 | 9,12-Octadecadienoic acid (Z,Z)- | 96 | 27.877 | 86290860 | 0.60% |
| 153 | 5-(1-Naphthyl)tricyclo[4.1.0.0]hept-3-ene | 46 | 28.064 | 74297830 | 0.51% |
| 154 | Fluoranthene, 2-methyl- | 94 | 28.747 | 43463259 | 0.30% |
| 155 | 11H-Benzo[b]fluorene | 93 | 28.961 | 29844929 | 0.21% |
| 156 | Pyrene, 1-methyl- | 97 | 29.039 | 37030660 | 0.26% |
| 157 | 5-(1-Naphthyl)tricyclo[4.1.0.0]hept-3-ene | 42 | 29.291 | 23697854 | 0.16% |
| 158 | Pyrene, 1-methyl- | 94 | 29.327 | 32250741 | 0.22% |
| 159 | Pyrene, 1-methyl- | 96 | 29.423 | 34164867 | 0.24% |
| 160 | Pyrene, 1,3-dimethyl- | 96 | 30.196 | 14203088 | 0.10% |
| 161 | Pyrene, 1,3-dimethyl- | 60 | 30.26 | 19928142 | 0.14% |
| 162 | Triphenylene | 96 | 31.585 | 21473461 | 0.15% |
| 163 | Triphenylene | 96 | 31.706 | 19364062 | 0.13% |
| 164 | Chrysene, 4-methyl- | 95 | 32.998 | 24213228 | 0.17% |

TABLE A61

Reaction conditions for the reaction of soybean oil with superheated zirconia colloids suspended in water through open tubular reactor.

| Exp. No. | Oil Type | Reactor Type | Particle Size, Pore size, Surface Area | Actual Preheater Temp. (° C.) (T1) | Reactor Inlet Temp. (° C.), T2 | Back Pressure (PSI) |
|---|---|---|---|---|---|---|
| 761 | Soybean Oil | Open Tube | 0.95% Sea in salt water | 550 | 546 | 3400 |
| 762 | Soybean Oil | Open Tube | 0.95% Sea in salt water | 515 | 515 | 3400 |
| 763 | Soybean Oil | Open Tube | 4.4% Zirconia colloids | 512 | 512 | 4500 |
| 764 | Soybean Oil | Open Tube | Blank (no colloids) | 550 | 550 | 3900 |
| 765 | Soybean Oil | Open Tube | 0.95% Sea in salt water | 550 | 550 | 3800 |
| 766 | Soybean Oil | Open Tube | Blank (no colloids) | 515 | 515 | 3900 |
| 767 | Soybean Oil | ZR101112A | 10 um/300 A/30 m^2/g | 500 | 500 | 3400 |
| 768 | Soybean Oil | Open Tube | Blank (no colloids) | 519 | 490 | 3800 |
| 769 | Soybean Oil | Open Tube | Blank (no colloids) | 560 | 545 | 3800 |
| 770 | 4.9% Aspen | Open Tube | 4.5% zirconia colloids | 500 | 500 | 3400 |
| 771 | 4.9% Aspen | Open Tube | Blank (no colloids) | 500 | 500 | 3400 |
| 772 | 5% Camelina Meal in water | Open Tube | 7% colloids in water | 500 | 500 | 3250 |
| 773 | 5% Camelina Meal in water | Open Tube | 7% colloids in water | 525 | 520 | 3250 |
| 774 | 5.3% Algae Powder in water | Open Tube | 7% colloids in water | 500 | 495 | 3250 |
| 775 | Soybean Oil | Open Tube | 1% K2CO3 in water | 410 | 380 | 3500 |
| 776 | Soybean Oil | Open Tube | 1% K2CO3 in water | 469 | 430 | 3500 |
| 777 | Soybean Oil | Open Tube | 1% K2CO3 in water | 506 | 462 | 3500 |
| 778 | Soybean Oil | Open Tube | 1% K2CO3 in water | 541 | 499 | 3500 |
| 779 | 5.3% Algae Powder in water | Open Tube | 7% colloids in water | 548 | 545 | 3250 |
| 780 | 5.3% Algae Powder in water | Open Tube | Blank (no colloids) | 498 | 387 | 3250 |
| 781 | 10% Yeast in water | Open Tube | Blank (no colloids) | 499 | 387 | 3250 |
| 782 | 10% Yeast in water | Open Tube | Blank (no colloids) | 547 | 390 | 3250 |
| 783 | 10% Yeast in water | Open Tube | 7% colloids in water | 499 | 500 | 3250 |
| 784 | 10% Yeast in water | Open Tube | 7% colloids in water | 550 | 548 | 3250 |

TABLE A62

Data collected for sample conditions given in Table 61.

| Exp. No. | Actual Water Flow (min/min) | Actual Oil Flow rate (min/Min) | Total Flow Rate (ml/min) |
|---|---|---|---|
| 761 | 3.7 | 1.4385 | 5.139 |
| 762 | 3.7 | 1.4385 | 5.139 |
| 763 | 3.7 | 1.4385 | 5.139 |
| 764 | 3.7 | 1.4385 | 5.139 |
| 765 | 3.7 | 1.4385 | 5.139 |
| 766 | 3.7 | 1.4385 | 5.139 |
| 767 | 5.999 | 2.06325 | 8.062 |
| 768 | 8.780 | 3.120 | 11.900 |
| 769 | 8.780 | 3.120 | 11.900 |
| 770 | 3.804 | 0.196 | 4.000 |
| 771 | 3.804 | 0.196 | 4.000 |
| 772 | 3.800 | 0.200 | 4.000 |
| 773 | 5.800 | 0.200 | 6.000 |
| 774 | 5.788 | 0.212 | 6.000 |
| 775 | 1.840 | 0.660 | 2.500 |
| 776 | 1.840 | 0.660 | 2.500 |
| 777 | 1.840 | 0.660 | 2.500 |
| 778 | 1.840 | 0.660 | 2.500 |
| 779 | 5.788 | 0.212 | 6.000 |
| 780 | 5.788 | 0.212 | 6.000 |
| 781 | 4.600 | 0.400 | 5.000 |
| 782 | 4.600 | 0.400 | 5.000 |
| 783 | 4.600 | 0.400 | 5.000 |
| 784 | 4.600 | 0.400 | 5.000 |

TABLE A63

MS data obtained for the supercritical salt water (0.95%) decomposition of soybean oil at 515 degrees C.

| Peak # | Peak Name | % Probability | RT | Area | % of Total |
|---|---|---|---|---|---|
| 1 | Propene | 90 | 1.199 | 9708100 | 0.15% |
| 2 | 1-Butene | 52 | 1.245 | 45356387 | 0.72% |
| 3 | 1-Pentene | 90 | 1.349 | 116637632 | 1.85% |
| 4 | 1,3-Cyclopentadiene | 90 | 1.464 | 9072678 | 0.14% |
| 5 | Cyclopentene | 91 | 1.51 | 38671333 | 0.61% |
| 6 | 1-Pentene | 80 | 1.54 | 19440829 | 0.31% |
| 7 | 1-Hexene | 91 | 1.624 | 86076812 | 1.37% |
| 8 | Hexane | 83 | 1.661 | 59581335 | 0.95% |
| 9 | 3-Hexene, (E)- | 91 | 1.695 | 38804873 | 0.62% |
| 10 | Cyclobutene, 3,3-dimethyl- | 64 | 1.743 | 41864782 | 0.66% |
| 11 | Cyclopentane, methyl- | 91 | 1.826 | 42309712 | 0.67% |
| 12 | 1,3-Cyclopentadiene, methyl- | 92 | 1.917 | 9891003 | 0.16% |
| 13 | Cyclopentene, 1-methyl- | 90 | 1.991 | 73857450 | 1.17% |
| 14 | Benzene | 91 | 2.072 | 180759145 | 2.87% |
| 15 | Cyclohexene | 93 | 2.23 | 69805783 | 1.11% |
| 16 | 1-Heptene | 95 | 2.315 | 113148533 | 1.80% |
| 17 | Heptane | 91 | 2.403 | 79953445 | 1.27% |
| 18 | Cyclobutane, (1-methylethylidene)- | 76 | 2.454 | 28480440 | 0.45% |
| 19 | 2-Heptene | 94 | 2.49 | 27744382 | 0.44% |
| 20 | 2-Heptene | 93 | 2.585 | 25840630 | 0.41% |
| 21 | Cyclohexane, methyl- | 93 | 2.681 | 73502095 | 1.17% |
| 22 | Cyclopentane, ethyl- | 96 | 2.827 | 20552606 | 0.33% |
| 23 | Cyclohexene, 4-methyl- | 94 | 2.907 | 47923178 | 0.76% |
| 24 | Cyclobutane, (1-methylethylidene)- | 87 | 3.125 | 20492637 | 0.33% |
| 25 | Cyclopentane, ethylidene- | 91 | 3.155 | 38310546 | 0.61% |
| 26 | Toluene | 94 | 3.327 | 376780243 | 5.98% |
| 27 | Cyclohexene, 1-methyl- | 91 | 3.369 | 77708239 | 1.23% |
| 28 | 1-Octene | 95 | 3.716 | 70256197 | 1.12% |
| 29 | Cyclohexane, 1,2-dimethyl-, trans- | 89 | 3.816 | 16837962 | 0.27% |
| 30 | Octane | 83 | 3.869 | 50268629 | 0.80% |
| 31 | 4-Octene, (Z)- | 93 | 4 | 21537532 | 0.34% |
| 32 | 1-Decyne | 72 | 4.265 | 15884833 | 0.25% |
| 33 | trans-3,5-Dimethylcyclohexene | 91 | 4.34 | 17885439 | 0.28% |
| 34 | 1,4-Dimethyl-1-cyclohexene | 94 | 4.395 | 11753134 | 0.19% |
| 35 | Cyclohexane, ethyl- | 93 | 4.491 | 22781079 | 0.36% |
| 36 | 2-Ethyl-3-methylcyclopentene | 91 | 4.605 | 8801185 | 0.14% |
| 37 | Cyclohexene, 1,6-dimethyl- | 91 | 4.732 | 11032938 | 0.18% |
| 38 | 4-Octyne | 59 | 4.789 | 13209902 | 0.21% |
| 39 | Cyclohexene, 1-ethyl- | 93 | 4.842 | 17737449 | 0.28% |
| 40 | Pentalene, 1,2,3,3a,4,6a-hexahydro- | 90 | 4.972 | 16926642 | 0.27% |
| 41 | Ethylbenzene | 91 | 5.095 | 135169096 | 2.15% |
| 42 | Benzene, 1,3-dimethyl- | 97 | 5.269 | 122457208 | 1.94% |
| 43 | Benzene, 1,3-dimethyl- | 95 | 5.772 | 157758464 | 2.50% |
| 44 | Nonane | 91 | 5.934 | 32397469 | 0.51% |
| 45 | 3-Nonene | 56 | 6.076 | 13375033 | 0.21% |
| 46 | Benzene, 1,3,5-trimethyl- | 46 | 6.484 | 13390781 | 0.21% |
| 47 | 1H-Indene, octahydro-, cis- | 43 | 6.997 | 34774706 | 0.55% |
| 48 | Benzene, propyl- | 91 | 7.142 | 62699078 | 1.00% |
| 49 | Benzene, 1-ethyl-3-methyl- | 95 | 7.332 | 41322628 | 0.66% |
| 50 | Benzene, 1-ethyl-2-methyl- | 95 | 7.358 | 37869354 | 0.60% |
| 51 | Benzene, 1-ethyl-2-methyl- | 95 | 7.74 | 41103838 | 0.65% |
| 52 | 1-Decene | 97 | 8.014 | 25712372 | 0.41% |
| 53 | Benzene, 1,3,5-trimethyl- | 97 | 8.056 | 33159479 | 0.53% |
| 54 | Decane | 96 | 8.206 | 12565334 | 0.20% |
| 55 | 1H-Indene, 2,3,4,5,6,7-hexahydro- | 90 | 8.461 | 25256115 | 0.40% |

TABLE A63-continued

MS data obtained for the supercritical salt water (0.95%) decomposition of soybean oil at 515 degrees C.

| Peak # | Peak Name | % Probability | RT | Area | % of Total |
|---|---|---|---|---|---|
| 56 | Hexanoic acid | 20 | 8.705 | 51261258 | 0.81% |
| 57 | Benzene, cyclopropyl- | 92 | 8.824 | 14538703 | 0.23% |
| 58 | Tetracyclo[3.3.1.0(2,8).0(4,6)]-non-2-ene | 74 | 8.995 | 72646950 | 1.15% |
| 59 | Indene | 93 | 9.205 | 29111298 | 0.46% |
| 60 | Benzene, 1,2-diethyl- | 94 | 9.329 | 19477440 | 0.31% |
| 61 | Benzene, 1-methyl-3-propyl- | 93 | 9.374 | 21129506 | 0.34% |
| 62 | Benzene, butyl- | 91 | 9.471 | 61939987 | 0.98% |
| 63 | Cyclohexane, 1-propenyl- | 81 | 9.67 | 17047681 | 0.27% |
| 64 | Benzene, 1-methyl-2-propyl- | 91 | 9.715 | 20738679 | 0.33% |
| 65 | Benzene, 4-ethyl-1,2-dimethyl- | 94 | 9.949 | 12624499 | 0.20% |
| 66 | Indan, 1-methyl- | 93 | 10.137 | 76105651 | 1.21% |
| 67 | 1-Undecene | 96 | 10.261 | 52444043 | 0.83% |
| 68 | Undecane | 83 | 10.442 | 29956101 | 0.48% |
| 69 | 5-Undecene | 95 | 10.564 | 74771634 | 1.19% |
| 70 | 4-Undecene, (E)- | 78 | 10.749 | 37383168 | 0.59% |
| 71 | Cyclooctane, ethenyl- | 43 | 11 | 41401454 | 0.66% |
| 72 | 3a,6-Methano-3ah-indene, 2,3,6,7-tetrahydro- | 91 | 11.287 | 50351907 | 0.80% |
| 73 | Benzene, 1-methyl-4-(1-methylpropyl)- | 64 | 11.427 | 30165579 | 0.48% |
| 74 | 1,2-Butadiene, 3-phenyl- | 70 | 11.509 | 103262943 | 1.64% |
| 75 | 2-Butanone, 1-amino-1-phenyl- | 22 | 11.592 | 19659741 | 0.31% |
| 76 | Benzene, 1-butynyl- | 93 | 11.646 | 27126219 | 0.43% |
| 77 | Benzene, pentyl- | 81 | 11.685 | 83973018 | 1.33% |
| 78 | Naphthalene, 1,2,3,4-tetrahydro- | 96 | 11.768 | 38061199 | 0.60% |
| 79 | Benzene, 1-methyl-4-(2-methylpropyl)- | 87 | 11.895 | 17771063 | 0.28% |
| 80 | Naphthalene | 91 | 12.247 | 58473101 | 0.93% |
| 81 | Benzene, 1-methyl-4-(1-methyl-2-propenyl)- | 90 | 12.319 | 32691508 | 0.52% |
| 82 | 4-Dodecene, (E)- | 93 | 12.394 | 46168930 | 0.73% |
| 83 | 2-Ethyl-2,3-dihydro-1H-indene | 81 | 12.433 | 29802968 | 0.47% |
| 84 | 1H-Indene, 2,3-dihydro-1,2-dimethyl- | 70 | 12.54 | 93325560 | 1.48% |
| 85 | Pentalene, octahydro-1-methyl- | 62 | 12.674 | 22320083 | 0.35% |
| 86 | Benzene, (1-methyl-1-butenyl)- | 91 | 13.091 | 18970721 | 0.30% |
| 87 | 1H-Indene, 2,3-dihydro-1,2-dimethyl- | 70 | 13.602 | 14745353 | 0.23% |
| 88 | 1H-Indene, 1-ethenyl-2,3-dihydro- | 70 | 13.651 | 16880727 | 0.27% |
| 89 | 1H-Indene, 1,3-dimethyl- | 96 | 13.702 | 22288709 | 0.35% |
| 90 | Benzene, hexyl- | 60 | 13.797 | 50104414 | 0.80% |
| 91 | Naphthalene, 1,2,3,4-tetrahydro-5-methyl- | 70 | 13.914 | 43578483 | 0.69% |
| 92 | 1H-Indene, 1,3-dimethyl- | 93 | 14.011 | 16258607 | 0.26% |
| 93 | Benzene, (3-methyl-2-butenyl)- | 45 | 14.247 | 30258470 | 0.48% |
| 94 | 1-Tridecene | 98 | 14.408 | 76401175 | 1.21% |
| 95 | Naphthalene, 2-methyl- | 94 | 14.5 | 44943148 | 0.71% |
| 96 | Naphthalene, 1-methyl- | 94 | 14.828 | 37408436 | 0.59% |
| 97 | 1-Tetradecene | 98 | 16.304 | 23655205 | 0.38% |
| 98 | Naphthalene, 2,6-dimethyl- | 94 | 16.874 | 9245038 | 0.15% |
| 99 | Cyclopentene, 1-octyl- | 50 | 17.448 | 16128673 | 0.26% |
| 100 | 13-Tetradece-11-yn-1-ol | 42 | 17.668 | 26132125 | 0.42% |
| 101 | Undecylenic Acid | 90 | 17.739 | 39472537 | 0.63% |
| 102 | Z-9-Tetradecenal | 64 | 17.943 | 20650054 | 0.33% |
| 103 | 1-Pentadecene | 89 | 18.098 | 24333546 | 0.39% |
| 104 | Azulene, 4,6,8-trimethyl- | 74 | 19.106 | 23718923 | 0.38% |
| 105 | Decalin, syn-1-methyl-, cis- | 53 | 19.372 | 26547723 | 0.42% |
| 106 | 1,12-Tridecadiene | 90 | 19.467 | 44350826 | 0.70% |
| 107 | 1,12-Tridecadiene | 93 | 19.539 | 20541778 | 0.33% |

TABLE A63-continued

MS data obtained for the supercritical salt water (0.95%) decomposition of soybean oil at 515 degrees C.

| Peak # | Peak Name | % Probability | RT | Area | % of Total |
|---|---|---|---|---|---|
| 108 | Z-8-Hexadecene | 98 | 19.784 | 15545768 | 0.25% |
| 109 | 8-Phenyloctanoic acid | 95 | 23.834 | 30993914 | 0.49% |
| 110 | n-Hexadecanoic acid | 99 | 25.523 | 265594474 | 4.21% |
| 111 | 9-Octadecenoic acid, (E)- | 99 | 27.963 | 841771928 | 13.36% |
| 112 | 9-Octadecenoic acid, (E)- | 99 | 28.022 | 243847685 | 3.87% |
| 113 | Octadecanoic acid | 98 | 28.179 | 115671719 | 1.84% |

TABLE A64

MS data obtained for the supercritical salt water (0.95%) decomposition of soybean oil at 515 degrees C. with zirconia colloids.

| Peak # | Peak Name | % Probability | RT | Area | % of Total |
|---|---|---|---|---|---|
| 1 | 1-Butene | 52 | 1.246 | 36105212 | 0.62% |
| 2 | Pentane | 59 | 1.362 | 102392212 | 1.75% |
| 3 | Cyclopentene | 90 | 1.511 | 23065008 | 0.39% |
| 4 | Cyclopentane | 52 | 1.539 | 20673729 | 0.35% |
| 5 | 1-Hexene | 94 | 1.625 | 58285600 | 1.00% |
| 6 | Hexane | 64 | 1.661 | 82910775 | 1.42% |
| 7 | 3-Hexene | 90 | 1.694 | 39354228 | 0.67% |
| 8 | 3-Hexene, (Z)- | 70 | 1.745 | 38535001 | 0.66% |
| 9 | Cyclopentane, methyl- | 91 | 1.827 | 41437190 | 0.71% |
| 10 | 1,3-Cyclopentadiene, methyl- | 92 | 1.918 | 9335315 | 0.16% |
| 11 | Cyclopentene, 1-methyl- | 90 | 1.992 | 60230155 | 1.03% |
| 12 | Benzene | 94 | 2.074 | 116845210 | 2.00% |
| 13 | Cyclohexene | 94 | 2.232 | 52157832 | 0.89% |
| 14 | 1-Heptene | 90 | 2.316 | 94977669 | 1.62% |
| 15 | Heptane | 91 | 2.404 | 136387523 | 2.33% |
| 16 | 2-Heptene | 93 | 2.49 | 33114868 | 0.57% |
| 17 | (Z)-3-Heptene | 64 | 2.586 | 24454677 | 0.42% |
| 18 | Cyclohexane, methyl- | 93 | 2.682 | 74572064 | 1.28% |
| 19 | Cyclopentane, ethyl- | 96 | 2.829 | 23591240 | 0.40% |
| 20 | Cyclohexene, 4-methyl- | 91 | 2.91 | 37494627 | 0.64% |
| 21 | Cyclopropane, 1-methyl-1-isopropenyl- | 87 | 3.128 | 16158954 | 0.28% |
| 22 | Cyclopentane, ethylidene- | 91 | 3.156 | 39465096 | 0.68% |
| 23 | Toluene | 91 | 3.323 | 254609008 | 4.35% |
| 24 | Cyclohexene, 1-methyl- | 91 | 3.367 | 81860585 | 1.40% |
| 25 | Cyclooctane | 90 | 3.717 | 69904735 | 1.20% |
| 26 | Cyclohexane, 1,2-dimethyl-, trans- | 94 | 3.818 | 19310701 | 0.33% |
| 27 | Octane | 91 | 3.871 | 89693470 | 1.53% |
| 28 | 2-Octene, (E)- | 93 | 4.001 | 23617300 | 0.40% |
| 29 | 2-Octene, (E)- | 95 | 4.151 | 13239962 | 0.23% |
| 30 | 1,4-Dimethyl-1-cyclohexene | 93 | 4.398 | 13362343 | 0.23% |
| 31 | Cyclohexane, ethyl- | 94 | 4.493 | 31333046 | 0.54% |
| 32 | Cyclohexene, 1,6-dimethyl- | 92 | 4.735 | 13215451 | 0.23% |
| 33 | 4-Octyne | 53 | 4.789 | 15384093 | 0.26% |
| 34 | Cyclohexene, 1-ethyl- | 83 | 4.845 | 16332373 | 0.28% |
| 35 | cis-Bicyclo[3.3.0]oct-2-ene | 91 | 4.974 | 17282945 | 0.30% |
| 36 | Ethylbenzene | 91 | 5.097 | 109743602 | 1.88% |
| 37 | Benzene, 1,3-dimethyl- | 97 | 5.271 | 108222945 | 1.85% |
| 38 | Benzene, 1,3-dimethyl- | 95 | 5.771 | 125866066 | 2.15% |
| 39 | Nonane | 91 | 5.937 | 46800108 | 0.80% |
| 40 | cis-3-Nonene | 46 | 6.078 | 21842825 | 0.37% |
| 41 | cis-1,4-Dimethyl-2-methylenecyclohexane | 45 | 6.487 | 12096334 | 0.21% |
| 42 | Cyclopentane, butyl- | 95 | 6.674 | 15003407 | 0.26% |
| 43 | Cyclopentene,1-(2-methylpropyl)- | 50 | 7.001 | 28050199 | 0.48% |
| 44 | Benzene, propyl- | 87 | 7.145 | 48069163 | 0.82% |

TABLE A64-continued

MS data obtained for the supercritical salt water (0.95%) decomposition of soybean oil at 515 degrees C. with zirconia colloids.

| Peak # | Peak Name | % Probability | RT | Area | % of Total |
|---|---|---|---|---|---|
| 45 | Benzene, 1-ethyl-3-methyl- | 95 | 7.336 | 68969720 | 1.18% |
| 46 | Benzene, 1-ethyl-2-methyl- | 95 | 7.742 | 42916942 | 0.73% |
| 47 | 1-Decene | 97 | 8.016 | 30195345 | 0.52% |
| 48 | Benzene, 1,2,4-trimethyl- | 95 | 8.062 | 51439801 | 0.88% |
| 49 | Decane | 96 | 8.208 | 55144514 | 0.94% |
| 50 | cis-3-Decene | 86 | 8.346 | 32584007 | 0.56% |
| 51 | 1H-Indene, 2,3,4,5,6,7-hexahydro- | 91 | 8.464 | 37214748 | 0.64% |
| 52 | Benzene, 1,3,5-trimethyl- | 46 | 8.712 | 21279789 | 0.36% |
| 53 | Tetracyclo[3.3.1.0(2,8).0(4,6)]-non-2-ene | 81 | 8.997 | 69099538 | 1.18% |
| 54 | Benzene, 1-propynyl- | 93 | 9.215 | 13062233 | 0.22% |
| 55 | Benzene, 1,2-diethyl- | 86 | 9.332 | 16511910 | 0.28% |
| 56 | Benzene, 1-methyl-3-propyl- | 93 | 9.376 | 23456377 | 0.40% |
| 57 | Benzene, butyl- | 87 | 9.474 | 58868375 | 1.01% |
| 58 | Benzene, (1-methylpropyl)- | 94 | 9.717 | 22358108 | 0.38% |
| 59 | Benzene, 2-ethyl-1,4-dimethyl- | 96 | 9.953 | 12841006 | 0.22% |
| 60 | Indan, 1-methyl- | 94 | 10.139 | 77054914 | 1.32% |
| 61 | 3-Undecene, (Z)- | 95 | 10.263 | 47958700 | 0.82% |
| 62 | 5-Undecene | 59 | 10.389 | 28741380 | 0.49% |
| 63 | Undecane | 96 | 10.445 | 38967290 | 0.67% |
| 64 | 4-Undecene, (Z)- | 94 | 10.568 | 72190090 | 1.23% |
| 65 | 5-Undecene | 89 | 10.75 | 54808188 | 0.94% |
| 66 | 2,4-Dimethylstyrene | 60 | 11.026 | 30197373 | 0.52% |
| 67 | 1H-Indene, 2,3-dihydro-5-methyl- | 94 | 11.288 | 50337423 | 0.86% |
| 68 | 1H-Indene, 3-methyl- | 91 | 11.511 | 89306540 | 1.53% |
| 69 | 2-(p-Tolyl)ethylamine | 38 | 11.593 | 20485791 | 0.35% |
| 70 | Benzene, pentyl- | 81 | 11.687 | 94724732 | 1.62% |
| 71 | Naphthalene, 1,2,3,4-tetrahydro- | 96 | 11.77 | 56162735 | 0.96% |
| 72 | Benzene, 1-methyl-4-(2-methylpropyl)- | 80 | 11.897 | 18292132 | 0.31% |
| 73 | 1H-Indene, 1,3-dimethyl- | 97 | 12.166 | 14865916 | 0.25% |
| 74 | Naphthalene | 93 | 12.255 | 42665025 | 0.73% |
| 75 | 1H-Indene, 2,3-dihydro-1,6-dimethyl- | 90 | 12.322 | 33278785 | 0.57% |
| 76 | 1-Dodecene | 96 | 12.396 | 47888984 | 0.82% |
| 77 | 2-Ethyl-2,3-dihydro-1H-indene | 53 | 12.435 | 31480155 | 0.54% |
| 78 | Benzene, (3-methyl-2-butenyl)- | 86 | 12.544 | 94681559 | 1.62% |
| 79 | Benzene, (2-methyl-1-butenyl)- | 90 | 13.094 | 20630044 | 0.35% |
| 80 | 3-Phenyl-3-pentene | 83 | 13.266 | 17725495 | 0.30% |
| 81 | Naphthalene, 1-ethyl-1,2,3,4-tetrahydro- | 89 | 13.604 | 16446277 | 0.28% |
| 82 | 1H-Indene, 1,3-dimethyl- | 96 | 13.706 | 19437914 | 0.33% |
| 83 | Benzene, hexyl- | 76 | 13.796 | 23613936 | 0.40% |
| 84 | 1H-Indene, 1,3-dimethyl- | 94 | 13.821 | 25122512 | 0.43% |
| 85 | Naphthalene, 1,2,3,4-tetrahydro-6-methyl- | 93 | 13.915 | 50513786 | 0.86% |
| 86 | Naphthalene, 1,2-dihydro-4-methyl- | 95 | 14.015 | 15393886 | 0.26% |
| 87 | Benzene, 2-ethenyl-1,3,5-trimethyl- | 46 | 14.249 | 34584189 | 0.59% |
| 88 | 1-Tridecene | 56 | 14.411 | 84657983 | 1.45% |
| 89 | Benzocycloheptatriene | 83 | 14.505 | 35451136 | 0.61% |
| 90 | Naphthalene, 2-methyl- | 93 | 14.834 | 29267783 | 0.50% |
| 91 | Benzene, heptyl- | 50 | 15.793 | 15779472 | 0.27% |
| 92 | Benzene, 1,4-bis(1-methylethenyl)- | 93 | 16.043 | 27419450 | 0.47% |
| 93 | n-Decanoic acid | 42 | 16.15 | 29735252 | 0.51% |
| 94 | 1-Tetradecene | 98 | 16.304 | 24921603 | 0.43% |
| 95 | Naphthalene, 1,5-dimethyl- | 76 | 16.883 | 17826062 | 0.31% |
| 96 | Cyclopentene, 1-octyl- | 47 | 17.45 | 15313892 | 0.26% |

TABLE A64-continued

MS data obtained for the supercritical salt water (0.95%) decomposition of soybean oil at 515 degrees C. with zirconia colloids.

| Peak # | Peak Name | % Probability | RT | Area | % of Total |
|---|---|---|---|---|---|
| 97 | Benzene, octyl- | 30 | 17.673 | 30098809 | 0.52% |
| 98 | Butanoic acid, 3-methyl-2-methylene-, methyl ester | 38 | 17.957 | 28977127 | 0.50% |
| 99 | 1-Pentadecene | 60 | 18.107 | 25791463 | 0.44% |
| 100 | Pentadecane | 93 | 18.225 | 14389580 | 0.25% |
| 101 | n-Nonylcyclohexane | 64 | 19.108 | 23569066 | 0.40% |
| 102 | 4,8-Dimethylbicyclo[3.3.1]nonane-2,6-dione | 62 | 19.37 | 24950298 | 0.43% |
| 103 | E-1,9-Tetradecadiene | 78 | 19.473 | 46078985 | 0.79% |
| 104 | 1,9-Tetradecadiene | 96 | 19.544 | 17251052 | 0.30% |
| 105 | 1-Hexadecene | 95 | 19.788 | 13996133 | 0.24% |
| 106 | Tridecanoic acid | 90 | 21.039 | 10174022 | 0.17% |
| 107 | 8-Phenyloctanoic acid | 94 | 23.831 | 27431691 | 0.47% |
| 108 | n-Hexadecanoic acid | 99 | 25.521 | 261515664 | 4.47% |
| 109 | 9-Octadecenoic acid, (E)- | 99 | 27.94 | 622589039 | 10.65% |
| 110 | 9-Octadecenoic acid, (E)- | 99 | 28.002 | 243097110 | 4.16% |
| 111 | Octadecanoic acid | 97 | 28.172 | 117891308 | 2.02% |

TABLE A65

MS data obtained of the hexane extract obtained for the reaction of zirconia colloids with Camelina meal in supercritical water at 500 degrees C.

| Peak # | Peak Name | % Probability | RT | Area | % of Total |
|---|---|---|---|---|---|
| 1 | Toluene | 93 | 3.378 | 18166639 | 4.69% |
| 2 | 2,4-Dimethyl-1-heptene | 87 | 4.716 | 1403272 | 0.36% |
| 3 | Cyclopentanone, 2-methyl- | 94 | 4.748 | 3373938 | 0.87% |
| 4 | Ethylbenzene | 91 | 5.165 | 5058742 | 1.31% |
| 5 | 1,3,5,7-Cyclooctatetraene | 55 | 5.832 | 1578027 | 0.41% |
| 6 | 2-Octanone | 52 | 8.124 | 692597 | 0.18% |
| 7 | Benzene, cyclopropyl- | 81 | 9.043 | 4076165 | 1.05% |
| 8 | Indene | 46 | 9.299 | 3305055 | 0.85% |
| 9 | Phenol, 3-methyl- | 46 | 10.166 | 6393092 | 1.65% |
| 10 | Phenol, 4-methyl- | 60 | 10.267 | 1725973 | 0.45% |
| 11 | 2-Nonanone | 42 | 10.35 | 3832873 | 0.99% |
| 12 | Benzyl methyl ketone | 30 | 11.204 | 3394429 | 0.88% |
| 13 | Azulene, 1,2,3,3a-tetrahydro- | 70 | 11.324 | 3342740 | 0.86% |
| 14 | Benzene, 1-butynyl- | 46 | 11.545 | 5520301 | 1.43% |
| 15 | Bicyclo[3.1.0]hex-2-ene, 4-methylene-1-(1-methylethyl)- | 25 | 11.72 | 5686192 | 1.47% |
| 16 | Phenol, 3-ethyl- | 87 | 12.07 | 516959 | 0.13% |
| 17 | 2-Decanone | 83 | 12.486 | 5899681 | 1.52% |
| 18 | Dodecane | 52 | 12.564 | 2567393 | 0.66% |
| 19 | p-Pentylacetophenone | 62 | 13.678 | 3435502 | 0.89% |
| 20 | Phenol, 3-propyl- | 43 | 13.968 | 3750725 | 0.97% |
| 21 | 1-Tridecene | 95 | 14.404 | 2426458 | 0.63% |
| 22 | 2-Undecanone | 60 | 14.502 | 2464628 | 0.64% |
| 23 | Indolizine | 70 | 14.617 | 2642877 | 0.68% |
| 24 | Indole | 81 | 14.67 | 2922913 | 0.76% |
| 25 | 1H-Indole, 5-methyl- | 90 | 16.316 | 20471983 | 5.29% |
| 26 | 1H-Indole, 2-methyl- | 49 | 16.405 | 6354665 | 1.64% |
| 27 | Bicyclo[2.2.1]hept-2-ene, 1-methyl- | 58 | 17.326 | 2444648 | 0.63% |
| 28 | 2,2'-Bithiophene | 38 | 17.532 | 4453311 | 1.15% |
| 29 | Benzenamine, N-(1-methyl-2-propynyl)- | 53 | 18.082 | 9820399 | 2.54% |
| 30 | Pentadecane | 97 | 18.213 | 7240047 | 1.87% |
| 31 | Imidazo[4,5-d]pyridazine-4,7(5H,6H)-dione, 1-methyl- | 49 | 19.221 | 4509862 | 1.17% |
| 32 | Aniline, N-ethyl-3,5-di(hydroxymethyl)- | 38 | 19.375 | 7257964 | 1.87% |

TABLE A65-continued

MS data obtained of the hexane extract obtained for the reaction of zirconia colloids with Camelina meal in supercritical water at 500 degrees C.

| Peak # | Peak Name | % Probability | RT | Area | % of Total |
|---|---|---|---|---|---|
| 33 | 1-Methylene-spiro[4.5]decan-6-one | 25 | 19.542 | 4090080 | 1.06% |
| 34 | Cyclododecane | 96 | 19.782 | 3723418 | 0.96% |
| 35 | 2-Undecanone | 43 | 19.905 | 5450217 | 1.41% |
| 36 | 8-Heptadecene | 86 | 21.144 | 5924096 | 1.53% |
| 37 | 2-Methyl-Z-7-hexadecene | 87 | 21.243 | 4977388 | 1.29% |
| 38 | Heptadecane | 96 | 21.495 | 4838905 | 1.25% |
| 39 | Benzene, (1-methyldecyl)- | 47 | 22.802 | 2413305 | 0.62% |
| 40 | (−)-E-Pinane | 86 | 24.213 | 2435986 | 0.63% |
| 41 | 2-Heptadecanone | 94 | 24.511 | 22596773 | 5.84% |
| 42 | n-Hexadecanoic acid | 98 | 25.389 | 26253361 | 6.78% |
| 43 | Octadecan-4-one | 90 | 25.828 | 5247272 | 1.36% |
| 44 | (2-Acetyl-5-methyl-cyclopentyl)-acetic acid | 49 | 26.913 | 15234645 | 3.93% |
| 45 | 1,9-Tetradecadiene | 74 | 26.999 | 19721147 | 5.09% |
| 46 | 2-Nonadecanone | 97 | 27.247 | 12150959 | 3.14% |
| 47 | 3-Nitro-1-phenylpentan-1-one | 37 | 27.526 | 3648591 | 0.94% |
| 48 | 9,12-Octadecadienoic acid (Z,Z)- | 98 | 27.659 | 7039262 | 1.82% |
| 49 | 9-Octadecenoic acid, (E)- | 98 | 27.727 | 26285155 | 6.79% |
| 50 | Oleic Acid | 98 | 27.796 | 17137983 | 4.43% |
| 51 | 9,12-Octadecadienoic acid (Z,Z)- | 91 | 28.04 | 7490161 | 1.93% |
| 52 | Benzenamine, N-[(2-methoxyphenyl)methylene]-4-nitro- | 46 | 28.124 | 5822948 | 1.50% |
| 53 | Cyclotetradecanone, 2-methyl- | 43 | 28.449 | 2718304 | 0.70% |
| 54 | Z-9-Tetradecenal | 70 | 29.441 | 8103657 | 2.09% |
| 55 | 1-Cyclohexylnonene | 56 | 29.525 | 10584867 | 2.73% |
| 56 | 2-Nonadecanone | 64 | 29.756 | 5314037 | 1.37% |
| 57 | Silicic acid, diethyl bis(trimethylsilyl) ester | 43 | 37.946 | 2342439 | 0.61% |

TABLE A66

MS data of obtained from the hexane extract of the reaction of zirconia colloids with algae powder in supercritical water at 500 degrees C.

| Peak # | Peak Name | % Probability | RT | Area | % of Total |
|---|---|---|---|---|---|
| 1 | Benzene, 1,3-bis(3-phenoxyphenoxy)- | 87 | 3.219 | 16657096 | 0.72% |
| 2 | Benzene, 1,3-bis(3-phenoxyphenoxy)- | 93 | 3.245 | 14176171 | 0.61% |
| 3 | Toluene | 93 | 3.366 | 83179931 | 3.58% |
| 4 | Ethylbenzene | 91 | 5.132 | 30272521 | 1.31% |
| 5 | p-Xylene | 95 | 5.319 | 14473672 | 0.62% |
| 6 | Styrene | 95 | 5.762 | 61561183 | 2.65% |
| 7 | 1-Pentalenol, 1,2,3,3a,4,6a-hexahydro- | 46 | 7.033 | 10340085 | 0.45% |
| 8 | Benzene, 1-ethyl-2-methyl- | 94 | 7.779 | 6075290 | 0.26% |
| 9 | 1-Decene | 98 | 8.021 | 12254829 | 0.53% |
| 10 | Benzene, 1-ethyl-2-methyl- | 89 | 8.077 | 22884155 | 0.99% |
| 11 | Octane, 1,1′-oxybis- | 72 | 8.54 | 9919163 | 0.43% |
| 12 | Benzene, 1,2,3-trimethyl- | 94 | 8.734 | 11651334 | 0.50% |
| 13 | Benzene, 1-propenyl- | 94 | 8.87 | 8650812 | 0.37% |
| 14 | Tetracyclo[3.3.1.0(2,8).0(4,6)]-non-2-ene | 76 | 9.02 | 15774581 | 0.68% |
| 15 | Benzene, 1-propynyl- | 94 | 9.252 | 7329465 | 0.32% |
| 16 | Benzene, butyl- | 53 | 9.499 | 5759437 | 0.25% |
| 17 | 1H-Pyrrole, 1-butyl- | 53 | 9.534 | 8502598 | 0.37% |
| 18 | Phenol, 4-methyl- | 93 | 10.028 | 23194377 | 1.00% |
| 19 | Benzene, 2-butenyl- | 70 | 10.153 | 20643235 | 0.89% |
| 20 | 1-Undecene | 97 | 10.259 | 16829659 | 0.73% |

TABLE A66-continued

MS data of obtained from the hexane extract of the reaction of zirconia colloids with algae powder in supercritical water at 500 degrees C.

| Peak # | Peak Name | % Probability | RT | Area | % of Total |
|---|---|---|---|---|---|
| 21 | 2-Nonanone | 93 | 10.324 | 12881949 | 0.56% |
| 22 | 1H-Pyrrole, 2-ethyl-3,5-dimethyl- | 64 | 10.571 | 8012863 | 0.35% |
| 23 | Benzyl methyl ketone | 42 | 11.157 | 11113051 | 0.48% |
| 24 | Benzene, 2-butenyl- | 90 | 11.306 | 4332931 | 0.19% |
| 25 | 2-Methylindene | 91 | 11.52 | 20269310 | 0.87% |
| 26 | Phenol, 2,5-dimethyl- | 64 | 11.617 | 7426143 | 0.32% |
| 27 | Benzene, (1-methyl-2-cyclopropen-1-yl)- | 64 | 11.696 | 20244957 | 0.87% |
| 28 | Benzenemethanol, 2-methyl- | 50 | 11.782 | 7796886 | 0.34% |
| 29 | Phenol, 2-ethyl- | 87 | 11.978 | 36423606 | 1.57% |
| 30 | 1H-Indene, 1,1-dimethyl- | 90 | 12.173 | 9763053 | 0.42% |
| 31 | 1H-Indene, 2,3-dihydro-1,2-dimethyl- | 64 | 12.324 | 10045272 | 0.43% |
| 32 | 1-Dodecene | 95 | 12.391 | 19159795 | 0.83% |
| 33 | 1H-Pyrrole, 2-ethyl-3,4,5-trimethyl- | 70 | 12.466 | 40410342 | 1.74% |
| 34 | .alpha.-Ethyl-O-methoxybenzyl alcohol | 38 | 12.695 | 8255179 | 0.36% |
| 35 | 1,3-Cyclopentadiene, 5,5-dimethyl-1-propyl- | 42 | 13.133 | 8402605 | 0.36% |
| 36 | Phenol, 2,4,6-trimethyl- | 60 | 13.257 | 9482171 | 0.41% |
| 37 | Phenol, 2-ethyl-5-methyl- | 70 | 13.458 | 7898204 | 0.34% |
| 38 | Isoquinoline | 60 | 13.569 | 12405195 | 0.54% |
| 39 | Benzyl alcohol, 3-ethylamino- | 38 | 13.662 | 7492110 | 0.32% |
| 40 | Ammonium, (p-hydroxyphenyl)trimethyl-, hydroxide, inner salt | 43 | 13.73 | 6966835 | 0.30% |
| 41 | 1-Cyclopentene, 1-(methylencyclopropyl)- | 35 | 13.801 | 5697943 | 0.25% |
| 42 | Quinoline, 1,2,3,4-tetrahydro- | 52 | 13.873 | 12094525 | 0.52% |
| 43 | Phenol, 2,3-dimethyl- | 78 | 13.954 | 9286452 | 0.40% |
| 44 | Benzeneethanol, .alpha.-methyl-3-(1-methylethyl)- | 15 | 14.355 | 4712740 | 0.20% |
| 45 | 1-Tridecene | 98 | 14.405 | 19059939 | 0.82% |
| 46 | 6-Tridecene, 7-methyl- | 83 | 14.47 | 23172692 | 1.00% |
| 47 | Indole | 83 | 14.55 | 44733573 | 1.93% |
| 48 | 3-Tetradecene, (E)- | 46 | 14.69 | 15238393 | 0.66% |
| 49 | Naphthalene, 1-methyl- | 76 | 14.857 | 10050553 | 0.43% |
| 50 | 1H-Indole, 2,6-dimethyl- | 64 | 15.509 | 5560935 | 0.24% |
| 51 | 1-Octene, 3,7-dimethyl- | 93 | 15.581 | 18258030 | 0.79% |
| 52 | Naphthalene, 1,2-dihydro-1,1,6-trimethyl- | 95 | 15.652 | 10421418 | 0.45% |
| 53 | Naphthalene, 1,2,3,4-tetrahydro-1,5,7-trimethyl- | 89 | 15.702 | 8223964 | 0.35% |
| 54 | Benzene, 1-methoxy-2-methyl- | 60 | 16.007 | 8265760 | 0.36% |
| 55 | Quinoline, 4-methyl- | 94 | 16.173 | 21506774 | 0.93% |
| 56 | 1H-Indole, 3-methyl- | 91 | 16.306 | 172906809 | 7.45% |
| 57 | 1H-Indole, 7-methyl- | 55 | 16.397 | 23456655 | 1.01% |
| 58 | Naphthalene, 1,6-dimethyl- | 93 | 16.965 | 9198846 | 0.40% |
| 59 | Cyclobutane, 1,2-bis(1,3-butadienyl)- | 64 | 17.301 | 10092032 | 0.44% |
| 60 | Undecane | 42 | 17.449 | 5442626 | 0.24% |
| 61 | .+/-.-trans-2-Cyclohexene-1,4-diol | 27 | 17.855 | 17019104 | 0.73% |
| 62 | Benzenamine, N-methyl-N-2-propynyl- | 87 | 17.972 | 8482896 | 0.37% |
| 63 | Benzonitrile, 2,4,6-trimethyl- | 86 | 18.016 | 39699645 | 1.71% |
| 64 | 1-Pentadecene | 99 | 18.09 | 29871129 | 1.29% |
| 65 | 1H-Indole, 2,3-dimethyl- | 89 | 18.198 | 37828797 | 1.63% |
| 66 | Azulene, 4,6,8-trimethyl- | 25 | 19.125 | 7020059 | 0.30% |
| 67 | 1-Methoxy-5-trimethylsilyloxy-3-phenylpentane | 90 | 19.336 | 21739679 | 0.94% |
| 68 | 8-Quinolinol, 7-methyl- | 46 | 19.459 | 16135919 | 0.70% |

TABLE A66-continued

MS data of obtained from the hexane extract of the reaction of zirconia colloids with algae powder in supercritical water at 500 degrees C.

| Peak # | Peak Name | % Probability | RT | Area | % of Total |
|---|---|---|---|---|---|
| 69 | 1H-Fluorene, dodecahydro- | 18 | 19.536 | 10314927 | 0.45% |
| 70 | Z-8-Hexadecene | 95 | 19.784 | 13474196 | 0.58% |
| 71 | 2-Tetradecanone | 55 | 19.894 | 14608330 | 0.63% |
| 72 | 2-Naphthalenemethanol | 30 | 20.545 | 11141506 | 0.48% |
| 73 | 2,2-Dimethyl-5-phenyl-2H-pyrrole | 25 | 21.157 | 16130339 | 0.70% |
| 74 | 1-Pentadecene | 95 | 21.389 | 4588143 | 0.20% |
| 75 | 2-Pentadecanone | 81 | 21.51 | 23227777 | 1.00% |
| 76 | Cyclopropane, 1-methyl-2-pentyl- | 60 | 21.972 | 16794807 | 0.72% |
| 77 | Cyclohexane, 2-butyl-1,1,3-trimethyl- | 60 | 22.143 | 18992650 | 0.82% |
| 78 | 2-Pentadecanone | 64 | 22.494 | 9462045 | 0.41% |
| 79 | Dodecanoic acid | 50 | 22.532 | 11444950 | 0.49% |
| 80 | 9,9-Dimethoxybicyclo[3.3.1]nona-2,4-dione | 95 | 22.837 | 9368388 | 0.40% |
| 81 | 2-Hexadecanone | 91 | 23.051 | 11976235 | 0.52% |
| 82 | 1,4-Hexadiene, 2,3,4,5-tetramethyl- | 55 | 23.352 | 25528875 | 1.10% |
| 83 | 2-Hexadecene, 3,7,11,15-tetramethyl-, [R-[R*,R*-(E)]]- | 95 | 23.406 | 8444871 | 0.36% |
| 84 | 2-Hexadecene, 3,7,11,15-tetramethyl-, [R-[R*,R*-(E)]]- | 93 | 23.509 | 31729631 | 1.37% |
| 85 | 9-Octadecyne | 62 | 23.601 | 24199665 | 1.04% |
| 86 | 2-Hexadecene, 2,6,10,14-tetramethyl- | 83 | 23.709 | 97785136 | 4.21% |
| 87 | 1,1'-(1,1'-Cyclopropylidenediethyl-idene)disemicarbazide | 59 | 24.043 | 30402202 | 1.31% |
| 88 | 9-Undecenal, 2,10-dimethyl- | 68 | 24.175 | 8318429 | 0.36% |
| 89 | Divinylbis(cyclopropyl)silane | 38 | 24.229 | 47598281 | 2.05% |
| 90 | 2-Heptadecanone | 93 | 24.549 | 222283894 | 9.58% |
| 91 | Z-7-Hexadecenal | 91 | 25.165 | 18645195 | 0.80% |
| 92 | n-Hexadecanoic acid | 99 | 25.496 | 159257577 | 6.86% |
| 93 | 9H-Pyrido[3,4-b]indole, 1-methyl- | 93 | 25.777 | 8789954 | 0.38% |
| 94 | 3-Octadecanone | 90 | 25.839 | 29557855 | 1.27% |
| 95 | 9H-Pyrido[3,4-b]indole | 64 | 25.913 | 12838361 | 0.55% |
| 96 | Z,Z-3,13-Octadecedien-1-ol | 94 | 26.921 | 20292922 | 0.87% |
| 97 | E-2-Methyl-3-tetradecen-1-ol acetate | 86 | 26.954 | 10373853 | 0.45% |
| 98 | Z,E-3,13-Octadecadien-1-ol | 96 | 27.006 | 39272055 | 1.69% |
| 99 | 2-Nonadecanone | 99 | 27.254 | 21978051 | 0.95% |
| 100 | Molybdenum, dicarbonylbis(.eta.-4-3-methyl-3-buten-2-one) | 25 | 27.531 | 13246092 | 0.57% |
| 101 | Cyclohexane, 1-(1,5-dimethylhexyl)-4-(4-methylpentyl)- | 78 | 27.748 | 12443300 | 0.54% |
| 102 | Dodecanamide | 94 | 28.246 | 16129219 | 0.70% |
| 103 | 3-Octadecene-1,2-diol | 53 | 28.686 | 5824413 | 0.25% |

TABLE A67

MS data obtained from the hexane extract of the reaction of zirconia colloids with yeast powder in supercritical water at 500 degrees C.

| Peak # | Peak Name | % Probability | RT | Area | % of Total |
|---|---|---|---|---|---|
| 1 | Heptane, 4-methyl- | 93 | 3.385 | 2225018 | 0.27% |
| 2 | Toluene | 93 | 3.435 | 3831237 | 0.47% |
| 3 | 3-Hexanone | 64 | 3.794 | 1071920 | 0.13% |
| 4 | Cyclopentanone | 72 | 3.834 | 4705970 | 0.58% |

TABLE A67-continued

MS data obtained from the hexane extract of the reaction of zirconia colloids with yeast powder in supercritical water at 500 degrees C.

| Peak # | Peak Name | % Probability | RT | Area | % of Total |
|---|---|---|---|---|---|
| 5 | 1H-Pyrrole, 3-ethyl- | 86 | 4.295 | 5513624 | 0.68% |
| 6 | 2-Butenal, 2-ethyl- | 41 | 4.689 | 1952942 | 0.24% |
| 7 | 2,4-Dimethyl-1-heptene | 95 | 4.73 | 4954165 | 0.61% |
| 8 | Cyclopentanone, 2-methyl- | 76 | 4.752 | 9725224 | 1.19% |
| 9 | 2-Hexenal, 2-methyl- | 50 | 5.522 | 1792029 | 0.22% |
| 10 | Bicyclo[4.2.0]octa-1,3,5-triene | 46 | 5.907 | 5871478 | 0.72% |
| 11 | Bicyclo[4.2.0]octa-1,3,5-triene | 60 | 5.971 | 1304865 | 0.16% |
| 12 | 2-Cyclopenten-1-one, 2-methyl- | 90 | 6.306 | 3422564 | 0.42% |
| 13 | 1-Ethyl-2-pyrrolidinone | 83 | 6.802 | 2835273 | 0.35% |
| 14 | 1-Butanamine, 2-methyl-N-(2-methylbutylidene)- | 53 | 6.86 | 3483908 | 0.43% |
| 15 | Cyclohexanone, 2-propyl- | 43 | 6.914 | 4693741 | 0.58% |
| 16 | Cyclohexanone, 2-(2-bromo-4,4,4-trichlorobutyl)- | 72 | 7.41 | 3064810 | 0.38% |
| 17 | Benzenamine, N-ethyl- | 43 | 7.751 | 2180135 | 0.27% |
| 18 | 2-Ethylacrolein | 50 | 8.08 | 15073862 | 1.85% |
| 19 | Hexadecane, 1-chloro- | 52 | 8.255 | 3579453 | 0.44% |
| 20 | 6-Methyl-3-heptyne | 74 | 8.339 | 5021653 | 0.62% |
| 21 | Decane, 2,6,7-trimethyl- | 43 | 8.444 | 2380176 | 0.29% |
| 22 | Octane, 3-ethyl- | 50 | 8.539 | 3070411 | 0.38% |
| 23 | 2-Cyclopenten-1-one, 2,3,4-trimethyl- | 68 | 8.944 | 1409022 | 0.17% |
| 24 | 2-Pyrrolidinone, 1-propyl- | 53 | 9.051 | 17616936 | 2.16% |
| 25 | Piperidine, 1,2-dimethyl- | 58 | 9.273 | 6322235 | 0.78% |
| 26 | 2-Methyl-2,3-divinyloxirane | 55 | 9.347 | 2953535 | 0.36% |
| 27 | 1-Methylcyclooctene | 50 | 9.643 | 1780088 | 0.22% |
| 28 | 9H-Fluoren-9-one, 3-nitro-2,7-bis[2-(1-piperidinyl)ethoxy]- | 64 | 9.729 | 4207754 | 0.52% |
| 29 | Ethanone, 1-(2-methyl-1-cyclopenten-1-yl)- | 49 | 9.811 | 3961690 | 0.49% |
| 30 | Acetophenone | 87 | 9.956 | 4073870 | 0.50% |
| 31 | Acetophenone | 50 | 10.014 | 3559662 | 0.44% |
| 32 | 2-Butanone, 4-(1-piperidinyl)- | 58 | 10.116 | 5171955 | 0.64% |
| 33 | Phenol, 3-methyl- | 60 | 10.188 | 9592604 | 1.18% |
| 34 | Phenol, 4-methyl- | 91 | 10.307 | 3473991 | 0.43% |
| 35 | Mequinol | 38 | 10.36 | 7696548 | 0.95% |
| 36 | Phenol, 2-methyl- | 38 | 10.484 | 4124668 | 0.51% |
| 37 | Cyclohexane, (1-methylethylidene)- | 30 | 10.672 | 4122977 | 0.51% |
| 38 | (R)-(—)-14-Methyl-8-hexadecyn-1-ol | 38 | 10.79 | 4335741 | 0.53% |
| 39 | Octanenitrile | 45 | 10.925 | 2294023 | 0.28% |
| 40 | Benzyl methyl ketone | 87 | 11.207 | 12864212 | 1.58% |
| 41 | Phenol, 2,4-dimethyl- | 60 | 11.821 | 5357937 | 0.66% |
| 42 | Phenol, 4-ethyl- | 90 | 12.127 | 2857929 | 0.35% |
| 43 | Phenol, 2-ethyl- | 76 | 12.164 | 5535068 | 0.68% |
| 44 | 1-Dodecene | 89 | 12.44 | 1432442 | 0.18% |
| 45 | Dodecane | 86 | 12.597 | 3158684 | 0.39% |
| 46 | 1-Phenyl-2-butanone | 62 | 13.32 | 2703753 | 0.33% |
| 47 | Decane, 5-propyl- | 38 | 13.486 | 1180175 | 0.15% |
| 48 | p-Pentylacetophenone | 81 | 13.692 | 6878782 | 0.84% |
| 49 | Tridecane | 74 | 14.598 | 2145754 | 0.26% |
| 50 | Indole | 76 | 14.695 | 8571205 | 1.05% |
| 51 | Indole | 25 | 14.857 | 3654597 | 0.45% |
| 52 | Methylphenidate | 38 | 14.934 | 6201998 | 0.76% |
| 53 | Ketone, methyl 2,2,3-trimethylcyclopentyl | 38 | 15.024 | 4801160 | 0.59% |
| 54 | Spiro[5.5]undecane-1,7-dione | 41 | 15.553 | 872325 | 0.11% |
| 55 | Geranyl benzoate | 46 | 16.175 | 1590312 | 0.20% |
| 56 | Cyclododecane | 70 | 16.325 | 5125614 | 0.63% |
| 57 | 1H-Indole, 2-methyl- | 90 | 16.386 | 11738127 | 1.44% |
| 58 | 1H-Indole, 3-methyl- | 83 | 16.464 | 8562390 | 1.05% |

TABLE A67-continued

MS data obtained from the hexane extract of the reaction of zirconia
colloids with yeast powder in supercritical water at 500 degrees C.

| Peak # | Peak Name | % Probability | RT | Area | % of Total |
|---|---|---|---|---|---|
| 59 | N-Phenethyl-2-methylbutylideneami | 58 | 16.84 | 10224485 | 1.26% |
| 60 | Imidazole, 2-hydroxy-4-methyl- | 27 | 17.009 | 5659752 | 0.70% |
| 61 | 3-Ethyl-3-methylheptane | 43 | 17.905 | 2294185 | 0.28% |
| 62 | 1-Tridecene | 97 | 18.115 | 2094998 | 0.26% |
| 63 | Benzenamine, N-methyl-N-2-propynyl- | 83 | 18.18 | 2245034 | 0.28% |
| 64 | Benzonitrile, 2,4,6-trimethyl- | 50 | 18.24 | 4182263 | 0.51% |
| 65 | 5-(2-Methoxybenzylidene)-3-piperidinomethyl-2,4-thiazolidinedione | 35 | 18.442 | 4086230 | 0.50% |
| 66 | Dodecanoic acid, 2-methyl- | 74 | 18.715 | 2867032 | 0.35% |
| 67 | 1-Tridecene | 95 | 19.803 | 2101709 | 0.26% |
| 68 | 2-Methyl-E-7-hexadecene | 25 | 21.271 | 1106469 | 0.14% |
| 69 | 3-Eicosene, (E)- | 87 | 21.402 | 1958595 | 0.24% |
| 70 | 2-Pentadecanone | 76 | 21.56 | 4055668 | 0.50% |
| 71 | Methyl tetradecanoate | 91 | 21.942 | 2836855 | 0.35% |
| 72 | 4-Fluoro-1-methyl-5-carboxylic acid, ethyl(ester) | 46 | 22.541 | 2307224 | 0.28% |
| 73 | Arsinous bromide, diethyl- | 50 | 22.679 | 4904102 | 0.60% |
| 74 | 2-Dodecanone | 87 | 23.089 | 1955131 | 0.24% |
| 75 | 1,9-Tetradecadiene | 68 | 24.23 | 18232840 | 2.24% |
| 76 | 1,13-Tetradecadiene | 86 | 24.293 | 15622347 | 1.92% |
| 77 | 2-Heptadecanone | 94 | 24.521 | 29437065 | 3.61% |
| 78 | Pentadecanoic acid, 14-methyl-, methyl ester | 97 | 24.862 | 7555192 | 0.93% |
| 79 | Hexadecenoic acid, Z-11- | 99 | 25.162 | 45090830 | 5.54% |
| 80 | Cyclohexadecane | 80 | 25.326 | 3330278 | 0.41% |
| 81 | n-Hexadecanoic acid | 98 | 25.417 | 28729351 | 3.53% |
| 82 | n-Hexadecanoic acid | 93 | 25.499 | 4120784 | 0.51% |
| 83 | 8-Decen-1-ol, 5,9-dimethyl- | 62 | 25.555 | 6846923 | 0.84% |
| 84 | Ethyl tridecanoate | 46 | 25.785 | 2879509 | 0.35% |
| 85 | 3-Octadecanone | 96 | 25.842 | 5527146 | 0.68% |
| 86 | Methyl n-hexadecyl ketone | 89 | 25.927 | 2195843 | 0.27% |
| 87 | Z-7-Tetradecen-1-ol acetate | 90 | 26.922 | 15532660 | 1.91% |
| 88 | 7-Oxabicyclo[4.1.0]heptane, 1,5-dimethyl- | 55 | 27.012 | 20848179 | 2.56% |
| 89 | 9,12-Octadecadienoic acid (Z,Z)-, methyl ester | 99 | 27.125 | 6938341 | 0.85% |
| 90 | 7-Octadecenoic acid, methyl ester | 99 | 27.2 | 10229319 | 1.26% |
| 91 | 2-Nonadecanone | 99 | 27.257 | 23331093 | 2.86% |
| 92 | Heptadecanoic acid, 16-methyl-, methyl ester | 95 | 27.54 | 5310963 | 0.65% |
| 93 | 9-Octadecenoic acid, (E)- | 95 | 27.736 | 9885459 | 1.21% |
| 94 | Cyclotetradecane | 64 | 27.803 | 9274876 | 1.14% |
| 95 | Hexadecenoic acid, Z-11- | 90 | 28.04 | 12205983 | 1.50% |
| 96 | 2-Methyl-E-7-hexadecene | 56 | 28.128 | 6342086 | 0.78% |
| 97 | 2-Methyl-Z-4-tetradecene | 89 | 28.212 | 4605725 | 0.57% |
| 98 | Hexadecanamide | 93 | 28.288 | 4424773 | 0.54% |
| 99 | 3-Hexadecanone | 55 | 28.454 | 7959801 | 0.98% |
| 100 | Hexanal, O-methyloxime | 35 | 28.721 | 4564212 | 0.56% |
| 101 | 9,10-Anthracenedione, 2-methyl- | 58 | 28.854 | 2375241 | 0.29% |
| 102 | Naphthalene, 2-(phenylmethyl)- | 49 | 29.534 | 322582 | 0.04% |

TABLE A67-continued

MS data obtained from the hexane extract of the reaction of zirconia colloids with yeast powder in supercritical water at 500 degrees C.

| Peak # | Peak Name | % Probability | RT | Area | % of Total |
|---|---|---|---|---|---|
| 103 | 9-Octadecenamide, (Z)- | 58 | 30.464 | 2740359 | 0.34% |
| 104 | 1-Methyl-1-n-butyl-1-silacyclobutane | 53 | 30.826 | 6059931 | 0.74% |
| 105 | Cyclotetradecanone oxime | 38 | 31.159 | 1900223 | 0.23% |
| 106 | 1-Heptadecene | 91 | 31.868 | 2099459 | 0.26% |
| 107 | 1,2,3-Triphenyl-3-methyl-cyclopropene | 35 | 32.778 | 2794332 | 0.34% |
| 108 | 7-Diethylamino-3-[5-(4-fluorophenyl)-2-oxazolyl]coumarin | 46 | 32.996 | 2502112 | 0.31% |
| 109 | t-Butyldiphenyl(prop-2-ynyloxy)silane | 22 | 33.908 | 2089068 | 0.26% |
| 110 | 1-Benzazirene-1-carboxylic acid, 2,2,5a-trimethyl-1a-[3-oxo-1-butenyl] perhydro-, methyl ester | 38 | 34.58 | 1870706 | 0.23% |
| 111 | Silicic acid, diethyl bis(trimethylsilyl) ester | 47 | 34.647 | 1811953 | 0.22% |
| 112 | 1,3-Bis(trimethylsilyl)benzene | 27 | 34.745 | 3185223 | 0.39% |
| 113 | 2-Pentacosanone | 50 | 35.236 | 2964850 | 0.36% |
| 114 | 6-(2-Formylhydrazino)-N,N'-bis(isopropyl)-1,3,5-triazine-2,4-diamine | 42 | 35.75 | 18591779 | 2.28% |
| 115 | Cholesta-5,20,24-trien-3-ol, acetate, (3.beta.)- | 20 | 35.903 | 8858924 | 1.09% |
| 116 | Coprostan-3,5,24-trien | 49 | 35.952 | 12175693 | 1.49% |
| 117 | 3-(4-Hydroxybenzylideneamino)-7-chloro-10-methyl-phenothiazine | 38 | 36.01 | 10110816 | 1.24% |
| 118 | p-Pentyloxybenzylidene p-hexylaniline | 25 | 36.072 | 13895337 | 1.71% |
| 119 | Indole-2-one, 2,3-dihydro-N-hydroxy-4-methoxy-3,3-dimethyl- | 15 | 36.239 | 5980933 | 0.73% |
| 120 | Phenol, 4-fluoro-, phosphite (3:1) | 38 | 36.335 | 4852853 | 0.60% |
| 121 | cis-3,4,5-Trimethoxy-b-methyl-b-nitrostyrene | 38 | 36.498 | 7003166 | 0.86% |
| 122 | 2-Methyl-7-phenylindole | 38 | 36.564 | 4475593 | 0.55% |
| 123 | 2,4,6-Cycloheptatrien-1-one, 3,5-bis-trimethylsilyl- | 35 | 36.773 | 2992175 | 0.37% |
| 124 | 6-(2-Formylhydrazino)-N,N'-bis(isopropyl)-1,3,5-triazine-2,4-diamine | 90 | 36.85 | 11196554 | 1.37% |
| 125 | 2-Methyl-7-phenylindole | 25 | 36.91 | 4045224 | 0.50% |
| 126 | 1H-Indole, 1-methyl-2-phenyl- | 38 | 36.988 | 2829398 | 0.35% |
| 127 | 1,10-Secoergosta-5,7,9,22-tetraen-3-ol, acetate, (24.xi.)- | 38 | 37.12 | 11217065 | 1.38% |
| 128 | 3,3-Diisopropoxy-1,1,1,5,5,5-hexamethyltrisiloxane | 38 | 37.214 | 3426464 | 0.42% |
| 129 | 1,2,3,4,5,6,7,8-Octahydrotriphenylene | 38 | 37.272 | 5043491 | 0.62% |
| 130 | Dibenzylidene 4,4'-biphenylenediamine | 18 | 37.606 | 7044078 | 0.87% |
| 131 | 4-O-Methoxyphenylhydrazono-3-methyl-2-pyrazolin-5-one | 74 | 37.836 | 3592974 | 0.44% |
| 132 | Anthiaergosta-5,7,9,22-tetraene | 30 | 38.151 | 3379568 | 0.42% |
| 133 | 2-Ethylacridine | 60 | 39.023 | 1703816 | 0.21% |

TABLE A68

Conditions for the reaction of algae powder or soybean oil with various catalysts and supercritical water.

| Exp. No. | Oil Type | Reactor Type | Particle Size, Pore size, Surface Area | Actual Preheater Temp. (° C.) (T1) | Reactor Inlet Temp. (° C.), T2 | Back Pressure (PSI) |
|---|---|---|---|---|---|---|
| 785 | 17.3% Algae Powder in water | Open tubular | 7% ZrO2 colloids in water | 450 | 450 | 3100 |
| 786 | 17.3% Algae Powder in water | Open tubular | 7% ZrO2 colloids in water | 500 | 490 | 3100 |
| 787 | Soybean Oil | Fixed Bed | ZrO2 10 um/ 300 A/30 m^2/g | 600 | 595 | 3600 |
| 788 | Soybean Oil | Open tubular | 0.3% MgCO3 in H2O | 450 | 500 | 3100 |
| 789 | Soybean Oil | Fixed Bed | Nb2O5, 325 mesh | 500 | 493 | 3500 |
| 790 | Soybean Oil | Open tubular | 5% <5 um Fe2O3 in soy bean oil | 470 | 503 | 3100 |
| 791 | Soybean Oil | Fixed Bed | CoO2 325 mesh | 497 | 496 | 3500 |
| 792 | Soybean Oil | Open tubular | 5% <50 nm CuO in soybean oil | 481 | 499 | 3100 |
| 793 | Soybean Oil | Fixed Bed | 50% ZrO2 10 μm 300 A, 50% TiO2, 110 μm 60 Å, 7 g | 500 | 505 | 3500 |
| 794 | Soybean Oil | Open tubular | 5% <5 um ZnO in soybean oil | 482 | 499 | 3100 |
| 795 | Soybean Oil | Open tubular | 5% K2HPO4 in H2O | 410 | 493 | 3100 |
| 796 | Soybean Oil | Open tubular | 2.5% <50 nm Y2O3 in soybean oil | 500 | 500 | 3100 |

TABLE A69

Data collected for sample conditions given in Table A61.

| Exp. No. | Actual Water Flow (min/min) | Actual Oil Flow rate (min/Min) | Total Flow Rate (ml/min) |
|---|---|---|---|
| 785 | 3.0 | 3.0 | 6.0 |
| 786 | 3.0 | 3.0 | 6.0 |
| 787 | 5.6 | 2.0 | 7.0 |
| 788 | 4.8 | 1.7 | 6.5 |
| 789 | 2.7 | 0.5 | 3.2 |
| 790 | 4.8 | 1.7 | 6.5 |
| 791 | 1.35 | 0.25 | 1.60 |
| 792 | 4.8 | 1.7 | 6.5 |
| 793 | 5.6 | 2.0 | 7.0 |
| 794 | 4.8 | 1.7 | 6.5 |
| 795 | 4.8 | 1.7 | 6.5 |
| 796 | 4.8 | 1.7 | 6.5 |

TABLE A70

GC-MS product profile for the biofuel obtained from the reaction of soybean oil with supercritical water over $CoO_2$ catalyst using a fixed bed reactor at 500° C.

| Peak # | Peak Name | % Probability | RT | Area | % of Total |
|---|---|---|---|---|---|
| 1 | 1-Hexene | 95 | 1.634 | 25259211 | 0.49% |
| 2 | Benzene | 91 | 2.08 | 15680444 | 0.30% |
| 3 | 1-Heptene | 96 | 2.314 | 14948289 | 0.29% |
| 4 | Heptane | 91 | 2.398 | 13648475 | 0.26% |
| 5 | Toluene | 93 | 3.314 | 42488756 | 0.82% |
| 6 | 1-Octene | 96 | 3.698 | 14886200 | 0.29% |
| 7 | Octane | 91 | 3.847 | 18008641 | 0.35% |
| 8 | Ethylbenzene | 90 | 5.094 | 13555477 | 0.26% |
| 9 | 1-Nonene | 97 | 5.712 | 13464318 | 0.26% |
| 10 | Benzene, 1,3-dimethyl- | 97 | 5.756 | 14011344 | 0.27% |
| 11 | Nonane | 94 | 5.895 | 25370745 | 0.49% |
| 12 | Benzene, propyl- | 90 | 7.125 | 11284168 | 0.22% |
| 13 | 1-Decene | 97 | 7.97 | 12482132 | 0.24% |

TABLE A70-continued

GC-MS product profile for the biofuel obtained from the reaction of soybean oil with supercritical water over $CoO_2$ catalyst using a fixed bed reactor at 500° C.

| Peak # | Peak Name | % Probability | RT | Area | % of Total |
|---|---|---|---|---|---|
| 14 | Decane | 95 | 8.16 | 20214592 | 0.39% |
| 15 | Benzene, butyl- | 90 | 9.442 | 19710538 | 0.38% |
| 16 | 3-Undecene, (Z)- | 95 | 10.21 | 15903762 | 0.31% |
| 17 | Undecane | 96 | 10.391 | 21256257 | 0.41% |
| 18 | 2,3-Pentadiene, 2,4-dimethyl- | 43 | 10.477 | 4152348 | 0.08% |
| 19 | 1,5-Cyclooctadiene, 1,5-dimethyl- | 46 | 10.525 | 6978161 | 0.13% |
| 20 | 1,4-Undecadiene, (E)- | 59 | 10.962 | 11958143 | 0.23% |
| 21 | Tricyclo[4.1.0.02,7]heptane | 64 | 11.456 | 12862375 | 0.25% |
| 22 | Benzene, pentyl- | 93 | 11.638 | 66100060 | 1.27% |
| 23 | Benzene, 1-methyl-4-(2-methylpropyl)- | 91 | 11.853 | 16420713 | 0.32% |
| 24 | 1-Dodecene | 95 | 12.342 | 44006457 | 0.85% |
| 25 | Dodecane | 90 | 12.508 | 46999949 | 0.90% |
| 26 | Benzene, hexyl- | 90 | 13.747 | 18585850 | 0.36% |
| 27 | 1-Tridecene | 99 | 14.35 | 12211056 | 0.24% |
| 28 | Tridecane | 98 | 14.506 | 20334764 | 0.39% |
| 29 | Benzene, heptyl- | 95 | 16.013 | 26080760 | 0.50% |
| 30 | 1,14-Tetradecanediol | 49 | 16.245 | 27038691 | 0.52% |
| 31 | 1-Tetradecene | 98 | 16.387 | 20180808 | 0.39% |
| 32 | Tetradecane | 98 | 17.723 | 22463493 | 0.43% |
| 33 | Undecylenic Acid | 98 | 17.916 | 9884962 | 0.19% |
| 34 | E-9-Tetradecenal | 55 | 18.03 | 8511443 | 0.16% |
| 35 | 1-Pentadecene | 98 | 18.17 | 50115408 | 0.96% |
| 36 | Pentadecane | 98 | 19.406 | 29442251 | 0.57% |
| 37 | 1,11-Dodecadiene | 94 | 19.463 | 19532241 | 0.38% |
| 38 | 1,15-Hexadecadiene | 78 | 19.723 | 13470042 | 0.26% |
| 39 | 1-Hexadecene | 95 | 19.843 | 17945636 | 0.35% |
| 40 | Hexadecane | 98 | 20.956 | 30801629 | 0.59% |
| 41 | Dispiro[4.2.4.2]tetradecane | 58 | 21.459 | 92775039 | 1.78% |
| 42 | Heptadecane | 98 | 23.843 | 24046787 | 0.46% |
| 43 | 8-Phenyloctanoic acid | 94 | 25.636 | 544529244 | 10.47% |
| 44 | n-Hexadecanoic acid | 99 | 25.671 | 140397759 | 2.70% |
| 45 | n-Hexadecanoic acid | 99 | 27.14 | 16080758 | 0.31% |
| 46 | 6,9,12-Octadecatrien-1-ol | 76 | 27.291 | 43731187 | 0.84% |
| 47 | 3-Oxatricyclo[4.4.0.0(2,5)]dec-7-ene-2-carboxylic acid, 4-oxo-5-phenyl-, methyl ester | 91 | 27.429 | 16364376 | 0.32% |
| 48 | Hepta-4,6-dienoic acid, ethyl ester | 70 | 28.036 | 872656322 | 16.77% |
| 49 | 9,12-Octadecadienoic acid (Z,Z)- | 98 | 28.138 | 603592601 | 11.60% |
| 50 | 9,12-Octadecadienoic acid (Z,Z)- | 96 | 28.173 | 195752424 | 3.76% |
| 51 | 9,12-Octadecadienoic acid (Z,Z)- | 97 | 28.239 | 549145929 | 10.56% |
| 52 | 9,12-Octadecadienoic acid (Z,Z)- | 96 | 28.282 | 946569543 | 18.19% |
| 53 | 9,12-Octadecadienoic acid (Z,Z)- | 99 | 28.447 | 261535725 | 5.03% |
| 54 | Octadecanoic acid | 98 | 29.073 | 20449688 | 0.39% |
| 55 | Z,Z-10,12-Hexadecadien-1-ol acetate | 55 | 31.13 | 26790999 | 0.52% |

The invention claimed is:

1. A process for producing a hydrocarbon product stream comprising:

reacting components of a reaction mixture in the presence of a catalyst to form a product mixture in a one step process, the reaction mixture comprising plant, microorganism, or animal based biomass and water, wherein the reaction takes place inside a reaction vessel at a temperature and a pressure, wherein the product mixture comprises at least about 20% aromatics as measured by Gas Chromatography Mass Spectrometry (GCMS) chromatographic peak area normalization method, wherein the temperature is between 540 degrees Celsius and 600 degrees Celsius and the pressure is above critical pressure of water, and wherein the catalyst comprises a metal oxide.

2. The process of claim 1, wherein the reaction mixture includes at least about 50% water by mass.

3. The process of claim 1, wherein the reaction vessel is part of an extrusion system.

4. The process of claim 1, wherein the catalyst is mixed with one or more components of the reaction mixture and then passed into the reaction vessel.

5. The process of claim 1, wherein the catalyst comprises a metal oxide that is stable at temperature above 540 degree Celcius in the presence of supercritical water.

6. The process of claim 1, wherein the catalyst comprises a metal oxide selected from the group consisting of zirconia, titania, and hafnia.

7. The process of claim 1, wherein the catalyst further comprises silica clad with at least one of zirconia, titania, hafnia, yttria, tungsten (VI) oxide, manganese oxide, nickel oxide, nickel, carbon, carbon/nickel, and carbon/platinum.

8. The process of claim 1, wherein the catalyst comprises zirconia.

9. The process of claim 1, wherein the catalyst consists essentially of zirconia.

10. The process of claim 1, wherein the catalyst is in colloidal form.

11. The process of claim 1, wherein the reacting components of a reaction mixture in the presence of catalyst is conducted for a contact time wherein the contact time is less than sixty seconds.

12. The process of claim 1, wherein the product mixture includes substantially no free fatty acids.

13. The process of claim 1, wherein the pressure inside the reaction vessel is greater than about 3500 psi.

14. The process of claim 1, wherein the product mixture includes at least about 1-40% ketones as measured by Gas Chromatography Mass Spectrometry (GCMS) chromatographic peak area normalization method.

15. The process of claim 1, wherein the product mixture comprises at least about 30% aromatics as measured by Gas Chromatography Mass Spectrometry (GCMS) chromatographic peak area normalization method.

16. The process of claim 1, wherein the product mixture meets ASTM D4814.

17. The process of claim 1, the product mixture comprising a mixture of alkanes, alkenes, and aromatics.

18. The process of claim 1, wherein the plant, microorganism, or animal based biomass of the reaction mixture comprises virgin soybean oil.

19. A process for producing a hydrocarbon product stream comprising:
reacting components of a reaction mixture in the presence of a catalyst to form a product mixture in a one step process, the reaction mixture consisting of untreated virgin plant oil and water, wherein the reaction takes place inside a reaction vessel at a temperature and a pressure, wherein the product mixture comprises at least about 20% aromatics as measured by Gas Chromatography Mass Spectrometry (GCMS) chromatographic peak area normalization method,
wherein the temperature is between 510 degrees Celsius and 600 degrees Celsius and the pressure is above critical pressure of water, and
wherein the catalyst comprises a metal oxide.

20. The process of claim 19, the untreated virgin plant oil comprises virgin soybena oil.

21. A process for producing a hydrocarbon product stream comprising:
reacting components of a reaction mixture in the presence of a catalyst to form a product mixture in a one step process, the reaction mixture consisting of a feedstock having an acid number of about 50 (mg KOH/g oil) or greater and water, wherein the reaction takes place inside a reaction vessel at a temperature and a pressure, wherein the product mixture comprises at least about 20% aromatics as measured by Gas Chromatography Mass Spectrometry (GCMS) chromatographic peak area normalization method,
wherein the temperature is between 510 degrees Celsius and 600 degrees Celsius and the pressure is above critical pressure of water, and
wherein the catalyst comprises a metal oxide.

22. A process for producing a hydrocarbon product stream comprising:
reacting components of a reaction mixture in the presence of a catalyst to form a product mixture in a one step process, the reaction mixture comprising plant, microorganism, or animal based biomass and water, wherein the reaction takes place inside a reaction vessel at a temperature and a pressure, wherein the product mixture comprises at least about 20% aromatics as measured by Gas Chromatography Mass Spectrometry (GCMS) chromatographic peak area normalization method,
wherein the temperature is between 540 degrees Celsius and 600 degrees Celsius and the pressure is above critical pressure of water, and
wherein the catalyst comprises a colloidal dispersion of metal oxide particles.

23. The process of claim 22, the metal oxide particles having a size range of 0.1 nm to 500 nm.

* * * * *